United States Patent Office 3,541,213
Patented Nov. 17, 1970

---

3,541,213
FUNGICIDAL AND MITE OVICIDAL SUBSTITUTED 2-AMINOBENZIMIDAZOLES
Hein L. Klopping, Wilmington, Del., assignor to E. I. du Pont de Nemours and Company, Wilmington, Del., a corporation of Delaware
No Drawing. Continuation-in-part of application Ser. No. 629,900, Apr. 11, 1967, which is a continuation-in-part of application Ser. No. 548,034, May 6, 1966. This application Mar. 20, 1968, Ser. No. 714,462
Int. Cl. A01n 9/22
U.S. Cl. 424—273
36 Claims

ABSTRACT OF THE DISCLOSURE

Substituted 2-aminobenzimidazoles of the following three formulas are useful as mite ovicides and fungicides. The compounds also have utility in that when they are added to sewage, they result in an increase in the rate of sewage decomposition. When added to soil, the compounds increase the rate whereby the nitrogen present in fertilizers is converted into usable plant food. The compounds also possess activity against the helminth parasites of warm blooded animals.

Formula I

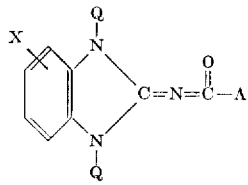

where one Q is

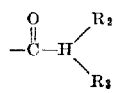

and X, A, $R_2$, $R_3$ and the other Q are as defined hereinafter. An exemplary species of the general class is the compound: methyl 1-(butylcarbamyl)-2-benzimidazolecarbamate.

Formula II

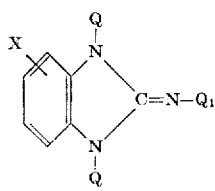

where one Q is —SZ and X, Z, $Q_1$ and the other Q are as defined hereinafter. An exemplary species of this general class is the compound: 1-(trichloromethylthio)-2-benzimidazolecarbamic acid, methyl ester.

Formula III

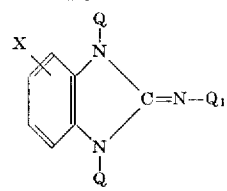

where X, $Q_1$ and Q are as defined hereinafter. Q includes such groups as hydrogen, alkoxycarbonyl, acyl, and alkyl. An examplary species of the general class is the compound: 1-methylcarbonyl-2-benzimidazolecarbamic acid, methyl ester.

CROSS REFERENCE TO RELATED APPLICATIONS

This application is a continuation-in-part of my copending application Ser. No. 629,900, filed Apr. 11, 1967, now abandoned, which application is a continuation-in-part of my copending application Ser. No. 548,034, filed May 6, 1966, now abandoned.

BACKGROUND OF THE INVENTION

This invention relates to substituted 2-aminobenzimidazoles and to methods of using these compounds to prevent or mitigate damage to plants and inanimate organic materials by fungi and mites.

The survival of man has for a long time been dependent in a large measure upon his ability to protect from the various agents of destruction, plants and their products which satisfy his basic needs. With the rapidly increasing population of the world it becomes imperative that there be continuing great improvements in the efficiency of the materials and the methods employed to provide this protection. These improvements can be in the form of effective control of more kinds of pests or in the form of requiring less material or work. The materials and methods of this invention represent marked advances in both of these possible areas of improvement, as will be explained more fully.

I have discovered that application of the compounds of this invention by the methods of this invention, surprisingly, entirely precludes or reduces damage to plants and inanimate organic materials due to both fungi and mites. Fungus mycelia are killed or prevented from developing further by the presence of one or more of the compounds, i.e., the compounds are fungicidal or fungistatic. The compounds further prevent mite populations from expanding or reduce them to a low level or even eliminate them by preventing the normal hatching of their eggs, i.e., the compounds are mite ovicides.

The compounds and methods of this invention also make possible the control of damage by both fungi and mites with an amazingly small amount of chemical and with surprisingly little effort. These advantages are due in large measure to the fact that the compounds when properly applied, can enter and move about in plants. This means that an entire plant can be protected from mites and fungi with a simple application of the chemical to only a part of it, i.e., the compounds are systemic. Further, if the compounds are applied after a disease causing fungus is already established within a plant, they can enter the tissues and eradicate the infection, i.e., the compounds are curative. Thus, the need for applications prior to the actual incidence of the disease is eliminated under many circumstances.

SUMMARY OF THE INVENTION

It has been found that the above outstanding fungicidal and mite ovicidal activity can be obtained by applying to the locus of mite or fungus infestation, the compounds represented by the following three formulas:

Formula I

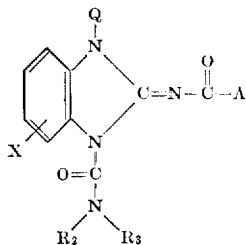

wherein

X is hydrogen, halogen, alkyl of 1 through 4 carbon atoms, nitro, or alkoxy of 1 through 4 carbon atoms;

A is $OR_1$ or $R_6$;

Q is hydrogen; methyl; methyl substituted with cyano, OR or COOR; alkylsulfonyl of 1 through 6 carbon atoms; phenylsulfonyl; phenylsulfonyl substituted with methyl, ethyl, methoxy or halogen; benzylsulfonyl; benzylsulfonyl substituted with methyl, ethyl, methoxy or halogen; alkenyl of 3 to 4 carbon atoms; propargyl; cyano;

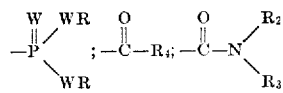

or $CDER_5$; with the proviso that the total carbon content of $R_2$, $R_3$ and Q shall not exceed 18 carbon atoms;

R is methyl or ethyl;

$R_1$ is alkyl of 1 through 4 carbon atoms or allyl;

$R_2$ is hydrogen, alkyl of 1 through 6 carbon atoms, alkenyl of 3 through 6 carbon atoms or alkynyl of 3 through 6 carbon atoms;

$R_3$ is hydrogen; alkyl of 1 through 18 carbon atoms; alkyl of 1 through 18 carbon atoms substituted with halogen, alkoxy of 1 through 4 carbon atoms, or alkoxycarbonyl of 2 through 4 carbon atoms; alkenyl of 3 through 18 carbon atoms; alkenyl of 3 through 18 carbon atoms substituted with halogen, alkoxy of 1 through 4 carbon atoms, or alkoxycarbonyl of 2 through 4 carbon atoms; alkynyl of 3 through 18 carbon atoms; alkynyl of 3 through 18 carbon atoms substituted with halogen, alkoxy of 1 through 4 carbon atoms, or alkoxycarbonyl of 2 through 4 carbon atoms; cycloalkyl of 3 through 10 carbon atoms; cycloalkyl of 3 through 10 carbon atoms substituted with methyl, methoxy, or chlorine; cycloalkenyl of 4 through 8 carbon atoms; cycloalkenyl of 4 through 8 carbon atoms substituted with methyl, methoxy, or chlorine; bicycloalkyl of 7 through 10 carbon atoms; bicycloalkenyl of 7 through 10 carbon atoms; (cycloalkyl)alkyl of 4 through 9 carbon atoms; (cycloalkyl)alkyl of 4 through 9 carbon atoms substituted with methyl, methoxy, or chlorine; (cycloalkenyl)alkyl of 5 through 9 carbon atoms; aralkyl of 5 through 8 carbon atoms; aralkyl of 5 through 8 carbon atoms substituted with alkyl of 1 through 4 carbon atoms, chloroalkyl of 1 through 4 carbon atoms, fluoroalkyl of 1 through 4 carbon atoms, alkoxy of 1 through 4 carbon atoms, halogen, cyano, alkoxycarbonyl of 2 through 3 carbon atoms, alkylsulfonyl of 1 through 4 carbon atoms, or nitro; phenyl; phenyl substituted with alkyl of 1 through 4 carbon atoms, chloroalkyl of 1 through 4 carbon atoms, fluoroalkyl of 1 through 4 carbon atoms, alkoxy of 1 through 4 carbon atoms, halogen, cyano, alkoxycarbonyl of 2 through 3 carbon atoms, alkylsulfonyl of 1 through 4 carbon atoms, or nitro; alkylsulfonyl of 1 through 18 carbon atoms; phenylsulfonyl; phenylsulfonyl substituted with alkyl of 1 through 4 carbon atoms, alkoxy of 1 through 4 carbon atoms, halogen, cyano, alkoxycarbonyl of 2 through 3 carbon atoms, or nitro; acyl of 1 through 18 carbon atoms; acyl of 1 through 18 carbon atoms substituted with halogen or alkoxy of 1 through 4 carbon atoms; aroyl of 6 through 10 carbon atoms; or aroyl of 6 through 10 carbon atoms substituted with alkyl of 1 through 4 carbon atoms, halogen, nitro, alkylsulfonyl of 1 through 4 carbon atoms or alkoxy of 1 through 4 carbon atoms; provided that when $R_2$ and $R_3$ are both substituents on the same nitrogen, they can be taken together to be $-(CH_2)_n-$ where $n$ is 2 to 8 or $-(CH_2)_2-O-(CH_2)_2-$;

$R_4$ is hydrogen; alkyl of 1 through 12 carbon atoms; alkyl of 1 through 12 carbon atoms substituted with hydroxy, $-CR_1$, cyano, acetoxy, chlorine or fluorine; alkynyl of 2 through 10 carbon atoms; alkenyl of 2 through 10 carbon atoms; cycloalkyl of 3 through 8 carbon atoms; chlorine; alkoxycarbonyl of 2 through 5 carbons; or aryl of the type

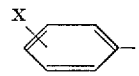

$R_5$ is alkyl of 1 through 12 carbons, alkenyl of 3 through 10 carbons, alkynyl of 3 through 10 carbons, cycloalkyl of 3 through 8 carbons, (cycloalkyl)alkyl of 7 through 10 carbons, phenyl or benzyl;

$R_6$ is hydrogen, alkyl of 1 through 3 carbons or cycloalkyl of 3 through 4 carbons; and D, E and W are oxygen or sulfur.

Preferred within Formula I because of their greater stability are the compounds of the following formula:

Formula IA

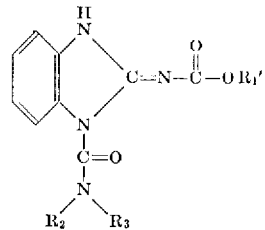

wherein $R_1'$ is methyl, ethyl, isopropyl or sec-butyl;

$R_2$ is hydrogen, alkyl of 1 through 6 carbon atoms, alkenyl of 3 through 6 carbon atoms or alkynyl of 3 through 6 carbon atoms;

$R_3$ is hydrogen; alkyl of 1 through 12 carbon atoms; alkyl of 1 through 12 carbon atoms substituted with halogen, alkoxy of 1 through 4 carbon atoms, or alkoxycarbonyl of 2 through 4 carbon atoms; alkenyl of 3 through 12 carbon atoms; alkynyl of 3 through 12 carbon atoms; cycloalkyl of 3 through 8 carbon atoms; cycloalkyl of 3 through 8 carbon atoms substituted with methyl, methoxy, or chlorine; cycloalkenyl of 4 through 8 carbon atoms; (cycloalkyl)alkyl of 4 through 9 carbon atoms; (cycloalkyl)alkyl of 4 through 9 carbon atoms substituted with methyl, methoxy, or chlorine; (cycloalkenyl)alkyl of 5 through 9 carbon atoms; aralkyl of 5 through 8 carbon atoms; aralkyl of 5 through 8 carbon atoms substituted with alkyl of 1 through 4 carbon atoms, chloroalkyl of 1 through 4 carbon atoms, fluoroalkyl of 1 through 4 carbon atoms, alkoxy of 1 through 4 carbon atoms, halogen, cyano, alkoxycarbonyl of 2 through 3 carbon atoms, alkylsulfonyl of 1 through 4 carbon atoms, or nitro; phenyl; phenyl substituted with alkyl of 1 through 4 carbon atoms, chloroalkyl of 1 through 4 carbon atoms, fluoroalkyl of 1 through 4 carbon atoms, alkoxy of 1 through 4 carbon atoms, halogen, cyano, alkoxycarbonyl of 2 through 3 carbon atoms, alkylsulfonyl of 1 through 4 carbon atoms, or nitro; alkylsulfonyl of 1 through 12 carbon atoms;

phenylsulfonyl; phenylsulfonyl substituted with alkyl of 1 through 4 carbon atoms, alkoxy of 1 through 4 carbon atoms, halogen, cyano, alkoxycarbonyl of 2 through 3 carbon atoms, or nitro; acyl of 1 through 12 carbon atoms; acyl of 1 through 12 carbon atoms substituted with halogen or alkoxy of 1 through 4 carbon atoms; aroyl of 6 through 10 carbon atoms; or aroyl of 6 through 10 carbon atoms substituted with alkyl of 1 through 4 carbon atoms, halogen, nitro, alkylsulfonyl of 1 through 4 carbon atoms or alkoxy of 1 through 4 carbon atoms; provided that when $R_2$ and $R_3$ are both substituents on the same nitrogen, they can be taken together to be $-(CH_2)_n-$ where $n$ is 2 to 8 or $-(CH_2)_2-O-(CH_2)_2-$; and provided that the total carbon content of $R_2$ and $R_3$ shall not exceed 12 carbons.

Preferred within Formula I because of their greater pesticidal activity are the compounds of the following formula:

Formula IB

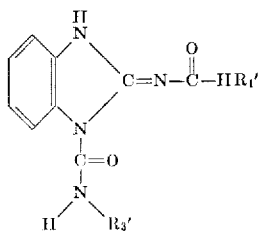

wherein
$R_1'$ is methyl, ethyl, isopropyl or sec-butyl; and
$R_3'$ is alkyl of 1 through 12 carbon atoms; phenyl; phenyl substituted with methyl, ethyl, methoxy, ethoxy, nitro, $CF_3$, $CH_3SO_2$ or halogen; benzyl; benzyl substituted with methyl, nitro, methoxy, or halogen; (cycloalkyl)alkyl of 7 through 8 carbon atoms; (cycloalkyl)alkyl of 7 through 8 carbon atoms substituted with methyl; cyclohexyl; or cyclohexyl substituted with methyl.

Preferred within Formula I on the basis of economics and ease of manufacture are the compounds of the following formula:

Formula IC

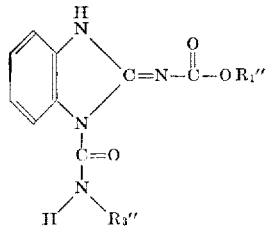

wherein
$R_1''$ is methyl or ethyl and
$R_3''$ is alkyl of 1 through 8 carbon atoms.

Most preferred within Formula I in view of highest activity are the following compounds:

1-butylcarbamoyl-2-benzimidazolecarbamic acid, methyl ester;
1-hexylcarbamoyl-2-benzimidazolecarbamic acid, methyl ester;
1-octaylcarbamoyl-2-benzimidazolecarbamic acid, methyl ester; and
1-(p-methoxyphenylcarbamoyl)-2-benzimidazolecarbamic acid, methyl ester.

It has not been entirely established whether the trisubstituted benzimidazoles of Formula I have structure (A) or structure (B) below:

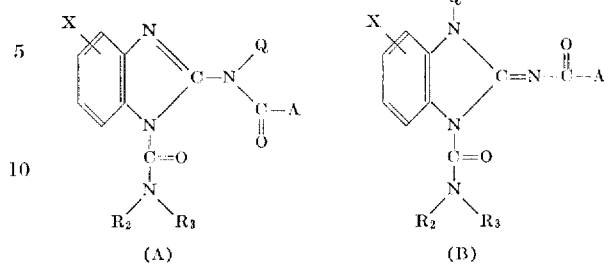

(A)                    (B)

For the purpose of this description, all the trisubstituted compounds are named as the 1,2,3-trisubstituted benzimidazolines (structure (B)) with the understanding that the invention covers the corresponding pure 1,N,N-trisubstituted positional isomers and isomeric mixtures thereof as they are likely to occur.

In a further aspect, the invention relates to the following novel compounds and their outstanding fungicidal and mite ovicidal activity.

Formula II

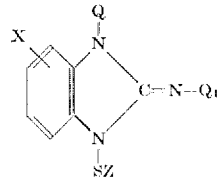

where
X is hydrogen, halogen, or alkyl of 1 through 4 carbon atoms, nitro, or alkoxy or 1 through 4 carbon atoms;
$Q_1$ is hydrogen, $COOR_1$ or $COR_6$;
Z is alkyl of 1 through 6 carbon atoms; alkyl of 1 through 6 carbon atoms substituted with chlorine or fluorine; phenyl; phenyl substituted with nitro, chlorine, fluorine, alkoxy of 1 through 4 carbon atoms, methyl, halomethyl, or alkylsulfonyl of 1 through 4 carbon atoms; benzyl; or benzyl substituted with nitro, chlorine, fluorine, methyl, halomethyl, alkoxy of 1 through 4 carbon atoms, or alkylsulfonyl of 1 through 4 carbon atoms;

Q is —SZ; hydrogen, —CDER₅; cyano;

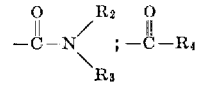

alkylsulfonyl of 1 to 6 carbon atoms;

methyl; methyl substituted with CN, —COOR, or —OR; alkenyl of 3 or 4 carbon atoms; propargyl; phenylsulfonyl; phenylsulfonyl substituted with halogen, methoxy, methyl or ethyl; benzylsulfonyl; or benzylsulfonyl substituted with halogen, methoxy, methyl or ethyl; provided that $Q_1$ cannot be hydrogen when Q is hydrogen, and further provided that the total carbon content of Q and Z cannot exceed 19 carbon atoms;

R is methyl or ethyl;
$R_1$ is alkyl of 1 through 4 carbon atoms or allyl;
$R_2$ is hydrogen, alkyl of 1 through 6 carbon atoms, alkenyl of 3 through 6 carbon atoms or alkynyl of 3 through 6 carbon atoms;
$R_3$ is hydrogen; alkyl of 1 through 18 carbon atoms; alkyl of 1 through 18 carbon atoms substituted with halogen, alkoxy of 1 through 4 carbon atoms, or alkoxycarbonyl of 2 through 4 carbon atoms; alkenyl of 3 through 18 carbon atoms; alkynyl of 3 through 18 carbon atoms; alkenyl of 3 through 18 carbon atoms substituted with halogen, alkoxy of 1 through 4 carbon atoms, or alkoxycarbonyl of 2 through 4 carbon atoms; alkynyl of 3 through 18 carbon atoms substituted with halogen, alkoxy of 1 through 4 carbon atoms, or alkoxycarbonyl of 2 through 4 carbon atoms; cycloalkyl of 3 through 10 carbon atoms; cycloalkyl of 3 through 10 carbon atoms substituted with methyl, methoxy, or chlorine; cycloalkenyl of 4 through 8 carbon atoms; cycloalkenyl of 4 through 8 carbon atoms substituted with methyl, methoxy or chlorine; bicycloalkyl of 7 through 10 carbon atoms; bicycloalkenyl of 7 through 10 carbon atoms; (cycloalkyl)alkyl of 4 through 9 carbon atoms; (cycloalkyl)alkyl of 4 through 9 carbon atoms substituted with methyl, methoxy, or chlorine; (cycloalkenyl)alkyl of 5 through 9 carbon atoms; aralkyl of 5 through 8 carbon atoms; phenyl; phenyl substituted with alkyl of 1 through 4 carbon atoms, chloroalkyl of 1 through 4 carbon atoms, fluoroalkyl of 1 through 4 carbon atoms, alkoxy of 1 through 4 carbon atoms, halogen, cyano, alkoxycarbonyl of 2 through 3 carbon atoms, alkylsulfonyl of 1 through 4 carbon atoms, or nitro; aralkyl of 5 through 8 carbon atoms substituted with alkyl of 1 through 4 carbon atoms, chloroalkyl of 1 through 4 carbon atoms, fluororalkyl of 1 through 4 carbon atoms, alkoxy of 1 through 4 carbon atoms, halogen, cyano, alkoxycarbonyl of 2 through 3 carbon atoms, alkylsulfonyl of 1 through 4 carbon atoms, or nitro; alkylsulfonyl of 1 through 18 carbon atoms; phenylsulfonyl; phenylsulfonyl substituted with alkyl of 1 through 4 carbon atoms, alkoxy of 1 through 4 carbon atoms, halogen, cyano, alkoxycarbonyl of 2 through 3 carbon atoms, or nitro; acyl of 1 through 18 carbon atoms; acyl of 1 through 18 carbon atoms substituted with halogen or alkoxy of 1 through 4 carbon atoms; aroyl of 6 through 10 carbon atoms; or aroyl of 6 through 10 carbon atoms substituted with alkyl of 1 through 4 carbon atoms, halogen, nitro, alkylsulfonyl of 1 through 4 carbon atoms or alkoxy of 1 through 4 carbon atoms; provided that when $R_2$ and $R_3$ are both substituents on the same nitrogen, they can be taken together to be —$(CH_2)_n$— where $n$ is 2 to 8, or —$(CH_2)$—O—$(CH_2)_2$—;

$R_4$ is hydrogen; alkyl of 1 through 12 carbon atoms; alkyl of 1 through 12 carbon atoms substituted with chlorine, fluorine, cyano, hydroxy, acetoxy or —$OR_1$; chlorine; cycloalkyl of 3 through 8 carbon atoms; alkenyl of 2 through 10 carbon atoms; alkynyl of 2 through 10 carbon atoms; aryl of the formula:

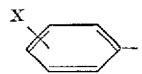

or alkoxycarbonyl of 2 to 5 carbon atoms;

$R_5$ is alkyl of 1 through 12 carbon atoms, alkenyl of 3 through 10 carbon atoms, alkynyl of 3 through 10 (cycloalkyl)alkyl of 7 through 10 carbon atoms, phenyl or benzyl; cycloalkyl of 3 through 8 carbon atoms;

$R_6$ is hydrogen, alkyl of 1 through 3 carbon atoms or cycloalkyl of 3 through 4 carbon atoms; and D, E and W are oxygen or sulfur.

Preferred within Formula II because of their greater stability are compounds of the following formula:

Formula II A

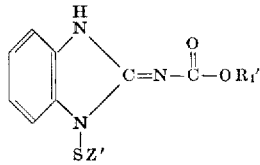

wherein $R_1'$ is methyl, ethyl, isopropyl or sec.-butyl; and $Z'$ is alkyl of 1 through 3 carbon atoms; alkyl of 1 through 3 carbon atoms substituted with chlorine; phenyl; phenyl substituted with methyl, nitro, or chlorine; benxyl; or benzyl substituted with methyl, nitro or chlorine.

Preferred within Formula II on the basis of economics and ease of manufacture are compounds of the following formula:

Formula II B

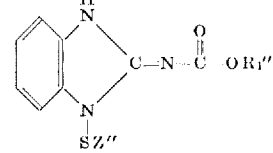

wherein $R_1''$ is methyl, ethyl or isopropyl; and $Z''$ is trichloromethyl or 2,4-dinitrophenyl.

Most preferred within Formula II are the following compounds:

1-(trichloromethylthio)-2-benzimidazolecarbamic acid, methyl ester 1-(trichloromethylthio)-2-benzimidazolecarbamic acid ethyl ester 1-(2,4-dinitrophenylthio)-2-benzimidazolecarbamic acid methyl ester 1-(2,4-dinitrophenylthio)-2-benzimidazolecarbamic acid, ethyl ester 1,3-di-(trichloromethylthio)-2-benzimidazolinecarbamic acid, methyl ester 1-(trichloromethylthio)-3-methylcarbamoyl-2-benzimidazolinecarbamic acid, methyl ester It has not been entirely established whether the trisubstituted benzimidazoles of Formula II has structure (A) or structure (B) below.

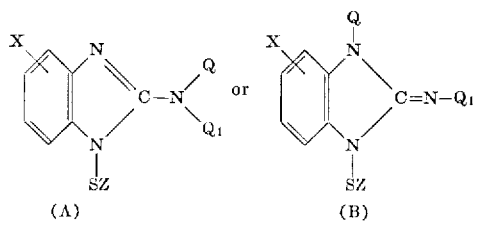

(A)         (B)

For the purpose of this description all the trisubstituted compounds are named as the 1,2,3-benzimidazolines (structure B) with the understanding that the invention covers the corresponding pure 1,N,N-trisubstituted isomers and isomeric mixtures as they are likely to occur.

In yet another aspect, the invention relates to the outstanding fungicidal and mite ovicidal activity obtained by applying to the locus of mite or fungus infestation, the compounds represented by the following formula:

Formula III

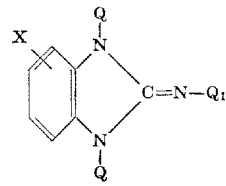

wherein

X is hydrogen, halogen, alkyl of 1 through 4 carbon atoms, nitro, or alkoxy or 1 through 4 carbons;

$Q_1$ is hydrogen, $CDER_1$, or

The other Q's are the same or different and are hydrogen; methyl; methyl substituted or —OR, —CN or COOR; alkenyl of 3 through 4 carbon atoms; propargyl;

cyano; alkylsulfonyl of 1 through 6 carbon atoms; phenylsulfonyl; benzylsulfonyl; $CDER_5$;

or trichloromethylsulfonyl; provided that when one Q and $Q_1$ are each either hydrogen or $COOR_1$, the other Q cannot be hydrogen or $COOR_2$; and further provided that the total number of carbon atoms for the two Q's cannot exceed 14 carbon atoms;

R is methyl or ethyl;

$R_1$ is alkyl of 1 through 4 carbon atoms or allyl;

$R_2$ is alkyl of 1 through 6 carbon atoms, alkenyl of 1 through 6 carbon atoms or alkynyl of 1 through 6 carbon atoms;

$R_4$ is hydrogen; alkyl of 1 through 12 carbon atoms; alkyl of 1 through 12 carbon atoms substituted with hydroxy, $-OR_1$, acetoxy, chlorine, fluorine or cyano; chlorine; alkenyl of 2 through 10 carbon atoms; alkynyl of 2 through 10 carbon atoms; cycloalkyl of 3 through 8 carbon atoms; aryl of the formula:

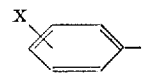

or alkoxycarbonyl of 2 through 5 carbon atoms;

$R_5$ is alkyl of 1 through 12 carbon atoms; alkyl of 1 through 12 carbon atoms substituted with cyano, hydroxy, OR, chlorine or bromine; alkenyl of 3 through 10 carbon atoms; alkynyl of 3 through 10 carbon atoms; cycloalkyl of 3 through 8 carbon atoms; (cycloalkyl)alkyl of 7 through 10 carbon atoms; (cycloalkyl)alkyl of 7 through 10 carbon atoms substituted with methyl, methoxy or chlorine;

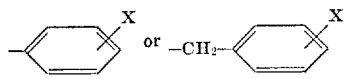

$R_6$ is hydrogen, alkyl of 1 through 3 carbon atoms, or cycloalkyl of 3 through 4 carbon atoms; and D, E and W are oxygen or sulfur.

Preferred within Formula III on the basis of their stability are the compounds of the following formula:

FORMULA IIIA

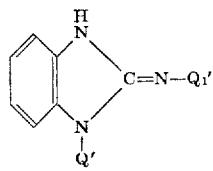

wherein $Q_1'$ is $COOR_1'$ or

Q' is hydrogen; methyl; methyl substituted with cyano, OR or COOR; cyano; $CDER_5$;

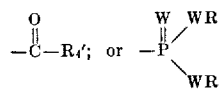

provided that when $Q_1'$ is $COOR_1'$, Q' cannot be hydrogen or $COOR_2$;

R is methyl or ethyl;

$R_1'$ is methyl, ethyl, isopropyl or sec-butyl;

$R_2$ is alkyl of 1 through 6 carbon atoms, alkenyl of 1 through 6 carbon atoms, or alkynyl of 1 through 6 carbon atoms;

$R_4'$ is alkyl of 1 through 12 carbon atoms; alkyl of 1 through 12 carbon atoms substituted with hydroxy, $-OR$, cyano, acetoxy, chlorine or fluorine; alkynyl of 2 through 10 carbon atoms; alkenyl of 2 through 10 carbon atoms; cycloalkyl of 3 through 8 carbon atoms; chlorine; aryl of the type:

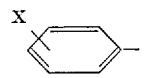

or alkoxycarbonyl of 2 to 5 carbons;

X is hydrogen, halogen, alkyl of 1 through 4 carbon atoms, nitro, or alkoxy of 1 through 4 carbon atoms;

$R_5$ is alkyl of 1 through 12 carbon atoms; alkyl of 1 through 12 carbon atoms substituted with cyano, hydroxy, OR, chlorine or bromine; alkenyl of 3 through 10 carbon atoms; alkynyl of 3 through 10 carbon atoms; cycloalkyl of 3 through 8 carbon atoms; (cycloalkyl)alkyl of 7 through 10 carbon atoms; (cycloalkyl)alkyl of 7 through 10 carbon atoms substituted with methyl, methoxy or chlorine;

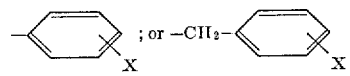

$R_6'$ is hydrogen, alkyl of 1 through 3 carbon atoms or cycloalkyl of 3 through 4 carbon atoms; and D, E and W are oxygen or sulfur.

Preferred within Formula III on the basis of economics and ease of manufacture are the compounds of the following formula:

FORMULA IIIB

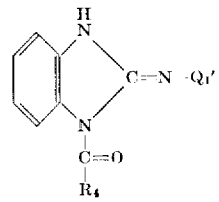

wherein $Q_1'$ is $COOR_1'$ or

$R_1'$ is methyl, ethyl, isopropyl or sec-butyl;

$R_4$ is hydrogen; alkyl of 1 through 12 carbon atoms; alkyl of 1 through 12 carbon atoms substituted with cyano, hydroxy, methoxy, ethoxy, acetoxy, chlorine, or fluorine; chlorine; alkenyl of 2 through 10 carbon atoms; alkynyl of 2 through 10 carbon atoms; cycloalkyl of 3 through 8 carbon atoms; alkoxy-carbonyl of 2 through 5 carbon atoms and aryl of the formula:

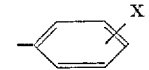

and $R_6'$ is alkyl of 1 through 3 carbon atoms or cycloalkyl of 3 through 4 carbon atoms.

Preferred within Formula III on the basis of their high pesticidal activity are the compounds of the following formula:

FORMULA IIIC

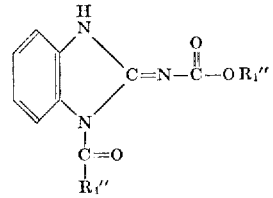

wherein $R_1''$ is methyl or ethyl; and $R_4''$ is alkyl of 1 through 4 carbons, cycloalkyl of 3 through 4 carbons, methoxycarbonyl, or ethoxycarbonyl.

Most preferred within Formula III are the following compounds:

1-acetyl-2-benzimidazolecarbamic acid, methyl ester
1-propionyl-2-benzimidazolecarbamic acid, methyl ester
1 - ethoxyoxyalyl - 2-benzimidazolecarbamic acid, methyl ester
1 - methoxyoxalyl - 2-benzimidazolecarbamic acid, methyl ester

DETAILED DESCRIPTION OF THE INVENTION

The compounds of Formula I can be prepared by a number of routes. For example, the 1-carbamoyl substituted 2-benzimidazolecarbamates can be prepared by reacting 2-benzimidazolecarbamates with isocyanates in accordance with the following reaction:

(1)
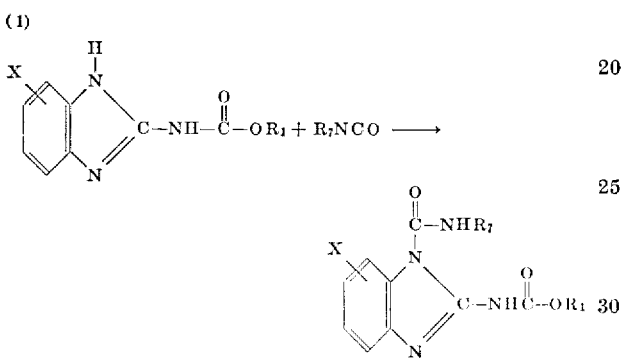

In this scheme, X and $R_1$ are described in Formula I, and $R_7$ is $R_2$ or $R_3$ as also described in Formula I.

The reaction as set forth in (1) above can be carried out in different inert solvents such as chloroform, carbon tetrachloride, methylene chloride, benzene, or cycylohexane. Mixtures of these solvents can also be used. The reaction can also be carried out without solvent by combining the two reactants in a closed system and subjecting them to shear or impact force, e.g., by use of a mix muller.

The reaction temperature, in general, is not critical and can be anywhere in between the freezing point and the boiling point of the reaction mixture, provided this boiling point is below the temperature at which reactants and products decompose. Ambient temperature is preferred.

The 1-carbamoyl-2-benzimidazolecarbamates can also be prepared by first preparing the corresponding 1-chlorocarbonyl-2-benzimidazolecarbamate from 2-benzimidzolecarbamate, phosgene and an acid acceptor, then reacting this 1 - chlorocarbonyl - 2-benzimidazolecarbamate with ammonia or substituted amines in accordance with the following sequence of reactions.

(2)
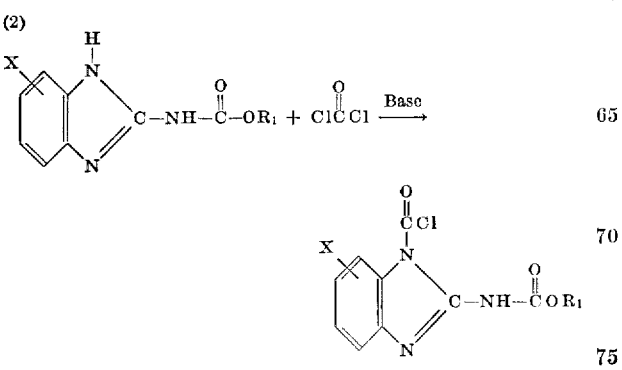

(3)
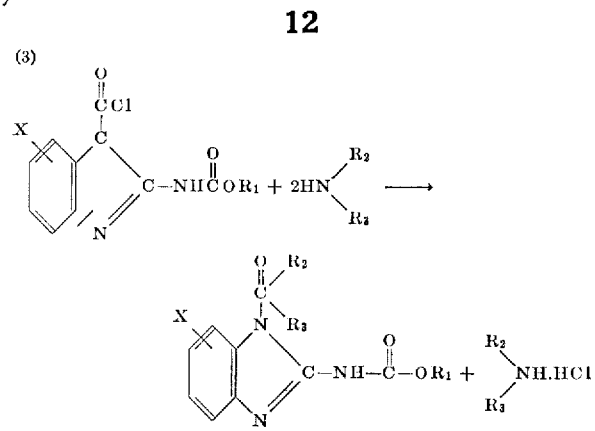

In these schemes, X, $R_1$, $R_2$ and $R_3$ are as described in Formula I.

The reactions set forth in (2) and (3) can be carried out in solvents such as acetone, tetrahydrofuran, chloroform, methylenechloride, benzene, cyclohexane and carbon tetrachloride. Mixtures of these solvents can also be used.

Suitable bases are sodium hydroxide, sodium acetate, sodium carbonate, potassium carbonate, sodium bicarbonate, trimethylamine, triethylamine, pyridine, and many others. These bases may be used either as such or in the form of a solution in a suitable solvent.

The reaction temperature is in general not critical, and as mentioned for reaction (1) can be anywhere in between the freezing point and the boiling point of the reaction mixture, provided this boiling point is below the temperature at which reactants and products decompose. Room temperature is generally most convenient and thus preferred.

The 1,3-biscarbamoylsubstituted $\Delta^{2,N}$-2-benzimidazolinecarbamates can be prepared by reacting 2-benzimidazolecarbamates with two equivalents of an isocyanate in accordance with the following reaction.

(4)
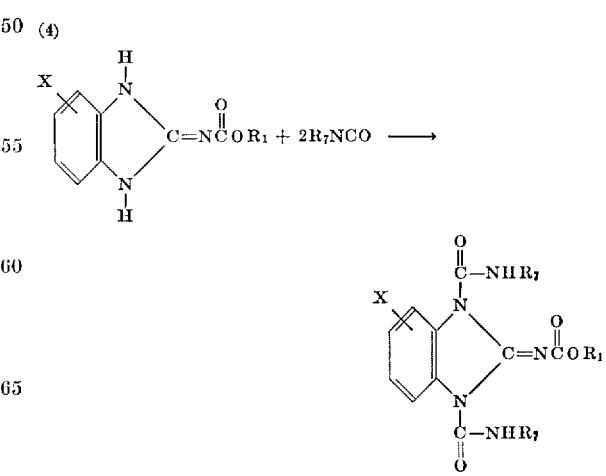

In this scheme X, $R_1$ and $R_7$ and the reaction conditions are the same as described for reaction (1).

The 1-carbamoyl substituted-3-carbamoyl substituted Δ²,ᴺ-2-benzimidazolinecarbamates can be prepared by reacting 1 - carbamoyl substituted - 2 - benzimidazolecarbamates with isocyanates in accordance with the following reaction.

(5)

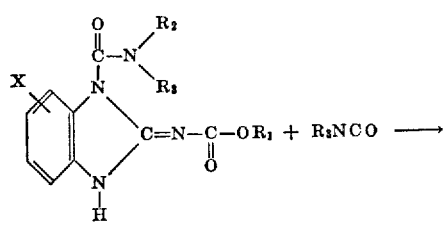

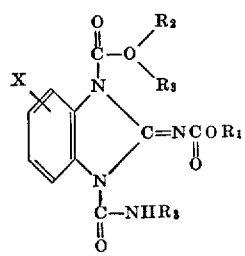

In this scheme, X, $R_1$, $R_2$, and $R_3$ are as described in Formula I.

The reaction conditions for reaction (5) are the same as those for reaction (1) above.

The 1-carbamoyl substituted-3-substituted-Δ²,ᴺ-2-benzimidazolinecarbamates can be prepared by reacting 1-substituted carbamoyl-3-benzimidazolines with electrophilic reagents (QW) such as alkyl chloroformates in accordance with the following reaction.

(6)

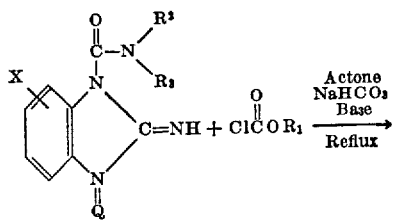

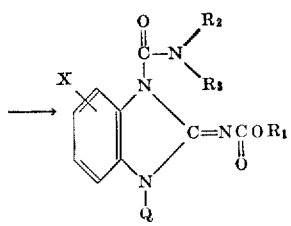

In this scheme, X, $R_1$, $R_2$, $R_3$ and Q are as described in Formula I.

The reaction conditions for reaction (6) are similar to those described for reaction (1) above.

The 2 - imino - 3-carbamoyl substituted-1-benzimidazolines used in reaction (6) can be prepared by reacting the 2-imino-1-benzimidazolines with isocyanates in accordance with the following reaction.

(7)

In this scheme, X, Q and $R_1$ are as described as in Formula I and $R_7$ is $R_2$ or $R_3$ as described in Formula I.

The reaction conditions for reaction (7) are the same as those for reaction (1).

The following examples illustrate the preparation of the compounds of Formula I. The amounts are given in terms of parts by weight unless otherwise specified.

EXAMPLE 1

Preparation of methyl 1-(butylcarbamoyl)-2-benzimidazolecarbamate

To a slurry of 19.1 parts of methyl-2-benzimidazolecarbamate and 600 parts of chloroform are added 9.9 parts of n-butylisocyanate. The reaction is stirred at room temperature until a clear solution is present or until only a small amount of solid is present.

Any solids present are removed by filtration. The solvent is removed from the filtrate under reduced pressure and essentially pure methyl 1-(butylcarbamoyl)-2-benzimidazolecarbamate is obtained by triturating the remaining white solid with hexane and collecting the product by filtration.

The following compounds are prepared in accordance with the procedure set forth above by replacing n-butylisocyanate with the indicated isocyanate. The table shows not only the relative proportions of the indicated isocyanates needed for 19.1 parts by weight of methyl-2-benzimidazolecarbamate but also the product obtained.

| Isocyanate | | Product |
|---|---|---|
| Parts by wt. | Name | |
| 8.5 | Propylisocyanate | Methyl 1-(propylcarbamoyl)-2-benzimidazolecarbamate. |
| 8.5 | Isopropylisocyanate | Methyl 1-(isopropylcarbamoyl)-2-benzimidazole carbamate. |
| 7.1 | Ethylisocyanate | Methyl 1-(ethylcarbamoyl)-2-benzimidazolecarbamate. |
| 8.2 | Allylisocyanate | Methyl 1-(allylcarbamoyl)-2-benzimidazolecarbamate. |
| 14.2 | Benzoylisocyanate | Methyl 1-(benzoylcarbamoyl)-2-benzimidazolecarbamate. |
| 16.0 | Trichloroacetylisocyanate | Methyl 1-(trichloroacetylcarbamoyl)-2-benzimidazolecarbamate. |
| 5.7 | Methylisocyanate | Methyl 1-(methylcarbamoyl)-2-benzimidazolecarbamate. |
| 12.7 | Hexylisocyanate | Methyl 1-(hexylcarbamoyl)-2-benzimidazolecarbamate. |
| 12.5 | Cyclohexylisocyanate | Methyl 1-(cyclohexylcarbamoyl)-2-benzimidazolecarbamate. |
| 13.9 | 2-methylcyclohexylisocyanate | Methyl 1-[(2-methylcyclohexyl)-carbamoyl]-2-benzimidazolecarbamate. |
| 13.9 | Cyclohexylmethylisocyanate | Methyl 1-[(cyclohexylmethyl)-carbamoyl]-2-benzimidazolecarbamate. |
| 15.5 | 4-methoxycyclohexylisocyanate. | Methyl 1-[(4-methoxycyclohexyl)-carbamoyl]-2-benzimidazolecarbamate. |
| 15.5 | Octylisocyanate | Methyl 1-[(octylcarbamoyl)]-2-benzimidazolecarbamate. |
| 11.1 | Cyclopentylisocyanate | Methyl 1-(cyclopentylcarbamoyl)-2-benzimidazolecarbamate. |
| 13.7 | 2-norbornenylisocyanate | Methyl 1-[(2-norbornenyl)carbamoyl] 2-benzimidazolecarbamate. |
| 15.3 | Cyclooctylisocyanate | Methyl 1-(cyclooctylcarbamoyl)-2-benzimidazolecarbamate. |
| 13.3 | Benzylisocyanate | Methyl 1-(benzylcarbamoyl)-2-benzimidazolecarbamate. |
| 14.7 | p-Methylbenzylisocyanate | Methyl 1-[(p-methylbenzyl)-carbamoyl]-2-benzimidazolecarbamate. |
| 12.3 | Furfurylisocyanate | Methyl 1-(furfurylcarbamoyl)-2-benzimidazolecarbamate. |
| 11.9 | Phenylisocyanate | Methyl 1-(phenylcarbamoyl)-2-benzimidazolecarbamate. |
| 13.3 | o-Tolylisocyanate | Methyl 1-[(o-tolyl)carbamoyl]-2-benzimidazolecarbamate. |
| 13.3 | m-Toluoylisocyanate | Methyl 1-[(m-toluoyl)carbamoyl]-2-benzimidazolecarbamate. |
| 13.3 | p-Tolylisocyanate | Methyl 1-[(p-tolyl)carbamoyl]-2-benzimidazolecarbamate. |
| 15.4 | o-Chlorophenylisocyanate | Methyl 1-[(o-chlorophenyl)carbamoyl]-2-benzimidazolecarbamate. |
| 15.4 | p-Chlorophenylisocyanate | Methyl 1-[(p-chlorophenyl) carbamoyl]-2-benzimidazolecarbamate. |
| 16.1 | p-Isopropylphenylisocyanate | Methyl 1-[(p-isopropylphenyl)-carbamoyl]-2-benzimidazolecarbamate. |
| 17.5 | p-Tert-butylphenylisocyanate. | Methyl 1-[(p-tert-butylphenyl) carbamoyl] 2-benzimidazolecarbamate. |
| 14.7 | 3,4-xylylisocyanate | Methyl 1-[(3,4-xylyl)carbamoyl]-2-benzimidazolecarbamate. |
| 14.9 | p-Methoxyphenylisocyanate | Methyl 1-[(p-methoxyphenyl)-carbamoyl]-2-benzimidazolecarbamate. |
| 14.9 | o-Methoxyphenylisocyanate | Methyl 1-[(o-methoxyphenyl)-carbamoyl]-2-benzimidazolecarbamate. |
| 19.1 | p-butoxyphenylisocyanate | Methyl 1-[(p-butyoxyphenyl)-carbamoyl]-2-benzimidazolecarbamate. |
| 19.8 | p-bromophenylisocyanate | Methyl 1-[(p-bromophenyl)carbamoyl]-2-benzimidazolecarbamate. |
| 13.7 | o-Fluorophenylisocyanate | Methyl 1-[(o-fluorophenyl)-carbamoyl]-2-benzimidazolecarbamate. |
| 14.4 | p-Cyanophenylisocyanate | Methyl 1-[(p-cyanophenyl)-carbamoyl]-2-benzimidazolecarbamate. |
| 17.7 | p-(Methoxycarbonyl)-phenylisocyanate. | Methyl 1-[(p-methoxycarbonyl-phenyl) carbamoyl]-2-benzimidazolecarbamate. |
| 19.1 | p-(Ethoxycarbonyl)-phenylisocyanate. | Methyl 1-[(p-ethoxycarbonyl-phenyl) carbamoyl]-2-benzimidazolecarbamate. |
| 16.4 | p-Nitrophenylisocyanate | Methyl 1-[(p-nitrophenyl)-carbamoyl]-2-benzimidazolecarbamate. |
| 16.4 | m-Nitrophenylisocyanate | Methyl 1-[(m-nitrophenyl)carbamoyl]-2-benzimidazolecarbamate. |
| 18.8 | 3,4-dichlorophenylisocyanate | Methyl 1-[(3,4-dichlorophenyl)-carbamoyl]-2-benzimidazolecarbamate. |
| 16.8 | 3-chloro-4-methylphenylisocyanate. | Methyl 1-[(3-chloro-4-methylphenyl)carbamoyl]-2-benzimidazolecarbamate. |
| 12.9 | Ethoxycarbonylmethylisocyanate. | Methyl 1-(ethoxycarbonylmethylcarbamoyl)-2-benzimidazolecarbamate. |
| 14.3 | Ethoxycarbonyl-ethylisocyanate. | Methyl 1-(ethoxycarbonylethylcarbamoyl)-2-benzimidazolecarbamate. |
| 11.5 | Methoxypropylisocyanate | Methyl 1-(methoxypropylcarbamoyl)-2-benzimidazolecarbamate. |
| 10.6 | 2-chloroethylisocyanate | Methyl 1-[(2-chloroethyl)carbamoyl]-2-benzimidazolecarbamate. |
| 9.9 | Isobutylisocyanate | Methyl 1-(isobutylcarbamoyl)-2-benzimidazolecarbamate. |
| 25.0 | Octadecylisocyanate | Methyl 1-(octadecylcarbamoyl)-2-benzimidazolecarbamate. |
| 21.1 | Dodecylisocyanate | Methyl 1-(dodecylcarbamoyl)-2-benzimidazolecarbamate. |
| 19.4 | 9-decenylisocyanate | Methyl 1-(9-decenylcarbamoyl-2-benzimidazolecarbamate. |

EXAMPLE 2

Preparation of methyl 1-carbamoyl-2-benzimidazolecarbamate

To a solution of 9.9 parts of phosgene in 300 parts of tetrahydrofuran is slowly added 19.1 parts of methyl 2-benzimidazolecarbamate. The reaction is stirred at room temperature for 1 hour, then 10.1 parts of triethylamine are added to the reaction mixture. The reaction is stirred at room temperature for 1 hour, then the solid present is removed by filtration. The solvent is removed from the filtrate under reduced pressure and essentially pure methyl 1-chlorocarbonyl-2-benzimidazolecarbamate is obtained by triturating the residue with hexane and collecting the product by filtration.

To a solution of 12.7 parts of methyl 1-chlorocarbonyl-2-benzimidazolecarbamate and 300 parts of chloroform is slowly added 1.7 parts of ammonia. Any solids present are removed by filtration, and the filtrate is washed with water. The chloroform layer is dried and the solvent is removed under reduced pressure. Essentially pure methyl 1-carbamoyl-2-benzimidazolecarbamate is obtained by triturating the remaining white solid with hexane and collecting the product by filtration.

The following compounds can be prepared in accordance with the above procedure by replacing the 12.7 parts of the appropriate 1-chlorocarbonyl-2-benzimidazbamate and the 1.7 parts of ammonia with equivalent parts of the appropriate 1-chlorocarbonyl-2-benzimidazolecarbamic acid ester and the properly substituted amines necessary to prepare each named product.

Product methyl 1-(N,N-dimethylcarbamoyl)-2-benzimidazolecarbamate
methyl 1-(N,N-dipropylcarbamoyl)-2-benzimidazolecarbamate
methyl 1-(N,N-diethylcarbamoyl)-2-benzimidazolecarbamate
methyl 1-(N,N-dibutylcarbamoyl)-2-benzimidazolecarbamate
methyl 1-(N,N-dihexylcarbamoyl)-2-benzimidazolecarbamate
methyl 1-(N-methyl-N-octylcarbamoyl)-2-benzimidazolecarbamate
methyl 1-(N-dodecyl-N-methylcarbamoyl)-2-benzimidazolecarbamate
methyl 1-(N-ethyl-N-methylcarbamoyl)-2-benzimidazolecarbamate
methyl 1-(N-hexyl-N-methylcarbamoyl)-2-benzimidazolecarbamate
methyl 1-(N-butyl-N-ethylcarbamoyl)-2-benzimidazolecarbamate
methyl 1-(piperidinocarbonyl)-2-benzimidazolecarbamate
ethyl 1-(N,N-dimethylcarbamoyl)-2-benzimidazolecarbamate
propyl 1-(N,N-dimethylcarbamoyl)-2-benzimidazolecarbamate
butyl 1-(N,N-dimethylcarbamoyl)-2-benzimidazolecarbamate
allyl 1-(N,N-dimethylcarbamoyl)-2-benzimidazolecarbamate
ethyl 1-(piperidinocarbonyl)-2-benzimidazolecarbamate
methyl 1-(pyrrolidinocarbonyl)-2-benzimidazolecarbamate
methyl 1-(N-cyclohexyl-N-ethylcarbamoyl)-2-benzimidazolecarbamate
methyl 1-[N-methyl-N-(p-toluoyl)carbamoyl]-2-benzimidazole-carbamate
isopropyl 1-(morpholinocarbonyl)-2-benzimidazolecarbamate
ethyl 1-(N-butyl-N-methylcarbamoyl)-2-benzimidazolecarbamate
ethyl 1-(N-cyclohexyl-N-ethylcarbamoyl)-2-benzimidazolecarbamate
isopropyl 1-(N-butyl-N-methylcarbamoyl)-2-benzimidazolecarbamate
isopropyl 1-(N-hexyl-N-methylcarbamoyl)-2-benzimidazolecarbamate
isopropyl 1-[N-methyl-N-(p-tolyl)carbamoyl]-2-benzimidazolecarbamate
ethyl 1-[N-ethyl-N-(p-tolyl)carbamoyl]-2-benzimidazolecarbamate
isopropyl 1-(N-cyclohexyl-N-methylcarbamoyl)-2-benzimidazolecarbamate
propyl 1-(N-butyl-N-methylcarbamoyl)-2-benzimidazolecarbamate
propyl 1-[N-methyl-N-(p-toluoyl)carbamoyl]-2-benzimidazolecarbamate
ethyl 1-carbamoyl-2-benzimidazolecarbamate
isopropyl 1-carbamoyl-2-benzimidazolecarbamate
propyl 1-carbamoyl-2-benzimidazolecarbamate
butyl 1-carbamoyl-2-benzimidazolecarbamate
methyl 1-(1-aziridinylcarbonyl)-2-benzimidazolecarbamate
methyl 1-(octahydro-1H-azonin-1-ylcarbonyl)-2-benzimidazolecarbamate
methyl 1-(N,N-diallylcarbamoyl)-2-benzimidazolecarbamate
methyl 1-(N,N-dipropargylcarbamoyl)-2-benzimidazolecarbamate
methyl 1-(N,N-dihex-2-enylcarbamoyl)-2-benzimidazolecarbamate
methyl 1-(N,N-dibut-2-enylcarbamoyl)-2-benzimidazolecarbamate
methyl 1-(N-allyl-N-methylcarbamoyl)-2-benzimidazolecarbamate
methyl 1-(N-propargyl-N-methylcarbamoyl)-2-benzimidazolecarbamate
methyl 1-(N-hex-2-vinyl-N-methylcarbamoyl)-2-benzimidazolecarbamate

EXAMPLE 3

Preparation of methyl 1,3-bis(methylcarbamoyl)-$\Delta^{2,N}$-2-benzimidazolecarbamate To a slurry of 9.6 parts of methyl-2-benzimidazolecarbamate and 300 parts of chloroform are added 8.6 parts of methylisocyanate. The reaction is stirred at room temperature until a clear solution is present, or until a constant amount of solids are present. Any solids present are removed by filtration. The solvent is removed from the filtrate under reduced pressure, and essentially pure methyl 1,3-bis(methylcarbamoyl)-$\Delta^{2,N}$-2-benzimidazolinecarbamate is obtained by triturating the remaining solid with hexane and collecting the product by filtration.

The following compounds of Formula I are prepared in accordance with the preceding procedure by replacing the 9.6 parts of methyl-2-benzimidazolecarbamate and 8.6 parts of methylisocyanate with the equivalent parts of the 2-benzimidazolecarbamic acid ester and isocyanate necessary to prepare each named product.

Product methyl 1,3-bis(butylcarbamoyl)-$\Delta^{2,N}$-2-benzimidazolinecarbamate
methyl 1,3-bis(ethylcarbamoyl)-$\Delta^{2,N}$-2-benzimidazolinecarbamate
methyl 1,3-bis(propylcarbamoyl)-$\Delta^{2,N}$-2-benzimidazolinecarbamate
methyl 1,3-bis(pentylcarbamoyl)-$\Delta^{2,N}$-2-benzimidazolinecarbamate
methyl 1,3-bis(hexylcarbamoyl)-$\Delta^{2,N}$-2-benzimidazolinecarbamate
methyl 1,3-bis(octylcarbamoyl)-$\Delta^{2,N}$-2-benzimidazolinecarbamate
ethyl 1,3-bis(butylcarbamoyl)-$\Delta^{2,N}$-2-benzimidazolinecarbamate
methyl 1,3-bis(benzylcarbamoyl)-$\Delta^{2,N}$-2-benzimidazolinecarbamate
methyl 1,3-bis[(p-tolyl)carbamoyl]-$\Delta^{2,N}$-2-benzimidazolinecarbamate
methyl 1,3-bis[(p-chlorophenyl)carbamoyl]-$\Delta^{2,N}$-2-benzimidazolinecarbamate
methyl 1,3-bis[(p-methoxyphenyl)carbamoyl]-$\Delta^{2,N}$-2-benzimidazolinecarbamate
methyl 1,3-bis[(p-methoxycarbonylphenyl)-carbamoyl]-$\Delta^{2,N}$-2-benzimidazolinecarbamate
isopropyl 1,3-bis(butylcarbamoyl)-$\Delta^{2,N}$-2-benzimidazolinecarbamate methyl 1,3-bis(ethoxycarbonylmethylcarbamoyl)-
    $\Delta^{2,N}$-2-benzimidazolinecarbamate
methyl 1,3-bis(methoxypropylcarbamoyl)-$\Delta^{2,N}$-
    2-benzimidazolinecarbamate
ethyl 1,3-bis(methylcarbamoyl)-$\Delta^{2,N}$-2-
    benzimidazolinecarbamate
ethyl 1,3-bis(propylcarbamoyl)-$\Delta^{2,N}$-2-
    benzimidazolinecarbamate
ethyl 1,3-bis(ethoxycarbonylcarbamoyl)-$\Delta^{2,N}$-2-
    benzimidazolinecarbamate
sec-butyl 1,3-bis(methylcarbamoyl)-$\Delta^{2,N}$-2-
    benzimidazolinecarbamate
sec-butyl 1,3-bis(butylcarbamoyl)-$\Delta^{2,N}$-2-
    benzimidazolinecarbamate

EXAMPLE 4

Preparation of methyl 1-(butylcarbamoyl)-3-
(methylcarbamoyl)-$\Delta^{2,N}$-2-benzimidazolinecarbamate To a solution of 12.4 parts of methyl 1-(methyl-carbamoyl)-2-benzimidazolecarbamate and 300 parts of chloroform are added 5.0 parts of butylisocyanate. The reaction is stirred at room temperature until a clear solution is present, or until a constant amount of solids are present. Any solids present are removed by filtration. The solvent is removed from the filtrate under reduced pressure, and essentially pure methyl 1-(butylcarbamoyl)-3-(methylcarbamoyl)-$\Delta^{2,N}$-2-benzimidazolinecarbamate is obtained by triturating the remaining solid with hexane and collecting the product by filtration.

The following compounds are prepared in accordance with the above procedure by replacing the butylisocyanate with the relative proportions of the indicated isocyanate needed for 12.4 parts of methyl 1-(methylcarbamoyl)-2-benzimidazolecarbamate. The product obtained is also given.

ester and isocyanate necessary to prepare each named product.

Product ethyl 1-(butylcarbamoyl)-3-(methyl-$\Delta^{2,N}$-2-benzimidaz-
    olinecarbamate
ethyl 1-(hexylcarbamoyl)-3-(allyl)-$\Delta^{2,N}$-2-benzimidaz-
    olinecarbamate
isopropyl 1-(butylcarbamoyl)-3-(ethoxycarbonyl-
    methylcarbamoyl)-$\Delta^{2,N}$-2-benzimidazolinecarbamate
isopropyl 1-(ethylcarbamoyl)-3-(hexylcarbamoyl)-
    $\Delta^{2,N}$-2-benzimidazolinecarbamate
methyl 1 - (methoxypropylcarbamoyl)-3-(methylcarbam-
    oyl)-$\Delta^{2,N}$-2-benzimidazolinecarbamate
ethyl 1-(ethylcarbamoyl)-3-hexylcarbamoyl)-$\Delta^{2,N}$-2-
    benzimidazolinecarbamate
sec-butyl 1-(methylcarbamoyl)-3-[(p-toluoyl)-
    carbamoyl]-$\Delta^{2,N}$-2-benzimidazolinecarbamate
isobutyl 1-(cyclohexylcarbamoyl)-3-ethoxycarbonyl-
    methylcarbamoyl)-$\Delta^{2,N}$-2-benzimidazolinecarbamate
ethyl 1-(methylcarbamoyl)-3-[(p-toluoyl)carbamoyl]-
    $\Delta^{2,N}$-2-benzimidazolinecarbamate
ethyl 1-(propargylcarbamoyl)-3-(methylcarbamoyl)-
    $\Delta^{2,N}$-2-benzimidazolinecarbamate
isopropyl 1-(methylcarbamoyl)-3-[(p-toluoyl)-
    carbamoyl]-$\Delta^{2,N}$-2-benzimidazolinecarbamate
isopropyl 1-(butylcarbamoyl)-3-(cyclohexylcarbamoyl)-
    $\Delta^{2,N}$-2-benzimidazolinecarbamate
methyl 1-(cyclohexylcarbamoyl)-3-(hexylcarbamoyl)-
    $\Delta^{2,N}$-2-benzimidazolinecarbamate
methyl 1-(butylcarbamoyl)-3-[(p-toluoyl)carbamoyl]-
    $\Delta^{2,N}$-2-benzimidazolinecarbamate
methyl 1-(butylcarbamoyl)-3-(hexylcarbamoyl)-$\Delta^{2,N}$-2-
    benzimidazolinecarbamate

|              | Isocyanate                        |                                                                                                     |
|--------------|-----------------------------------|-----------------------------------------------------------------------------------------------------|
| Parts by wt. | Name                              | Product                                                                                             |
| 4.3          | Propylisocyanate                  | Methyl 1-(methylcarbamoyl)-3-(propylcarbamoyl)-$\Delta^{2,N}$-2-benzimidazolinecarbamate.           |
| 6.4          | Hexylisocyanate                   | Methyl 1-(hexylcarbamoyl)-3-(methylcarbamoyl)-$\Delta^{2,N}$-2-benzimidazolinecarbamate.            |
| 6.3          | Cyclohexylisocyanate              | Methyl 1-(cyclohexylcarbamoyl)-3-(methylcarbamoyl)-$\Delta^{2,N}$-2-benzimidazolinecarbamate.       |
| 7.0          | 4-methylcyclohexylisocyanate      | Methyl 1-(methylcarbamoyl)-3-[(4-methylcyclohexyl)carbamoyl]-$\Delta^{2,N}$-2-benzimidazolinecarbamate. |
| 6.7          | Benzylisocyanate                  | Methyl 1-(benzylcarbamoyl)-3-(methylcarbamoyl)-$\Delta^{2,N}$-2-benzimidazolinecarbamate.           |
| 6.0          | Phenylisocyanate                  | Methyl 1-(methylcarbamoyl)-3-(phenylcarbamoyl)-$\Delta^{2,N}$-2-benzimidazolinecarbamate.           |
| 6.7          | p-Toluoylisocyanate               | Methyl 1-(methylcarbamoyl)-3-[(p-toluoyl)carbamoyl]-$\Delta^{2,N}$-2-benzimidazolinecarbamate.      |
| 7.7          | p-Chlorophenylisocyanate          | Methyl 1-[(p-chlorophenyl)carbamoyl]-3-(methylcarbamoyl)-$\Delta^{2,N}$-2-benzimidazolinecarbamate. |
| 7.5          | p-Methoxyphenylisocyanate         | Methyl 1-[(p-methoxyphenyl)carbamoyl]-3-(methylcarbamoyl)-$\Delta^{2,N}$-2-benzimidazolinecarbamate. |
| 7.2          | p-Cyanophenylisocyanate           | Methyl 1-[(p-cyanophenyl)carbamoyl]-3-(methylcarbamoyl)-$\Delta^{2,N}$-2-benzimidazolinecarbamate.  |
| 8.9          | p-(Methoxycarbonyl)-phenylisocyanate | Methyl 1-[(p-methoxycarbonylphenyl)carbamoyl]-3-(methylcarbamoyl)-$\Delta^{2,N}$-2-benzimidazolinecarbamate. |
| 8.2          | p-Nitrophenylisocyanate           | Methyl 1-(methylcarbamoyl)-3-[(p-nitrophenyl)carbamoyl]-$\Delta^{2,N}$-2-benzimidazolinecarbamate.  |
| 6.5          | Ethoxycarbonylmethylisocyanate    | Methyl 1-(ethoxycarbonylmethylcarbamoyl)-3-(methylcarbamoyl)-$\Delta^{2,N}$-2-benzimidazolinecarbamate. |
| 5.8          | Methoxypropylisocyanate           | Methyl 1-(methoxypropylcarbamoyl)-3-(methylcarbamoyl)-$\Delta^{2,N}$-2-benzimidazolinecarbamate.    |

EXAMPLE 5

The following compounds are prepared in accordance with Example 4 by replacing the 12.4 parts of methyl 1-(methylcarbamoyl)-2-benzimidazolecarbamate and 5.0 parts of butylisocyanate with the equivalent parts of the 1-(substituted carbamoyl)-2-benzimidazolecarbamic acid

EXAMPLE 6

Preparation of methyl 1-(methylcarbamoyl)-3-
propionyl-$\Delta^{2,N}$-2-benzimidazolinecarbamate To a solution of 12.4 parts of methyl 1-(methylcarbamoyl)-2-benzimidazolecarbamate and 300 parts of chloroform are added 4.7 parts of propionyl chloride. After stirring at room temperature for 1 hour, 5.1 parts of triethylamine are added to the reaction. The reaction is stirred at room temperature for 2 hours, then washed with water and dried. The solvent is removed under reduced pressure, and essentially pure methyl 1-(methylcarbamoyl) - 3 - propionyl-$\Delta^{2,N}$-2-benzimidazoliecarbamate is obtained by triturating the remaining solid with hexane and collecting the product by filtration.

The following compounds are prepared in accordance with the above procedure by replacing the propionyl chloride with the relative proportions of the indicated acid halide needed for 12.4 parts of methyl 1-(methylcarbamoyl)-2-benzimidazolecarbamate or the equivalent weight of a 1-(substituted carbamoyl)-3-substituted-2-iminobenzimidazoline carbamate. The product obtained is also given.

Product methyl 2-(isopropoxycarbonylimino)-3-(butylcarbamoyl)-1-benzimidazolinecarboxylate methyl 2-(methoxycarbonylimino)-3-(butylcarbamoyl)-1-benzimidazolinecarboxylate methyl 2-(ethoxycarbonylimino)-3-butylcarbamoyl)-1-benzimidazolinecarboxylate methyl 2-(ethoxycarbonylimino)-3-(hexylcarbamoyl)-1-benzimidazolinecarboxylate 1-(allyloxyacetylcarbamoyl)-3-carbamoyl-2-benzimidazolinecarbamic acid, methyl ester 1-(lauroyl)-3-methylcarbamoyl-2-benzimidazolinecarbamic acid, methyl ester 1-(levulinoyl)-3-ethylcarbamoyl-2-benzimidazolinecarbamic acid, isopropyl ester 1-(2-octenoyl)-3-methylcarbamoyl-2-benzimidazolinecarbamic acid, methyl ester

| Parts by weight | Acid halide | Product |
| --- | --- | --- |
| 4.7 | Methyl chloroformate | Methyl 2-(methoxycarbonylimino)(methylcarbamoyl)-1-benzimidazolinecarboxylate. |
| 7.2 | 2-chloroethyl chloroformate | (2-chloroethyl)-2-(methoxy-carbonylimino)-3-(methylcarbamoyl)-1-benzimidazolinecarboxylate. |
| 5.7 | Chloroacetyl chloride | Methyl 1-(chloroacetyl)-3-(methyl-carbamoyl)-$\Delta^{2,N}$-2-benzimidazoline-carbamate. |
| 4.8 | Hydroxyacetyl chloride | Methyl 1-(hydroxyacetyl)-3-(methylcarbamoyl)-$\Delta^{2,N}$-2-benzimidazolinecarbamate. |
| 6.2 | Acetoxyacetyl chloride | Methyl 1-(acetoxyacetyl)-3-)methylcarbamoyl)-$\Delta^{2,N}$-2-benzimidazolinecarbamate. |
| 5.2 | Cyanoacetyl chloride | Methyl 1-(cyanoacetyl)-3-(methylcarbamoyl)-$\Delta^{2,N}$-2-benzimidazolinecarbamate. |
| 7. | Benzoyl chloride | Methyl 1-(benzoyl)-3-(methyl-carbamoyl)-$\Delta^{2,N}$-2-benzimidazolinecarbamate. |
| 8.8 | p-Chlorobenzoyl chloride | Methyl 1-(p-chlorobenzoyl)-3-(methylcarbamoyl)-$\Delta^{2,N}$-2-benzimidazolinecarbamate. |
| 10.1 | 3,4-dichlorobenzoyl chloride | Methyl 1-(3,4-dichlorobenzoyl)- -(methylcarbamoyl)-$\Delta^{2,N}$-2-benzimidazolinecarbamate. |
| 7.8 | p-Toluoyl chloride | Methyl 1-(p-toluoyl)-3-(methyl-carbamoyl)-$\Delta^{2,N}$-2-benzimidazolinecarbamate. |
| 9.3 | p-Nitrobenzoyl chloride | Methyl 1-(methylcarbamoyl)-3-(p-nitrobenzoyl)-$\Delta^{2,N}$-2-benzimidazolinecarbamate. |
| 8.6 | p-Anisoyl chloride | Methyl 1-(p-anisoyl)-3-(methyl-carbamoyl)-$\Delta^{2,N}$-2-benzimidazolinecarbamate. |
| 5.6 | Methyl chlorothiolformate | Methyl 2-(methoxycarbonylimino)-3-(methylcarbamoyl)-thio-1-benzimidazolinecarboxylate. |
| 4.7 | Methylchloroformate | Methyl 1-(methoxycarbonyl)-3-(methylcarbamoyl)-$\Delta^{2,N}$-2-benzimidazolinecarbamate. |
| 8.1 | Dimethyl chlorothiophosphate. | Methyl 1-(dimethoxyphosphinothioyl)-3-(methylcarbamoyl)-$\Delta^{2,N}$-2-benzimidazolinecarbamate. |
| 5.5 | Ethyl chloroformate | Ethyl 2-(methoxycarbonylimino)-3-(methylcarbamoyl)-1-benzimidazolinecarboxylate. |
| 8.3 | Hexyl chloroformate | Hexyl 2-(methoxycarbonylimino)-3-(methylcarbamoyl)-1-benzimidazolinecarboxylate. |
| 4.6 | Acryloyl chloride | Methyl 1-(methylcarbamoyl)-3-(acryloyl)-$\Delta^{2,N}$-2-benzimidazolinecarbamate. |
| 10.0 | Bromoacetyl bromide | Methyl 1-(bromoacetyl)-3-(methylcarbamoyl)-$\Delta^{2,N}$-2-benzimidazolinecarbamate. |
| 3.9 | Acetyl chloride | Methyl 1-(acetyl)-3-(methylcarbamoyl)-$\Delta^{2,N}$-2-benzimidazolinecarbamate. |
| 4.7 | Methyl chloroformate | Methyl 1-(formyl)-3-(methylcarbamoyl)-$\Delta^{2,N}$-2-benzimidazolinecarbamate. |
| 5.8 | Methanesulfonyl chloride | Methyl 1-(methanesulfonyl)-3-(methylcarbamoyl)-$\Delta^{2,N}$-2-benzimidazolinecarbamate. |
| 5.2 | Cyclopropanecarboxylic acid chloride. | Methyl 1-(cyclopropanecarbonyl)-3-(methylcarbamoyl)-$\Delta^{2,N}$-2-benzimidazolinecarbamate. |
| 7.3 | Cyclohexanecarboxylic acid chloride. | Methyl 1-(cyclohexanecarbonyl)-3-(methylcarbamoyl)-$\Delta^{2,N}$-2-benzimidazolinecarbamate. |

EXAMPLE 7

The following compounds are prepared in accordance with Example 6 by replacing the 12.4 parts of methyl 1-(methylcarbamoyl)-2-benzimidazolecarbamate and 4.7 parts of propionyl chloride with the equivalent parts of the 1-(substituted carbamoyl)-2-benzimidazolecarbamic acid ester, a 2-acylamidobenzimidazole or a 1,3-disubstituted 2-iminobenzimidazoline and electrophilic reagent necessary to prepare each named product.

1-(2-octynoyl)-3-methylcarbamoyl-2-benzimidazolinecarbamic acid, methyl ester 1-(3-methyl-2-nonenoyl)-3-ethylcarbamoyl-2-benzimidazolinecarbamic acid, methyl ester 1-(butoxyoxalyl)-3-methylcarbamoyl-2-benzimidazolinecarbamic acid, methyl ester 1-(hexylthiolcarbonyl)-3-butylcarbamoyl-2-benzimidazolinecarbamic acid, methyl ester 1-(dodecyloxythiocarbonyl)-3-methylcarbamoyl-2-benzimidazolinecarbamic acid, methyl ester
1-(dodecylthiolcarbonyl)-3-methylcarbamoyl-2-benzimidazolinecarbamic acid, methyl ester
1-(allylthiolcarbonyl)-3-butylcarbamoyl-2-benzimidazolinecarbamic acid, methyl ester
1-(4-octenoxythiocarbonyl)-3-ethylcarbamoyl-2-benzimidazolinecarbamic acid, methyl ester
1-(propargylthiolcarbonyl)-3-methylcarbamoyl-2-benzimidazolinecarbamic acid, methyl ester
1-(3-octynoxythiocarbonyl)-3-methylcarbamoyl-2-benzimidazolinecarbamic acid, ethyl ester
1-(cyclopropylmethylthiolcarbonyl)-3-methylcarbamoyl-2-benzimidazolinecarbamic acid, methyl ester
1-(cyclobutyloxythiocarbonyl)-3-ethylcarbamoyl-2-benzimidazolinecarbamic acid, methyl ester
1-(cyclooctyloxythiocarbonyl)-3-methylcarbamoyl-2-benzimidazolinecarbamic acid, methyl ester
1-(norbornylmethyloxythiocarbonyl)-3-methylcarbamoyl-2-benzimidazolinecarbamic acid, methyl ester
ethyl 2-(methoxycarbonylimino)-3-(butylcarbamoyl)-1-benzimidazolinecarboxylate
ethyl 2-(ethoxycarbonylimino)-3-(hexylcarbamoyl)-1-benzimidazolinecarboxylate
ethyl 2-(isopropoxycarbonylimino)-3-(propylcarbamoyl)-1-benzimidazolinecarboxylate
isopropyl 2-(methoxycarbonylimino)-3-(butylcarbamoyl)-1-benzimidazolinecarboxylate
isopropyl 2-(ethoxycarbonylimino)-3-(propylcarbamoyl)-1-benzimidazolinecarboxylate
isopropyl 2-(isopropoxycarbonylimino)-3-(methylcarbamoyl)-1-benzimidazolinecarboxylate
butyl 2-(ethoxycarbonylimino)-3-(butylcarbamoyl)-1-benzimidazolinecarboxylate
cyanoethyl 2-(methoxycarbonylimino)-3-(carbamoyl)-1-benzimidazolinecarboxylate
methyl 1-(butylcarbamoyl)-3-(benzenesulfonyl)-$\Delta^{2,N}$-2-benzimidazolinecarbamate
hydroxyethyl 2-(ethoxycarbonylimino)-3-(hexylcarbamoyl)-1-benzimidazolinecarboxylate
ethyl 1-(butylcarbamoyl)-3-(chloroacetyl)-$\Delta^{2,N}$-2-benzimidazolinecarbamate
ethyl 1-(hexylcarbamoyl)-3-(hydroxyacetyl)-$\Delta^{2,N}$-2-benzimidazolinecarbamate
ethyl 1-(acetoxyacetyl)-3-(cyclohexylcarbamoyl)-$\Delta^{2,N}$-2-benzimidazolinecarbamate
ethyl 1-(cyanoacetyl)-3-(hexylcarbamoyl)-$\Delta^{2,N}$-2-benzimidazolinecarbamate
ethyl 1-(butylcarbamoyl)-3-(p-toluoyl)-$\Delta^{2,N}$-2-benzimidazolinecarbamate
ethyl 1-(cyclohexanecarbonyl)-3-(propylcarbamoyl)-$\Delta^{2,N}$-2-benzimidazolinecarbamate
ethyl 2-(ethoxycarbonylimino)-3-(butylcarbamoyl)-thio-1-benzimidazolinecarboxylate
methyl 2-(methoxycarbonylimino)-3-(methylcarbamoyl)thiono-1-benzimidazolinecarboxylate
methyl 2-(ethoxycarbonylimino)-3-(butylcarbamoyl)-1-benzimidazolinecarbodithioate
ethyl 1-(butylcarbamoyl)-3-(ethanesulfonyl)-$\Delta^{2,N}$-2-benzimidazolinecarbamate
methyl 1-(butylcarbamoyl)-3-cyano-$\Delta^{2,N}$-2-benzimidazolinecarbamate
ethyl 1-(butylcarbamoyl)-3-(diethylphosphonyl)-$\Delta^{2,N}$-2-benzimidazolinecarbamate
methyl 1-(butoxyacetyl)-3-(methylcarbamoyl)-$\Delta^{2,N}$-2-benzimidazolinecarbamate
methyl 1-(ethynylcarbonyl)-3-(methylcarbamoyl)-$\Delta^{2,N}$-2-benzimidazolinecarbamate
methyl 1-butylcarbamoyl-3-ethoxyoxalyl-2-benzimidazolinecarbamate
sec-butyl 1-methylcarbamoyl-3-methoxyoxalyl-2-benzimidazolinecarbamate
methyl 1-butylcarbamoyl-3-methoxyoxalyl-2-benzimidazolinecarbamate
1-butylcarbamoyl-3-methoxyoxalyl-2-propionamidobenzimidazoline
1-butylcarbamoyl-3-methoxy(thiocarbonyl)-2-propionamidobenzimidazoline All of the compounds of this example can also be prepared by refluxing an acetone mixture containing an alkylchloroformate or an acyl chloride with the properly 1,3-disubstituted-2-iminobenzimidazoline and sodium bicarbonate. Exemplary of this reaction is the following preparation of methyl 1-(butylcarbamoyl)-3-(methoxycarbonyl)-2-benzimidazolecarbamate.

A total of 9.4 parts of methylchloroformate contained in 50 parts of acetone is added slowly to a slurry of 29 parts of methyl 1-butylcarbamoyl-2-imino-1-benzimidazolinecarboxylate, 8.4 parts of sodium bicarbonate and 350 parts of acetone at 25° C. The reaction is refluxed for 2 hours then cooled to 5° C.

A total of 300 parts of cold water is added to the reaction medium followed by an extraction with chloroform solvent. The chloroform layer is removed, dried over anhydrous magnesium sulfate and stripped free of solvent under reduced pressure. An oil remained which turned solid when triturated in hexane.

The solid removed by filtration is essentially pure methyl 1-(butylcarbamoyl)-3-(methoxycarbonyl)-2-benzimidazolinecarbamate.

EXAMPLE 8

The following compounds are prepared in accordance with Example 1 by replacing the 19.1 parts of methyl-2-benzimidazolecarbamate and 9.9 parts of n-butylisocyanate with the equivalent parts of the properly substituted benzimidazole and isocyanate necessary to prepare each named product.

Product ethyl 1-(methylcarbamoyl)-2-(5-iodobenzimidazolecarbamate)
ethyl 1-(3-butoxypropylcarbamoyl)-2-benzimidazolecarbamate
ethyl 1-(allylcarbamoyl)-2-benzimidazolecarbamate
ethyl 1-(isopropylcarbamoyl)-2-benzimidazolecarbamate
ethyl 1-(butylcarbamoyl)-2-(5-fluorobenzimidazolecarbamate)
ethyl 1-(sec-butylcarbamoyl)-2-benzimidazolecarbamate
ethyl 1-(8,9-dichloroheptadecylcarbamoyl)-2-benzimidazolecarbamate
ethyl 1-(hexylcarbamoyl)-2-benzimidazolecarbamate
ethyl 1-(octylcarbamoyl)-2-benzimidazolecarbamate
ethyl 1-(dodecylcarbamoyl)-2-benzimidazolecarbamate
ethyl 1-(cyclohexylcarbamoyl)-2-benzimidazolecarbamate
ethyl 1-[(2-methylcyclohexyl)carbamoyl]-2-benzimidazolecarbamate
ethyl 1-([(4-methylcyclohexyl)carbamoyl]-2-benzimidazolecarbamate
ethyl 1 - [(p - toluoyl)carbamoyl]-2-benzimidazolecarbamate
ethyl 1 - [(o-chlorophenyl)carbamoyl]-2-benzimidazolecarbamate
ethyl 1-[(p-isopropylphenyl)carbamoyl]-2-benzimidazolecarbamate
ethyl 1-[(4-methoxycyclohexyl)carbamoyl]-2-benzimidazolecarbamate
ethyl 1 - (cyclopentylcarbamoyl)-2-benzimidazolecarbamate
ethyl 1-(cyclooctylcarbamoyl)-2-benzimidazolecarbamate
ethyl 1-(benzylcarbamoyl)-2-benzimidazolecarbamate
ethyl 1 - [(p-methylbenzyl)carbamoyl]-2-benzimidazolecarbamate
ethyl 1 - [(3,4 - xylyl)carbamoyl]-2-benzimidazolecarbamate
ethyl 1-[(p-methoxyphenyl)carbamoyl]-2-benzimidazolecarbamate
ethyl 1-[(ethoxycarbonylmethyl)carbamoyl]-2-benzimidazolecarbamate ethyl 1-[(3,4-dichlorophenyl)carbamoyl]-2-benzimidazolecarbamate
ethyl 1-[(2-ethoxycarbonylethyl)carbamoyl]-2-benzimidazolecarbamate
ethyl 1-(isobutylcarbamoyl)-2-benzimidazolecarbamate
ethyl 1-[(p-nitrophenyl)carbamoyl]-2-benzimidazolecarbamate
ethyl 1-[(2-chloroethyl)carbamoyl]-2-benzimidazolecarbamate
isopropyl 1-(methylcarbamoyl)-2-benzimidazolecarbamate
isopropyl 1-(ethylcarbamoyl)-2-benzimidazolecarbamate
isopropyl 1-(propylcarbamoyl)-2-benzimidazolecarbamate
isopropyl 1-(butylcarbamoyl)-2-benzimidazolecarbamate
isopropyl 1-(allylcarbamoyl)-2-benzimidazolecarbamate
isopropyl 1-(hexylcarbamoyl)-2-benzimidazolecarbamate
isopropyl 1-(p-nitrophenylcarbamoyl)-2-benzimidazolecarbamate
isopropyl 1-(cyclohexylcarbamoyl)-2-benzimidazolecarbamate
isopropyl 1-[(3-methylcyclohexyl)carbamoyl]-2-benzimidazolecarbamate
isopropyl 1-[(butoxycarbonylmethyl)carbamoyl-2-benzimidazolecarbamate
isopropyl 1-[(p-methylbenzyl)carbamoyl]-2-benzimidazolecarbamate
isopropyl 1-(furfurylcarbamoyl)-2-benzimidazolecarbamate
isopropyl 1-[(o-toluoyl)carbamoyl]-2-benzimidazolecarbamate
isopropyl 1-[(p-toluoyl)carbamoyl]-2-benzimidazolecarbamate
isopropyl 1-[(p-chlorophenyl)carbamoyl]-2-benzimidazolecarbamate
isopropyl 1-[(p-methoxyphenyl)carbamoyl]-2-benzimidazolecarbamate
isopropyl 1-[(p-cyanophenyl)carbamoyl-2-benzimidazolecarbamate
isopropyl 1-[(p-methoxycarbonylphenyl)carbamoyl]-2-benzimidazolecarbamate
isopropyl 1-[(ethoxycarbonylmethyl)carbamoyl]-2-benzimidazolecarbamate
isopropyl 1-[(p-tolylsulfonyl)carbamoyl]-2-benzimidazolecarbamate
propyl 1-(propylcarbamoyl)-2-benzimidazolecarbamate
propyl 1-(butylcarbamoyl)-2-benzimidazolecarbamate
propyl 1-(hexylcarbamoyl)-2-benzimidazolecarbamate
propyl 1-(octylcarbamoyl)-2-benzimidazolecarbamate
propyl 1-(cyclohexylcarbamoyl)-2-benzimidazolecarbamate
propyl 1-[(2-norbornyl)carbamoyl]-2-benzimidazolecarbamate
propyl 1-[(p-toluoyl)carbamoyl]-2-benzimidazolecarbamate
propyl 1-[(m-toluoyl)carbamoyl]-2-benzimidazolecarbamate
propyl 1-[(p-bromophenyl)carbamoyl]-2-benzimidazolecarbamate
sec-butyl 1-(methylcarbamoyl)-2-benzimidazolecarbamate
sec-butyl 1-(propylcarbamoyl)-2-benzimidazolecarbamate
sec-butyl 1-(butylcarbamoyl)-2-benzimidazolecarbamate
sec-butyl 1-(pentylcarbamoyl)-2-benzimidazolecarbamate
sec-butyl 1-(allylcarbamoyl)-2-benzimidazolecarbamate
sec-butyl 1-(cyclohexylcarbamoyl)-2-benzimidiazolecarbamate
sec-butyl 1-[(4-methylcyclohexyl)carbamoyl]-2-benzimidazolecarbamate
sec-butyl 1-[(p-toluoyl)carbamoyl]-2-benzimidazolecarbamate
sec-butyl 1-[(o-fluorophenyl)carbamoyl]-2-benzimidazolecarbamate
methyl 1-(sec-butylcarbamoyl)-2-benzimidazolecarbamate
methyl 1-(p-tolylsulfonylcarbamoyl)-2-benzimidazolecarbamate
methyl 1-(isobutylcarbamoyl)-2-benzimidazolecarbamate
methyl 1-(phenylsulfonylcarbamoyl)-2-benzimidazolecarbamate
methyl 1-(o-nitrophenylcarbamoyl)-2-benzimidazolecarbamate
methyl 1-(p-chlorophenylsulfonylcarbamoyl)-2-benzimidazolecarbamate
methyl 1-(p-ethoxyphenylcarbamoyl)-2-benzimidazolecarbamate
isopropyl 1-(3,4-dimethylphenylsulfonylcarbamoyl)-2-benzimidazolecarbamate
methyl 1-(methylsulfonylcarbamoyl)-2-benzimidazolecarbamate
methyl 1-(butylsulfonylcarbamoyl)-2-benzimidazolecarbamate
methyl 1,3-dicarbamoyl-2-benzimidazolecarbamate
1-(2,3,3,4,5,5-hexachloro-3-butencarbamoyl)-2-benzimidazolecarbamic acid, methyl ester
1-(4-ethoxybut-2-enylcarbamoyl)-2-benzimidazolecarbamic acid, methyl ester
1-(4-ethoxycarbonylbut-2-enylcarbamoyl)-2-benzimidazolecarbamic acid, methyl ester
1-(4-methoxybut-2-ynlcarbamoyl)-2-benzimidazolecarbamic acid, methyl ester
1-(4-methoxycarbonylbut-2-ynlcarbamoyl)-2-benzimidazolecarbamic acid, methyl ester
1-(1-chloromethylpropargylcarbamoyl)-2-benzimidazolecarbamic acid, methyl ester
1-cyclodecylcarbamoyl-2-benzimidazolecarbamic acid, methyl ester
1-cyclopentylcarbamoyl-2-benzimidazolecarbamic acid, ethyl ester
methyl 1-(acetylcarbamoyl)-2-benzimidazolecarbamate
methyl 1-(stearoylcarbamoyl)-2-benzimidazolecarbamate
methyl 1-(2-decenoylcarbamoyl)-2-benzimidazolecarbamate
methyl 1-(butyroylcarbamoyl)-2-benzimidazolecarbamate
methyl 1-(hexanoylcarbamoyl)-2-benzimidazolecarbamate
methyl 1-(acrylylcarbamoyl)-2-benzimidazolecarbamate
methyl 1-(propionoylcarbamoyl)-2-benzimidazolecarbamate
methyl 1-(2,4,6-octatrienoylcarbamoyl)-2-benzimidazolecarbamate
methyl 1-(2-dodecenoylcarbamoyl)-2-benzimidazolecarbamate
methyl 1-(elaidoylcarbamoyl)-2-benzimidazolecarbamate
methyl 1-(methacrylylcarbamoyl)-2-benzimidazolecarbamate
methyl 1-(propionylcarbamoyl)-2-benzimidazolecarbamate
methyl 1-(trifluoroacetylcarbamoyl)-2-benzimidazolecarbamate
methyl 1-(methoxyacetylcarbamoyl)-2-benzimidazolecarbamate
methyl 1-(α-bromoacetylcarbamoyl)-2-benzimidazolecarbamate
methyl 1-(levulinoylcarbamoyl)-2-benzimidazolecarbamate
methyl 1-(3-chloropropionylcarbamoyl)-2-benzimidazolecarbamate
methyl 1-(p-chlorobenzoylcarbamoyl)-2-benzimidazolecarbamate
methyl 1-(p-nitrobenzoylcarbamoyl)-2-benzimidazolecarbamate
methyl 1-(p-toluoylcarbamoyl)-2-benzimidazolecarbamate
methyl 1-(m-bromobenzoylcarbamoyl)-2-benzimidazolecarbamate
methyl 1-(3,4-dichlorobenzoylcarbamoyl)-2-benzimidazolecarbamate
methyl 1-(m-methoxybenzoylcarbamoyl)-2-benzimidazolecarbamate
methyl 1-(stearoloylcarbamoyl)-2-benzimidazolecarbamate methyl 1-(undecenoylcarbamoyl)-2-benzimidazolecarbamate
methyl 1-(isopropylpropiolylcarbamoyl)-2-benzimidazolecarbamate
methyl 1-(crotonylcarbamoyl)-2-benzimidazolecarbamate
methyl 1-(3-hexenoylcarbamoyl)-2-benzimidazolecarbamate
methyl 1-(3-butenoylcarbamoyl)-2-benzimidazolecarbamate
methyl 1-(p-chlorobenzylcarbamoyl)-2-benzimidazolecarbamate
isopropyl 1-(p-nitrobenzylcarbamoyl)-2-benzimidazolecarbamate
methyl 1-(p-methylbenzylcarbamoyl)-2-benzimidazolecarbamate
methyl 1-(o-nitrobenzylcarbamoyl)-2-benzimidazolecarbamate
methyl 1-(p-methoxybenzylcarbamoyl)-2-benzimidazolecarbamate
methyl 1-(3,4-dimethylbenzylcarbamoyl)-2-benzimidazolecarbamate
ethyl 1-(allyl)-3-(carbamoyl)-$\Delta^{2,N}$-2-benzimidazolinecarbamate
methyl 1-(2-butenyl)-3-(methylcarbamoyl)-$\Delta^{2,N}$-2-benzimidazolinecarbamate
methyl 1-(propargyl)-3-(methylcarbamoyl)-$\Delta^{2,N}$-2-benzimidazolinecarbamate
methyl 1-(8-decenylcarbamoyl)-2-benzimidazolecarbamate
methyl 1-(8-heptadecynylcarbamoyl)-2-benzimidazolecarbamate
methyl 1-(propargylcarbamoyl)-2-benzimidazolecarbamate
methyl 1-(ketostearoylcarbamoyl)-2-benzimidazolecarbamate
methyl 1-(8-heptadecenylcarbamoyl)-2-benzimidazolecarbamate
methyl 1-(8-pentadecenylcarbamoyl)-2-benzimidazolecarbamate
methyl 1-(3-hexenylcarbamoyl)-2-benzimidazolecarbamate
methyl 1-(cyclopropylmethylcarbamoyl)-2-benzimidazolecarbamate
methyl 1-(cyclopentylmethylcarbamoyl)-2-benzimidazolecarbamate
methyl 1-(cyclohexylmethylcarbamoyl)-2-benzimidazolecarbamate
methyl 1-(norbornylmethylcarbamoyl)-2-benzimidazolecarbamate
methyl 1-(cyclooctylmethylcarbamoyl)-2-benzimidazolecarbamate
1-(5-methylcyclohex-2-enylcarbamoyl)-2-benzimidazolecarbamic acid, methyl ester
1-(4-methoxycyclohex-2-enylcarbamoyl)-2-benzimidazolecarbamic acid, methyl ester
1-(4-chlorocyclohex-2-enylcarbamoyl)-2-benzimidazolecarbamic acid, methyl ester
1-(4-methylcyclopen-2-enylcarbamoyl)-2-benzimidazolecarbamic acid, methyl ester
1-(1-tetrahydronaphthylcarbamoyl)-2-benzimidazolecarbamic acid, methyl ester
1-(fenchylcarbamoyl)-2-benzimidazolecarbamic acid, methyl ester
1-(octahydronaphthylcarbamoyl)-2-benzimidazolecarbamic acid, methyl ester
isopropyl 1-(butylcarbamoyl)-5-butyl-2-benzimidazolecarbamate
methyl 1-(butylcarbamoyl)-5-chloro-2-benzimidazolecarbamate
methyl 1-[(p-toluoyl)carbamoyl]-5-nitro-2-benzimidazolecarbamate
methyl 1-(butylcarbamoyl)-5-methyl-2-benzimidazolecarbamate methyl 1-(hexylcarbamoyl)-5-methoxy-2-benzimidazolecarbamate
ethyl 1-(butylcarbamoyl)-5-bromo-2-benzimidazolecarbamate
methyl 1-(butylcarbamoyl)-5-butyl-2-benzimidazolecarbamate
methyl 1-(hexylcarbamoyl)-5-butoxy-2-benzimidazolecarbamate
1-(2-methylcyclopentylmethylcarbamoyl)-2-benzimidazolecarbamic acid, ethyl ester
1-(p-methoxycyclohexylmethylcarbamoyl)-2-benzimidazolecarbamic ester, isopropyl ester
1-(m-methoxycyclohexylmethylcarbamoyl)-3-carbamoyl-2-benzimidazolinecarbamic acid, methyl ester
1-(p-chlorocyclohexylmethylcarbamoyl)-2-benzimidazolecarbamic acid, methyl ester
1-(2-phenethylcarbamoyl)-2-benzimidazolecarbamic acid, methyl ester
1-(p-methylcyclohexylethylcarbamoyl)-2-benzimidazolecarbamic acid, methyl ester
methyl 1-(methoxycarbonylmethyl)-3-(methylcarbamoyl)-$\Delta^{2,N}$-2-benzimidazolinecarbamate
methyl 2-(propionylimino)-3-(butylcarbamoyl)-1-benzimidazolinecarboxylate
1-(4-butylbenzylcarbamoyl)-2-benzimidazolecarbamic acid, methyl ester
1-(p-trichlorobenzylcarbamoyl)-2-benzimidazolecarbamic acid, methyl ester
1-(o-fluoromethylbenzylcarbamoyl)-2-benzimidazolecarbamic acid, methyl ester
1-(p-methoxybenzylcarbamoyl)-2-benzimidazolecarbamic acid, methyl ester
1-(o-fluorobenzylcarbamoyl)-2-benzimidazolecarbamic acid, methyl ester
1-(p-bromobenzylcarbamoyl)-2-benzimidazolecarbamic acid, methyl ester
1-(o-nitrobenzylcarbamoyl)-2-benzimidazolecarbamic acid, methyl ester
1-(p-butylsulfonylbenzylcarbamoyl)-2-benzimidazolecarbamic acid, methyl ester
1-(p-ethoxycarbonylbenzylcarbamoyl)-2-benzimidazolecarbamic acid, methyl ester
1-(p-chloromethylphenylcarbamoyl)-2-benzimidazolecarbamic acid, ethyl ester
1-(m-trichloromethylphenylcarbamoyl)-2-benzimidazolecarbamic acid, methyl ester
1-(p-fluoromethylphenylcarbamoyl)-2-benzimidazolecarbamic acid, methyl ester
1-(p-trifluoromethylphenylcarbamoyl)-2-benzimidazolecarbamic acid, methyl ester
1-(p-methylsulfonylphenylcarbamoyl)-2-benzimidazolecarbamic acid, methyl ester
1-(p-butylsulfonylphenylcarbamoyl)-3-methylcarbamoyl-2-benzimidazolinecarbamic acid
1-(butoxyacetylcarbamoyl)-2-benzimidazolecarbamic acid, methyl ester
1-(p-sec-butylbenzoylcarbamoyl)-2-benzimidazolecarbamic acid, methyl ester
1-(p-methylsulfonylbenzoylcarbamoyl)-2-benzimidazolecarbamic acid, methyl ester
1-(p-butoxybenzoylcarbamoyl)-2-benzimidazolecarbamic acid, methyl ester
1-(p-nitrophenylsulfonylcarbamoyl)-2-benzimidazolecarbamic acid, methyl ester
1-(octadecylsulfonylcarbamoyl)-2-benzimidazolecarbamic acid, methyl ester
1(-p-methylphenylsulfonylcarbamoyl)-2-benzimidazolecarbamic acid, methyl ester
1-(p-tert-butylphenylsulfonylcarbamoyl)-2-benzimidazolecarbamic acid, methyl ester
1-(p-methoxyphenylsulfonylcarbamoyl)-2-benzimidazolecarbamic acid, methyl ester
1-(p-butoxyphenylsulfonylcarbamoyl)-2-benzimidazolecarbamic acid, methyl ester 1-(p-chlorophenylsulfonylcarbamoyl)-2-benzimidazolecarbamic acid, methyl ester
1-(p-bromophenylsulfonylcarbamoyl)-2-benzimidazolecarbamic acid, ethyl ester
methyl 1-(4-methylcyclohexylcarbamoyl)-2-benzimidazolecarbamate
methyl 1-(4-chlorocyclohexylcarbamoyl)-2-benzimidazolecarbamate
methyl 1-(4-methoxycyclohexylcarbamoyl)-2-benzimidazolecarbamate
methyl 1-(2-cyclobutenylcarbamoyl)-2-benzimidazolecarbamate
methyl 1-(2-cyclohexenylcarbamoyl)-2-benzimidazolecarbamate
methyl 1-(2-cyclooctenylcarbamoyl)-2-benzimidazolecarbamate
methyl 1-(1-cyclopentenylmethylcarbamoyl)-2-benzimidazolecarbamate
methyl 1-(1-cyclooctenylmethylcarbamoyl)-2-benzimidazolecarbamate
methyl 1-[p-(2-chloroethyl)carbaniloyl]-2-benzimidazolecarbamate
methyl 1-[p-(chloromethyl)benzylcarbamoyl]-2-benzimidazolecarbamate
methyl 1-[p-(trifluoromethyl)benzylcarbamoyl]-2-benzimidazolecarbamate
methyl 1-(p-cyanobenzylcarbamoyl)-2-benzimidazolecarbamate
methyl 1-(p-carbomethoxybenzylcarbamoyl)-2-benzimidazolecarbamate
methyl 1-(p-methylsulfonylbenzylcarbamoyl)-2-benzimidazolecarbamate
methyl 1-(p-cyanosulfanilamidocarbonyl)-2-benzimidazolecarbamate
methyl 1-(p-carboethoxysulfanilamidocarbonyl)-2-benzimidazolecarbamate
methyl 1-(1-naphthamidocarbonyl)-2-benzimidazolecarbamate
methyl 1-(p-butylsulfonylbenzamidocarbonyl)-2-benzimidazolecarbamate

EXAMPLE 9

The following compounds are prepared in accordance with Example 6 by replacing the 12.4 parts of methyl 1-(methylcarbamoyl) - 2 - benzimidazolecarbamate and 4.7 parts of propionylchloride with the equivalent parts of the properly substituted benzimidazole and electrophilic reagent necessary to prepare each named product.

Product 1-(cyanomethyl)-3-butylcarbamoyl-2-benzimidazolinecarbamic acid, methyl ester
1-(methoxymethyl)-3-methylcarbamoyl-2-benzimidazolinecarbamic acid, ethyl ester
1-(methoxycarbonylmethyl)-3-butylcarbamoyl-2-benzimidazolinecarbamic acid, methyl ester
1-(butoxycarbonylmethyl)-3-methylcarbamoyl-2-benzimidazolinecarbamic acid, methyl ester
1-(benzylsulfonyl)-3-ethylcarbamoyl-2-benzimidazolinecarbamic acid, methyl ester
1-(hexylsulfonyl)-3-butylcarbamoyl-2-benzimidazolinecarbamic acid, methyl ester
1-(p-chlorophenylsulfonyl)-3-methylcarbamoyl-2-benzimidazolinecarbamic acid, methyl ester
1-(p-methoxyphenylsulfonyl)-3-methylcarbamoyl-2-benzimidazolinecarbamic acid, methyl ester
1-(p-methylphenylsulfonyl)-3-hexylcarbamoyl-2-benzimidazolinecarbamic acid, methyl ester
1-(p-ethylphenylsulfonyl)-3-methylcarbamoyl-2-benzimidazolinecarbamic acid, methyl ester
methyl 1-(butylcarbamoyl)-3-cyano-$\Delta^{2,N}$-2-benzimidazolecarbamate
methyl 1-(methoxycarbonyl)-3-dimethylcarbamoyl)-$\Delta^{2,N}$-2-benzimidazolinecarbamate
ethyl 1-(cyano)-3-[(p-toluoyl)carbamoyl]-$\Delta^{2,N}$-2-benzimidazolinecarbamate
ethyl 2-(propionylimino)-3-(cyclohexylcarbamoyl)-1-benzimidazolinecarboxylate
isopropyl 2-(propionylimino)-3-(butylcarbamoyl)-1-benzimidazolinecarboxylate
allyl 1-(hexylcarbamoyl)-2-benzimidazolecarbamate
allyl 1-(methylcarbamoyl)-2-benzimidazolecarbamate
allyl 1-(butylcarbamoyl)-2-benzimidazolecarbamate
allyl 1-[(p-toluoyl)carbamoyl]-2-benzimidazolecarbamate
allyl 1-(cyclohexylcarbamoyl)-2-benzimidazolecarbamate
methyl 1-(cyclopropylcarbamoyl)-2-benzimidazolecarbamate
isopropyl 1-(cyclopropylcarbamoyl)-2-benzimidazolecarbamate
ethyl 1-(cyclopropylcarbamoyl)-2-benzimidazolecarbamate
methyl 1-(butoxycarbonylmethyl)-3-(methylcarbamoyl)-$\Delta^{2,N}$-2-benzimidazolinecarbamate
1-(p-chlorobenzylsulfonyl)-3-ethylcarbamoyl-2-benzimidazolinecarbamic acid, methyl ester
1-(p-methylbenzylsulfonyl)-3-butylcarbamoyl-2-benzimidazolinecarbamic acid, methyl ester
1-(p-methoxybenzylsulfonyl)-3-methylcarbamoyl-2-benzimidazolinecarbamic acid, methyl ester
1-(p-ethylbenzylsulfonyl)-3-(2-chloroacetylcarbamoyl)-2-benzimidazolinecarbamic acid, methyl ester
1-(dodecylthiolcarbonyl)-3-trifluoroacetylcarbamoyl)-2-benzimidazolinecarbamic acid, methyl ester
1-(allylthiolcarbonyl)-3-butylcarbamoyl-2-benzimidazolinecarbamic acid, methyl ester
1-(propargylthiolcarbonyl)-3-methylcarbamoyl-2-benzimidazolinecarbamic acid, methyl ester
1-(cyclooctylthiolcarbonyl)-3-ethylcarbamoyl-2-benzimidazolinecarbamic acid, methyl ester
1-(cyclohexylmethylthiolcarbonyl)-3-carbamoyl-2-benzimidazolinecarbamic acid, methyl ester
1-(phenylthiolcarbonyl)-3-butylcarbamoyl-2-benzimidazolinecarbamic acid, methyl ester
1-(benzylthiolcarbonyl)-3-propylcarbamoyl-2-benzimidazolinecarbamic acid, methyl ester
1-(dodecycloxythiocarbonyl)-3-methylcarbamoyl-2-benzimidazolinecarbamic acid, methyl ester
1-(cyclopentenyloxythiocarbonyl)-3-methylcarbamoyl-2-benzimidazolinecarbamic acid, methyl ester
1-(phenoxythiocarbonyl)-3-butylcarbamoyl-2-benzimidazolinecarbamic acid, methyl ester
1-(benzyloxythiocarbonyl)-3-sec-butylcarbamoyl-2-benzimidazolinecarbamic acid, isopropyl ester
1-(cyclohexylmethyloxythiocarbonyl)-3-propylcarbamoyl-2-benzimidazolinecarbamic acid, methyl ester
1-(hexylthiolcarbonyl)-3-butylcarbamoyl-2-benzimidazolinecarbamic acid, methyl ester

EXAMPLE 10

Preparation of 1-methylcarbamoyl-2-propionamidobenzimidazole

A total of 30 parts of methylisocyanate is added gradually to a stirring mixture of 94 parts of 2-propionamidobenzimidazole and 1000 parts of benzene. After the entire reaction mixture is stirred for 8 hours at room temperature, the solvent is removed under vacuum to give 110 parts of essentially pure 1-(methylcarbamoyl)-2-propionamidobenzimidazole.

By substituting an equivalent amount or two equivalent amounts of the appropriate isocyanate for methyl isocyanate and properly substituted aminobenzimidazole for 2-propionamidobenzimidazole, the following compounds of Formula I can be made:

1-(ethylcarbamoyl)-2-propionamidobenzimidazole
1-(butylcarbamoyl)-2-propionamidobenzimidazole
1-(hexylcarbamoyl)-2-propionamidobenzimidazole 1-(p-tolylcarbamoyl)-2-propionamidobenzimidazole
1-(ethoxycarbonylmethylcarbamoyl)-2-propionamidobenzimidazole
1-(cyclopropylcarbamoyl)-2-propionamidobenzimidazole
1-(dodecylcarbamoyl)-2-propionamidobenzimidazole
1-(piperidinocarbonyl)-2-propionamidobenzimidazole
1-(cyclohexylcarbamoyl)-2-cyclopropylcarboxamidobenzimidazole
1-(butylcarbamoyl)-2-cyclobutylcarboxamidobenzimidazole
1-(phenylcarbamoyl)-2-cyclopropylcarboxamidobenzimidazole
1-(o-chlorophenylcarbamoyl)-2-cyclopropylcarboxamidobenzimidazole
1-(p-bromophenylcarbamoyl)-2-cyclopropylcarboxamidobenzimidazole
1-(m-fluorophenylcarbamoyl)-2-cyclopropylcarboxamidobenzimidazole
1-(3,4-dichlorophenylcarbamoyl)-2-cyclopropylcarboxamidobenzimidazole
1-(p-methoxyphenylcarbamoyl)-2-cyclopropylcarboxamidobenzimidazole
1-(p-butoxyphenylcarbamoyl)-2-cyclopropylcarboxamidobenzimidazole
1-(butylcarbamoyl)-2-formamidobenzimidazole
1-(methylcarbamoyl)-2-acetamidobenzimidazole
1-(butylcarbamoyl)-2-acetamidobenzimidazole
1-(ethylcarbamoyl)-2-butyramidobenzimidazole
1-(methylcarbamoyl)-2-butyramidobenzimidazole
1-(p-butylphenylcarbamoyl)-2-propionamidobenzimidazole
1-(p-methylphenylcarbamoyl)-2-propionamidobenzimidazole
1-(cumylcarbamoyl)-2-propionamidobenzimidazole
1-(3,4-dimethylphenylcarbamoyl)-2-propionamidobenzimidazole
1-(m-nitrophenylcarbamoyl)-2-propionamidobenzimidazole
1-(p-nitrophenylcarbamoyl)-2-propionamidobenzimidazole
1-(p-chlorophenylcarbamoyl)-2-propionamidobenzimidazole
1-(benzylcarbamoyl)-2-propionamidobenzimidazole
1-(p-methylbenzylcarbamoyl)-2-propionamidobenzimidazole
1-(p-chlorobenzylcarbamoyl)-2-propionamidobenzimidazole
1-(3-chloro-4-methylphenylcarbamoyl)-2-propionamidobenzimidazole
1-(furfurylcarbamoyl)-2-propionamidobenzimidazole
1,3-di(methylcarbamoyl)-2-formimidobenzimidazoline
1,3-di(methylcarbamoyl)-2-acetamidobenzimidazoline
1,3-di(methylcarbamoyl)-2-propionimidobenzimidazoline
1,3-di(butylcarbamoyl)-2-butyramidobenzimidazoline
1,3-di(butylcarbamoyl)-2-propionimidobenzimidazoline
1,3-di(hexylcarbamoyl)-2-propionimidobenzimidazoline
1,3-di(ethylcarbamoyl)-2-propionimidobenzimidazoline
1-methylcarbamoyl-3-butylcarbamoyl-2-cyclopropylcarboximidobenzimidazoline
1-butylcarbamoyl-3-(p-tolylcarbamoyl)-2-propionimidobenzimidazoline

EXAMPLE 11

Preparation of 1,3-di(chlorocarbonyl)-2-propionimidobenzimidazoline

To a solution of 19 parts of phosgene in 300 parts of tetrahydrofuran is gradually added 18.9 parts of 2-propionamidobenzimidazole. The entire mixture is stirred under anhydrous conditions, at room temperature, for a period of 1 hour. At this point 20.2 parts triethylamine is added and the entire mixture stirred further for an additional hour at room temperature. Any solid present is discarded by filtration. The filtrate is stripped free of solvent under reduced pressure and essentially pure 1,3-di(chlorocarbonyl)-2-propionimidobenzimidazoline is obtained by triturating the residue with hexane and collecting the solid by filtration.

EXAMPLE 12

Preparation of 1-carbamoyl-3-chlorocarbonyl-2-propionimidobenzimidazoline

A total of 1.7 parts of ammonia is gradually added to a stirring mixture of 14.0 parts of 1,3-dichlorocarbonyl-2-propionimidobenzimidazoline and 300 parts of chloroform (alcohol-free). After stirring the reaction mixture for one hour, any solid present is filtered and discarded. The filtrate is washed with water, dried and the solvent is removed under reduced pressure. Essentially pure 1-carbamoyl-3-chlorocarbonyl - 2 - propionimidobenzimidazoline is obtained by triturating the residue with hexane and collecting the product by filtration.

The following compounds can be prepared similarly by substituting equivalent amounts of the appropriate 1-chlorocarbonyl-2-amidobenzimidazole or 1,3-(dichlorocarbonyl)-2-amidobenzimidazole or alkyl 1,3-dichlorocarbonyl-2-benzimidazolecarbamate for 1-chlorocarbonyl-2-propionamidobenzimidazole and the properly substituted amine for ammonia.

1-(morpholinocarbonyl)-2-cyclopropylcarboxamidobenzimidazole
1-(N,N-dimethylcarbamoyl)-2-propionamidobenzimidazole
1-(N,N-dibutylcarbamoyl)-2-propionamidobenzimidazole
1-(N,N-dihexylcarbamoyl)-2-propionamidobenzimidazole
1-(N-dodecyl-N-methylcarbamoyl)-2-propionamidobenzimidazole
1-(piperidinocarbonyl)-2-cyclopropylcarboxamidobenzimidazole
1-(N-methyl-N-phenylcarbamoyl)-2-cyclopropylcarboxamidobenzimidazole
1-(N,N-dimethylcarbamoyl)-2-cyclopropylcarboxamidobenzimidazole
1-(N,N-dimethylcarbamoyl)-2-cyclobutylcarboxamidobenzimidazole
1-(N,N-dibutylcarbamoyl)-2-propionamidobenzimidazole
1-(N-butyl-N-methylcarbamoyl)-2-acetamidobenzimidazole
1-(N-(3-methoxypropyl)-N-methylcarbamoyl)-2-propionamidobenzimidazole
1,3-di(carbamoyl)-2-propionimidobenzimidazoline
1,3-bis(N-methylcarbamoyl)-2-propionimidobenzimidazoline
1,3-bis(N-butylcarbamoyl)-2-propionimidobenzimidazoline
1,3-bis(N,N-dimethylcarbamoyl)-2-propionimidobenzimidazoline
1,3-bis(N-butyl-N-methylcarbamoyl)-2-propionimidobenzimidazoline
2-propionamido-1-thiolbenzimidazole carboxylic acid, dodecyl ester
2-propionamido-1-thionobenzimidazole carboxylic acid, benzyl ester
1-allylcarbamoyl-2-propionamidobenzimidazole
1-propargylcarbamoyl-2-propionamidobenzimidazole
1-(8-heptadecenylcarbamoyl)-2-propionamidobenzimidazole
1-(8-decynylcarbamoyl)-2-cyclopropylcarboxamidobenzimidazole
1-(8-heptadecynylcarbamoyl)-2-cyclopropylcarboxamidobenzimidazole
methyl 1,3-dicarbamoyl-2-benzimidazolecarbamate The compounds of Formula II can be prepared by reacting an aminobenzimidazolecarboxylic acid ester or amidobenzimidazole with one or two equivalents of a sulfenyl chloride as shown in reaction schemes (1), (2) and (3) below:

(1)
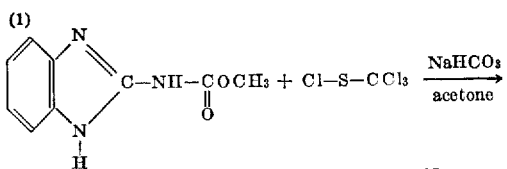NaHCO₃ / acetone

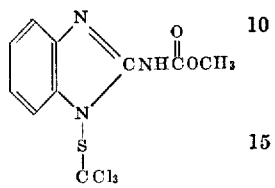

(2)
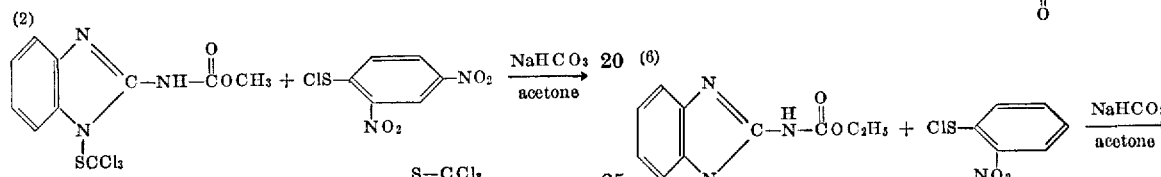NaHCO₃ / acetone

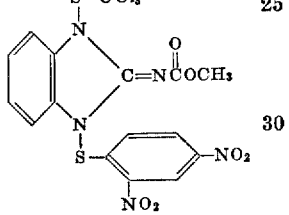

(3)
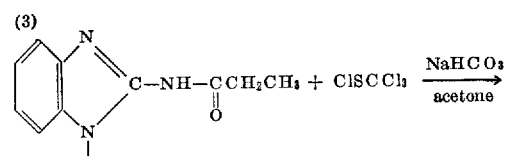NaHCO₃ / acetone

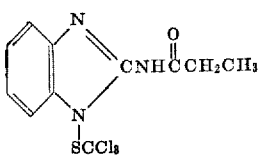

The reactions are generally run in an inert solvent such as chloroform, tetrahydrofuran or acetone at room temperature or at slightly elevated temperatures in the presence of suitable acid acceptors such as sodium bicarbonate or triethylamine.

Other trisubstituted benzimidazolines of Formula II can be prepared similarly by taking the appropriately disubstituted aminobenzimidazoles and reacting them with one equivalent of a sulfenyl chloride in reactions (4), (5) and (6) below:

(4)
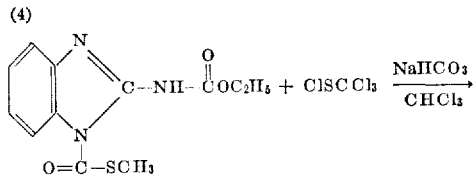NaHCO₃ / CHCl₃

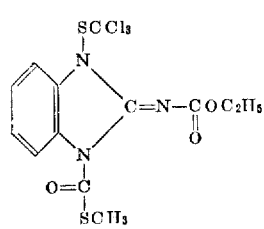

(5)
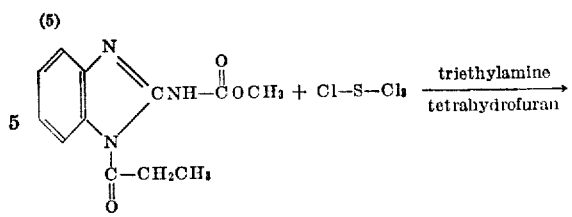triethylamine / tetrahydrofuran

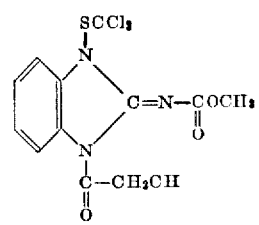

(6)
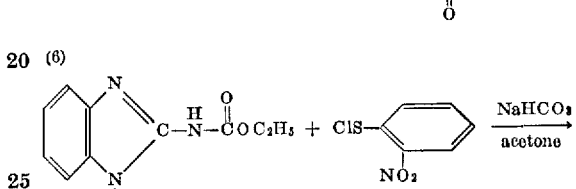NaHCO₃ / acetone

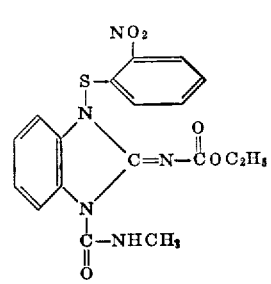

The insoluble amine salt or sodium chloride which forms during the reaction is filtered or washed away with water and the filtrate is stripped under reduced pressure to remove the solvent and yield technical grade di- or tri-substituted benzimidazoles and benzimidazolines of Formula II.

The following examples are offered to illustrate the preparation of the compounds of Formula II. The amounts are given in terms of parts by weight unless otherwise specified.

EXAMPLE 13

To a mixture of 19 parts of methyl 2-benzimidazolecarbamate, 100 parts of chloroform, 9 parts of sodium bicarbonate and 10 parts of water, a total of 19 parts of trichloromethanesulfenyl chloride is added gradually with stirring. The reaction is maintained at room temperature with external cooling. The entire reaction is stirred for an additional hour at room temperature. The solid formed is removed by filtration, washed with two volumes of water and allowed to dry. This material amounts to 27 parts of essentially pure 1-(trichloromethylthio)-2-benzimidazolecarbamic acid, methyl ester.

By using equivalent amounts of properly substituted sulfenyl chlorides for the trichloromethanesulfenyl chloride and equivalent amounts of properly substituted mono- or di-substituted 2-aminobenzimidazoles for the methyl-2-benzimidazolecarbamate, the following compounds can be similarly made:

1-(methylthio)-2-benzimidazolecarbamic acid, methyl ester
1-(ethylthio)-2-benzimidazolecarbamic acid, methyl ester
1-(pentachloroethylthio)-2-benzimidazolecarbamic acid, methyl ester
1-(trifluoromethylthio)-2-benzimidazolecarbamic acid, methyl ester 1-(trichloromethylthio)-3-(2-ethoxycarbonylmethyl)-
    $\Delta^{2,N}$-2-benzimidazolinecarbamic acid, methyl ester
1-(trichlychloromethylthio)-3-propionyl-2-iminobenzimidazole
3-(trifluoromethylthio)-1-propionyl-2-iminobenzimidazole
1-(2,4-dinitrophenylthio)-2-benzimidazolecarbamic acid, methyl ester
1-(2,4-dinitrophenylthio)-2-benzimidazolecarbamic acid, ethyl ester
1-(o-nitrophenylthio)-2-benzimidazolecarbamic acid, isopropyl ester
1-(2,4-dinitrophenylthio)-2-benzimidazolecarbamic acid, isobutyl ester
1-(2,4-dinitrophenylthio)-2-benzimidazolecarbamic acid, isopropyl ester
3-(trichloromethylthio)-2-imino-1-benzimidazolinecarboxylic acid, methyl ester
1-(trichloromethylthio)-2-benzimidazolecarbamic acid, ethyl ester
1-(trichloromethylthio)-5-methyl-3-benzimidazolecarboxylic acid, methyl ester
1-(trichloromethylthio)-6-chloro-3-benzimidazolecarboxylic acid, ethyl ester
1-(trichloromethylthio)-2-benzimidazolecarbamic acid, isopropyl ester
1-(hexylthio)-2-benzimidazolecarbamic acid, methyl ester
1-(m-trifluoromethylphenylthio)-2-benzimidazolecarbamic acid, methyl ester
1-methyl-3-trichloromethylthio-2-benzimidazolinecarbamic acid, methyl ester
1-cyanomethyl-3-(2,2,2-trichloroethylthio)-2-benzimidazolinecarbamic acid, methyl ester
1-methoxymethyl-3-(trichloromethylthio)-2-benzimidazolinecarbamic acid, methyl ester
1-methylsulfonyl-3-(trichloromethylthio)-2-benzimidazolinecarbamic acid, methyl ester
1-hexylsulfonyl-3-(methylthio)-2-benzimidabolinecarbamic acid, methyl ester
1-phenylsulfonyl-3-(trichloromethylthio)-2-benzimidazolinecarbamic acid, methyl ester
1-(p-chlorophenylsulfonyl)-3-(trichloromethylthio)-2-benzimidazolinecarbamic acid, methyl ester
1-(p-bromophenylsulfonyl)-3-(trichloromethylthio)-2-benzimidazolinecarbamic acid, methyl ester
1-(p-methoxyphenylsulfonyl)-3-(trifluoromethylthio)-2-benzimidazolinecarbamic acid, methyl ester
1-(m-methylphenylsulfonyl)-3-(trichloromethylthio)-2-benzimidaboline carbamic acid, methyl ester
1-(p-ethylphenylsulfonyl)-3-(hexylthio)-2-benzimidazolinecarbamic acid, methyl ester
1-(benzylsulfonyl)-3-(trichloromethylthio)-2-benzimidazolinecarbamic acid, methyl ester
1-(p-fluorobenzylsulfonyl)-3-(o-nitrophenylthio)-2-benzimidazolinecarbamic acid, methyl ester
1-(p-chlorobenzylsulfonyl)-3-(trichloromethylthio)-2-benzimidazolinecarbamic acid, methyl ester
1-(p-methoxybenzylsulfonyl)-3-(trichloromethylthio)-2-benzimidazolinecarbamic acid, methyl ester
1-(p-methylbenzylsulfonyl)-3-(trichloromethylthio)-2-benzimidazolinecarbamic acid, methyl ester
1-(p-ethylbenzylsulfonyl)-3-(trichloromethylthio)-2-benzimidazolinecarbamic acid, methyl ester
1-(trichloromethylthio)-5-fluoro-2-benzimidazolecarbamic acid, ethyl ester
1-(trichloromethylthio)-5-iodo-2-benzimidazolecarbamic acid, methyl ester
1-(trichloromethylthio)-5-butoxy-2-benzimidazolecarbamic acid, methyl ester
1-(trichloromethylthio)-6-methoxy-2-benzimidazolecarbamic acid, methyl ester
1-(trichloromethylthio)-5-butyl-2-benzimidazolecarbamic acid, methyl ester
1-(methylthio)-6-nitro-2-benzimidazolecarbamic acid, ethyl ester
1-(trichloromethylthio)-3-propionyl-2-iminobenzimidazoline
1-(trichloromethylthio)-2-(cyclopropylcarbonylamino)benzimidazole
1-(trichloromethylthio)-3-(cyclohexylcarbonyl)-2-iminobenzimidazole
2-(cyclopropylcarbonylamino)-1-(trichloromethylthio)benzimidazole
2-(cyclobutylcarbonylamino)-1-(trichloromethylthio)benzimidazole
1-(trichloromethylthio)-5-nitro-2-benzimidazolecarbamic acid, methyl ester
1-(trichloromethylthio)-3-(dodecylthiolcarbonyl)-2-benzimidazolinecarbamic acid, allyl ester
1-(trichloromethylthio)-3-(allylthiolcarbonyl)-2-benzimidazolinecarbamic acid, methyl ester
1-(trichloromethylthio)-3-(propargylthiocarbonyl)-2-benzimidazolinecarbamic acid, methyl ester
1-(cyclooctylthiolcarbonyl)-3-trichloromethylthio-2-benzimidazolinecarbamic acid, methyl ester
1-(cyclohexylmethylthiolcarbonyl)-3-trichloromethylthio-2-benzimidazolinecarbamic acid, methyl ester
1-(phenylthiolcarbonyl)-3-trichloromethylthio-2-benzimidazolinecarbamic acid, methyl ester
1-(benzylthiolcarbonyl)-3-trichloromethylthio-2-benzimidazolinecarbamic acid, methyl ester
1-(phenoxythiocarbonyl)-3-trichloromethylthio-2-benzimidazoline carbamic acid, methyl ester
1-(hexyloxythiocarbonyl)-3-trichloromethylthio-2-benzimidazolinecarbamic acid, methyl ester
1-(benzyloxythiocarbonyl)-3-trichloromethylthio-2-benzimidazolinecarbamic acid, methyl ester
1-(dodecyloyl)-3-trichloromethylthio-2-benzimidazolinecarbamic acid, methyl ester
1-(butoxyacetyl)-3-(2,4-dinitrophenylthio)-2-benzimidazolinecarbamic acid, silyl ester
1-(3-methoxypropionyl)-3-trichloromethylthio-2-benzimidazolinecarbamic acid, methyl ester
1-(acetoacetyl)-3-methylthio-2-benzimidazolinecarbamic acid, methyl ester
1-(trifluoroacetyl)-3-methylthio-2-benzimidazolinecarbamic acid, methyl ester
1-(chlorocarbonyl)-3-methylthio-2-benzimidazolinecarbamic acid, methyl ester
1-(acryoyl)-3-trichloromethylthio-2-benzimidazolinecarbamic acid, methyl ester
1-(2-decenoyl)-3-trichloromethylthio-2-benzimidazolinecarbamic acid, methyl ester
1-(propargoyl)-3-trichloromethylthio-2-benzimidazolinecarbamic acid, methyl ester
1-(2-octynoyl)-3-trichloromethylthio-2-benzimidazolinecarbamic acid, methyl ester
1-(cyclooctanoyl)-3-trichloromethylthio-2-benzimidazolinecarbamic acid, methyl ester
1-(butoxyoxalyl)-3-phenylthio-2-benzimidazolinecarbamic acid, methyl ester
1-(benzoyl)-3-trichloromethylthio-2-benzimidazolinecarbamic acid, methyl ester
1-(2-nitrobenzoyl)-3-trichloromethylthio-2-benzimidazolinecarbamic acid, methyl ester
1-(p-chlorobenzoyl)-3-trichloromethylthio-2-benzimidazolinecarbamic acid, methyl ester
1-(2,2,2-trifluoroethylthio)-2-benzimidazolecarbamic acid, methyl ester
1-(hexylthio)-2-benzimidazolecarbamic acid, methyl ester
1-(2-chloroethylthio)-2-benzimidazolecarbamic acid, methyl ester
1-(p-methylsulfonylphenylthio)-2-benzimidazolecarbamic acid, methyl ester
1-(benzythio)-2-benzimidazolecarbamic acid, methyl ester
1-(p-butylsulfonylphenyl)-2-benzimidazolecarbamic acid, methyl ester 1-(m-trifluoromethylphenyl)-2-benimidazolecarbamic acid, methyl ester
1-(trichloromethylthio)-5-bromo-2-benzimidazole-carbamic acid, methyl ester
1-(pentafluoroethylthio)-2-benzimidazolecarbamic acid, ethyl ester
1-(2-fluoroethylthio)-2-benzimidazolecarbamic acid, ethyl ester
2-butyramido-1-(trichloromethylthio)benzimidazole
2-acetamido-1-(trichloromethylthio)benzimidazole
2-formamido-1-(trichloromethylthio)benzimidazole
2-propionamido-1-(trichloromethylthio)benzimidazole

EXAMPLE 14

A total of 38 parts of trichloromethane sulfenyl chloride is added gradually with stirring to a mixture composed of 19 parts of methyl 2-benzimidazolecarbamate, 100 parts of chloroform, 18 parts of sodium bicarbonate and 10 parts of water. External cooling is applied to the reaction to maintain the reaction at about room temperature. The entire reaction is stirred for an additional hour after the addition of trichloromethane sulfenyl chloride is completed. Essentially pure product, 1,3-bis-(trichloromethylthio) - $\Delta^{2,N}$ - 2-benzimidazolinecarbamic acid, methyl ester (30 parts) is obtained by filtering, water washing and drying the solid matter formed during the reaction.

By using equivalent amounts of properly substituted sulfenyl chlorides for the trichloromethane sulfenyl chloride and equivalent amounts of properly substituted mono- or di-substituted 2-aminobenzimidazoles for the methyl 2-benzimidazolecarbamate the following compounds of Formula II can be similarly made.

1,3-bis(trichloromethylthio)-2-cyclopropylcarbonylimino-benzimidazoline
1,3-bis(trichloromethylthio)-2-forminidol-benzimidazoline
1,3-(trichloromethylthio)-$\Delta^{2,N}$-2-benzimidazoline-carbamic acid, ethyl ester
1,3-bis(trichloromethylthio)-$\Delta^{2,N}$-2-benzimidazoline-carbamic acid, isopropyl ester
1,3-bis(trichloromethylthio)-$\Delta^{2,N}$-2-benzimidazoline-carbamic acid, sec-butyl ester
1-(trichloromethylthio)-3-(o-nitrophenylthio)-$\Delta^{2,N}$-2-benzimidazolinecarbamic acid, methyl ester

EXAMPLE 15

A total of 20 parts of 2,4-dinitrophenylsulfenyl chloride is added gradually to a stirring mixture composed of 19 parts of methyl 2-benzimidazolecarbamic, 100 parts of chloroform, and 8 parts of pyridine. The reaction is stirred for an additional hour at room temperature upon completing the addition of the 2,4-dinitrophenylsulfenyl chloride. At this point, the solvent is removed under reduced pressure and the residue is washed with water and dried. The remaining solid is essentially pure 1-(2,4-dinitrophenylthio)-2-benzimidazolecarbamic acid, methyl ester.

By using equivalent amounts of properly substituted sulfenyl chlorides for the 2,4-dinitrophenyl sulfenyl chloride and equivalent amounts of properly substituted mono- or di-substituted 2-aminobenzimidazoles for the methyl 2-benzimidazolecarbamate, the following compounds can be similarly made.

1-(2,4-dichlorophenylthio)-2-benzimidazolecarbamic acid, methyl ester
1-(p-fluorophenylthio)-2-benzimidazolecarbamic acid, methyl ester
1-(2,4-dimethylphenylthio)-2-benzimidazolecarbamic acid, methyl ester
1-(p-methoxyphenylthio)-2-benzimidazolecarbamic acid, methyl ester
2-propionamido-1-(2,4-dinitrophenylthio)benzimidazole
2-acetamido-1-(2,4-dinitrophenylthio)benzimidazole
2-butyramido-1-(2,4-dinitrophenylthio)benzimidazole
1-(2,4-dinitrophenylthio)-2-benzimidazolecarbamic acid, methyl ester
1-(phenylthio)-2-benzimidazolecarbamic acid, methyl ester
1-(o-nitrophenylthio)-[5-fluoro]-2-benzimidazole-carbamic acid, methyl ester
1-(o-nitrophenylthio)-3-(m-nitrophenylcarbamoyl)-$\Delta^{2,N}$-2-benzimidazolinecarbamic acid, methyl ester
1-(o-methylphenylthio)-2-benzimidazolecarbamic acid, sec-butyl ester
1-(3,4-dimethylphenylthio)-2-benzimidazolecarbamic acid, methyl ester
1-(o-nitrophenylthio)-2-benzimidazolecarbamic acid, methyl ester
1-(p-nitrophenylthio)-2-benzimidazolecarbamic acid, methyl ester
1-(3,4-dichlorophenylthio)-2-benzimidazolecarbamic acid, methyl ester
1,3-bis(2,4-dinitrophenylthio)-$\Delta^{2,N}$-2-benzimidazoline carbamic acid, methyl ester
1-(p-methylsulfonylphenylthio)-2-benzimidazolecarbamic acid, methyl ester
1-(p-butylsulfonylphenylthio)-2-benzimidazolecarbamic acid, methyl ester
1-(benzylthio)-2-benzimidazolecarbamic acid, methyl ester
1-(o-methylbenzylthio)-2-benzimidazolecarbamic acid, methyl ester
1-(p-trifluoromethylbenzylthio)-2-benzimidazole-carbamic acid, methyl ester
1-(o-nitrobenzylthio)-2-benzimidazolecarbamic acid, methyl ester
1(p-chlorobenzylthio)-2-benzimidazolecarbamic acid, methyl ester
1-(o-fluorobenzylthio)-2-benzimidazolecarbamic acid, methyl ester
1-(o-methoxybenzylthio)-2-benzimidazolecarbamic acid, methyl ester
1-(p-ethylsulfonylbenzylthio)-2-benzimidazolecarbamic acid, methyl ester

EXAMPLE 16

A total of 19 parts of trichloromethanesulfenyl chloride is added gradually to a stirring mixture composed of 24.8 parts of 1-methoxycarbonyl-2-benzimidazolecarbamic acid, methyl ester, 100 parts of chloroform, and 11 parts of triethylamine. After stirring the reaction for an additional two hours after completing the above addition, the solvent is removed under reduced pressure with a minimum of heat. The residue is washed with water, dried and is essentially pure 1-methoxycarbonyl-3-(trichloromethylthio)-2-benzimidazolecarbamic acid, methyl ester.

By using equivalent amounts of properly substituted sulfenyl chlorides for the trichloromethane sulfenyl chloride and equivalent amounts of properly substituted mono- or di-substituted 2-aminobenzimidazoles for the 1-methoxycarbonyl-2-benzimidazolecarbamic acid, methyl ester, the following compounds of Formula II can be similarly made.

1-(trichloromethylthio)-3-(3-chloropropylcarbamoyl)-$\Delta^{2,N}$-2-benzimidazolinecarbamic acid, methyl ester
1-(trichloromethylthio)-3-(dimethylcarbamoyl)-$\Delta^{2,N}$-2-benzimidazolinecarbamic acid, methyl ester
1-(trichloromethylthio)-3-(N-methyl-N-(3-methoxypropyl)-carbamoyl)-$\Delta^{2,N}$-2-cyclopropylcarboximinobenzimidazoline
1-(trichloromethylthio)-3-(2-chloroethylcarbamoyl)-$\Delta^{2,N}$-2-benzimidazolinecarbamic acid, ethyl ester
1-(trichloromethylthio)-3-(N,N-dibutylcarbamoyl)-$\Delta^{2,N}$-2-benzimidazolinecarbamic acid, methyl ester
1-(p-butoxybenzylthio)-3-(methoxyacetyl)-$\Delta^{2,N}$-2-benzimidazolinecarbamic acid, methyl ester 1-(trichloromethylthio)-3-(cyanoacetyl)-Δ²,ᴺ-2-benzimidazolinecarbamic acid, methyl ester
1-(trichloromethylthio)-3-(hydroxyacetyl)-Δ²,ᴺ-2-benzimidazolinecarbamic acid, methyl ester
1-(trichloromethylthio)-3-(ethoxycarbonylmethylcarbamoyl)-Δ²,ᴺ-2-benzimidazolinecarbamic acid, methyl ester
1-(trifluoromethylthio)-3-(p-methoxyphenylcarbamoyl)-Δ²,ᴺ-2-benzimidazolinecarbamic acid, methyl ester
1-(trifluoromethylthio)-3-(3,4-dichlorophenylcarbamoyl)-Δ²,ᴺ-2-benzimidazolinecarbamic acid, methyl ester
1-(trichloromethylthio)-2-(methoxycarbonylimino)-3-thionobenzimidazolinecarboxylic acid, methyl ester
1-(trichloromethylthio)-2-(methoxycarbonylimino)-3-dithiobenzimidazolinecarboxylic acid, methyl ester
1-(methylthio)-2-(butoxycarbonylimino)-3-thiobenzimidazolinecarboxylic acid, hexyl ester
1-(trichloromethylthio)-2-(methoxycarbonylimino)-3-thionobenzimidazolinecarboxylic acid, 2-cyanoethyl ester
1-(trichloromethylthio)-2-(methoxycarbonylimino)-3-thionobenzimidazolinecarboxylic acid, 2-chloroethyl ester
1-(trichloromethylthio)-2-(ethoxycarbonylimino)-3-thionobenzimidazolinecarboxylic acid, 3-methoxypropyl ester
1-(trichloromethylthio)-2-(methoxycarbonylimino)-3-thiolbenzimidazolinecarboxylic acid, isopropyl ester
1-(trichloromethylthio)-3-cyano-Δ²,ᴺ-2-benzimidazolinecarbamic acid, methyl ester
1-(trichloromethylthio)-3-formyl-Δ²,ᴺ-2-benzimidazolinecarbamic acid, ethyl ester
1-(2,4-dinitrophenylthio)-3-cyano-Δ²,ᴺ-2-benzimidazolinecarbamic acid, methyl ester
1-(trichloromethylthio)-3-(methylcarbamoyl)-Δ²,ᴺ-2-benzimidazolinecarbamic acid, methyl ester
1-(trifluoromethylthio)-3-propionyl-Δ²,ᴺ-2-benzimidazolinecarbamic acid, methyl ester
1-(trifluoromethylthio)-3-acetyl-Δ²,ᴺ-2-benzimidazolinecarbamic acid methyl ester
1-(trichloromethylthio)-3-propionyl-Δ²,ᴺ-2-benzimidazolinecarbamic acid, methyl ester
1-(trichloromethylthio)-3-propionyl-Δ²,ᴺ-2-propionimidobenzimidazoline
1-(trichloromethylthio)-3-cyclopropylcarbonyl-Δ²,ᴺ-2-benzimidazolinecarbamic acid, methyl ester
1-(dimethoxyphosphoryl)-3-trichloromethylthio-2-benzimidazolinecarbamic acid, methyl ester
1-(diethoxyphosphoryl)-3-trichloromethylthio-2-benzimidazolinecarbamic acid, methyl ester
1-(dimethoxythiophosphoryl)-3-trichloromethylthio-2-benzimidazolinecarbamic acid, methyl ester
1-(trichloromethylthio)-3-(dodecylcarbamoyl)-Δ²,ᴺ-2-benzimidazolinecarbamic acid, methyl ester
1-(trichloromethylthio)-3-(phenylcarbamoyl)-Δ²,ᴺ-2-benzimidazolinecarbamic acid, methyl ester
1-(trichloromethylthio)-3-(cyclohexylcarbamoyl)-Δ²,ᴺ-2-benzimidazolinecarbamic acid, methyl ester
1-(trichloromethylthio)-3-(p-tolylcarbamoyl)-Δ²,ᴺ-2-benzimidazolinecarbamic acid, methyl ester
1-(trichloromethylthio)-3-(butylcarbamoyl)-Δ²,ᴺ-2-benzimidazolinecarbamic acid, methyl ester
1-(trichloromethylthio)-3-(hexylcarbamoyl)-Δ²ᴺ-2-benzimidazolinecarbamic acid, methyl ester
1-(trichloromethylthio)-3-(benzylcarbamoyl)-Δ²,ᴺ-2-benzimidazolinecarbamic acid, methyl ester
1-(trichloromethylthio)-3-(o-chlorophenylcarbamoyl)-Δ²,ᴺ-2-benzimidazolinecarbamic acid, methyl ester
1-(trichloromethylthio)-3-(p-butylphenylcarbamoyl)-Δ²,ᴺ-2-benzimidazolinecarbamic acid, methyl ester
1-(trichloromethylthio)-3-(methoxycarbonyl)-Δ²,ᴺ-2-benzimidazolinecarbamic acid, methyl ester
1-(2,4-dinitrophenylthio)-3-(methoxycarbonyl)-Δ²,ᴺ-2-benzimidazolinecarbamic acid, methyl ester
1-(trichloromethylthio)-3-(2-chloroethoxycarbonyl)-Δ²,ᴺ-2-benzimidazolinecarbamic acid, methyl ester
1-(trichloromethylthio)-3-(amyloxycarbonyl)-Δ²,ᴺ-2-benzimidazolinecarbamic acid, methyl ester
1-(trichloromethylthio)-3-(2-cyanoethoxycarbonyl)-Δ²,ᴺ-2-benzimidazolinecarbamic acid, isopropyl ester
1-(trichloromethylthio)-3-(2-hydroxypropoxycarbonyl)-Δ²,ᴺ-2-benzimidazolinecarbamic acid, methyl ester
methyl 1-allyl-3-(trichloromethylthio)-Δ²,ᴺ-2-benzimidazolinecarbamate
methyl 1-(2-butenyl)-3-(trichloromethylthio)-Δ²,ᴺ-2-benzimidazolinecarbamate
methyl 1-propargyl-3-(trichloromethylthio)-Δ²,ᴺ-2-benzimidazolinecarbamate
allyl 1-(trichloromethylthio)-2-benzimidazolecarbamate
1-(methoxyoxalyl)-3-(trichloromethylthio)-Δ²,ᴺ-2-benzimidazolinecarbamic acid, methyl ester
1-(ethoxyoxalyl)-3-(trichloromethylthio)-Δ²,ᴺ-2-benzimidazolinecarbamic acid, methyl ester
1-(benzyloxycarbonyl)-3-(trichloromethylthio)-2-(methoxycarbonylimino)benzimidazoline
1-(phenoxycarbonyl)-3-(trichloromethylthio)-2-(isopropoxycarbonylimino)benzimidazoline
1-(octadecylcarbamoyl)-3-(trichloromethylthio)-2-(methoxycarbonylimino)benzimidazoline
1-(allylcarbamoyl)-3-(trichloromethylthio)-2-(methoxycarbonylimino)benzimidazoline
1-(2-dodecenoylcarbamoyl)-3-(trichloromethylthio)-2-(methoxycarbonylimino)benzimidazoline
1-(stearoloylcarbamoyl)-3-(methylthio)-2-(methoxycarbonylimino)benzimidazoline
1-(undecoloylcarbamoyl)-3-(trichloromethylthio)-2-(methoxycarbonylimino)benzimidazoline
1-(tetroloylcarbamoyl)-3-(2,4-trichloromethylthio)-2-(methoxycarbonylimino)benzimidazoline
1-(tetroloylcarbamoyl)-3-(2,4-dinitrophenylthio)-2-(methoxycarbonylimino)benzimidazoline
1-(propargylcarbamoyl)-3-(2,4-dinitrophenylthio)-2-(methoxycarbonylimino)benzimidazoline
1-(8-heptadecenylcarbamoyl)-3-(trichloromethylthio)-2-(methoxycarbonylimino)benzimidazoline
methyl 1-(3-hexenylcarbamoyl)-3-(trichloromethylthio)-Δ²,ᴺ-2-benzimidazolinecarbamate
methyl 1-(acetylcarbamoyl)-3-(trichloromethylthio)-Δ²,ᴺ-2-benzimidazolinecarbamate
ethyl 1-(stearoylcarbamoyl)-3-(trichloromethylthio)-Δ²,ᴺ-2-benzimidazolinecarbamate
isopropyl 1-(acryloylcarbamoyl)-3-(trichloromethylthio)-Δ²,ᴺ-2-benzimidazolinecarbamate
isopropyl 1-(propioloylcarbamoyl)-3-(methylthio)-Δ²,ᴺ-2-benzimidazolinecarbamate
methyl 1-(trichloroacetylcarbamoyl)-3-(methylthio)-Δ²,ᴺ-2-benzimidazolinecarbamate
methyl 1-(elaidoylcarbamoyl)-3-(trichloromethylthio)-Δ²,ᴺ-2-benzimidazolinecarbamate
methyl 1-(trifluoroacetylcarbamoyl)-3-(trichloromethylthio)-Δ²,ᴺ-2-benzimidazolinecarbamate
isopropyl 1-(p-chlorobenzylcarbamoyl)-3-(trichloromethylthio)-Δ²,ᴺ-2-benzimidazolinecarbamate
isopropyl 1-(o-nitrobenzylcarbamoyl)-3-(trichloromethylthio)-Δ²,ᴺ-2-benzimidazolinecarbamate
methyl 1-(hexylthio)-2-benzimidazolecarbamate
allyl 1-(trichloromethylthio)-2-benzimidazolecarbamate The following methods can be used to prepare the compounds of Formula III.

From the reaction of 2-aminobenzimidazole with electrophilic reagents (XZ) such as acyl chlorides, ketone dimers, alkyl thiolchloroformates, alkyldithiochloroformates, dialkylphosphonothionic acid chlorides and alkyl and aryl sulfonyl chlorides as illustrated below:

(1)
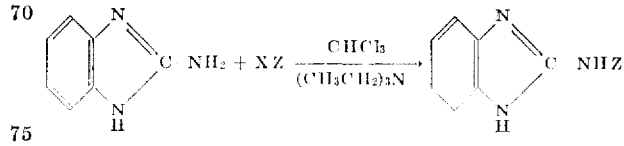

(2)

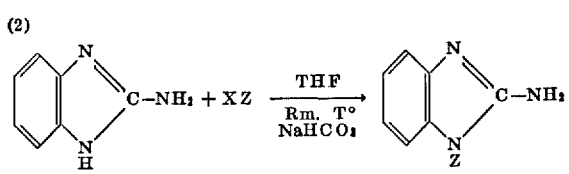

Generally, 2-aminobenzimidazole is reacted with the electrophilic reagent (XZ) in an inert solvent such as chloroform, tetrahydrofuran, benzene, acetone, and in the presence of an acid acceptor such as triethylamine, trimethylamine, pyridine and sodium bicarbonate. When the reaction is heated at reflux temperature (as in chloroform solvent for example) for a period of six hours, the corresponding 2-substituted aminobenzimidazoles are the predominant product, see Equation 1 above. If the reaction is run at room temperature or lower as (2) above, the corresponding 1-substituted - 2 - aminobenzimidazoles are the major product.

Similarly, the electrophilic reagents (XZ) such as acyl chlorides, alkylthiolchloroformates, alkylthionochloroformates, alkyldithiochloroformates, dialkylphosphonothionic acid chlorides, alkyl and aryl sulfonyl chlorides also react with 1-substituted-2-aminobenzimidazoles in the presence of an acid acceptor, to give 1,3-disubstituted benzimidazolines (at room temperature) as:

(3)

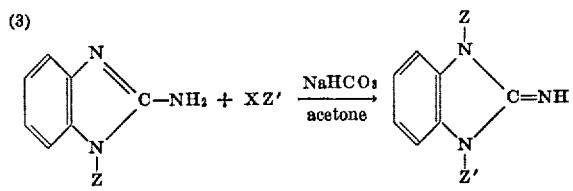

The corresponding 2-substituted aminobenzimidazoles (Equation 4 below) are not as strong bases as the 1-substituted-2-aminobenzimidazoles; consequently, in chloroform only the more reactive electrophilic reagents for examples, ketone dimers, acyl chlorides, phosgene, alkoxyoxalayl chlorides, and the chloroformates, react to give the corresponding 1,2-disubstituted isomers as:

(4)

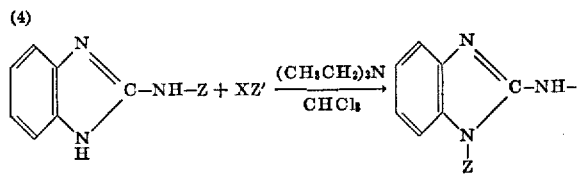

Another reaction of the 2-substituted aminobenzimidazoles is the formation of the sodium salt in dry dimethylformamide with a reagent such as sodium hydride, see reaction 5. This sodium salt can react with a broader spectrum of electrophilic reagents (XZ), see Equation 6, as dialkylphosphonothionic acid chlorides, alkyl sulfonyl chlorides, alkyl chloride, acyl chlorides and chloroformates and alkoxy oxalyl chlorides to give the corresponding disubstituted products, where the substituents are in the 2,2- or 1,2-positions. Both isomers are active as fungicides and need not be separated.

(5)

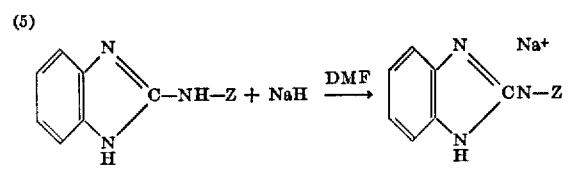

(6)

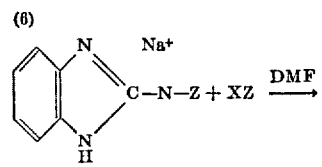

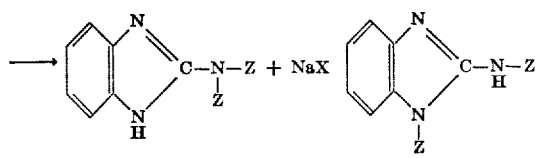

Some specific reactions follow which illustrate more fully the general reaction (6).

(7)

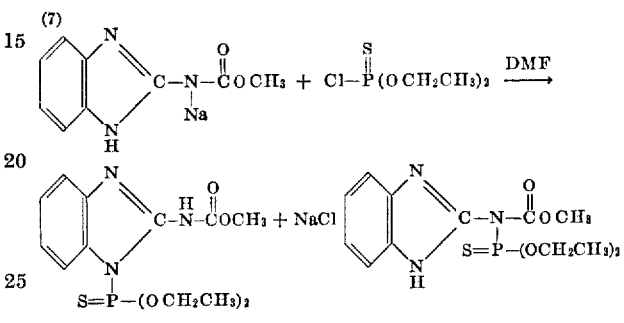

(8)

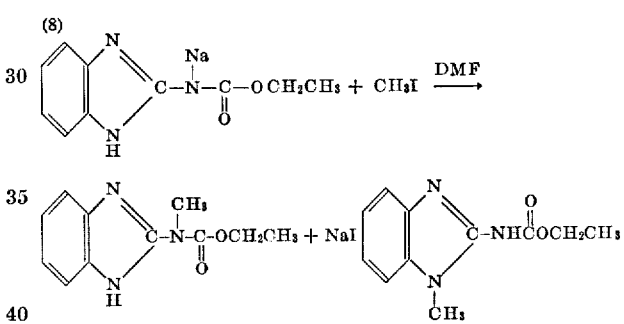

(9)

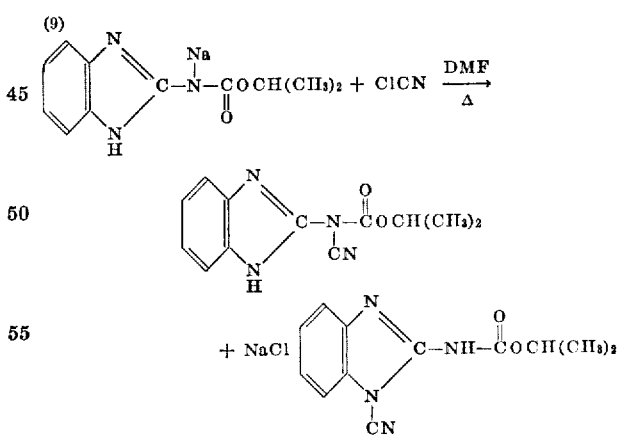

(10)

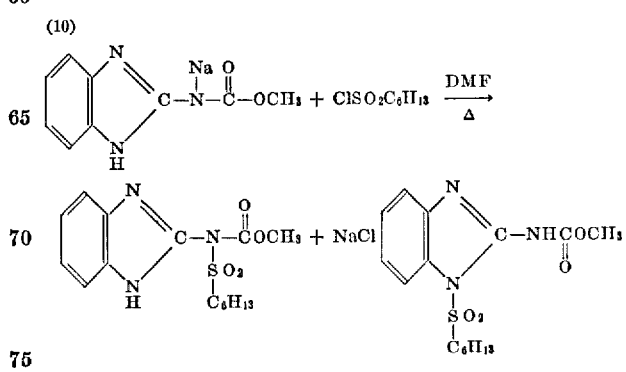

(11) 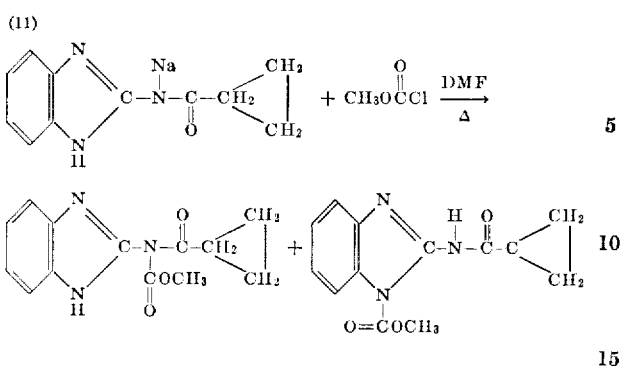

(16) 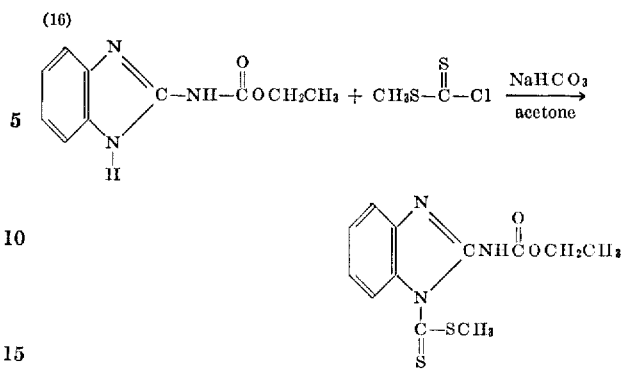

Equations 3 and 4 above are further illustrated by the following synthesis schemes:

(12) 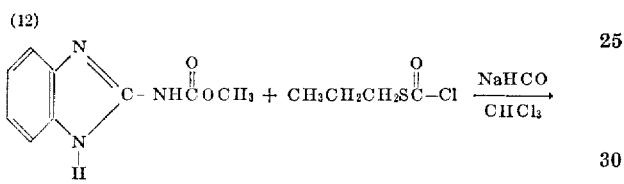

(17) 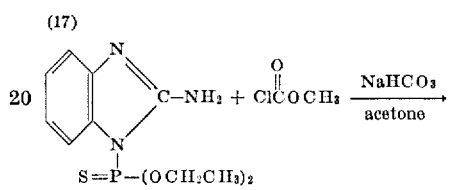

(13) 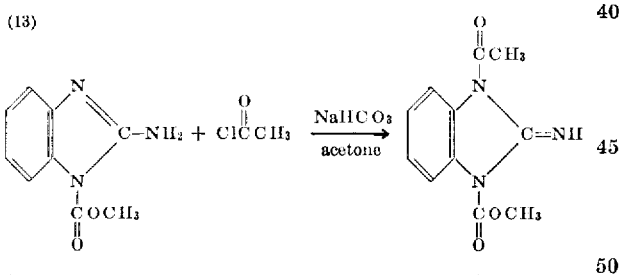

(18) 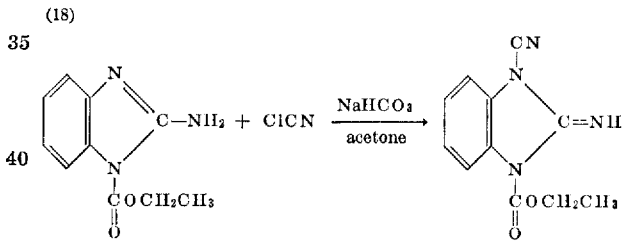

(14) 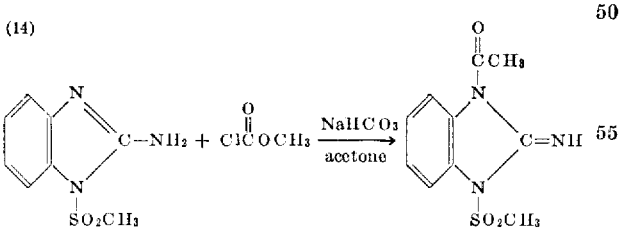

(15) 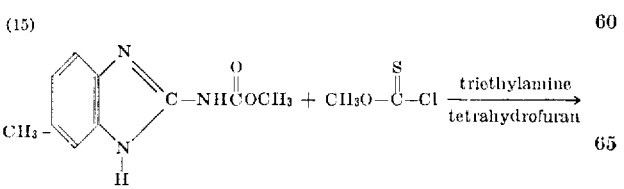

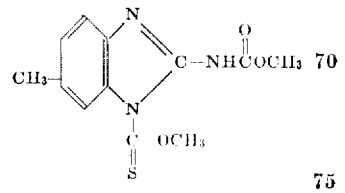

Trisubstituted 2-aminobenzimidazolines

The trisubstituted 2-aminobenzimidazolines of Formula III are generally less stable to heat, water and bases than the disubstituted 2-aminobenzimidazoles. Their preparation consequently requires milder reaction conditions such as maintaining the reaction temperature at or below room temperature. Elevated temperatures are to be avoided if maximum yield of product is desired. Generally the trisubstituted benzimidazolines are soluble in most organic solvents; the disubstituted 2-iminobenzimidazolines and 2-aminobenzimidazoles are somewhat less soluble and the monosubstituted 2-aminobenzimidazoles are the least soluble.

2-benzimidazolecarbamic acid, esters, react with electrophilic reagents such as acyl chlorides, phosgene, ketene dimer and alkoxyoxalyl chlorides in inert solvents such as chloroform, benzene, tetrahydrofuran, and acetone in the presence of acid acceptors such as triethylamine, pyridine or sodium bicarbonate to form the corresponding 1,2-disubstituted benzimidazoles of Formula III, as for example:

(19)

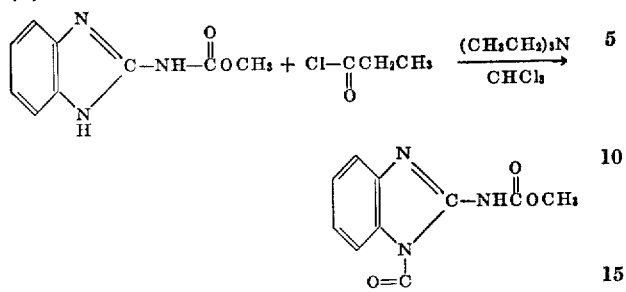

With the addition of another equivalent of an acyl chloride and triethylamine the reaction proceeds further to give trisubstituted benzimidazoles as shown below:

(20)

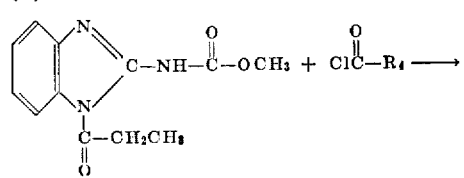

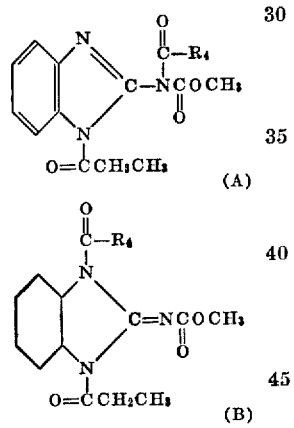

Trisubstituted amidobenzimidazoles can also be prepared from amidobenzimidazoles by reaction with two equivalent weights of electrophilic reagents as illustrated in reaction (21) below.

(21)

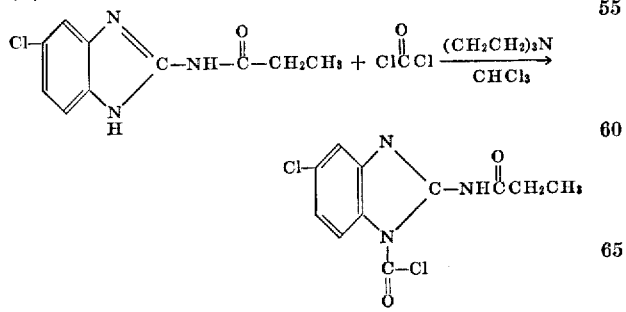

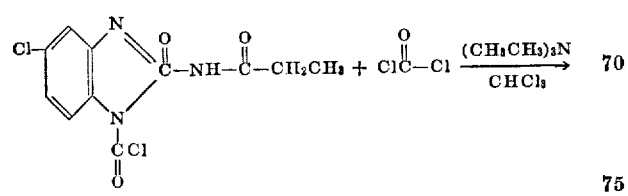

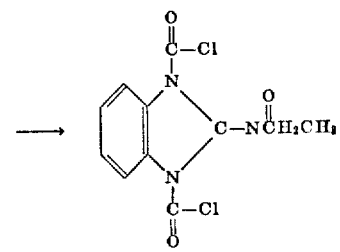

Note that the products obtained from reaction (20) above have been described by the two formulae, see products (A) and (B). Since it is difficult to determine the exact structure of such products, and since the products obtained may well be mixtures of (A) and (B), for the sake of brevity and clarity, all trisubstituted compounds of this invention will be named as (B) (1,2,3-benzimidazolines) with the understanding that we intend to cover each corresponding 1,N,N-substituted 2-aminobenzimidazole isomer.

Trisubstituted amidobenzimidazoles of Formula III can be prepared by reacting an appropriate disubstituted 2-aminobenzimidazole with electrophilic reagents such as phosgene, acyl chlorides, alkoxyoxalyl chlorides, or chloroformates, as illustrated by the following reactions:

(22)

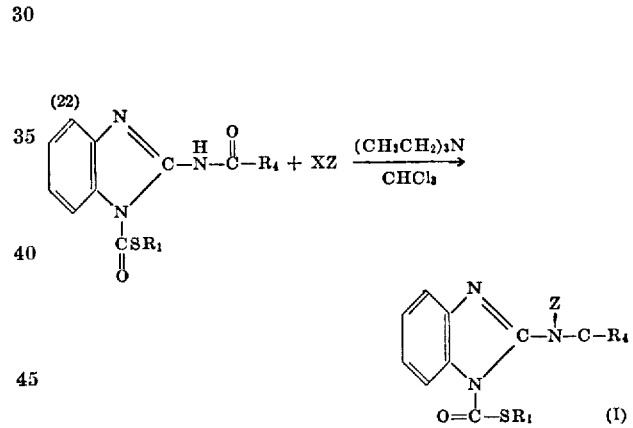

(23)

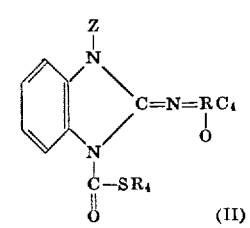

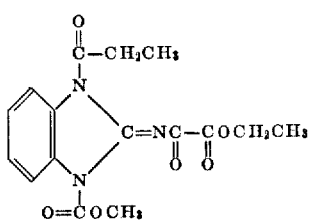

(24)
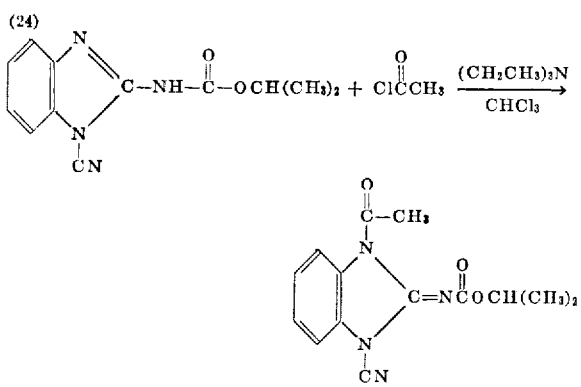

(25)
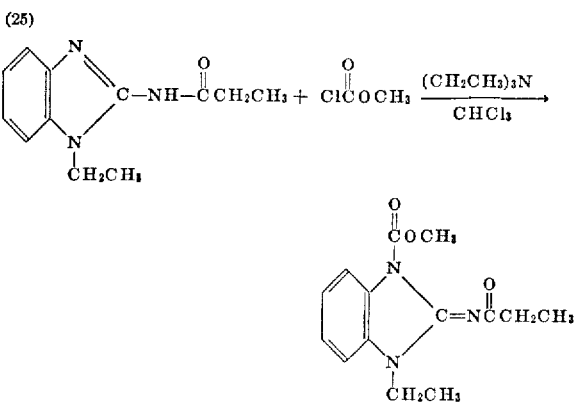

(2)
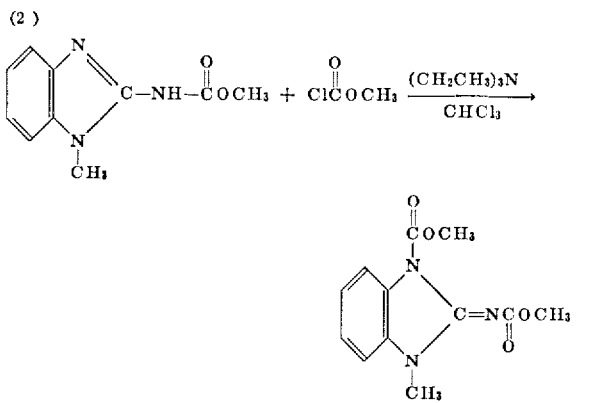

(27)
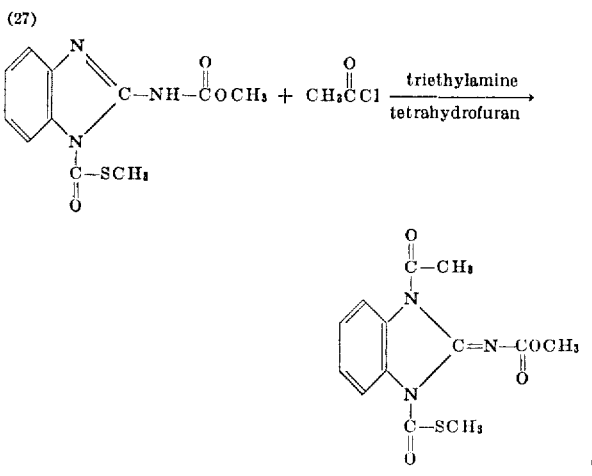

(28)
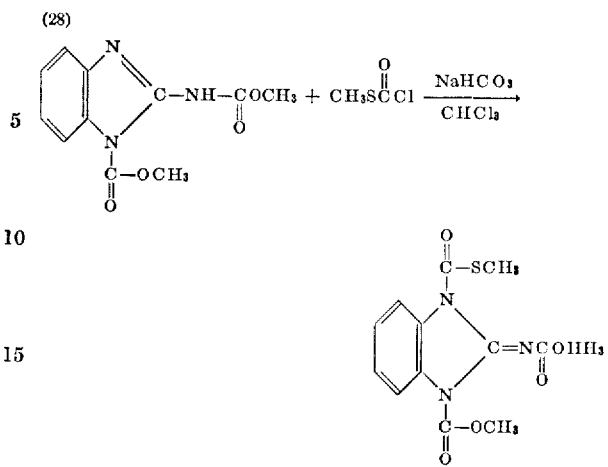

The following examples illustrate the preparation of the compounds of Formula III. The parts are in parts by weight unless otherwise indicated.

EXAMPLE 17

Preparation of 2-methoxycarbonylamino-1-thiolbenzimidazolecarboxylic acid, methyl ester A total of 19.1 parts of 2-benzimidazolecarbamic acid, methyl ester is suspended in 100 parts of chloroform containing 9.3 parts of sodium bicarbonate. This mixture is stirred at room temperature while 12.2 parts of methyl chlorothiolformate is added gradually. The entire mixture is stirred overnight at room temperature. The solid remaining is filtered and the filtrate stripped free of solvent under reduced pressure. Essentially pure 2-methoxycarbonyl amino - 1 - thiolbenzimidazolecarboxylic acid, methyl ester remains as the residue.

The following compounds of Formula III can be prepared similarly by substituting equivalent amounts of the properly substituted 2-benzimidazolecarbamic acid, ester and alkylthiolchloroformate for the 2-benzimidazolecarbamic acid, methyl ester and methyl chlorothiolformate of the procedure set forth above.

5 - chloro-2-(methoxycarbonylamino)-1-thiolbenzimidazolecarbocyclic acid, methyl ester
5-methoxy-2-(methoxycarbonylamino)-1-thiolbenzimidazolecarboxylic acid, isopropyl ester
5-(n-butyl)-2-(methoxycarboxylamino)-1-thiolbenzimidazolecarboxylic acid, methyl ester
5-isopropyl-2-(methoxycarboxylamino)-1-thiolbenzimidazolecarboxylic acid, n-propyl ester
2-(methoxycarbonylamino)-1-thiolbenzimidazolecarboxylic acid, isopropyl ester
1-[(phenylthio)carbonyl]-2-benzimidazolecarbamic acid, isopropyl ester
5-fluoro-2-(methoxycarbonylamino)-1-thiolbenzimidazolecarboxylic acid, ethyl ester
1-(cyanomethyl)-2-(methoxycarbonylimino)-3-thiolbenzimidazolinecarboxylic acid, methyl ester
1-methanesulfonyl-2-(methoxycarbonylimino)-3-thiolbenzimidazolinecarboxylic acid, methyl ester
1-butanesulfonyl-2-(methoxycarbonylimino)-3-thiolbenzimidazolinecarboxylic acid, methyl ester
1-(phenoxycarbonyl)-2-methoxycarbonylimino)-3-thiolbenzimidazolinecarboxylic acid, methyl ester
1-benzoyl-2-(methoxycarbonylimino)-3-thiolbenzimidazolinecarboxylic acid, isopropyl ester
1-acetyl-2-(methoxycarbonylimino)-3-thiolbenzimidazolinecarboxylic acid, methyl ester
1-butyroyl-2-(methoxycarbonylimino)-3-thiolbenzimidazolinecarboxylic acid, isopropyl ester
1-(diethoxyphosphinyl)-2-(methoxycarbonylimino)-3-thiolbenzimidazolinecarboxylic acid, methyl ester 1-(dimethoxyphosphinothioyl)-2-(methoxycarbonyl-
  imino)-3-thiolbenzimidazolinecarboxylic acid,
  methyl ester
1-trichloromethanesulfonyl-2-(methoxycarbonylimino)-
  3-thiolbenzimidazolinecarboxylic acid, methyl ester
1-(benzyloxycarbonyl)-2-(methoxycarbonylimino)-3-
  thiolbenzimidazolinecarboxylic acid, methyl ester
1-(dodecyloxycarbonyl)-2-methoxycarbonylimino)-3-
  thiolbenzimidazolinecarboxylic acid, methyl ester
1-(alkyloxycarbonyl-2-(methoxycarbonylimino)-3-thiol-
  benzimidazolinecarboxylic acid, methyl ester
1-acetyl-2-(sec-butyloxycarbonylamino)benzimidazole
1-acetyl-2-(allyloxycarbonylamino)benzimidazole
1-propionyl-2-(sec-butyloxycarbonylamino)
  benzimidazole

EXAMPLE 18

Preparation of 2-methoxycarbonylamino-1-thiono-
benzimidazolecarboxylic acid, methyl ester A total of 35 parts of 2-benzimidazolecarbamic acid, methyl ester is suspended in 150 parts of chloroform containing 17 parts sodium bicarbonate. This mixture is stirred at room temperature while 20.3 parts of methyl thionochloroformate is added gradually. Solid sodium chloride forms, and this is removed by filtration. The filtrate is stripped solvent-free under reduced pressure and the residue is essentially pure product, namely, 2-methoxycarbonylamino-1-thionobenzimidazole carboxylic acid, methyl ester.

In a similar manner the following compounds of Formula III can be prepared by substituting equivalent amounts of the properly substituted 2-benzimidazole-carbamic acid ester and alkyl thionochloroformate for 2-benzimidazolecarbamic acid, methyl ester and methyl thionochloroformate.

1-(propargyloxycarbonyl)-2-(methoxycarbonylimino)-
  3-thionobenzimidazolinecarboxylic acid,
  methyl ester
1-(formyl)-2-(methoxycarbonylimino)-3-thionobenzim-
  idazolinecarboxylic acid, methyl ester
1-(p-decen-1-yloxycarbonyl)-2-(methoxycarbonylimino)-
  3-thionobenzimidazolinecarboxylic acid, methyl ester
1-(diethoxyphosphinothioyl)-2-(methoxycarbonylimino)-
  3-thionobenzimidazolinecarboxylic acid, methyl ester
6-chloro-2-(methoxycarbonylamino)-1-thionobenzim-
  idazolecarboxylic acid, methyl ester
5-methyl-2-(methoxycarbonylamino)-1-thionobenzim-
  idazolecarboxylic acid, methyl ester
5-nitro-2-(methoxycarbonylamino)-1-thionobenzim-
  idazolecarboxylic acid, methyl ester
5-bromo-2-(methoxycarbonylamino)-1-thionobenzim-
  idazolecarboxylic acid, methyl ester
5-(n-butoxy-2-methoxycarbonylamino)-1-thiono-
  benzimidazolecarboxylic acid, methyl ester
1-methyl-2-(methoxycarbonylimino)-3-thionobenzim-
  idazolinecarboxylic acid, methyl ester
1-(3-ethyl-3-hexen-5-yloxycarbonyl)-2-(methoxy-
  carbonylamino)-3-thionobenzimidazole-
  carboxylic acid, methyl ester
2-(methoxycarbonylimino)-3-thionobenzimidazoline-
  carboxylic acid, oleyl ester
1-cyano-2-(methoxycarbonylimino)-3-thionobenzim-
  idazolinecarboxylic acid, isopropyl ester
1-(methoxycarbonylmethyl)-2-(methoxycarbonylimino)-
  3-thionobenzimidazolinecarboxylic acid,
  methyl ester
1-(methoxycarbonylethyl)-2-(methoxycarbonylimino)-
  3-thionobenzimidazolinecarboxylic acid,
  methyl ester
6-bromo-1-(4-octen-1-yloxycarbonyl)-2-(methoxy-
  carbonylamino)-3-thionobenzimidazolecarboxylic
  acid, methyl ester
5-nitro-2-(methoxycarbonylamino)-1-thionobenzim-
  idazoloecarboxylic acid, ethyl ester
2-(ethoxycarbonylamino)-1-thionobenzimidazole-
  carboxylic acid, methyl ester
1-(methoxycarbonyl)-2-thiolbenzimidazolecarbamic
  acid, methyl ester
2-(n-butoxycarbonylamino)-1-thionobenzimidazole-
  carboxylic acid, stearyl ester
2-(ethoxycarbonylamino)-1-thionobenzimidazole-
  carboxylic acid, 2-fluoroethyl ester
2-(methoxycarbonylamino)-1-thionobenzimidazole-
  carboxylic acid, 3-bromopropyl ester
2-(methoxycarbonylamino)-1-thionobenzimidazole-
  carboxylic acid, p-(trifluoromethyl)phenyl ester
2-(methoxycarbonylamino)-1-thionobenzimidazole-
  carboxylic acid, p-(methylsulfonyl)phenyl ester
2-(methoxycarbonylamino)-1-thionobenzimidazole-
  carboxylic acid, p-isopropoxyphenyl ester
2-(methoxycarbonylamino)-1-thionobenzimidazole-
  carboxylic acid, p-fluorophenyl ester
2-(methoxycarbonylamino)-1-thionobenzimidazole-
  carboxylic acid, 9,10-dibromooctadecyl ester
2-methoxycarbonylamino-1-thionobenzimidazole-
  carboxylic acid, p-methylbenzyl ester
2-methoxycarbonylamino-1-thionobenzimidazolecarbox-
  ylic acid, o-chlorobenzyl ester
2-methoxycarbonylamino-1-thionobenzimidazole-
  carboxylic acid, p-fluorobenzyl ester

EXAMPLE 19

Preparation of 1-methoxycarbonyl-2-imino-3-thiol-
benzimidazolinecarboxylic acid, methyl ester A mixture of 19.1 parts of 1-methoxycarbonyl-2-aminobenzimidazole and 9.3 parts of sodium bicarbonate in 100 parts of chloroform is stirred at room temperature and 11.1 parts of methyl thionochlorformate is added gradually. Solid sodium chloride forms and is removed by filtration. Solvent is removed from the filtrate under reduced pressure to yield a residue of essentailly pure product, i.e., 1-methoxycarbonyl - 2 - imino - 3-thiolbenzimidazolinecarboxylic acid, methyl ester.

EXAMPLE 20

Preparation of 2-(methoxythiocarbonylamino)-1-
benzimidazolecarboxylic acid, methyl ester A total of 13.3 parts of 2-aminobenzimidazole, 10.2 parts of triethylamine, and 100 parts of chloroform is stirred at room temperature while adding gradually 12 parts of methyl thionochloroformate. This mixture is stirred overnight at room temperature and is then twice extracted with water. The chloroform layer is stripped free of solvent under reduced pressure to yield essentially pure 2-thionobenzimidazolecarbamic acid, methyl ester.

By a similar procedure, 10 parts of 2-thionobenzimidazole carbamic acid, methyl ester is reacted with 4.5 parts of methyl chloroformate in 100 parts of chloroform containing 5.5 parts of triethylamine. After work-up as above, an essentially pure 2 - (methoxythiocarbonylamino)-1-benzimidazolecarboxylic acid, methyl ester is obtained.

The following compounds of Formula III can be prepard similarly by substituting equivalent amounts of the properly substituted 2 - aminobenzimidazole and alkyl thionochloroformate for the 2 - aminobenzimidazole and methyl thionochloroformate set forth above.

2-(isopropyloxythiocarbonylamino)-1-benzimidazole-
  carboxylic acid, decyl ester
6-isopropyl-2-(methoxythiocarbonylamino)-1-benz-
  imidazolecarboxylic acid, benzyl ester
2-(methoxythiocarbonylamino)-3-benzimidazolecar-
  boxylic acid, decyl ester
2-(methoxythiocarbonylamino)-1-thionobenzimidazole-
  carboxylic acid, octyl ester

EXAMPLE 21

Preparation of 2-(methoxycarbonylamino)-1-benzimidazoledithiocarboxylic acid, methyl ester To a mixture of 15 parts of 2-benzimidazolecarbamic acid, methyl ester, in 75 parts of chloroform in which is suspended 7 parts of sodium bicarbonate, is added gradually, with stirring, 10 parts of methyl dithiochloroformate. The entire mixture is stirred overnight at room temperature and then filtered. Solvent is removed from the filtrate under reduced pressure to yield essentially pure 2 - (methoxycarbonylamino) - 1 - benzimidazoledithiocarboxylic acid, methyl ester.

The following compounds of Formula III can be prepared by substituting equivalent amounts of the properly substituted 2 - benzimidazolecarbamic acid ester and alkyl dithiochloroformate for 2 - benzimidazolecarbamic acid, methyl ester, and methyl dithiochloroformate of the procedure above.

2-(ethoxycarbonylamino)-1-dithiobenzimidazolecarboxylic acid, methyl ester
2-methoxycarbonylamino)-1-dithiobenzimidazolecarboxylic acid, isopropyl ester
2-methoxycarbonylamino)-1-dithiobenzimidazolecarboxylic acid, benzyl ester
2-imino-1-(cyclohexylmethyloxycarbonyl)-3-dithiobenzimidazolinecarboxylic acid, methyl ester
2-imino-1-cyclohexyloxycarbonyl-3-dithiobenzimidazolinecarboxylic acid, methyl ester

EXAMPLE 22

(A) Preparation of 2-dithiobenzimidazolecarbamic acid, methyl ester

A mixture of 20 parts of 2-aminobenzimidazole, 17.5 parts by weight of triethylamine, and 100 parts of chloroform is stirred at room temperature while adding gradually 16.5 parts of methyl dithiochloroformate. This mixture is stirred overnight at room temperature and is then twice extracted with water. The chloroform layer is stripped free of solvent under reduced pressure to yield essentially pure 2 - dithiobenzimidazolecarbamic acid, methyl ester.

1 - methyl - 2 - dithiolbenzimidazolecarbamic acid, methyl ester can be made similarly by merely replacing 2 - aminobenzimidazole with 1 - methyl - 2-aminobenzimidazole.

(B) Preparation of 2-[methylthio(thiocarbonyl)amino]-1-benzimidazolecarboxylic acid, methyl ester By a similar procedure, 10 parts of 2-dithiobenzimidazolecarboxylic acid, methyl ester is reacted with 4.5 parts of methyl chlorofromate in 100 parts of chloroform containing 5 parts of triethylamine. After work-up as above, an essentially pure 2-[methylthio(thiocarbonyl)amino]-1-benzimidazolecarboxylic acid, methyl ester, is obtained.

EXAMPLE 23

Preparation of 2-imino-1-thiol-1,3-benzimidazolinedicarboxylic acid, dimethyl ester The method of Example 19 is used with 11.1 parts of methyl thiolchloroformate replacing the same quantity of methyl thionochloroformate to prepare 2 - imino-1-thiol-1,3-benzimidazolinedicarboxylic acid, dimethyl ester.

EXAMPLE 24

Preparation of 2 - (methoxycarbonylimino) - 1-thiono-3 - thiol - 1,3 - benzimidazolinedicarboxylic acid, dimethyl ester To a mixture of 26.5 parts of 2-(methoxycarbonylamino) - 1 - thionobenzimidazole carboxylic acid, methyl ester, 100 parts of chloroform, and 12 parts of methyl thiolchloroformate is added gradually at room temperature 12 parts of triethylamine in 25 parts of chloroform. The reaction mixture is stirred 2 hours at room temperature and then extracted twice with ice water. After drying, the chloroform layer is stripped solvent-free at room temperature to yield essentially pure 2 - (methoxycarbonylimino) - 1 - thiono - 3-thiol-1,3-benzimidazolinedicarboxylic acid, dimethyl ester.

In a similar fashion the following compounds of Formula III can be prepared by substituting equivalent quantities of 2-(alkoxycarbonylimino)-1-thiol or 1 - thionobenzimidazolecarboxylic acid, alkyl ester, and alkyl chloroformates, thiolchloroformates, or thionochloroformates for 2 - (methoxycarbonylamino) - 1 - thionobenzimidazolecarboxylic acid, methyl ester, and methyl thiolchloroformate.

2-methoxycarbonylimino-1-thiol-1,3-benzimidazolinedicarboxylic acid, 1-ethyl 3-methyldiester
2-methoxycarbonylimino-1-thiono-1,3-benzimidazolinedicarboxylic acid, 1,3-dimethyl ester
2-(methoxycarbonylimino)-1-thiono-3-thiol-1,3-benzimidazolinedicarboxylic acid, dimethyl ester
2-(methoxycarbonylimino)-1,3-dithiono-1,3-benzimidazolinedicarboxylic acid, dimethyl ester
2-(butoxycarbonylimino)-1-thiono-3-thiol-1,3-benzimidazolinedicarboxylic acid, dimethyl ester
2-(methoxycarbonylimino)-1,3-dithiol-1,3-benzimidazolinedicarboxylic acid, diisopropyl ester
2-benzimidazolethiolcarbamic acid, methyl ester
2-benzimidazolethionocarbamic acid, ethyl ester
1-benzimidazolethionocarboxylic acid-2-amino, methyl ester
5-bromo-1-allyl-2-(methoxycarbonylimino)-3-thiolbenzimidazolinecarboxylic acid, methyl ester
6-nitro-1-propargyl-2-(methoxycarbonylimino)-3-thionobenzimidazolinecarboxylic acid, benzyl ester
1-(oleyloxycarbonyl)-2-(methoxycarbonylimino)-3-thiolbenzimidazolinecarboxylic acid, methyl ester.

EXAMPLE 25

Preparation of 2-propionoamidobenzimidazole

Propionyl chloride, 47 parts, is added gradually to a stirring mixture of 66.5 parts of 2-aminobenzimidazole, 53 parts of triethylamine and 500 parts of chloroform. When the addition is completed, the entire mixture is stirred and heated at reflux temperature for a period of 6 hours. The reaction mixture is cooled and the solid is filtered, washed with water and dried to give 77 parts of 2-propionoamidobenzimidazole.

By substituting the appropriate acyl chlorides in equivalent amounts for propionyl chloride of the procedure above, the following compounds can be prepared:

2-acetamidobenzimidazole
2-butyramidobenzimidazole
2-cyclopropylcarboxamidobenzimidazole
2-cyclobutylcarboxamidobenzimidazole
2-isobutyramidobenzimidazole
2-cyclopropylcarboxamido-5-chlorobenzimidazole
2-propionamido-5-methylbenzimidazole
2-propionamido-5-methoxybenzimidazole
2-propionamido-5-butoxybenzimidazole
2-propionamido-5-nitrobenzimidazole
2-cyclopropylcarboxamido-5-butylbenzimidazole
2-propionamido-5-chlorobenzimidazole
2-propionamido-4-methylbenzimidazole
2-propionamido-5-butylbenzimidazole
2-formamidobenzimidazole.

EXAMPLE 26

Preparation of 2-amino-1-cyclopropylcarbonylbenzimidazole

A total of 52 parts of cyclopropanecarboxylic acid chlorine is added gradually to a stirring mixture of 66 parts of 2-aminobenzimidazole, 54 parts of triethylamine and 1000 parts of tetrahydrofuran. The temperature is kept between 5° to 10° C. during the addition of the acid chloride. When the addition of the acid chloride is completed, the entire mixture is stirred at room temperature for 0.25 hours. The solid is discarded by filtration and the filtrate stripped under reduced pressure to give 90 parts of essentially pure 2-amino-1-cyclopropylcarbonylbenzimidazole.

By substituting the appropriate acyl chlorides in equivalent amounts for cyclopropanecarboxylic acid chloride in the example above, the following compounds can be made:

2-amino-1-cyclopropylcarbonyl-4-methylbenzimidazole
2-amino-1-acetylbenzimidazole
2-amino-1-propionylbenzimidazole
2-amino-1,3-diacetylbenzimidazole.

EXAMPLE 27

Preparation of 1-propionyl-2-propionamidobenzimidazole

Propionyl chloride (46 parts) is added gradually to a stirring mixture of 94 parts of 2-propionamidobenzimidazole, 100 parts of tetrahydrofuran and 60 parts of triethylamine. The entire mixture is stirred at room temperature for 8 hours. The solvent is removed under reduced pressure and the residue washed with water. After air drying, the remaining solid is essentially pure product 1-propionyl-2-propionamidobenzimidazole.

By substituting the appropriate amidobenzimidazole in equivalent amounts for 2-propionamidobenzimidazole and the appropriate acyl chloride, alkylthiol chloroformate, O,O-dialkylphosphorylchloride or sulfonyl chloride for propionyl chloride in the procedure above, the following compounds can be made similarly:

1-cyclohexylcarbonyl-2-propionamidobenzimidazole
1-hexylcarbonyl-2-propionamidobenzimidazole
1-chloroacetyl-2-cyclopropylcarboxamidobenzimidazole
1-cyanoacetyl-2-cyclopropylcarboxamidobenzimidazole
1-methylacetyl-2-cyclopropylcarboxamidobenzimidazole
1-ethoxyoxalyl-2-cyclopropylcarboxamidobenzimidazole
1-methoxyoxalyl-2-cyclopropylcarboxamidobenzimidazole
1-methoxyoxalyl-2-propionamidobenzimidazole
N-(1-ethoxyoxalyl-2-benzimidazolyl)oxamidic acid, ethyl ester
1-propiolyl-2-cyclopropylcarboxamidobenzimidazole
1-benzoyl-2-propionamidobenzimidazole
1,3-dipropionyl-2-iminobenzimidazoline
1,3-dicyclopropylcarbonyl-2-iminobenzimidazoline
1-propionyl-2-formamidobenzimidazole
1-propionyl-3-formyl-2-iminobenzimidazoline
1-methoxyoxalyl-3-propionyl-2-iminobenzimidazoline
1-(3,4-dichlorobenzoyl)-2-propionamidobenzimidazole
1-benzoyl-2-cyclopropylcarboxamidobenzimidazole
2-propionamido-1-benzimidazolethiolcarboxylic acid, methyl ester
2-propionamido-1-benzimidazolethionocarboxylic acid, methyl ester
2-propionamido-1-benzimidazolecarbodithioic acid, methyl ester
2-propionamiod-1-benzimidazolecarbodithioic acid, butyl ester
2-propionamiod-1-benzimidazolecarbodithioic acid, 2-chloroethyl ester
2-cyclopropylcarboxamido-1-benzimidazolethionocarboxylic acid, ethyl ester
1-propionyl-2-imino-3-thionobenzimidazolinecarboxylic acid, methyl ester
1-propionyl-2-thionobenzimidazolecarbamic acid, methyl ester
1-propionyl-2-thionobenzimidazolecarbamic acid, ethyl ester
1-cyclopropylcarbonyl-2-thionobenzimidazolecarbamic acid, methyl ester
1-cyclopropylcarbonyl-2-benzimidazoledithiocarbamic acid, ethyl ester
2-cyclopropylcarboxamidothiol-1-benzimidazolecarboxylic acid, ethyl ester
1-methylsulfonyl-2-imino-3-propionylbenzimidazoline
1-phenylsulfonyl-2-imino-3-propionylbenzimidazoline
1-hexylsulfonyl-2-imino-3-propionylbenzimidazoline
1-propionyl-2-imino-3-benzimidazolinephosphonothionic acid, diethyl ester
1-propionyl-2-imino-3-benzimidazolinephosphonothionic acid, dimethyl ester
1-benzylsulfonyl-2-imino-3-methoxycarbonylbenzimidazoline
1-cyclohexylcarbonyl-2-imino-3-benzimidazolinephosphonic acid, dimethyl ester
1-cyclopropylcarbonyl-2-imino-3-benzimidazolinephosphonic acid, dimethyl ester
1-(methoxymethyl)-3-methylthiocarbonyl-2-benzimidazolinecarbamic acid, methyl ester
1-pivaloyl-2-imino-3-benzimidazolinephosphonic acid, diethyl ester
1-pivaloyl-3-propionyl-2-propionimidobenzimidazoline
1,3-di-(propionyl)-2-propionimidobenzimidazoline
1,3-di-(propionyl)-2-cyclopropylcarboximidobenzimidazoline
1,3-di-(propiopyl)-$\Delta^{2,N}$-2-thionobenzimidazolinecarbamic acid, methyl ester
1,3-di-(acetyl)-$\Delta^{2,N}$-2-thionobenzimidazolinecarbamic acid, methyl ester
1-propionyl-2-propionimido-3-thiolbenzimidazolinecarboxylic acid, methyl ester
1-methylsulfonyl-3-propionyl-2-propionimidobenzimidazoline
1-propionyl-2-propionimido-3-benzimidazolinephosphonothionic acid, diethyl ester
2-propionamido-1-thiobenzimidazole carboxylic acid, benzyl ester
2-propionamide-1-thiolbenzimidazole carboxylic acid, phenyl ester
2-propionamide-1-thiolbenzimidazole carboxylic acid, stearyl ester
2-propionamido-1-thionobenzimidazole carboxylic acid, (3-buten-1-yl) ester
2-cyclopropylcarboxamido-1-thionobenzimidazole carboxylic acid, (3-nonyn-1-yl) ester
2-propionamido-1-thionobenzimidazole carboxylic acid, vinyl ester
2-propionamido-1-thiolbenzimidazole carboxylic acid, allyl ester
2-propionamido-1-thiolbenzimidazole carboxylic acid, propargyl ester
2-propionamido-1-thiolbenzimidazole carboxylic acid, cetyl ester
methyl 1-propionyl-2-thionobenzimidazolecarbamate
methyl 1-acetyl-2-thionobenzimidazolecarbamate
isopropyl 1-acryloyl-2-thiolbenzimidazolecarbamate
2-cyclopropylcarboxamido-1-thionobenzimidazole carboxylic acid, (2-dodecenyl ester)
2-cyclopropylcarboxamido-1-thionobenzimidazole carboxylic acid, octyl ester
2-cyanopropylcarboxamido-1-thionobenzimidazole carboxylic acid, oleyl ester
2-cyclopropylcarboxamido-1-thionobenzimidazole carboxylic acid, citronelly ester
2-propionamido-1-thionobenzimidazole carboxylic acid, geraniolyl ester.

EXAMPLE 28

Preparation of 2-propionamido-1-benzimidazolephosphonothionic acid, diethyl ester A total of 18.9 parts of 2-propionamidobenzimidazole is added gradually to a stirring mixture containing 4.2 g.

of 60% sodium hydride and 200 parts of anhydrous dimethylformamide. The entire mixture is stirred and heated at about 75° C. until hydrogen no longer evolves from the reaction. At this point, a solution of diethylphosphonothionic acid chloride (18.9 parts) dissolved in 50 parts of anhydrous dimethyl formamide is added and the entire reaction is stirred at 75° C. for 1 hour. The reaction mixture is filtered and the filtrate is stripped to a solvent free residue. The residue, washed with water until salt-free and air-dried, gives 2-propionamido-1-benzimidazolephosphonothionic acid, diethyl ester.

By substituting the appropriate amidobenzimidazole and dialkylphosphonothionic acid chlorides for the 2-propionamidobenzimidazole and diethylphosphonothionic acid chloride above, the following compounds can be prepared similarly:

2-propionamido-1-benzimidazolephosphonothionic acid, dimethyl ester
2-cyclopropylcarboxamido-1-benzimidazolephosphonothionic acid, diethyl ester
2-propionamido-1-benzimidazolephosphonic acid, methyl ester.

By substituting the appropriate 2-aminobenzimidazole and alkyl sulfonyl or chloroformate intermediates for 2-propionamidobenzimidazole and diethylphosphorothionic acid chloride above, the following compounds can be made similarly:

2-propionamide-(1)-thionobenzimidazolecarboxylic acid, methyl ester
1-methylsulfonyl-2-propionamidobenzimidazole
1-hexylsulfonyl-2-propionamidobenzimidazole
1-methylsulfonyl-2-cyclopropylcarboxamidobenzimidazole
2-propionamido-1-benzimidazolethiolcarboxylic acid, methyl ester.

EXAMPLE 29

Preparation of 1-ethylcarbonyl-2-benzimidazolecarbamic acid, methyl ester

To a total of 9.6 parts of 2-benzimidazolecarbamic acid, methyl ester and 8 parts of propionyl chloride in 50 parts by volume of chloroform is added 8.7 parts of triethylamine in 25 parts by volume of chloroform. Addition is accomplished over a 15-minute period at 20 to 40° C. After stirring an additional 5 minutes, the reaction mixture is washed twice with 100 parts by volume of ice water. The chloroform layer is dried and solvent is removed at room temperature to yield a pink solid which is slurried at room temperature with a solvent mixture containing 300 parts by volume of n-heptane and 300 parts by volume of tetraphydrofuran. After stirring the slurry for 3 hours at room temperature, a small amount of solid is removed by filtration. This solvent is stripped from the filtrate at room temperature to yield 9 parts of 1-ethylcarbonyl-2-benzimidazolecarbamic acid, methyl ester.

By substituting equivalent amounts of the properly substituted 2-benzimidazolecarbamic acid, alkyl esters for 2-benzimidazolecarbamic acid, methyl ester and the appropriate acyl chloride or ketene dimer for the propionyl chloride above, the following compounds can be made:

1-(m-methylcyclohexylcarbonyl)-2-benzimidazolecarbamic acid, methyl ester
1-benzoyl-2-benzimidazolecarbamic acid, ethyl ester
1-(3,4-dichlorobenzoyl)-2-benzimidazolecarbamic acid, methyl ester
1-(p-methoxybenzoyl)-2-benzimidazolecarbamic acid, methyl ester
1-(p-methylbenzoyl)-2-benzimidazolecarbamic acid, methyl ester
1-(p-bromobenzoyl)-2-benzimidazolecarbamic acid, methyl ester
1-(p-nitrobenzoyl)-2-benzimidazolecarbamic acid, methyl ester
1-(3-chloro-p-toluoyl)-2-benzimidazolecarbamic acid, methyl ester
1-(p-butylbenzoyl)-2-benzimidazolecarbamic acid, ethyl ester
1-(3,4-dimethylbenzoyl)-2-benzimidazolecarbamic acid, methyl ester
1-(p-butoxybenzoyl)-2-benzimidazolecarbamic acid, methyl ester
1-(m-nitrobenzoyl)-2-benzimidazolecarbamic acid, methyl ester
1-dodecanoyl-2-benzimidazolecarbamic acid, allyl ester
1-cyclooctylcarbonyl-2-benzimidazolecarbamic acid, methyl ester
1-(3-hexenoyl)-2-benzimidazolecarbamic acid, methyl ester
1-(2-heptynoyl)-2-benzimidazolecarbamic acid, methyl ester
1-(methoxyoxalyl)-2-benzimidazolecarbamic acid, methyl ester
1-(ethoxyoxalyl)-2-benzimidazolecarbamic acid, methyl ester
1-(propoxyoxalyl)-2-benzimidazolecarbamic acid, methyl ester
1-(butoxyoxalyl)-2-benzimidazolecarbamic acid, methyl ester
1-(levulinoyl)-2-benzimidazolecarbamic acid, methyl ester
1-(acetoacetyl)-2-benzimidazolecarbamic acid, methyl ester
1-(acetoacetyl)-2-benzimidazolecarbamic acid, isopropyl ester
1-(acetoacetyl)-2-imino-3-benzimidazolinecarboxylic acid, methyl ester
1-ethylcarbonyl-2-imino-3-benzimidazolinecarboxylic acid, methyl esster
1-cyclopropylcarbonyl-2-imino-3-benzimidazolinecarboxylic acid, methyl ester
1-cyclopropylcarbonyl-2-imino-3-benzimidazolinecarboxylic acid, isopropyl ester
1-cyclopropylcarbonyl-2-imino-3-benzimidazolinecarboxylic acid, tert-butyl ester
1-ethylcarbonyl-2-imino-3-benzimidazolinecarboxylic acid, methyl ester
1-isopropylcarbonyl-2-imino-3-benzimidazolinecarboxylic acid, isopropyl ester
1-chlorocarbonyl-2-benzimidazolecarbamic acid, methyl ester
1-methylcarbonyl-2-benzimidazolecarbamic acid, allyl ester
1-methylcarbonyl-2-(5-chlorobenzimidazole)carbamic acid, methyl ester
1-methylcarbonyl-2-(5-chlorobenzimidazolecarbamic acid), ethyl ester
1-acetyl-2-benzimidazolecarbamic acid, methyl ester
1-propionyl-5-methoxy-2-benzimidazolecarbamic acid, methyl ester
1-propionyl-5-butyl-2-benzimidazolecarbamic acid, methyl ester
1-cyclopropylcarbonyl-5-chloro-6-methyl-2-benzimidazolecarbamic acid, methyl ester
1-acetyl-5-butyl-2-benzimidazolecarbamic acid, methyl ester.

EXAMPLE 30

Preparation of N-methyl-2-benzimidazolecarbamic acid, methyl ester

A total of 19.0 parts of 2-benzimidazolecarbamic acid, methyl ester is added gradually with stirring to 200 parts of anhydrous dimethylformamide containing 4.2 parts 60% sodium hydride. This reaction is stirred under a blanket of nitrogen at a temperature of 55–65° C. until hydrogen no longer evolves from the reaction. At this point 16.0 parts of methyl iodide dissolved in 75 parts of dry dimethylformamide is added and the reaction temperature is maintained at 60–70° C. by external heating for a one-hour period. The mixture is filtered and the filtrate stripped free of solvent under reduced pressure. The residue, after washing with water and drying, is essentially pure N-methyl-2-benzimidazolecarbamic acid, methyl ester.

The compounds listed below can be prepared similarly by substituting the appropriate benzimidazolecarbamic acid, alkyl ester and appropriate electrophile (as: alkyl halides, chloromethyl ethers, cyanogen chloride, O,O-dialkylphosphonothionic acid chlorides, α-bromoethylacetate, β-bromoethylpropionate, chloroethanol, and chloroacetonitrile) for the 2-benzimidazolecarbamic acid, methyl ester and the methyl iodide of the above example.

1-methoxymethyl-2-benzimidazolecarbamic acid, methyl ester
1 - ethoxycarbonylmethyl - 2-benzimidazolecarbamic acid, methyl ester
1-allyl-2-benzimidazolecarbamic acid, methyl ester
1-propargyl-2-benzimidazolecarbamic acid, methyl ester
1-allyl-2-benzimidazolecarbamic acid, isopropyl ester
N-propargyl-2-benzimidazolecarbamic acid, isopropyl ester
N-cyanomethyl-2-benzimidazolecarbamic acid, methyl ester
N - (diethoxyphosphionothioyl)-2-benzimidazolecarbamic acid, allyl ester
3-methyl-2-imino-1-benzimidazolinecarboxylic acid, methyl ester
N-methyl-2-benzimidazolecarbamic acid, isopropyl ester
N-cyano-2-benzimidazolecarbamic acid, allyl ester
N-cyanomethyl-2-benzimidazolecarbamic acid, methyl ester
N-(dimethoxyphosphinothioyl)-2-benzimidazolecarbamic acid, methyl ester
N - (diethoxyphosphinothioyl) - 2-benzimidazolecarbamic acid, methyl ester
N - (diethoxyphosphinothioyl) - 2-benzimidazolecarbamic acid, isopropyl ester
N - (diethoxyphosphinyl) - 2-benzimidazolecarbamic acid, methyl ester
N-(dimethoxyphosphinyl)-2-benzimidazolecarbamic acid, isopropyl ester
1-methoxycarbonyl-2-imino-3-benzimidazolinephosphonothionic acid, dimethyl ester
1-methoxycarbonyl-2-imino-3-benzimidazolinephosphonothionic acid, diethyl ester
1-allyloxycarbonyl-2-imino-3-acetylbenzimidazoline
1,3-bis(methoxycarbonyl)-2-acetimidobenzimidazoline
1,3-bis(methoxycarbonyl)-2-propionimidobenzimidazoline
methyl 1,3 - bis(ethoxyoxalyl) - $\Delta^{2,N}$ - 2-benzimidazolinecarbamate
isopropyl 1-acetoacetyl-2-benzimidazolecarbamate
N-[bis(methylthio)phosphinyl]-2-benzimidazolecarbamic acid, methyl ester
N-[bis(ethylthio)thiophosphinyl]-2-benzimidazolecarbamic acid, methyl ester.

EXAMPLE 31

Preparation of 1,3-dipropionyl-2-methoxycarbonyliminobenzimidazoline

A slurry of 9.6 parts of 2-benzimidazolecarbamic acid, methyl ester in 50 parts by volume of chloroform was treated with 16.7 parts of propionyl chloride. The reaction mixture was cooled in an ice-acetone bath while adding 12 parts of triethylamine in 25 parts by volume of chloroform over a three-minute period. The temperature of the mixture during addition of the amine did not exceed 15° C. The resulting homogenous solution was stirred for 15 minutes at −5 to 5° C. and then washed four times with 100 parts by volume of ice water. After drying the chloroform layer and removing solvent under reduced pressure at room temperature, 14.1 parts by weight of 1,3 - dipropionyl-2-methoxycarbonyliminobenzimidazoline was obtained.

The compounds below can be prepared similarly by substituting equivalent amounts of the appropriate benzimidazolecarbamic acid, alkyl ester and electrophile (as: acyl chlorides, alkylchloroformates, phosgene) for the 2-benzimidazolecarbamic acid, methyl ester and the propionyl chloride of above:

1,3-dipropionyl-2-ethoxycarbonyliminobenzimidazoline
1,3-dipivalyl-2-methoxycarbonyliminobenzimidazoline
1,3-diacetyl-2-methoxycarbonyliminobenzimidazoline
1,3-diacetyl-2-propoxycarbonyliminobenzimidazoline
1,3-dipropionyl-2-isopropoxycarbonyliminobenzimidazoline
1,3-diacetyl-2-sec-butoxycarbonyliminobenzimidazoline
1,3-di-(chlorocarbonyl)-2-methoxycarbonyliminobenzimidazoline
1,3-di-(chlorocarbonyl)-2-isopropoxycarbonyliminobenzimidazoline
1,3 - dipropionyl-2-allyloxycarbonyliminobenzimidazoline.

EXAMPLE 32

Preparation of 1-allyloxycarbonyl-3-cyan-2-propionylbenzimidazoline

To a total of 12.1 parts of 1-allyloxycarbonyl-2-imino-3-cyanobenzimidazoline and 8 parts of propionyl chloride in 50 parts by volume of chloroform is added 8.7 parts of triethylamine contained in 25 parts by volume of chloroform. Addition is accomplished gradually at 20–40° C. The reaction mixture is washed twice with 100 parts by volume of ice water. The chloroform layer is dried and the solvent removed at room temperature under reduced pressure. The pink solid residue is slurred in a mixture of 300 parts by volume of n-heptane and 100 parts by volume of tetrahydrofuran for 3 hours at room temperature. At this point, the insoluble material is filtered and discarded. The solvent is stripped from the filtrate at room temperature to yield, as the residue, 9.0 parts by weight of 2 - propionylimido - 1-allyloxycarbonyl-3-cyanobenzimidazoline.

By substituting equivalent amounts of the properly substituted benzimidazolecarbamic acid, esters and acyl chlorides for the 1-allyloxycarbonyl-2-imino-cyanobenzimidazoline and the propionyl chloride above the following trisubstituted benzimidazolines can be prepared similarly.

1-methyl-2-methoxycarbonylimino-3-acetylbenzimidazoline
1-allyl-2-allyloxycarbonylimino-3-acryloylbenzimidazoline
1-propargyl-2-methoxycarbonylimino-3-acetylbenzimidazoline
1-(dimethoxyphosphonothioyl)-2-acetylimino-3-benzimidazolinecarboxylic acid, propargyl ester
1-cyano-2-propionylimino-3-benzimidazolinecarboxylic acid, methyl ester
1-(dimethoxyphosphonothioyl)-2-propionylimino-2-benzimidazolinecarboxylic acid, methyl ester
1-(dimethoxyphosphonothioyl)-2-cyclopropylcarbonylimino-3-benzimidazolinecarboxylic acid, methyl ester
1-(diethoxyphosphonothioyl)-2-methoxycarbonylimino-3-cyclopropylcarbonylbenzimidazoline
1-methoxyoxalyl-2-methoxycarbonylimino-3-cyanobenzimidazoline
1-methoxyoxalyl-2-methoxycarbonylimino-3-acetylbenzimidazoline
1-levulinyl-2-methoxycarbonylimino-3-benzimidazolinecarboxylic acid, methyl ester
1-methyl-2-methoxycarbonylimino-3-benzimidazolinecarboxylic acid, methyl ester
2-[(methoxycarbonyl)(methyl)amino]-3-benzimidazolecarboxylic acid, methyl ester
1,2-diacetyl-2-benzimidazolecarbamic acid, methyl ester
1,2-di-(cyclopropylcarbonyl)-2-benzimidazolecarbamic acid, methyl ester 1-(diethoxyphosphinyl)-2-methoxycarbonylimino-3-allyl-
  benzimidazoline
1-ethyl-2-(dimethoxyphosphonothioylimino)-3-benz-
  imidazolinecarboxylic acid, methyl ester
allyl 1-(stearoyl)-2-benzimidazolecarbamate
1-(4-hexenyloxycarbonyl)-3-propionyl-2-propionimido-
  benzimidazoline
1-(5-hexynyloxycarbonyl)-3-propionyl-2-propionimido-
  benzimidazoline
methyl 1-(2-dodecenoyl)-2-benzimidazolecarbamate
methyl 1-(elaidoyl)-2-benzimidazolecarbamate
methyl 1-(trichloroacetyl)-2-benzimidazolecarbamate
methyl 1-(tetroloyl)-2-benzimidazolecarbamate
methyl 1-levulinoyl-2-benzimidazolecarbamate
methyl 1-cyclooctanoyl-2-benzimidazolecarbamate
methyl 1-(4-methoxycyclohexanoyl)-2-benzimidazole-
  carbamate
methyl 1-(4-methylcyclohexanoyl)-2-benzimidazole-
  carbamate
isopropyl 1-(ethoxyoxalyl)-2-benzimidazolecarbamate As mentioned previously, it has been found that the compounds of this invention possess outstanding fungicidal and mite ovicidal activity when employed to prevent or mitigate damage to plants and inanimate organic materials. A further aspect of this invention involves methods which when used in conjunction with the compounds of this invention, result in advances in mite and fungus control of great practical importance. A further advantage of the compounds of the invention is that they have a low order of mammalian toxicity. The paragraphs which follow describe in more detail the utility of this invention.

The compounds of this invention control a wide variety of fungus diseases of foliage, fruit, stems and roots of growing plants without damage to the host. Fruits, tubers, bulbs, roots, seeds and other plant parts harvested for food, animal feed or for other purposes are protected from fungus deterioration during processing, distribution and storage. Seeds, tubers, cuttings and other plant propagation materials are protected from fungus attack during handling and storage, as well as in the soil after planting. Wood, fabric, fiber board, paper and other industrial materials are protected from unsightly stain and destructive decay caused by fungi. Luggage, shoes, shower curtains, carpets, mats, clothing and other useful household, public or industrial items are protected from rot, fungus stains and mold growth. Painted surfaces are protected from stain and discoloration by incorporation of a compound of this invention in the paint formulation.

The many fungi against which the compounds of this invention are active may be represented by, but is not intended to be limited to, the following: *Venturia inaequalis*, which causes apple scab; *Podosphaera leucotricha*, which causes powdery mildew on apple; *Uromyces phaseoli*, which causes bean rust; *Cercospora apii*, which causes early blight of celery; *Cercospora beticola*, which causes leaf spot of sugar beets; *Sclerotinia sclerotiorum*, which causes rot of vegetable crops, such as lettuce, beans, carrots, and celery; *Colletotrichum* spp., which cause anthracnose of fruits and vegetables, such as beans, tomatoes and coffee; *Septoria apii*, which causes late blight of celery; *Cercospora musae*, which causes Sigotoka disease of banana; Piricularia sp., which causes Johnson spot on banana; *Erysiphe cichloracearum*, which causes powdery mildew on cantaloupe and other cucurbit crops; *Penicllium digitatum*, Phomopsis spp., and *Diplodia natalensis*, which cause fruit rots on citrus; *Ceratostomella ulmi*, which causes Dutch elm disease; *Sphaerotheca humuli*, which causes powdery mildew on roses; *Diplocarpon rosae*, which causes black spot on roses; Ramularia sp., which causes leaf spots on ornamental plants; *Botrytis cinerea*, which causes blossom and fruit rots of ornamentals, fruits and vegetables; *Uncinula necatar*, which causes powdery mildew on grapes; *Guignardia bidwellii*, which causes grape black rot; *Melonconium fuligineum*, which causes white rot of grapes; *Coccomyces hiemalis*, which causes cherry leaf spot; Cytospora sp., which causes cankers of trees; *Cladosporium carpophilum*, which causes peach scab; *Fusicladium effusum*, which causes pecan scab; *Erysiphe graminis*, which causes powdery mildew on cereals; *Monolinia (Sclerotinia) laxa* and *M. fructicola*, which cause brown rot of stone fruits, such as peaches, cherries and apricots; *Pseudopenziza ribes*, which causes leaf spot on gooseberry; *Piricularia oryzae*, which causes rice blast; *Puccinia recondita*, *P. coronata* and *P. glumarum*, which causes leaf rusts of wheat, oats and grasses, respectively; *Puccinia graminis tritici*, which causes stem rust of wheat; *Claviceps purpurea*, which causes ergot of rye and grasses; *Aspergillus niger*, which causes cotton boll rot as well as decay following wounding in many plant tissues; *Aspergillus flavus*, which causes mold growth on peanuts, as well as on other food and field materials; *Aspergillus terreus*, which is common in soil and attacks vegetable matter; *Tilletia caries* and other Tilletia species, which cause common bunt of wheat; *Ustilago tritici, Ustilago nigra, Ustilago avena* (and other Ustilago species), which cause loose smut of wheat, barley, and oats, respectively; *Urocystis tritici* and other Urocystis species, which cause loose smut of wheat; *Sphacelotheca sorghi*, which causes covered smut of sorghum; *Ustilago hordei* and *Ustilago kolleri*, which cause covered smut of barley and oats, respectively; *Pithomyces chartorum*, which is present in turf, pastures, and other grassy areas and is known to have several secondary effects; *Gloeodes pomigena*, which causes sooty blotch on apples; *Physalospora obtusa*, which causes black rot on apples; *Microthyriella rubi*, which causes flyspeck on apples; various species of Rhizoctonia, Fusarium and Verticillium present in soil and attacking the roots or other underground parts and the vascular system of a variety of plants; various species of Penicillium growing on such things as fabric, fiber board, leather goods and paint; species of Myrothecium attacking such items as shower curtains, carpets, mats and clothing.

The mite ovicidal action of the compounds of this invention is useful in preventing the development of damaging populations of mites or in causing the gradual reduction of existing populations. The movement of mites is limited. Thus, an increase in population or the continuation of a high population in a particular locus depends largely upon the hatching of eggs laid in that locus.

Mite eggs do not hatch to produce living young if these eggs are treated with one of these compounds, or if they are laid on a surface containing one of these compounds. Further, the eggs will not hatch if they are laid by a female mite that has been in contact with one of these compounds, or are laid by a female mite that is ingesting or has recently ingested food such as plant juices containing one of these compounds. This interference with the hatching of eggs prevents the population from increasing significantly beyond that present at the time of treatment. Also, this ovidical action, along with the high natural mortality of adults, can largely eliminate mites from an already infested area over a relatively short period of time. Further as long as the compounds are present on the surface the mites occupy or remain in their food supply, new populations cannot develop.

Many species of mites which cause damage to fruits, field crops, vegetables, and ornamentals under a wide variety of circumstances, are controlled by the compounds and methods of this invention. The extent of the practical utility of the mite control obtained is represented by, but is not intended to be limited to, the following listing of specific suscepible mites along with the types of damage that they can cause: *Panonychus ulmi* (European red mite) and *Tetranychus telarius* (two-spotted mite) which are commonly called "'orchard mites"; these mites attack a great many deciduous tree fruits including apples, pears, cherries, plums and peaches; *Tetranychus atlanticus* (Atlantic or strawberry mite), *T. cinnabarinus* (carmine spider mite) and *T. pacificus* (Pacific mite); these mites attack cotton and numerous other crop plants; *Paratetranychus citri* (citrus red mite) and others which attack citrus; *Phyllocuptruta sleivora* which causes citrus rust; *Bryobia praetiosa* (clover mite) which attacks clover, alfalfa and other crops; *Phyllosoptruta oleivora*, the citrus rust mite; *Aceria neocynodomis* which attacks grasses and other plants; *Tyrophagus lintneri* which is a serious pest in stored foods and on cultivated mushrooms and *Lepidoglyphus destructor* which injures Kentucky bluegrass seed in storage.

The compounds of this invention when applied by certain of the methods of this invention enter and move freely within plants, i.e., they are systemic. Thus both fungi and mites can be controlled in plants in parts well removed from the point of application. In view of this activity the compounds can be applied to seeds; thus the treatment of cucumber seeds with a few grams per 50 kilograms of seed of a compound of this invention provides control of powdery mildew (*Erysiphe cichoracearum*) and spider mites such as *Tetranychus urticae* on the resulting plants for periods in excess of 40 days. Applications to soil also provides control of certain foliage diseases and mites on plants growing in the treated soil. Spray or dust treatments of plant foliage and stems impart protection against both fungi and mites to other parts of the plant not actually sprayed and to new foliage developing later.

There are important practical advantages associated with the use of an effective systemic pesticide. Thus successful application to seed as described above, results in great savings in chemical and application costs. Soil applications which effectively protect entire plants for an extended period also represent similar savings. Distribution within the plant following foliage treatment eliminates the need for frequent retreatment to protect rapidly growing tissue. Also, materials within the plant are not subject to removal by rainfall. Similarly, movement or translocation of the chemical within the plant can provide protection to those parts of the plant that may not have been covered by the original spray application. This is of particular importance with plants of dense growth character resisting the intrusion of the spray and also to tall plants, such as shade trees, where the spray will not reach to the top.

An additional valuable characteristic of the compounds of this invention is their ability to prevent the spread or to kill fungus infection already established within a plant, i.e. they are curative. Thus, the compounds need not be applied until after conditions develop which permit the actual initiation of fungus attack. This means that, under some circumstances, it is possible to avoid applying any chemical during the entire life of the crop. In other cases, only a part of the normal full schedule of pesticide is required.

Therefore great savings both in chemical cost and application labor are possible with compounds capable of systemic and curative performance. Another saving is afforded by the compounds of this invention through the fact that both fungi and mites are controlled by applications of a single chemical.

The compounds of this invention provide protection from damage caused by fungi, mites or both when applied to the proper locus by the methods described hereinafter and at a sufficient rate to exert the desired fungicidal and mite ovicidal effect. They are especially suited for the protection of living plants such as fruit-bearing trees, nut-bearing trees, ornamental trees, forest trees, vegetable crops, horticultural crops (including ornamentals, small fruits and berries), fiber crops, grain and seed crops, sugarcane, sugar beets, pineapple, forage and hay crops, beans, peas, soybeans, peanuts, potatoes, sweet-potatoes, tobacco, hops, turf, and pasture.

Living plants may be protected from fungi and mites by applying one or more of the compounds of this invention to the soil in which they are growing or in which they may subsequently be seeded or planted; or to seeds, tubers, bulbs or other plant reproductive parts prior to planting; as well as to foliage, stems and fruit of the living plant. Living plants can also be protected by dipping the root system or physically injecting the chemical or chemicals into roots or stems.

Soil applications are made from dusts, granules, pellets, slurries or solution. Preferred rates for application of the compounds of this invention to soil in which plants are or will be growing range from 0.01 to 500 parts per million by weight of the soil in which the roots are or will be growing. More preferred use rates are in the range of 0.1 to 50 parts per million, and the most preferred rates are in the range of 0.25 to 25 parts per million.

Preferred rates for application to seeds, tubers, bulbs or other plant reproductive parts, range from 0.03 to 6000 grams of active compound of this invention per 50 kilograms of planting material treated. More preferred rates are in the range of 0.3 to 3000 grams of active compound per 50 kilograms. The most preferred rates are in the range of 2.8 to 1500 grams per 50 kilograms.

Applications are made from dusts, slurries or solutions. Such treatments protect the treated parts themselves from damage due to fungi, mites, or both, and in addition, impart extended protection against both types of pests to the resulting new plants.

Preferred rates for application of the compounds of this invention to foliage, stems and fruit of living plants range from 0.012 to 60 kilograms of active ingredient per hectare. More preferred rates are in the range of 0.025 to 30 kilograms per hectare and the most preferred rates are in the range of 0.05 to 15 kilograms per hectare. The optimum amount within this range depends upon a number of variables which are well known to those skilled in the art of plant protection. These variables include, but are not limited to, the disease to be controlled, weather conditions expected, the type of crop, stage of development of the crop, and the interval between applications. Applications within the range given may need to be repeated one or many more times at intervals of 1 to 60 days. Applications are made from dusts, slurries or solutions.

Preferred rates for dip applications to roots of living plants are in the range of 0.5 to 18,000 grams of active ingredient per 380 liters of water or other liquid carrier. More preferred rates are in the range of 4.5 to 9,000 gams per 380 liters and the most preferred rates are in the range of 45 to 4500 grams per 380 liters.

Preferred rates for injection into the roots or stems of living plants are in the range of 0.01 to 10,000 parts per million of water or other liquid carrier. More preferred rates are in the range of 0.1 to 5,000 parts per million. The most preferred rates are in the range of 1 to 1,000 parts per million.

Plant parts such as fruits, tubers, bulbs, foliage roots and the like, harvested for food or feed, are protected from decay and other deterioration caused by fungi or mites during processing, distribution and storage by treatment with an active compound of this invention. The plant parts to be so protected can be dipped in a liquid bath containing the active ingredient, dusted with a finely divided preparation of the active ingredient, sprayed, misted with an aerosol containing the compound, or enclosed in wrapping or packing materials impregnated with the active compound.

If a liquid bath is used, it can contain an amount of the active ingredient in the range of 1 to 5,000 parts per million of the weight of the fluid. A more preferred range for the bath is 5 to 2,500 parts per million, and the most preferred range is 10 to 1,000 parts per million.

Dusts as well as wrapping or packing materials used for this type of application can contain 0.01 to 10% of the active ingredient. More preferred rates are in the range of 0.1 to 5% and the most preferred rates are in the range of 0.2 to 2.5%.

Wood, leather, fabric, fiber board, paper and other industrial materials of an organic nature can be protected from decomposition or discoloration by fungi and infestation by mites by coating, incorporating or impregnating with an effective amount of one or more of the compounds of this invention. The coating can be accomplished by dipping, spraying, flooding, misting (as with an aerosol) or dusting the material to be protected with a suitable composition containing the active ingredient. The preferred use rates for the active ingredient in the treating preparation actually applied to the material to be protected are in the range of 0.025 to 95% by weight. More preferred rates are in the range of 0.05 to 50%, with the most preferred rates being in the range of 0.1 to 25%.

Where incorporation or impregnation procedures are to be employed, use rates may be expressed in terms of the amount of active ingredient introduced into the material to be protected. The preferred use rates for these types of applications are in the range of 0.001 to 30 percent by weight of active ingredient in the final product. More preferred rates are in the range of 0.005 to 15% with the most preferred rates being in the range of 0.01 to 7%.

Luggage, shoes, shower curtains, carpets, mats, clothing and other useful household, public or industrial items are protected from rot, fungus stains and unsightly mold growth as well as infestation by mites by the active compounds of this invention. Again, either surface or deep protection can be obtained. Surface treatment is by dips, washes, sprays, aerosols or dust applications. Deep treatment is accomplished by penetrating solutions. Sprays, dips and washes contain the active compound of the invention at rates of 10 to 5000 parts per million. Fluids for aerosol application and dusts contain 0.1 to 20% by weight. Penetrating solvent solutions contain an amount of the active ingredient that results in a deposit of 5 to 20,000 parts per million in the material to be protected.

Painted surfaces can be protected from unsightly stain and mold growth by incorporating in the paint formulation, prior to application, 5 to 20,000 parts per million of an active compound of this invention. More preferred rates are in the range of 10 to 10,000 parts per million and the most preferred rates are in the range of 20 to 5,000 parts per million. Such treatments with the compounds of this invention also protect the paint while still in the can from deterioration by fungi.

Damage by mites to stored organic products such as grain, seed, bulbs, tubers, meat or animal hides is kept to a minimum by treating the floors, walls, portions, and other parts of warehouses or other structures with one or more of the active compounds. Applications are made by the use of dusts, sprays, or aerosols with preferred use rates in the range of 0.05 to 1000 grams of the active compound of this invention per 93 square meters of surface to be kept free of excessive mite populations.

As was previously set forth the compounds of this invention are especially suited for use on living plants. Application to the foliage, stems and fruit of plants at the rate indicated above is generally accomplished by employing sprays, dusts or aerosols containing the proper amount of active ingredient. For the control of mites and fungi which are regularly present, applications often start prior to the time that the problem actually appears and continue on a pre-determined schedule. Such a procedure is termed "preventive" or "protective."

With the compounds of this invention, successful control of plant diseases can also be accomplished by applications made after they are present. Fungus mycelia within the plant tissue are actually killed. This approach or effect is termed "curative" or "eradicant" and permits the user to realize considerable savings.

Curative control of plant diseases with the compounds of this invention is enhanced if the treated plant parts are moist for one or more periods of 2 to 12 hours each soon after the active compound is applied. Often the slow drying of an original spray treatment or naturally occuring rains, mists, fogs or dews will accomplish this. Under other circumstances, such as during dry periods or in shelters such as greenhouses, it is necessary to keep the plants moist by some special effort for best results.

When the compounds of this invention are applied, their activity can be enhanced by using certain adjuvants, for example in the water in which the benzimidazole fungicides are dispersed. These adjuvants may be surface active agents, oils, humectants, enzymes, carbohydrates, and organic acids. They improve the performance on tubers, on foliage, in treatments used for dip application to roots of living plants, in the case of liquids used for injection into the roots or stems of living plants, or in mixtures used to treat fruits, tubers, bulbs, roots, and the like, after harvest.

Surface active agents that enhance fungus control and mite control by the compounds of this invention include sulfonated and sulfated amines and amides, diphenyl sulfonate derivatives, ethoxylated alcohols, ethoxylated alkylphenols, ethoxylated fatty acids, ethoxylated fatty esters and oils, polyethylene oxide polypropylene oxide combinations, alkylsulfonates, fluorocarbon surfactants, glycerol esters, ethoxylated alcohol sulfates, glycol esters, isethionates, sulfated ethoxylated alkylphenols, lanolin derivatives, lecithin and lecithin derivatives, alkanol amides, phosphate derivatives, monoglycerides and derivatives, quaternaries, sorbitan and sorbitol derivatives, sulfosuccinates, alcohol sulfates, sulfated fatty esters, sulfated and sulfonated oils and fatty acids, alkyl benzene sulfonates, imidazolines, taurates, ethoxylated mercaptans, ethoxylated amines and amides, modified phthalic glycerol alkyl resins, and similar materials. The oils include nonphytotoxic aliphatic spray oils and triglycerides, either with or without emulsifier to permit dispersion in water. Humectants such as glycerin or ethylene glycols, enzymes such as bromelin, and carbohydrates such as glucose, lactose, and dextrose are also useful. Organic acids of interest include glycollic and gluconic acids. Although the precise manner in which these additives improve the performance of the fungicides of this invention is not known, the effect is, nevertheless, startling, and it is possible that these additives improve the penetration into the plant or translocation throughout the plant of the fungicides of this invention.

Preferred surface active agents to improve the fungicidal and mite ovicidal activity of these compounds are products such as dioctyl sodium sulfosuccinates ("Aerosol" OT and "Aerosol" OT-B), blends of aromatic sulfonates and ethylene oxide derivatives ("Argrimul" GM, "Agrimul" A-100, "Agrimul" N-100, "Emcol" H50A, "Emcol" H53), polyoxyethylene sorbitol oleate/laurate ("Atlox" 1045A), sodium lauryl sulfate ("Duponol" ME), polyoxyethylated vegetable oils ("Emulphor" EL719), lecithin derivatives ("Emultex" R), acidic complex organic phosphate esters ("Gafac" RE–610, "Victawet"), aliphatic amide alkyl sulfonates ("Hyfoam" Base LL), oleic acid esters of sodium isethionate ("Igepon" AP78), sodium N-methyl-N-oleolyl taurate ("Igepon" T77), sodium salt of sulfated lauryl and myristyl colamide ("Intramine" Y), polyethylene glycol 400 oleic acid ester ("Nonisol" 210), sodium dodecylbenzone sulfonate ("Sul-Fon-Ate" AA 10, "Ultrawet" K), polyoxyethylene ethers with longchain alcohols ("Surfonic" LR 30, "Alfonic" 1012–6, "Brij" 30, "Tergitol" TMN), ethylene oxide condensates with propylene oxide/ethylene diamine condensates ("Tetronic" 504), polyhydride alcohol esters ("Trem" 014), modified phthalic glycerol alkyl resins ("Triton" B 1956), quaternaries ("Zelec" DP), alkylphenol ethylene oxide condensate ("Dowfax" 9N4, "Dowfax" 9N10, "Hyonic" 9510, "Tergitols") and the like. Examples given in parentheses are illustrative and do not exclude other unnamed commercial products. Examples of other surface active agents in each of these several categories are listed in "Detergents and Emulsifiers," 1965 Annual, or 1966 Annual, published by John W. McCutcheon Inc., 236 Mt. Kemble Avenue, Morristown, N.J.

Preferred oils include spray oils such as "Orchex" 796 made emulsifiable with "Triton" X–45, castor oil made emulsifiable with "Triton" X–114, corn oil made emulsifiable with "Triton" X–114, Volck Oil #70, Sunoco Oil No. 7E and similar nonphytotoxic spray oils of vegetable, animal or mineral origin.

The preferred rates for these surfactants when used in sprays is in the range from 10 to 10,000 parts per million of the spray fluid. More preferred rates are in the range of 30 to 3,000 parts per million and the most preferred rates are in the range of 100 to 1,000 parts per million.

For dusts, the preferred surfactant rates are in the range of 1,000 to 300,000 parts per million of the material actually applied. More preferred rates are in the range of 5,000 to 200,000 parts per million with the most preferred rates being in the range of 10,000 to 100,000 parts per million.

As previously mentioned, the compounds of the invention are systemic. For systemic applications to aboveground parts, such as foliage, stems and fruit, the presence of a surface-active agent in the spray or dust enhances activity. Use rates for the surface active agent here are the same as for sprays and dusts for preventive or curative control as discussed above. Systemic effect from the treatment of above-ground parts is also enhanced by moisture on the treated surfaces for one or more periods of 2 to 12 hours each.

Systemic control of both mites and fungi on plants is also accomplished by applications to seeds, tubers, bulbs or other reproductive parts prior to planting as well as by application of the chemical to the soil in which the plants to be protected are, or will be, growing. Application to reproductive parts prior to planting is effected through the use of sprays, dips, dusts or aerosols containing one or more of the compounds of this invention. Treatment of soil is accomplished by physical mixing prior to planting, distribution in the furrow at planting time, application in transplant water, placement in the soil in a band or sheet with specialized equipment, injection through irrigation water or by distribution on the field surface.

The fungicidal and mite ovicidal compositions of the invention contain in sufficient amount to exert fungicidal or mite ovicidal action, one or more compounds of this invention in admixture with a carrier material or conditioning agent of the kind used and commonly referred to in the art as an adjuvant or modifier. The general classes of adjuvants applicable to the compounds of this invention are inert solids, organic liquid solvent, organic liquid or aqueous diluents and surface-active agents. Formulations adapted for ready and efficient application using conventional applicator equipment are prepared by compounding the compounds of this invention with suitable adjuvants by mixing, grinding, stirring or other conventional processes. Normally the active ingredient composes 1–95% by weight of the fungicidal or mite ovicidal composition.

Solid compositions can be in the form of water-dispersible powders, dusts, pellets and granules. Water-dispersible powders are particularly useful and can be prepared by simple mixing and grinding steps and can be either used as such, diluted with inert solids to form dusts or granules, or suspended in a suitable liquid medium for spray or seed treatment application. The powders usually comprise active ingredients admixed with varying amounts of conditioning agents, surface-active agents and stabilizers. The classes of extenders suitable for the wettable powders of this invention are clays, such as the kaolins, diatomaceous earths, calcium carbonates, sulfur, sodium sulfate, and also synthetic silicas and silicates. Diluents that have been surface reacted, such as organic acid coated calcium carbonate, can also be used. Diluents of organic origin such as walnut shell flour, lignin sulfonate, corn cob flour, or carbohydrates can also be used. In addition, natural or synthetic frangible resins can be used.

Among the preferred diluents are coated calcium carbonate, corn cob flour, starch, sucrose, sulfur, sodium sulfate and partially desulfonated sodium lignin sulfonate. It is also preferred that the diluents be used in an anhydrous state.

The active ingredient usually makes up from about 25–90% of these wettable powder compositions. These wettable powders can also be converted to dusts containing 1–25% of active material by mixing or grinding one or more of the diluents listed above, or with pyrophyllite, volcanic ash and other dense, rapid-settling inert solids. Alternatively, dusts can be prepared by grinding the dust diluents with the active ingredient, or by preparing dust concentrates for further dilution. These dust concentrates can contain from 80–95% of the active ingredient, blended and ground with diluents and, if desired, small amounts of surface active agents.

For the granule compositions of this invention, the most suitable carriers are of two types. The first are porous, adsorptive, preformed granules, such as preformed and screened granular clays, heat expanded granular screened vermiculite, or granular botanicals. On any of these, a solution or aqueous or nonaqueous suspension of the active agent can be sprayed at concentrations up to 25 weight percent of the total weight. In addition to the active component, the solutions or suspensions can contain surfactant and also binders such as sucrose or swollen starch to aid in adhering small particles of dispersed product to the dried granules. Such adhesive materials may also be surfactants and include such products as polyvinyl alcohol, calcium and magnesium lignin sulfonate in admixture with wood sugars, acrylate and asphalt emulsions, abietates, etc. Oils of other non-volatile liquids like glycols can also be used to improve adhesion.

The second suitable type of carrier is the powdered kaolinitic clays, or bentonitic clays in the sodium, calcium or magnesium forms. These clays are blended with the active components and optionally surfactants to give mixtures that are granulated and dried to yield granular material with the active component distributed uniformly throughout the mass. Other suitable diluents for granulation are sulfur, organic dusts such as corn cob flour starch, dextrin, sucrose, in conjunction with binders and surfactants. Such granules can also be made with 25 to 30 weight percent active component, but more frequently a concentration of about 10 weight percent is desired for optimum distribution. Similar compositions can be made by extruding the mixture in the presence of moisture or other liquids such as polyethylene glycols and converting the extrusions into granules or pellets by a suitable combination of cutting, drying, and crushing steps. The granular compositions of this invention are most useful in a size range of 15–60 mesh.

Liquid compositions employing one or more of the active compounds of this invention are prepared by admixing the active ingredient with a suitable liquid diluent medium. The active ingredient can be either in solution or in suspension in the liquid medium. Typical of the liquid media which can be used are water, paraffinic spray oils, alkylated naphthalenes, xylene, alcohols, chlorinated hydrocarbons and ketones. The active ingredient usually makes up from about 0.5 to 50% of these liquid compositions. In addition, surface-active agents, particularly emulsifiers, can be present to aid in the suspension of dispersion or to emulsify the composition into water.

Compositions of the invention, especially liquids and wettable powders, contain as a conditioning agent one or more surface-active agents in amounts sufficient to render a given compositions readily dispersible in water or in oil. By the term "surface-active agent," it is understood that wetting agents, dispersing agents, suspending agents and emulsifying agents are included.

Suitable surface-active agents include anionic, cationic, and non-ionic types. In general, less than 10% by weight of the surface-active agent is present in the compositions of this invention, although frequently the amount of surface-active agent in these compositions is less than 2% by weight.

Preferred wetting agents are alkylbenzene- and alkylnaphthalene sulfonates, sulfated fatty alcohols, amines or acid amides, long chain acid esters of sodium isethionate, esters of sodium sulfosuccinate, sulfated or sulfonated fatty acid esters, petroleum sulfonates, sulfonated vegetable oils, and ditertiary acetylenic glycols. Preferred dispersants are methyl cellulose, polyvinyl alcohol, sodium, calcium, and magnesium lignin sulfonates, polymeric alkylnaphthalene sulfonates, sodium naphthalene sulfonate, polyvinylpyrrolidone derivatives, polymethylene bisnaphthalenesulfonate and sodium N-methyl-N-(long chain acid) taurates.

Wetting and dispersing agents in these preferred wettable powder compositions of this invention are usually present at concentrations of from about 0.5 weight percent to 5 weight percent. The inert extender then completes the formulation. Where needed, 0.1 weight percent to 1.0 weight percent of the extender can be replaced by a corrosion inhibitor or an antifoaming agent, or both. In some instances, it may be advantageous to use larger amounts of dispersants such as the lignin sulfonates in wettable powder, pellet, granule and dust compositions. In such a case, the lignin sulfonates additionally act as diluents for powders and as binder for granules and pellets.

Emulsifying agents most suitable for the liquid compositions of this invention are alkylaryl polyethoxy alcohols, condensation products of ethylene oxide with long-chain alkyl alcohols, mercaptans or amines, sorbitan fatty acid esters, polyethylene glycol fatty esters, fatty alkylol amide condensates, amine salts of fatty alcohol sulfates, and oil soluble salts of petroleum sulfonates. Mixtures of emulsifying agents are often preferred. Such emulsifying agents will comprise from about 3 to 10 weight percent of the total composition. As described above, however, much greater amounts of emulsifying agent can be used to give improved results.

The compounds of this invention and the oils, humectants, enzymes, carbohydrates, and acids useful to enhance the fungicidal and mite-ovicidal activity of these compounds can be brought together in several ways. For example, the additive which will enhance activity can be mixed with compounds of the invention when spray slurries are being prepared. It is often also possible and convenient to produce formulations in which the additive and the compound of the invention will both be present in the composition, which is then convenient to apply. Such compositions can be powders, granules, suspensions, or even solutions, depending upon the physical and chemical characteristics of the components that are to be prepared. It will be readily understood by those skilled in the trade and in the light of the above teachings that the ratios of active ingredient compound to additives may vary widely. Thus, the additive may be present in such mixtures within the range of from 33 to 10,000 parts per 100 parts of the compounds of this invention. More preferred are rates of from 40 to 5,000 parts of additive per 100 parts of active ingredient and a range of ratios from 50 to 3,500 per 100 parts of compound is even more preferred.

Among non-ionic and anionic surfactants, those most suitable for the preparation of the dry, wettable products of this invention are solid forms of compounds known to the art as wetters and dispersants. Occasionally a liquid, non-ionic compound classified primarily as an emulsifier can serve as both wetter and dispersant.

Such compositions can contain, in addition to the active ingredient of this invention, conventional insecticides, miticides, bactericides, nematocides, fungicides, or other agricultural chemicals such as fruit set agents, fruit thinning compounds, fertilizer ingredients and the like, so that the compositions can serve useful purposes in addition to the control of fungi and mite infestations.

The following are illustrative of the agricultural chemicals that can be included in the compositions or, additionally, that may be added to sprays containing one or more of the active compounds.

1,2,3,4,10,10-hexachloro-1,4,4a,5,8,8a-hexahydro-1,4-endo-exo-5,8-dimethanonaphthalene (aldrin);
1,2,3,4,5,6-hexachlorocyclohexane (lindane);
2,3,4,5,6,7,8,8-octachloro-4,7-methano-3a-4,7,7a-tetrahydroindane;
1,1,1-trichloro-2,2-bis(p-chlorophenyl)ethane (DDT);
1,2,3,4,10,10-hexachloro-6,7-epoxy-1,4,4a,5,6,7,8,8a-octahydro-1,4-endo-exo-5,8-dimethanonaphthalene (dieldrin);
1,2,3,4,10,10-hexachloro-6,7-epoxy-1,4,4a,5,6,7,8,8a-octahydro-1,4-endo-endo-5,6-dimethanonaphthalene (endrin);
1 (or 3a), 4,5,6,6,8,8-heptachloro-3a-4,7,7a-tetrahydro-4,7-methanoindene;
1,1,1-trichloro-2,2-bis(p-methoxyphenyl)ethane (methoxychlor);
1,1-dichloro-2,2-bis(p-chlorophenyl)ethane;
chlorinated camphene having a chlorine content of 67–69%;
2-nitro-1,1-bis(p-chlorophenyl)butane;
1-naphthyl-N-methylcarbamate ("Sevin"®);
methylcarbamic acid, ester with phenyl, 4-(dimethylamino)-3,5-dimethyl;
methylcarbamic acid, ester with 1,3-dithiolan-2-one oxime;
O,O-diethyl-O-(2-isopropyl-4-methylpyrimid-6-yl)thiophosphate;
O,O-dimethyl-1-hydroxy-2,2,2-trichloroethyl phosphonate;
O,O-dimethyl-S-(1,2-dicarbethoxyethyl)dithiophosphate (malathion);
O,O-dimethyl-O-p-nitrophenyl thiophosphate (methyl parathion);
O,O-dimethyl-O-(3-chloro-4-nitrophenyl)thiophosphate;
O,O-diethyl-O-p-nitrophenyl thiophosphate (parathion);
di-2-cyclopentenyl-4-hydroxy-3-methyl-2-cyclopenten-1-one chrysanthemate;
O,O-dimethyl-O-(2,2-dichlorovinyl)phosphate (DDVP);
mixture containing 53.3% "Bulan," 26.7% "Prolan" and 20.0% related compounds;
O,O-dimethyl-O-(2,4,5-trichlorophenyl)phosphorothioate;
O,O-dimethyl-S-(4-oxo-1,2,3-benzotriazine-3(4H)-yl-methyl)-phosphorodithioate ("Guthion"®);
bis(dimethylamino)phosphonous anhydride;
O,O-diethyl-O-(2-keto-4-methyl-7-a'-pyranyl) thiophosphate;
O,O-diethyl (S-ethyl mercaptomethyl)dithiophosphate;
calcium arsenate;
sodium aluminofluoride;
dibasic lead arsenate;
2'-chloroethyl-1-methyl-2-(p-tert-butylphenoxy)ethyl sulfite;
azobenzene;
ethyl 2-hydroxy-2,2-bis(4-chlorophenyl)acetate;
O,O-diethyl-O-(2-(ethylmercapto)-ethyl)thiophosphate;
2,4-dinitro-6-sec-butyl phenol;
toxaphene;
O-ethyl-O-p-nitrophenylbenzenethiophosphonate;
4-chlorophenyl-4-chlorobenzene sulfonate;
p-chlorophenyl-phenyl sulfone;
tetraethyl pyrophosphate;
1,1-bis(p-chlorophenyl)ethanol;
1,1-bis(chlorophenyl)-2,2,2-trichloroethanol;
p-chlorophenyl-p-chlorobenzyl sulfide;

bis(p-chlorophenoxy)methane;
3-(1-methyl-2-pyrrolidyl)pyridine;
mixed ester of pyrethrolone and cinerolone keto-alcohols and two chrysanthemum acids;
cube and derris, both whole root and powdered;
ryanodine;
mixture of alkaloids known as veratrine;
dl-2-allyl-4-hydroxy-3-methyl-2-cyclopenten-1-one esterified with a mixture of cis and trans dl-chrysanthemum monocarboxylic acids;
butoxypolypropylene glycol;
p-dichlorobenzene;
2-butoxy-2'-thiocyanodiethyl ether;
napthalene;
methyl O-carbamylthiolacetohydroxamate;
1,1-dichloro-2,2-bis(p-ethylphenyl)ethane;
methyl O-(methylcarbamoyl)thiolacetohydroxamate;
p-dimethylaminobenzenediazo sodium sulfonate;
quinone oxyaminobenzooxohydrazone;
tetraalkyl thiuram disulfides such as tetramethyl thiuram; disulfide or tetraethyl thiuram disulfide;
metal salts of ethylene disdithiocarbamic acid, e.g. maganese, zins, iron and sodium salts;
pentachloronitrobenzene;
N-dodecylguanidine acetate (dodine);
N-trichloromethylthiotetrahydrophthalimide (captan);
phenylmercury acetate;
2,4-dichloro-6-(o-chloroaniline)-s-triazine ("Dryrene"®);
N-methylmercury p-toluenesulfonanilide;
chlorophenolmercury hydroxides;
nitrophenolmercury hydroxides;
ethylmercury acetate;
ethylmercury 2,3-dihydroxypropyl mercaptide;
methylmercury acetate;
methylmercury 2,3-dihydroxypropyl mercaptide;
3,3'-ethylenebis(tetrahydro-4,6-dimethyl-2H-1,3,5-thiodiazine-2-thione);
methylmercury dicyandiamide;
N-ethylmercury-p-toluenesulfonilide;
1,4-dichloro-2,5-dimethoxy benzene;
metal (e.g. iron, sodium and zinc), ammonium and amine salts of dialkyl dithiocarbamic acids;
tetrachloronitroanisole;
hexachlorobenzene;
hexachlorophene;
methylmercury nitrile;
tetrachloroquinine;
N-trichloromethylthiophthalimide;
1,2-dibromo-3-chloropene;
1,2-dibromo-3-chloroprene;
dichloropropane - dichloropropene mixture;
ethylene dibromide;
chloropicrin;
sodium dimethyl dithiocarbamate;
tetrachloroisophthalonitrile;
1-benezimidazole carboxylic acid, 2-carboxyaminodimethyl ester streptomycin;
2-(2,4,5-trichlorophenoxy)propionic acid;
p-chlorophenoxyacetic acid;
1-naphthalene acetamide; and
N-(1-napthyl)acetamide.

The agricultural chemicals listed above are merely exemplary of the compounds which can be mixed with the active compounds and are not intended to any way limit the invention.

The use of pesticides such as those listed above in combination with a compound within the scope of this invention sometimes appears to greatly enhance the activity of the active compound. In other words, an unexpected degree of activity is sometimes seen when another pesticide is used along with the active compound.

The pressures of an expanding world population, together with the need for more economical agricultural pratices have resulted in earlier harvesting of grains, including corn. Frequently the grain is stored or sold to grain elevators without proper drying. Spoilage of the grain under these conditions may be quite rapid, with the formation of toxins and other substances that are very harmful or fatal when fed to animals.

Safe, effective feed additives that combat spoilage are thus of great importance to agriculture.

The compounds of this invention can be used to prevent the spoilage of animal feeds. In particular, when mixed with the feed, they provide more efficient and longer lasting protection without harm or injury to livestock that consume it. The compounds of this invention may be conveniently formulated for this use in a number of the ways previously disclosed and these formulations may be mixed directly with mixed feed, newly harvested hay and newly harvested grain. These compounds effectively prevent the spoilage of corn, sorghum, wheat, barley, oats, rye and other grains that may be used as livestock feed.

Under normal conditions, these compounds may be incorporated into feeds at rates of from 0.01% to 0.25% with excellent results. Higher rates may be required under very damp conditions.

These compounds can also be used to improve the performance of other feed additives, such as sodium propionate, by mixing the two additives directly, or by adding them separately to the feed to be protected.

The compounds of this invention have an activity which relates to the treatment of sewage, soil or other substances in which natural oxidation processes occur. More specifically, the addition of these benzimidazole compounds to such substrates increases the rate and magnitude of oxidation processes.

Sewage is a dilute aqueous solution of organic wastes which must be treated to prevent pollution of natural water sources. During sewage treatment, complex organic and inorganic molecules are oxidized to simpler molecules, such as carbon dioxide, water and nitrates. Two common techniques for increasing the oxidation, or decomposition, rate of sewage in modern sewage treatment plants are the use of a trickling filter and the use of aeration tanks. The addition of benzimidazole compounds to sewage adds a new technique for increasing the decomposition rate of sewage, and can be used to increase the effects achieved in trickling filters and aeration tanks. When benzimidazole compounds are added to sewage, the result is an increase in the rate of oxygen utilization in the sewage which signifies an increase in the decomposition rate of the sewage.

The addition of benzimidazole compounds to soil results in a more rapid and complete oxidation of fertilizer nitrogen into nitrates. The formation of nitrates in the soil is related to soil temperature and decreases with decreasing temperature. Below 45° C. very little nitrate forms. Consequently, in cold climates where the growing season is short, the addition of benzimidazole compounds to nitrogenous fertilizers will result in a more rapid and complete conversion into nitrates and thereby stimulate plants to mature faster.

The compounds of the present invention also possess activity against helminth parasites of warm-blooded animals. Properly formulated and administered, these can be utilized for the treatment of helminthiasis of animals by oral administration.

For example, the subject compounds are useful for the control of infections such as *Trichuris vulpis* in dogs and gastroenteritis in sheep due to such parasites as *Ostertagia, Haemonchus* and *Cooperi* species. In addition, nematodes in laboratory mice such as *Aspicularis teraptera* and others may also be checked. Various ancyclostomes such as *Bunestomium trigenecephalum* and *Ancyclostoma caninum* are also controlled by the compounds of this invention.

Anthelmintic activity is obtained by oral administration of the compounds of this invention mixed with a suitable non-toxic carrier to obtain the active anthelmintic composition. The carrier can be a pharmaceutically acceptable diluent or excipient normally used for the preparation of medicaments and include such materials as lactose, calcium, phosphate, gelatin, pectin and others. Liquid carrier may be taken from such agents as olive oil, sesame oil and water. Alternatively the active ingredients of this invention may be incorporated in a receptacle such as a hard or soft gelatin capsule. The quantity of the active ingredient administered to the animal is in the range of 20 to 600 mg./kg./day.

The following examples illustrate the activity of the compounds of Formula I. All parts are parts by weight unless otherwise indicated.

EXAMPLE 33

An aqueous suspension concentrate is prepared as follows:

| | |
|---|---|
| 1 - (methylcarbamoyl)-2-cyclopropylcarboximidobenzimidazole | 30.00 |
| Polyacrylic acid, sodium salt | 0.35 |
| Low viscosity polyvinyl alcohol | 1.50 |
| Water+(sodium hydroxide to a pH of 7.0 added last) | 68.15 |

The active component is ground to pass a 30 mesh screen and is then mixed with the remaining formulation ingredients and sand ground to a particle size below 5 microns.

Six field crates of oranges are picked from a commercial grove in Florida. Three of these crates of oranges are dipped for 3 minutes in a water bath containing a suspension made from the above formulation, in an amount to give 300 parts per million by weight of the active ingredient of this invention. A polyethylene glycol ester of oleic acid surface active agent is present at the rate of 150 p.p.m. of total liquid. The remaining three crates are dipped in a simular fashion in water with the surface active agent only. All crates are set aside in a citrus storage house for three weeks. At the end of this time all fruit are examined. The fruit that has been dipped with the compound of this invention is still in good condition, but the fruit that is not so protected is largely rotted by the blue mold fungus (*Penicillium digitatum*.)

The following compounds may be similarly formulated and when used as above give like results.

1-(butylcarbamoyl)-2-propionamidobenzimidazole
1-(butylcarbamoyl)-2-cyclopropylcarboxamidobenzimidazole
1 - (sec - butylcarbamoyl)-2-benzimidazolecarbamic acid, methyl ester
1-(isobutylcarbamoyl)-2-benzimidazolecarbamic acid, methyl ester
1-(methylcarbamoyl)-2-benzimidazolecarbamic acid, sec-butyl ester
1-(9-decenylcarbamoyl)-2-benzimidazolecarbamic acid, methyl ester
1-(p-tolylsulfonylcarbamoyl)-2-benzimidazolecarbamic acid, isopropyl ester
1-(ethoxycarbonylmethylcarbamoyl)-2-benzimidazolecarbamic acid, ethyl ester
1-(allylcarbamoyl)-2-benzimidazolecarbamic acid, ethyl ester
1-(p-cyanophenylcarbamoyl)-2-benzimidazolecarbamic acid, isopropyl ester
1-(p-methoxyphenylcarbamoyl)-2-benzimidazolecarbamic acid, methyl ester
1-(allylcarbamoyl)-2-benzimidazolecarbamic acid, methyl ester
1-(butylcarbamoyl)-2-benzimidazolecarbamic acid, methyl ester
1-(ethylcarbamoyl)-2-benzimidazolecarbamic acid, methyl ester
1-(3,4-dichlorophenylcarbamoyl)-2-benzimidazolecarbamic acid, methyl ester
1-(isopropylcarbamoyl)-2-benzimidazolecarbamic acid, methyl ester
1-(cyclohexylcarbamoyl)-2-benzimidazolecarbamic acid, methyl ester
1-(p-nitrophenylcarbamoyl)-2-benzimidazolecarbamic acid, methyl ester
1-(p-cyanophenylcarbamoyl)-2-benzimidazolecarbamic acid, methyl ester
1-(hexylcarbamoyl)-2-benzimidazolecarbamic acid, ethyl ester
1-(butoxycarbonylmethylcarbamoyl)-2-benzimidazolecarbamic acid, isopropyl ester
1-(cyclohexylcarbamoyl)-2-benzimidazolecarbamic acid, isopropyl ester
1-(p-nitrophenylcarbamoyl)-2-benzimidazolecarbamic acid, isopropyl ester
1-(allylcarbamoyl)-2-benzimidazolecarbamic acid, isopropylester
1-(methylcarbamoyl)-2-benzimidazolecarbamic acid, isopropyl ester
1-(hexylcarbamoyl)-2-benzimidazolecarbamic acid, isopropyl ester
1-(butylcarbamoyl)-2-benzimidazolecarbamic acid, isopropyl ester
1-(dodecylcarbamoyl)-2-benzimidazolecarbamic acid, methyl ester
1-(octylcarbamoyl)-2-benzimidazolecarbamic acid, methyl ester
1-(methylcarbamoyl)-3-propionyl-$\Delta^{2,N}$-2-benzimidazoline-2-carbamic acid, methyl ester
1,3-dicarbamoyl-2-benzimidazolecarbamic acid, methyl ester
1-(2-methylcyclohexycarbamoyl)-2-benzimidazolecarbamic acid, methyl ester
1-(hexylcarbamoyl)-2-benzimidazolecarbamic acid, methyl ester
1,3-bis(methylcarbamoyl)-$\Delta^{2,N}$-2-benzimidazoline carbamic acid, methyl ester
1-(3-chloro-p-tolylcarbamoyl)-2-benzimidazolecarbamic-acid, methyl ester
1-(propylcarbamoyl)-2-benzimidazolecarbamic acid, methyl ester
N-methyl-2-propionamido-1-benzimidazolecarboxamide
1-(m-tolylcarbamoyl)-2-benzimidazolecarbamic acid, methyl ester
1-(o-tolylcarbamoyl)-2-benzimidazolecarbamic acid, methyl ester
1-(ethoxycarbonylmethyl-2-carbamoyl)-2-benzimidazolecarbamic acid, methy ester
1-(p-tolylcarbamoyl)-2-benzimidazolecarbamic acid, methyl ester
1-(p-ethoxyphenylcarbamoyl)-2-benzimidazolecarbamic acid, methyl ester
1-(cyclohexylmethylcarbamoyl)-2-benzimidazolecarbamic acid, methyl ester
1-(benzylcarbamoyl)-2-benzimidazolecarbamic acid, methyl ester
1-(ethoxycarbonylmethylcarbamoyl-2-benzimidazolecarbamic acid, isopropyl ester
1-(o-nitrophenylcarbamoyl)-2-benzimidazolecarbamic acid, methyl ester
1-methylcarbamoyl-2-benzimidazolecarbamic acid, methyl ester
3-phenylcarbamoyl-2-benzimidazolecarbamic acid, methyl ester

EXAMPLE 34

A wettable powder formulation is prepared as follows:

| | |
|---|---|
| Methyl 1-[(m-toluoyl)carbamoyl]-2-benzimidazolecarbamate | 70.0 |
| Diatomaceous earth | 28.7 |
| Alkylaryl sodium sulfonates | 1.0 |
| Methyl cellulose | 0.3 |

The above ingredients are blended and micropulverized to a particle size below 50 microns, followed by reblending.

The wettable powder thus prepared is added to water at the rate of 1 pound of the active ingredient per 100 gallons of water. A modified phthalic glycerol alkyd resin surface active agent ("Triton" B 1956) is added in an amount to give 400 p.p.m. in the final spray. This suspension is used to spray, to the point of run-off, alternate trees in a field planting of apples. Sprays are applied at weekly intervals from April 25 until June 6. From June 6 until the end of the season, the sprays are applied at intervals of two weeks. The remaining trees in the planting are left unsprayed.

In early September all trees are carefully examined. Trees that were sprayed with the compound of this invention are healthy and free of mite infestation and fungus damage. The fruit on the sprayed trees is unblemished and of good size. The foliage of the unsprayed trees, on the other hand, is heavily infested with the apple scab fungus (*Venturia inaequalis*) and the powdery mildew fungus (*Podosphaera leucotricha*). Also the leaves of the unsprayed plants are badly infested with European red mites (*Panonychus ulmi*). The fruit on the unsprayed trees is spotted with scab and of small size.

The following compounds may be similarly formulated and when used as above give similar results.

methyl 1-(methylcarbamoyl)-2-benzimidazolecarbamate
methyl 1-(ethylcarbamoyl)-2-benzimidazolecarbamate
methyl 1-(propylcarbamoyl)-2-benzimidazolecarbamate
methyl 1-(butylcarbamoyl)-2-benzimidazolecarbamate
methyl 1-(pentylcarbamoyl)-2-benzimidazolecarbamate
methyl 1-(hexylcarbamoyl)-2-benzimidazolecarbamate
methyl 1-(octylcarbamoyl)-2-benzimidazolecarbamate
methyl 1-[(p-nitrophenyl)carbamoyl]-2-benzimidazolecarbamate Also in the above example, the following surface active agents may be substituted with similar results:

sodium lauryl sulfate ("Duponol" ME)
polyoxethylene sorbitol oleate/laurate ("Attox" 1045A)

EXAMPLE 35

A wettable powder formulation is prepared from the following ingredients:

Methyl 1-(hexylcarbamoyl)-2-
  benzimidazolecarbamate _____ 50.0
Kaolinite _____ 45.0
Sodium lignin sulfonate _____ 1.0
Dioctyl sodium sulfosuccinate _____ 2.0
Finely divided synthetic silica _____ 2.0

These ingredients are mixed, blended and micronized to a particle size below 10 microns, followed by reblending.

A uniform field planting of cantaloupe in North Carolina is inoculated with the powdery mildew fungus (*Erysiphe cichoracearum*). After 10 days this organism has become well established in the plants.

At this time alternate rows are sprayed with water containing a suspension of the wettable powder prepared as described above and an added amount of a polyhydric alcohol ester surface active agent ("Trem" 014). The concentration of this chemical suspension is such as to give 227 grams of the active compound of this formulation per 378 liters of water (0.06%) and 400 p.p.m. of the surfactant. The spray is applied at a volume of 1410 liters per hectare. The remaining rows are left unsprayed.

After another 15 days the unsprayed rows are heavily damaged by powdery mildew and some of the plants are dying. The sprayed rows, however, are healthy and growing rapidly. The results indicate that the active compound of the suspension acts as a curative fungicide.

EXAMPLE 36

The following formulation is prepared by intimately blending the ingredients and grinding the blend in an air attrition mill until the particle size is substantially less than 5 microns and then reblending.

Methyl 1-(methylcarbamoyl)-2-
  benzimidazolecarbamate _____ 50.0
Dioctyl sodium sulfosuccinate _____ 1.0
Low viscosity methylcellulose _____ 0.3
Silica _____ 48.7

Acid delinted cottonseed, already treated with 85 grams of tetramethylthiuram disulfide per 45.3 kilograms of seed, is overtreated in a slurry treater with the formulation described above, in such a way as to provide 113 grams of the active ingredient per 45.3 kilograms of seed. A similar lot of seed, treated with tetramethylthiuram disulfide only, is used for purposes of comparison. The two lots of seed are planted in alternating rows in the same field. The seed treated with tetramethylthiuram disulfide only emerges to a good stand but many seedlings die later due to post-emergence damping off, and growth of the surviving plants is poor due to *Rhizoctonia solani*. Most of the seedlings that do survive exhibit soreshin leasions caused by Rhizoctonia. The seeds over-treated with the above formulation, on the other hand, result in a stand that suffers little post-emergence damping off and grows rapidly.

EXAMPLE 37

The following formulation is prepared by intimately blending the following ingredients and micropulverizing them until the particles are substantially all below 20 microns.

Methyl 1-(propylcarbamoyl)-2-benzimidazole-
  carbamate _____ 50.0
Oleic acid ester of sodium isethionate _____ 2.0
Sodium lauryl sulfate _____ 1.0
Synthetic fine silica _____ 47.0

The above 50% wettable powder formulation is dispersed in water to give an active ingredient concentration of 3.6 grams per liter of water. Eight uniform apple trees of the same variety are selected for testing. Four of these are sprayed to run-off, which is approximately 2850 liters per hectare, at weekly intervals during the growing season with the above formulation, and the other four trees are left unsprayed.

By the end of the season the unsprayed trees have developed very high populations of orchard mites and are highly infected with apple scab. *Venturia inaequalis*. Due to the feeding of the mites, the foliage is russeted and drops prematurely. Also the untreated trees have poor twig growth are small, spotted fruit. The trees sprayed with methyl 1-(propylcarbamoyl)-2-benzimidazolecarbamate are essentially free of mites, their eggs and apple scab. As a result of the excellent mite control, the sprayed trees have foliage of a thrifty, dark green color, and they exhibit good twig growth and fruit size.

Any of the compounds named in Examples 1 through 12 may be formulated as described in this example and when used as indicated give similar results.

EXAMPLE 38

A wettable powder formulation is prepared from the following ingredients in the proportions given:

Methyl 1-(butylcarbamoyl)-2-benzimidazolecar-
  bamate _____ 25
Methyl O-(methylcarbamyl)thiolacetohydroxamate __ 10
Oleic acid ester of sodium isethionate _____ 2
Sodium lauryl sulfate _____ 2
Diatomaceous silica _____ 61

All ingredients are combined and rotated in a blender until uniformly admixed. The total mix is then air-milled to produce particles most of which are less than 10 microns in particle size.

A sufficient amount of the above wettable powder is added to water such that there are 2.5 grams per liter of water of the methyl O-(methylcarbamoyl)thioacetohydroxamate. The resulting suspension is then sprayed at weekly intervals on one pair of similar, adjacent plots in a greenbean field in Florida at the rate of two kilograms of methyl 1-(butylcarbamoyl)-2-benzimidazolecarbamate per hectare. The test area is selected as one in which there is a high infestation of the two-spotted mite, *Tetranychus bamaculatus*, and the Mexican bean beetle, *Epilachna varivestis*. The plot sprayed with the above formulation remains free of both the two-spotted mite and the Mexican bean beetle for the entire growing season and provides a good yield of greenbeans. The unsprayed plot is attacked by both of the above pests and is damaged to the extent that the yield is greatly reduced. Similar areas sprayed with methyl O-(methylcarbamyl)thiolacetohydroxamate alone are free from attack by the Mexican bean beetle but are damaged by the two-spotted mite.

In the above example, methyl O-(carbamyl)thiolacetohydroxamate may be subsituted for methyl O-(methylcarbamoyl)thiolacetohydroxamate with essentially equivalent results.

EXAMPLE 39

A wettable powder formulation is prepared from the following ingredients in the proportions given:

Methyl 1-(isobutylcarbamoyl)-2-benzimidazole-
  carbamate _____ 30.0
Methoxychlor _____ 30.0
Sodium lauryl sulfate _____ 1.0
Oleic acid ester of sodium isethionate _____ 2.0
Non-swelling montmorillonoid clay _____ 37.0

All of the ingredients are combined and rotated in a blender until uniformly mixed. The total mix is then air-milled to produce particles essentially less than 40 microns in size.

The wettable powder prepared above is added to water in an amount such that there are 2.5 grams of each of the active ingredients per liter of water. The resulting suspension is sprayed at the rate of 10 kilograms per hectare for each of the active ingredients over a plot in a Bermuda grass turf area in Florida. The area selected for the test is heavily infested with a plant-feeding mite, *Aceria neocynodomis*, and chinch bugs, *Blissus leucopterus insularis*. The chinch bugs are killed in the treated plot and the mite infestation soon disappears. The turf quickly returns to a healthy and attractive condition.

In a similar untreated plot both the mites and the chinch bugs continue to multiply and, by their feeding, the Bermuda grass becomes discolored and the turf reflects many unsightly dead spots. Similar plots sprayed with methoxychlor only are free of damage due to chinch bugs but are injured by the high mite infestation.

The following compounds can be substituted for the methyl 1-(isobutylcarbamoyl)-2-benzimidazolecarbamate and similarly formulated. When used as set forth above they give similar results.

methyl 1-[(2-methylcyclohexyl)carbamboyl]-2-benzimidzolecarbamate
methyl 1-(butylcarbamoyl)-2-benzimidazolecarbamate

EXAMPLE 40

The following formulation is prepared by intimately blending the ingredients and grinding the blend in an air attrition mill until the particle size is substantially less than 5 microns and then reblending.

Methyl 1-(butylcarbamoyl)-2-benzimidazolecarba-
  mate _____ 85.0
Alkylnapthalene sulfonic acid, sodium salt ____ 1.5
Sodium N-methyl-N-oleoyl taurate _____ 2.0
Synthetic fine silica _____ 11.5

Four similar potted bean plants (one plant per pot) are selected. The soil in two of these pots is drenched with a water suspension of the wettable powder formulation described above at a rate to provide 30 parts per million by weight in the total amount of soil in the pot. The remaining two pots are left untreated.

Five days after treatment 50 adult mites (*Tetranychus telarius*) are placed on a terminal leaf on each of the test plants. Twenty-four hours later these adult mites, all still alive, are transferred to untreated bean foliage. After another twenty-four hours all of the adult mites are removed in a way which causes no damage to the eggs that have been laid during the twenty-four hour period on the untreated foliage.

The number of eggs laid by each batch of 50 mites is essentially the same. A sufficient time is allowed for all viable eggs to hatch. Counts demonstrate that none of the eggs hatch from among those laid by mites that had fed on foliage from pots with soil containing the compound of this formulation. Hatch to provide living young was complete, on the other hand, among eggs laid by mites similarly handled except that the plants providing sustenance were not in contact with the compound of this formulation. This experiment demonstrates systemic movement in plants and mite ovicide effect.

The following compounds can be similarly formulated and when used as above give like results.

methyl 1-(hexylcarbamoyl)-2-benzimidazolecarbamate
methyl 1-(cyclopentylcarbamoyl)-2-benzimidazolecarbamate

EXAMPLE 41

A dust concentrate is prepared as follows:

methyl 1-(phenylcarbamoyl)-2-benzimidazole-
  carbamate _____ 80
Synthetic fine silica _____ 20

The above ingredients are blended and milled to a particle size below 10 microns, followed by reblending.

Two experimental lots of house paint are prepared in a similar manner except that 0.5% by weight of the active compound of this formulation is milled with the dry ingredients in one lot, whereas none of the concentrate was added to the other lot. Test boards were painted with each lot. After one year of exposure in Florida, the board with the paint to which the concentrate was not added was badly stained by fungus growth including species of Penicillium and other genera. The board with the paint containing the compound of this invention remained bright.

EXAMPLE 42

A dilute dust is prepared as follows:

Dust concentrate formulation of Example 41 _____ 10
Ground phosphate rock _____ 90

The above ingredients are blended to form a free flowing dust.

A uniform cherry orchard in Michigan is selected for the test. Alternate trees are dusted every 14 days at the rate of 2 pounds per tree with the above dust formulation. The remaining trees are left unprotected.

On September 1 the trees are examined. The trees that had been dusted with the compound of this invention are green and healthy, with all leaves remaining on the trees. At this time the foliage of the unprotected trees is largely discolored due to attack by the leaf spot fungus (*Coccomyces hiemalis*) and the two spotted mite (*Tetranychus telarius.*) Further, much of the foliage of the unprotected trees has fallen due to the effect of the two pests.

The following compounds may be similarly formulated and when used as above give like results.

methyl 1-(isopropylcarbamoyl)-2-benzimidazolecarbamate methyl 1-(isobutylcarbamoyl)-2-benzimidazolecarbamate
methyl 1-(octylcarbamoyl)-2-benzimidazolecarbamate

EXAMPLE 43

A dilute dust is prepared as follows:

| | |
|---|---|
| Ethyl 1-(ethylcarbamoyl)-2-benzimidazolecarbamate | 5 |
| Pyrophyllite | 95 |

The active ingredient and an equal amount of pyrophyllite are first blended and micropulverized to a particle size smaller than 100 microns, then reblended with the remainder of the diluent.

Sugar cane seed pieces cut in November are divided into eight lots. Four of these lots are dusted in such a way as to cover all surfaces with the dust prepared as described above. The other four lots are dusted with the inert diluent only. All lots are stored under similar conditions until the following February at which time they are examined. The four lots that had been treated with the compound of this invention are in good condition. The four unprotected lots, on the contrary, are so badly rotted by fungi of the genus Fusarium that they cannot be planted.

EXAMPLE 44

| | Percent |
|---|---|
| Methyl 1-(butylcarbamoyl)-2-benzimidazolecarbamate | 50 |
| Dioctyl sodium sulfosuccinate (Aerosol OTB) | 5 |
| Low viscosity methylcellulose (Methocel 15) | 0.5 |
| Sucrose (commercial cane sugar) | 46.5 |

The above components are blended and micropulverized, then air milled until the active component is substantially all below 5 microns.

The above 50% wettable powder formulation is dispersed in water to give an active ingredient concentration of 3.6 grams per liter of water. Eight uniform apple trees of the same variety are selected for testing. Four of these are sprayed to run-off, which is approximately 2850 liters per hectare, at weekly intervals during the growing season with the above formulation, and the other four trees are left unsprayed.

By the end of the season the unsprayed trees have developed very high populations of orchard mites and are highly infected with apple scab, *Venturia inaequalia*. Due to the feeding of the mites, the foliage is russeted and drops prematurely. Also, the untreated trees have poor twig growth and small, spotted fruit.

The trees sprayed with methyl 1-(butylcarbamoyl)-2-benzimidazole carbamate are essentially free of mites, their eggs and apple scab. As a result of the excellent mite control, the sprayed trees have foliage of a thrifty, dark green color, and they exhibit good twig growth and fruit size.

Any of the compounds named in Examples 34 through 43 may be formulated as described in this example and when used as indicated give similar results.

EXAMPLE 45

| | Percent |
|---|---|
| Methyl 1-(butylcarbamoyl)-2-benzimidazole carbamate | 60 |
| Dioctyl sodium sulfosuccinate | 3 |
| Low viscosity methyl cellulose | 0.5 |
| Sulfur (sublimed) | 36.5 |

The above composition was blended, micropulverized and air milled in the same manner as the previous examples.

Test plots are established in a rice field. The plots are sprayed with water containing a suspension of the wettable powder described above along with a polyhydric alcohol ester surface active agent ("Trem" 014). The amount of the wettable powder used is such as to provide 1.5 grams of the active compound of this invention per liter of water. The amount of "Trem" 014 is 400 p.p.m. in the final spray. The spray is applied at weekly intervals at the rate of 900 liters per hectare. The remainder of the field is left unsprayed. Three months after the start of the test, the sprayed plots are healthy and growing well. The untreated plots on the other hand, are seriously damaged by the rice blast fungus, *Piricularia oryzae* which greatly reduces yield.

EXAMPLE 46

A slurry of 50,000 parts of dry tobacco is prepared in sufficient water to form a viscous dispersion. To this is added 25 parts of methyl 1-(n-butylcarbamoyl)-2-benzimidazole carbamate followed by 18,000 parts of the aqueous binder described in Example 1 of U.S. 3,000,764. The slurry is then dried on a stainless steel band drier. Tobacco so treated resists fungus attack for prolonged periods of time.

EXAMPLE 47

The following ingredients are converted into a dust as indicated:

| | |
|---|---|
| Methyl 1-(ethylcarbamoyl)-2-benzimidazolecarbamate | 20 |
| Pyrophyllite | 79 |
| Alkylnaphthalene sulfonic acid, sodium salt | 1 |

Equal parts of the active ingredient and the diluent are milled with the surfactant and then diluted with the remaining pyrophyllite in a ribbon blender. The components are then blended until they are homogeneous.

Cotton plants in selected plots are thoroughly dusted at a rate of 10 kilograms of dust per hectare for each application on June 20 and at two-week intervals thereafter until mid-August with the above dust formulation in addition to a regular insecticidal program. Similar plots receive the insecticidal application only. By late August the plots receiving the insecticide only have a high incidence of boll rot caused by *Aspergillus niger* and high populations of spider mites, *Tetranychus spp.*, which cause the leaves of the cotton plants to turn rusty brown, twist and drop to the ground. Many bolls are completely rotted and loss of leaves results in the shedding of small bolls and prevents the lint from becoming fully developed. Cotton plants treated with the above dust formulation retain healthy foliage and produce a heavy crop of healthy full-sized bolls.

The following compounds may be similarly formulated and when used as above give like results.

methyl 1-carbamoyl-2-benzimidazolecarbamate
methyl 1-[(p-toluoyl)carbamoyl]-2-benzimidazolecarbamate
methyl 1-[(o-chlorophenyl)carbamoyl]-2-benzimidazolecarbamate
methyl 1-(isopropylcarbamoyl)-2-benzimidazolecarbamate
methyl 1-octadecylcarbamoyl-2-benzimidazolecarbamate

EXAMPLE 48

A dust formulation is prepared from the following ingredients in the proportions listed:

| | |
|---|---|
| Methyl 1-(heptylcarbamoyl)-2-benzimidazolecarbamate | 5 |
| Methoxychlor | 5 |
| Sodium alkylnaphthalenesulfate | 1 |
| Pyrophyllite clay | 89 |

The above ingredients are combined and rotated in a blender until uniformly mixed. The composition is then milled to produce particles essentially less than 50 microns in diameter. The above-prepared dust is then applied to a special planting of tea roses. The planting consists of uniform plots each with three varieties of rose. The test period extends from June 1 through August 31. At the end of the test period the roses in all unprotected plots are seriously damaged by the spider mite,

*Tetranychus telarius*, the rose blackspot, *Diplocarpon rosae*, and the Japanese beetle, *Popillia japonica*. Randomly selected plots dusted at weekly intervals with the above prepared composition to the extent that thorough coverage of the plant is obtained with the formulation, remain free from damage, and produce good yields of bloom throughout the test period.

Plots treated with a dust containing methoxychlor but without methyl 1-(heptylcarbamoyl)-2-benzimidazolecarbamate show no Japanese beetle injury. However, they are seriously damaged by mites and blackspot.

The following compounds can be substituted for methyl 1-(heptylcarbamoyl)-2-benzimidazolecarbamate and when similarly formulated and used as above, give like results.

methyl 1-(phenylcarbamoyl)-2-benzimidazolecarbamate
methyl 1-[(3,4-dichlorophenyl)carbamoyl]-2-benzimidazolecarbamate
methyl 1-(ethoxycarbonylmethylcarbamoyl)-2-benzimidazolecarbamate
methyl 1-(p-nitrophenylcarbamoyl)-2-benzimidazolecarbamate

EXAMPLE 49

An aqueous suspension concentrate is prepared as follows:

Methyl 1-(cyclohexylcarbamoyl)-2-benzimidazole-
  carbamate _____ 30.00
Polyacrylic acid, sodium salt _____ 0.35
Low viscosity polyvinyl alcohol _____ 1.50
Water + (sodium hydroxide to a pH of 7.0 added
  last) _____ 68.15

The active component is ground to pass a 30 mesh screen and is then mixed with the remaining formulation ingredients and milled in a sand grinder until the particle size is below 5 microns.

Six field crates of oranges are picked from a commercial grove in Florida. Three of these crates are dipped for three minutes in a water bath containing a suspension made from the above formulation, in an amount to give 300 parts per million by weight of the active ingredient of this invention. A polyethylene glycol ester of oleic acid surface active agent is present at the rate of 150 p.p.m. of total liquid. The remaining three crates are dipped in a similar fashion in water with the surface active agent only. All crates are set aside in a citrus storage house for three weeks. At the end of this time all fruit are examined. The fruit that has been dip-treated with the compound of the invention is still in good condition, but the fruit that is not so protected is largely rotted by the blue mold fungus (*Penicillium digitatum*).

EXAMPLE 50

An aqueous suspension concentrate is prepared as follows:

Methyl 1-(butylcarbamoyl) - 2 - benzimidazolecar-
  bamate _____ 30.00
Polyacrylic acid, sodium salt _____ 0.35
Low viscosity polyvinyl alcohol _____ 1.50
Water+(sodium hydroxide to a pH of 7.0 added
  last) _____ 68.15

The active compound is ground to pass a 30 mesh screen and is then mixed with the remaining formulation ingredients and sand ground to a particle size below 5 microns.

Green pine lumber coming from the saw in a mill is dipped for two minutes in a bath containing a suspension of the formulation prepared as described above. The amount of suspension concentrate used is such as to provide 400 parts per million of the active compound in the bath. Similar lumber is not dipped. All of the lumber is piled together in a seasoning yard. After three months the lumber is examined. The lumber that has been dip-treated was all bright and clean. The unprotected lumber was heavily covered with green mold (Penicillium spp.).

EXAMPLE 51

A granular formulation is prepared as follows:
Granular corn cob (15–30 mesh) _____ 90
Methyl 1-(phenylcarbamoyl) - 2 - benzimidazolecar-
  bamate _____ 10

The active compound is dissolved in warm chloroform and the chloroform solution is sprayed on the granular corn cob which is being tumbled in a mixer. Evaporation of the chloroform yelds a finished granule in which the active ingredient is absorbed.

A field in California is seeded with cotton in the normal manner, except that granules prepared as set forth above are added to alternate rows. These granules are dropped in such a way that some fall into the furrow and some are mixed with the covering soil. The rate of granule application is such as to employ 0.45 kilogram of active chemical of this invention per 3600 meters of row. The remaining rows are untreated.

Six weeks after planting, many of the plants in the rows without the granules are dead, and others show soreshin lesions caused by *Rhizoctonia solani* as well as heavy populations of the Pacific mite (*Tetranychus pacificus*). In the rows that had received the granules, all plants remain alive and are healthy, and further they are free of mites. The effect on mites is clearly systemic.

The following compounds may be similarly formulated and when used as above give similar results.

methyl 1-(butylcarbamoyl)-2-benzimidazolecarbamate
methyl 1-(3-chloro-4-methylphenylcarbamoyl)-2-
  benzimidazolecarbamate
methyl 1-[(m-toluoyl)carbamoyl]-2-benzimidazole-
  carbamate
methyl 1-[(ethoxycarbonylmethyl)carbamoyl]-2-
  benzimidazolecarbamate
methyl 1-[(p-ethoxycarbonylphenyl)carbamoyl]-2-
  benzimidazolecarbamate

EXAMPLE 52

An aerosol is prepared from the following ingredients in the proportions given:

Ethyl 1 - (isopropylcarbamoyl)-2-benzimidazolecar-
  bamate _____ 3.0
Methyl chloride _____ 22.0
Freon 11 (trichloromonofluoromethane) _____ 37.5
Freon 12 (dichlorodifluoromethane) _____ 37.5

The active ingredient is dissolved in the methylene chloride and then loaded into the aerosol container. This is followed by cold loading of the Freons.

Alternate rose bushes growing in a greenhouse are misted lightly at weekly intervals with the aerosol described above. After two months of this program the treated plants are healthy, with dark green attractive foliage and are growing well. The untreated plants, on the other hand, have much foliage discolored and curled due to infection by the rose powdery mildew organism *Sphaerotheca humuli*. Other foliage on the untreated plants if yellowed due to attack by the Atlantic mite (*Tetranychus atlanticus*). Due to the extensive foliage damage, the plants not treated with the compound of this invention grow more slowly than the protected plants.

The following compounds may be similarly formulated and when used as above give good results:

ethyl 1-(butylcarbamoyl)-2-benzimidazolecarbamate
methyl 1-(hexylcarbamoyl)-2-benzimidazolecarbamate
methyl 1-(benzylcarbamoyl)-2-benzimidazolecarbamate
methyl 1-(allylcarbamoyl)-2-benzimidazolecarbamate
methyl 1-(γ-dodecenylcarbamoyl)-2-benzimidazole-
  carbamate

EXAMPLE 53

| | Percent |
|---|---|
| 1 - butylcarbamoyl - 2 - benzimidazolecarbamic acid methyl ester | 51.6 |
| Alkyl naphthalene sulfonate, sodium salt ("Alkanol" B) | 5.0 |
| Polyvinylpyrrolidone derivative ("Ganex" V 904) | 1.0 |
| Calcium carbonate surface-reacted with propionic acid | 42.4 |

The mixture is prepared by predrying all the compounds and then blending, micropulverizing, and finally air-milling until the particle size is below about five microns.

Test plots are established in a rice field. These are sprayed with water containing a suspension of the wettable powder described above along with an aliphatic amide alkyl sulfonate surface active agent ("Hyfoam" Base LL). The amount of the wettable powder used is such as to provide 1.5 grams of the active compound of this invention per liter of water. The amounts of "Hyfoam" Base LL used is 400 p.p.m. in the final spray. The spray is applied at weekly intervals at the rate of 900 liters per hectare. The remainder of the field is left unsprayed.

Three months after the start of the test, the sprayed plots are healthy and growing well. The untreated plots, on the other hand, are seriously damaged by the rice blast fungus *Piricularia oryzae* which greatly reduces yield.

EXAMPLE 54

The formulation of Example 53 is also useful in controlling Sigatoka disease of banana caused by the fungus *Cercospora musae*. This is demonstarted by a field test in which designated areas in a banana plantation are treated with 400 grams of the active ingredient of this invention per hectare and an equal amount of a polyhydric alcohol ester surface active agent ("Trem" 014) applied in an amount of water sufficient to assure good distribution. The treatment is applied at intervals of 14 days.

Four months after the start of the test the banana plants in the treated plots are free from disease, whereas, the untreated plants are heavily damaged by Sigatoka disease.

EXAMPLE 55

| | |
|---|---|
| 1-(p-nitrophenylcarbamoyl) - 2 - benzimidazolecarbamic acid, methyl ester | 72.2 |
| Sodium lauryl sulfate ("Duponol" WA) | 1.5 |
| Oleic acid ester of sodium isethionate ("Igepon" AP 78) | 2.0 |
| Diatomaceous earth ("Celite" 209) | 24.3 |

The mixture is prepared by blending the ingredients, hammer-milling, and then air-milling twice to obtain a very finely divided powder.

A test is established in a field planting of celery in Florida. Random plots established in a field are sprayed with water containing a suspension of the wettable powder described above along with a blend of aromatic sulfonate and ethylene oxide derivatives ("Agrimul" GM). The amount of wettable powder used is such as to provide two grams of active compound of this invention per liter of water. The amount of "Agrimul" GM used is such as to provide 300 p.p.m. in the final spray. The spray is applied weekly at the rate of 1000 liters per hectare. The remainder of the field is left unsprayed.

Three months after the first spray application, the sprayed celery plots are in a healthy condition and obviously growing well. The untreated portions of the field on the other hand are seriously infested with the early blight fungus (*Cercospora apii*). The disease causes the death of much of the foilage and reduces the growth and market volume of the plants.

EXAMPLE 56

The formulation of Example 55 is also useful in controlling peach scab caused by the fungus *Cladosporium carpophilum*. This is demonstrated by a field study in which random trees in a peach planting are sprayed, starting in the spring, with water containing a suspension of the wettable powder described in the example along with an acid complex organic phosphate ester surface active agent ("Gafac" RE–610).

The amount of the wettable powder used is such as to provide 2.5 grams of the active compound of this invention per liter of water. The amount of "Gafac" RE–610 employed is 400 p.p.m. in the final spray.

The spray is applied on a normal peach fungicide schedule at the rate of 2000 liters per hectare of peach trees. The remaining trees in the planing are left unsprayed.

At the time of harvest fruit on the treated trees are healthy and attractive to consumers. Conversely, fruit from the untreated trees is spotted with scab and of reduced market value.

EXAMPLE 57

| | |
|---|---|
| 1-butylcarbamoyl - 2 - benzimidazolecarbamic acid, methyl ester | 51.6 |
| Alkylnaphthalene sulfonate, sodium salt (Petro Ag Special) | 4.0 |
| Neutral, partially desulfonated sodium lignin sulfonate ("Marasperse") | 44.4 |

The surfactants are heated to remove free moisture, and after again being cooled they are blended with the active ingredient. The mixture is air-milled to obtain a homogeneous wettable powder of fine particle size.

A uniform field planting of sugar beets in Ohio is selected. Alternate rows are sprayed with water containing a suspension of the wettable powder described above along with a dioctyl sodium sulfosuccinate surface active agent ("Aerosol" OT). The amount of the wettable powder used is much as to provide one gram of the active compound of this invention per liter of water. The amount of "Aerosol" OT used is such as to provide 250 p.p.m. in the final spray. The spray is applied at weekly intervals at the rate of 1000 liters per hectare. The remaining rows are left unsprayed.

Twelve weeks after the initiation of the test, the sprayed rows of sugar beets are healthy and growing rapidly. The untreated rows, on the other hand, are heavily infected with the leaf spot fungus, *Cercospora beticola*. As a consequence of this fungus infection, the plants in the untreated rows are growing slowly and will clearly provide less yield.

EXAMPLE 58

The formulation of Example 57 is also useful in controlling powdery mildew of grapes caused by the fungus *Uncinula necator*. This is demonstrated by a field test in which alternate rows of grapes growing in California are sprayed with a water suspension of the wettable powder containing two grams of the active ingredient per liter. To the spray suspension is also added 300 p.p.m. of sodium N-methyl-N-oleoyl taurate ("Igepon" T 77). The sprays are applied to the treated rows weekly at the rate of 1200 liters per hectare.

Near the end of the growing season (after 14 weekly treatments) the grape vines in the treated rows are healthy and growing well. The untreated rows, however, are heavily diseased with powdery mildew and, as a consequence, growing slowly. The berries on the untreated vines are discolored and broken.

EXAMPLE 59

A dilute dust is prepared as follows:

| | |
|---|---|
| 1-(hexylcarbamoyl)-2-propionamidobenzimidazole | 5 |
| Talc | 90 |
| Synthetic fine silica | 5 |

The active ingredient and the silica are first blended and micropulverized to a particle size smaller than 25 microns and then reblended with the talc.

Sugar cane seed pieces cut in November are divided into eight lots. Four of these lots are dusted in such a way as to cover all surfaces with a dust prepared as described above. The other four lots are dusted with the inert diluent only. All lots are stored under similar conditions until the following February at which time they are examined. The four lots that had been treated with the compound of this invention are in good condition. The four unprotected lots, to the contrary, are so badly rotted by fungi of the genus Fusarium that they cannot be planted.

EXAMPLE 60

A granular formulation is prepared as follows:

Granular corn cob _____ 90
1 - (butylcarbamoyl) - 2 - propionamidobenzimidazole _____ 10

The active compound is dissolved in warm chloroform and the chloroform solution is sprayed on the granular corn cob which is being tumbled in a mixer. Evaporation of the chloroform yields a finished granule in which the active ingredient is absorbed.

A field in California is seeded with cotton in the normal manner, except that granules prepared as set forth above are added to alternate rows. These granules are dropped in such a way that some fall into the furrow and some are mixed with the covering soil. The rate of granule application is such as to employ 0.45 kilogram of active chemical of this invention per 3600 meters of row. The remaining rows are untreated.

Six weeks after planting, many of the plants in the rows without the granules are dead, and others show soreshin lesions caused by Rhizoctonia solani as well as heavy populations of the Pacific mite (Tetranychus pacificus). In the rows that had received the granules, all plants remain alive and are healthy, and further they are free of mites. The effect on mites is clearly systemic.

EXAMPLE 61

An aquous suspension concentrate is prepared as follows:

1-(butylcarbamoyl) - 2 - cyclopropylcarboxamidobenzimidazole _____ 30.00
Polyacrylic acid, sodium salt _____ 0.35
Low viscosity polyvinyl alcohol _____ 1.50
Water+(sodium hydroxide to a pH of 7.0 added last) _____ 68.15

The active compound is ground to pass a 30 mesh screen and is then mixed with the remaining formulation ingredients and sand ground to a particle size below 5 microns.

Green pine lumber coming from the saw in a mill is dipped for two minutes in a bath containing a suspension of the formulation prepared as described above. The amount of suspension concentrate used is such as to provide 400 parts per million of the active compound in the bath. Similar lumber is not dipped. All of the lumber is piled together in a seasoning yard. After three months the lumber is examined. The lumber that has been dip-treated was all bright and clean. The unprotected lumber was heavily covered with green mold (Penicillium spp.).

EXAMPLE 62

The following ingredients are converted into a dust as indicated:

1 - methylcarbamoyl - 2 - propionamidobenzimidazole _____ 20
Pyrophyllite _____ 79
Alkyl naphthalene sulfonic acid, sodium salt _____ 1

Equal parts of the active ingredient and the diluent are milled with the surfactant and then diluted with the remaining pyrophyllite in a ribbon blender. The components are then blended until they are homogeneous.

Cotton plants in selected plots are thoroughly dusted at a rate of 10 kilograms of dust per hectare for each application on June 20 and at two-week intervals thereafter until mid-August with the above dust formulation in addition to a regular insecticidal program. Similar plots receive the insecticidal application only. By late August the plots receiving the insecticide only have a high incidence of boll rot caused by Aspergillus niger and high populations of spider mites, Tetranychus spp., which cause the leaves of the cotton plants to turn rusty brown, twist and drop to the ground. Many bolls are completely rotted and loss of leaves results in the shedding of small bolls and prevents the lint from becoming fully developed. Cotton plants treated with the above dust formulation retain healthy foliage and produce a heavy crop of healthy full-sized bolls.

The following compound may be similarly formulated and when used as above gives like results:

1 - methylcarbamoyl - 2 - cyclopropylcarboxamidobenzimidazole

EXAMPLE 63

A wettable powder formulation is prepared from the following ingredients in the proportions given:

1 - (hexylcarbamoyl) - 2 - propionamidobenzimidazole _____ 25
Methyl O-(methylcarbamyl)thiolacetohydroxamate _ 10
Oleic acid ester of sodium isethionate _____ 2
Sodium lauryl sulfate _____ 2
Diatomaceous silica _____ 61

All ingredients are combined and rotated in a blender until uniformly admixed. The total mix is then air-milled to produce particles most of which are less than 40 microns in particle size.

A sufficient amount of the above wettable powder is added to water such that there are 2.5 grams per liter of water of the methyl O-(methylcarbamoyl)thiolacetohydroxamate. The resulting suspension is then sprayed at weekly intervals on one of a pair of similar, adjacent plots in a greenbean field in Florida at the rate of two kilograms of 1 - (hexylcarbamoyl)-2-propionamidobenzimidazole per hectare. The test area is selected as one in which three is a high infestation of the two-spotted mite, Tetranychus bimaculatus, and the Mexican bean beetle, Epilachna varivestis. The plot sprayed with the above formulation remains free of both the two-spotted mite and the Mexican bean beetle for the entire growing season and provides a good yield of greenbeans. The unsprayed plot is attacked by both of the above pests and is damaged to the extent that the yield is greatly reduced. Similar areas sprayed with methyl O-(methylcarbamyl) thiolacetohydroxamate alone are free from attack by the Mexican bean beetle but are damaged by the two-spotted mite.

In the above example methyl O-(carbamyl)thiolacetohydroxamate may be substituted for methyl O-methylcarbamyl)thiolacetohydroxamate with essentially equivalent results.

EXAMPLE 64

An aerosol is prepared from the following ingredients in the proportions given:

1 - (butylcarbamoyl) - 2 - propionamidobenzimidazole _____ 3.0
Methyl chloride _____ 22.0
Freon 11 (trichloromonofluoromethane) _____ 37.5
Freon 12 (dichlorodifluoromethane) _____ 37.5

The active ingredient is dissolved in the methylene chloride and then loaded into the aerosol container. This is followed by cold loading of the Freons.

Alternate rose bushes growing in a greenhouse are misted lightly at weekly intervals with the aerosol described above. After two months of this program the treated plants are healthy, with dark green attractive foliage and are growing well. The untreated plants, on the other hand, have much foliage discolored and curled due to infection by the rose powdery mildew organism, *Sphaerotheca humuli*. Other foliage on the untreated plants is yellowed due to attack by the Atlantic mite (*Tetranychus atlanticus*). Due to the extensive foliage damage, the plants not treated with the compound of this invention grow more slowly than the protected plants.

The following compound may be similarly formulated and when used as above gives good results:

1-(methylcarbamoyl)-2-propionamidobenzimidazole

EXAMPLE 65

The compounds of Examples 1 through 12 can also be formulated as a 0.52% solution in methylene chloride or chloroform.

The above aerosol is sprayed on oranges, which are then inoculated with *Penicillium digitatum*. Ten days later, the treated fruit is free of disease whereas untreated fruit is covered with green mold.

EXAMPLE 66

The following formulation is prepared by intimately blending the ingredients and grinding the blend in an air attrition mill until the particle size is substantially less than 5 microns and then reblending.

| | |
|---|---|
| Methyl 1 - (butylcarbamoyl) - 2 - benzimidazolecarbamate | 50 |
| "Rhodamin" B Extra | 2 |
| "Tergitol" 12–T–9 (dodecyl phenol reacted with 9 moles of ethylene oxide) | 3 |
| Sodium lignin sulfonate | 5 |
| "Ser-X" (serite) | 40 |

The above formulation is applied to wheat seed infested with covered smut (*Tilletia caries; Tilletia foetida*), and loose smut (*Ustilago tritici*) at the rate of hree ounces per bushel in standard dust treating equipment. Arasan ® 75 is added simultaneously at the rate of 1 oz./bushel, for additional protection against pythium. The seed is planted, and examination of the crop at maturity reveals excellent control of these disease organisms.

This formulation may likewise be used to control covered and loose smut of oats, barley, and covered smut of sorghum. It may also be used as a slurry treatment if so desired.

EXAMPLE 67

The following formulation is prepared by mixing the active ingredients, blending and micropulverizing.

| | |
|---|---|
| Methyl 1 - (butylcarbamoyl) - 2 - benzimidazolecarbamate | 50 |
| "Ser-X" (serite) | 50 |

The above formulation is applied as a drill box treatment at the rate of 3 oz./bu. to sorghum. The dust and seed are well mixed as they are added to the drill box. As the seed is drilled into the soil, it is coated with the dust treatment and excess dust falls into the drill row. The sorghum germinates and grown well giving an excellent yield of seed. Excellent control of covered smut (*Sphacelotheca sorghi*) is obtained.

EXAMPLE 68

A dust formulation is prepared from the following ingredients by blending and double micropulverizing:

| | |
|---|---|
| Methyl 1 - (butylcarbamoyl) - 2 - benzimidazolecarbamate | 10.5 |
| Sodium lignin sulfonate ("Marasperse" N–22) | 89.5 |

This formulation is thoroughly mixed with several portions of a commercial protein dairy feed mixture at rates of from 0.01% (0.2 pound per ton of feed) to 0.2% (4 pounds per ton of feed). At these rates, excellent control of mold growth is obtained.

At rates of 0.08% and above, mold growth is prevented for 26 days with only a trace of ammonia evolution. Under similar conditions in an identical but untreated feed sample, mold growth is observed after 12 days and at this time substantial ammonia evolution is observed.

All of the compounds of this invention can be formulated and mixed with feeds such as that described above, or with newly harvested grains, such as corn or sorghum for the prevention of their spoilage when used as animal feeds.

EXAMPLE 69

The wettable powder formulation of Example 53 is diluted with calcium carbonate coated with about 1% propionic acid to form a 10% powder. This powder is substituted for the dust formulation of Example 68 with similar results.

EXAMPLE 70

A canvas bag containing about 3 pounds of 1-(butylcarbamoyl)-2-benzimidazolecarbamic acid, methyl ester (I), is suspended in the aeration tank of an activated sludge sewerage treatment plant. The tank is filled with material from a settling tank and recycled sludge. Air enters the tank at the bottom and rises through the activated sludge as a series of fine bubbles. The action of the bubbles causes mixing to occur as I dissolves, and it is thoroughly mixed throughout the tank. Normally, the sewage would remain in the aeration tank for a period of 9–10 hours. However, the addition of I permits removal of the material from the tank after only 7 to 8 hours. Because the additive is so insoluble, the actual concentration achieved is 1–3 p.p.m.

EXAMPLE 71

A mixture containing 1.0% of 1-(p-nitrophenyl-carbamoyl)-2-benzimidazolecarbamic acid, methyl ester (II), and urea is prepared by adding 1 part of II to 99 parts of shotted urea in a Patterson-Kelly twin shell dry blender. The urea is uniformly coated with II.

The mixture is tested to show its effect on corn grown in Canada where the growing season is short. The entire test plot is prepared by applying a broadcast application of 329 lbs./A of 0–14–14 fertilizer to a nitrogen deficient area. Conventional procedures are used to prepare the ground and for planting the corn. The mixture is applied at rates to supply 0, 80 and 160 lbs. of nitrogen/A. Control plots are prepared in a similar manner using untreated shotted urea. The entire area is disced, harrowed and planted to corn with a single row planter.

The corn germinates and grows well on all plots, but during the early season growth, the corn treated with II appears to grow more vigorously. As the season progresses, the corn treated with II continues to appear marginally better than that in the control plots. A good yield of corn is obtained from the treated plots.

EXAMPLE 72

The compounds of this invention are useful for the treatment of helminth infections of economically important farm animals.

When (1-butylcarbamoyl)-2-benzimidazolecarbamic acid, methyl ester is administered orally to sheep at 15 mg./kg. in the form of a drench or capsule, Haemonchus, Ostertagia, Strongyloides, Cooperia and other helminths of the abomasum, small and large intestines are removed.

When cattle are treated with 20 mg./kg. of this compound adminstered orally in the form of a drench or capsule, Ostertagia, Cooperia, Strongyloides and other helminth parasites are eliminated from the treated animals.

Equally satisfactory results are obtained against infections in swine with *Ascaris suum, Strongyloides ransomi* and *Trichuris suis* from treatment by a dosage in the form of a capsule at 30 mg./kg. Incorporation of (1-butylcarbamoyl)-2-benzimidazolecarbamic acid, methyl ester in swine feed at 0.05% is successful in suppressing the verminous pneumonia of pigs challenged with living ova of *A. suum*.

Chickens are cleared of helminth infections with *Ascaridia galli* and *Heterakis gallinae* by adding 0.05% of the subject compound to the poultry feed and feeding the infected birds for 24 hours on this ration.

EXAMPLE 73

A wettable powder formulation is prepared as follows:

| | |
|---|---|
| 1-(trichloromethylthio)-2-benzimidazole-carbamic acid, methyl ester | 70.0 |
| Diatomaceous earth | 28.7 |
| Alkylaryl sodium sulfonates | 1.0 |
| Methyl cellulose | 0.3 |

The above ingredients are blended and micropulverized to a particle size below 50 microns, followed by reblending.

The wettable powder thus prepared is added to water at the rate of 454 grams of the active ingredient per 378 liters of water. A modified phthalic glycerol alkyd resin surface active agent is added in an amount to give 400 p.p.m. in the final spray. This suspension is used to spray, to the point of run-off, alternate trees in a field planting of apples. Sprays are applied at weekly intervals from April 25 until June 6. From June 6 until the end of the season, the sprays are applied at intervals of two weeks. The remaining trees in the planting are left unsprayed.

In early September all trees are carefully examined. Trees that were sprayed with the compound of this invention are healthy and free of mite infestation and fungus damage. The fruit on the sprayed trees is unblemished and of good size. The foliage of the unsprayed trees, on the other hand, is heavily infested with the apple scab fungus (*Venturia inaequalis*) and the powdery mildew fungus (*Podosphaera leucotricha*). Also the leaves of the unsprayed plants are badly infested with European red mites (*Panonychus ulmi*). The fruit on the unsprayed trees is spotted with scab and of small size.

The following compounds may be similarly formulated and when used as above give similar results 1-(trichloromethylthio)-2-benzimidazolecarbamic acid, ethyl ester 1-(trichloromethylthio)-2-benzimidazolecarbamic acid, n-propyl ester

EXAMPLE 74

The following formulation is prepared by intimately blending the ingredients and grinding the blend in an air attrition mill until the particle size is substantially less than 5 microns and then reblending.

| | |
|---|---|
| 1-(trichloromethylthio)-2-benzimidazolecarbamic acid, n-butyl ester | 85.0 |
| Alkylnaphthalene sulfonic acid, sodium salt | 1.5 |
| Sodium N-methyl-N-oleoyl taurate | 2.0 |
| Synthetic fine silica | 11.5 |

Four similar potted bean plants (one plant per pot) are selected. The soil in two of these pots is drenched with a water suspension of the wettable powder formulation described above at a rate to provide 30 parts per million by weight in the total amount of soil in the pot. The remaining two pots are left untreated.

Five days after treatment 50 adult mites (*Tetranychus telarius*) are placed on a terminal leaf on each of the test plants. Twenty-four hours later these adult mites, all still alive, are transferred to untreated bean foliage. After another twenty-four hours all of the adult mites are removed in a way which causes no damage to the eggs that have been laid during the twenty-four hour period on the untreated foliage.

The number of eggs laid by each batch of 50 mites is essentially the same. A sufficient time is allowed for all viable eggs to hatch. Counts demonstrate that one of the eggs hatch from among those laid by mites that had fed on foliage from pots with soil containing the compound of this invention. Hatch to provide living young was complete, on the other hand, among eggs laid by mites similarly handled except that the plants providing sustenance were not in contact with a compound of this invention. This experiment demonstrates systemic movement in plants and mite ovicide effect.

EXAMPLE 75

A wettable powder formulation is prepared from the following ingredients:

| | |
|---|---|
| 1-(trichloromethylthio)-2-benzimidazolecarbamic acid, propyl ester | 50.0 |
| Kaolinite | 45.0 |
| Sodium lignin sulfonate | 1.0 |
| Dioctyl sodium sulfosuccinate | 2.0 |
| Finely divided synthetic silica | 2.0 |

These ingredients are mixed, blended and micronized to a particle size below 10 microns, followed by reblending.

A uniform field planting of cantaloupe in North Carolina is inoculated with the powdery mildew fungus (*Erysiphe cichoracearum*). After 10 days this organism has become well established in the plants. At this time alternate rows are sprayed with water containing a suspension of the wettable powder prepared as described above and an added amount of a polyhydric alcohol ester surface active agent ("Trem" 014). The concentration of this chemical suspension is such as to give 227 grams of the active compound of this invention per 378 liters of water (0.06%) and 400 p.p.m. of the surfactant. The spray is applied at a volume of 1410 liters per hectare. The remaining rows are left unsprayed.

After another 15 days the unsprayed rows are heavily damaged by powdery mildew and some of the plants are dying. The sprayed rows, however, are healthy and growing rapidly. The results indicate that the active compound of the suspension acts as a curative fungicide.

EXAMPLE 76

A dust concentrate is prepared as follows:

| | |
|---|---|
| 1-(trichloromethylthio)-2-benzimidazolecarbamic acid, methyl ester | 80 |
| Synthetic fine silica | 20 |

The above ingredients are blended and milled to a particle size below 10 microns, followed by reblending.

Two experimental lots of house paint are prepared in a similar manner except that 0.5% by weight of the active compounds of this formulation is milled with the dry ingredients in one lot, whereas none of the concentrate was added to the other lot. Test boards were painted with each lot. After one year of exposure in Florida, the board with the paint to which the concentrate was not added was badly stained by fungus growth including species of Penicillium and other genera. The board with the paint containing the compound of this invention remained bright.

EXAMPLE 77

The following formulation is prepared by intimately blending the ingredients and grinding the blend in an air attrition mill until the particle size is substantially less than 5 microns and then reblending.

| | |
|---|---|
| 1-(trichloromethylthio)-2-benzimidazole carbamic acid, sec-butyl ester | 50.0 |
| Dioctyl sodium sulfosuccinate | 1.0 |
| Low viscosity methylcellulose | 0.3 |
| Silica | 48.7 |

Acid delinted cotton seed, already treated with 85 grams of tetramethylthiuram disulfide per 45.3 kilograms of seed, is overtreated in a slurry treater with the formulation described above, in such a way as to provide 113 grams of the active ingredient per 45.3 kilograms of seed. A similar lot of seed, treated with tetramethylthiuram disulfide only, is used for purposes of comparison. The two lots of seed are planted in alternating rows in the same field. The seed treated with tetramethylthiuram disulfide only emerges to a good stand but many seedlings die later due to *Rhizoctonia solani*, and growth of the surviving plants is poor. Most of the seedlings that do survive exhibit soreshin lesions caused by Rhizoctonia. The seeds overtreated with the above formulation, on the other hand, result in a stand that suffers little post-emergence damping off and grows rapidly.

EXAMPLE 78

A granular formulation is prepared as follows:

Granular corn cob (15–30 mesh) _____ 90
1-(trichloromethylthio)-2-benzimidazolecarbamic
  acid, isopropyl ester _____ 10

The active compound is dissolved in warm chloroform and the chloroform solution is sprayed on the granular corn cob which is being tumbled in a mixer. Evaporation of the chloroform yields a finished granule in which the active ingredient is absorbed.

A field in California is seeded with cotton in the normal manner, except that granules prepared as set forth above are added to alternate rows. These granules are dropped in such a way that some fall into the furrow and some are mixed with the covering soil. The rate of granule application is such as to employ 0.45 kilogram of active chemical of this invention per 3,600 meter of row. The remaining rows are untreated.

Six weeks after planting, many of the plants in the rows without the granules are dead, and other show soreshin lesions caused by *Rhizoctonia solani* as well as heavy populations of the Pacific mite (*Tetranychus pacificus*). In the rows that had received the granules, all plants remain alive and are healthy, and further they are free of mites. The effect on mites is clearly systemic.

The following compound may be similarly formulated and when used as above gives similar results.

1 - (trichloromethylthio)-2-benzimidazolecarbamic acid, isopropyl ester

EXAMPLE 79

The following formulation is prepared by intimately blending the following ingredients and micropulverizing them until the particles are substantially all below 20 microns.

1-(trichloromethylthio)-2-benzimidazolecarbamic
  acid, methyl ester _____ 50.0
Oleic acid ester of sodium isethionate _____ 2.0
Sodium lauryl sulfate _____ 1.0
Synthetic fine silica _____ 47.0

The above 50% wettable powder formulation is dispersed in water to give an active ingredient concentration of 3.6 grams per liter of water. Eight uniform apple trees of the same variety are selected for testing. Four of these are sprayed to run-off, which is approximately 2850 liters per hectare, at weekly intervals during the growing season with the above formulation, and the other four trees are left unsprayed.

By the end of the season the unsprayed trees have developed very high populations of orchard mites and are highly infected with apple scab, *Venturia inaequalis*. Due to the feeding of the mites, the foliage is russeted and drops prematurely. Also, the untreated trees have poor twig growth and small, spotted fruit. The trees sprayed with 1 - (trichloromethylthio)-2-benzimidazolecarbamic acid, methyl ester are essentially free of mites, their eggs and apple scab. As a result of the excellent mite control, the sprayed trees have foliage of a thrifty, dark green color, and they exhibit good twig growth and fruit size.

Any of the compounds named in Examples 13 and 16 may be formulated as described in this example and when used as indicated give similar results.

EXAMPLE 80

A wettable powder formulation is prepared from the following ingredients in the proportions given:

1-(trichloromethylthio)-2-benzimidazolecarbamic
  acid, isopropyl ester _____ 25
Methyl O-(methylcarbamyl)thiolacetohydroxamate __ 10
Oleic acid ester of sodium isethionate _____ 2
Sodium lauryl sulfate _____ 2
Diatomaceous silica _____ 60

All ingredients are combined and rotated in a blender until uniformly admixed. The total mix is then air-milled to produce particles most of which are less than 10 microns in particle size.

A sufficient amount of the above wettable powder is added to water such that there are 2.5 grams per liter of water of the methyl O-(methylcarbamoyl)thioacetohydroxamate. The resulting suspension is then sprayed at weekly intervals on one of a pair of similar, adjacent plots in a greenbean field in Florida at the rate of two kilograms of 1-(trichloromethylthio)-2-benzimidazolecarbamic acid, isopropyl ester per hectare. The test area is selected as one in which there is a high infestation of the two-spotted mite, *Tetranychus bimaculatus*, and the Mexican bean beetle, *Epilachna varivestis*. The plot sprayed with the above formulation remains free of both the two-spotted mite and the Mexican bean beetle for the entire growing season and provides a good yield of greenbeans. The unsprayed plot is attacked by both of the above pests and is damaged to the extent that the yield is greatly reduced. Similar areas sprayed with methyl O-(methylcarbamyl)thioacetoxydroxamate alone are free from attack by the Mexican bean beetle but are damaged by the two-spotted mite.

In the above example methyl O-(carbamyl)thiolacetohydroxamate may be substituted for methyl O-(methylcarbamyl)thiolacetohydroxamate with essentially equivalent results.

EXAMPLE 81

A wettable powder formulation is prepared from the following ingredients in the proportions given:

1-(trichloromethylthio) - 2 - benzimidazolecarbamic
  acid, n-propyl ester _____ 30.0
Methoxychlor _____ 30.0
Sodium lauryl sulfate _____ 1.0
Oleic acid ester of sodium isethionate _____ 2.0
Non-swelling montmorillonite clay _____ 37.0

All of the ingredients are combined and rotated in a blender until uniformly mixed. The total mix is then air-milled to produce particles essentially less than 40 microns in size.

The wettable powder prepared above is added to water in an amount such that there are 2.5 grams of each of the active ingredients per liter of water. The resulting suspension is sprayed at the rate of 10 kilograms per hectare for each of the active ingredients over a plot in a Bermudagrass turf area in Florida. The area selected for the test is heavily infested with a plant-feeding mite, *Aceria neocynodomis*, and chinch bugs, *Blissus leucopterus insularis*. The chinch bugs are killed in the treated plot and the mite infestation soon disappears. The turf quickly returns to a healthy and attractive condition.

In a similar untreated plot both the mites and the chinch bugs continue to multiply and, by their feeding, the Bermudagrass becomes discolored and the turf reflects many unsightly dead spots. Similar plots sprayed with methoxychlor only are free of damage due to chinch bugs but are injured by the high mite infestation.

The following compounds may be similarly formulated and when used as above give similar results.

1-(trichloromethylthio) - 2 - benzimidazolecarbamic acid, methyl ester 1-(trichloromethylthio) - 2 - benzimidazolecarbamic acid, ethyl ester

EXAMPLE 82

A dilute dust is prepared as follows:

Dust concentrate formulation of Example 76 _____ 10
Tobacco dust _____ 90

The above ingredients are blended to form a free flowing dust.

A uniform cherry orchard in Michigan is selected for the test. Alternate trees are dusted every 14 days at the rate of 910 grams per tree with the above fungicidal dust formulation. The remaining trees are left unprotected. On Sept. 1 the trees are examined. The trees that had been dusted with the compound of this invention are green and healthy, with all leaves remaining on the tree. At this time the foliage of the unprotected trees is largely discolored due to attack by the leaf spot fungus (*Coccomyces hiemalis*) and the two-spotted mite (*Tetranychus telarius*). Further much of the foliage of the unprotected trees has fallen due to the effect of the two pests.

The following compounds may be similarly formulated and when used as above give like results.

1-(trichloromethylthio) - 2 - benzimidazolecarbamic acid, n-butyl ester 1-(trichloromethylthio) - 2 - benzimidazolecarbamic acid, methyl ester

EXAMPLE 83

The following ingredients are converted into a dust as indicated:

1 - (trichloromethylthio) - 2 - benzimidazolecarbamic acid, isobutyl ester _____ 20
Pyrophyllite _____ 79
Alkylnaphthalene sulfonic acid, sodium salt _____ 1

Equal parts of the active ingredient and the diluent are milled with the surfactant and then diluted with the remaining pyrophyllite in a ribbon blender. The components are then blended until they are homogeneous.

Cotton plants in selected plots are thoroughly dusted at a rate of 10 kilograms of dust per hectare for each application on June 20 and at two-week intervals thereafter until mid-August with the above dust formulation in addition to a regular insecticidal program. Similar plots receive the insecticidal application only. By late August the plots receiving the insecticide only have a high incidence of boll rot caused by *Aspergillus niger* and high populations of spider mites, *Tetranychus spp.*, which cause the leaves of the cotton plants to turn rusty brown, twist and drop to the ground. Many bolls are completely rotted and loss of leaves results in the shedding of small bolls and prevents the lint from becoming fully developed. Cotton plants treated with the above dust formulation retain healthy foliage and produce a heavy crop of healthy full-size-bolls.

The following compounds may be similarly formulated and when used as above give like results.

1-(trichloromethylthio) - 2 - benzimidazolecarbamic acid, sec-butyl ester 1-(trichloromethylthio) - 2 - benzimidazolecarbamic acid, isopropyl ester

EXAMPLE 84

A dust formulation is prepared from the following ingredients in the proportions listed:

1 - (trichloromethylthio) - 2 - benzimidazolecarbamic acid, sec-butyl ester _____ 5

Methoxychlor _____ 5
Sodium alkylnaphthalenesulfate _____ 1
Pyrophyllite clay _____ 89

The above ingredients are combined and rotated in a blender until uniformly mixed. The composition is then air-milled to produce particles essentially less than 50 microns in diameter. The above-prepared dust is then applied to a special planting of tea roses. The planting consists of uniform plots each with three varieties of rose. The test period extends from June 1 through August 31. At the end of the test period the roses in all unprotected plots are seriously damaged by the spider mite, *Tetranychus telarius*, the rose blackspot, *Diplocarpon rosae*, and the Japanese beetle, *Popillia japonica*. Randomly selected plots dusted at weekly intervals with the above prepared composition to the extent that thorough coverage of the plant is obtained with the formulation, remain free from damage, and produce good yields of bloom throughout the test period.

Plots treated with a dust containing methoxychlor, but without the 1 - (trichloromethylthio) - 2 - benzimidazolecarbamate acid, sec-butyl ester show no Japanese beetle injury. However, they are seriously damaged by mites and blackspot.

The following compounds may be similarly formulated and when used as above give like results.

1-(trichloromethylthio)-2-benzimidazolecarbamic acid, sec-butyl ester 1-(trichloromethylthio)-2-benzimidazolecarbamic acid, propyl ester

EXAMPLE 85

A dilute dust is prepared as follows:

1 - (trichloromethylthio) - 2 - benzimidazolecarbamic acid, butyl ester _____ 5
Synthetic fine silica _____ 5
Talc _____ 90

The active ingredient and the silica are first blended and micropulverized to a particle size smaller than 25 microns, and then blended with the talc.

Sugar cane seed pieces cut in November are divided into eight lots. Four of these lots are dusted in such a way as to cover all surfaces with a dust prepared as described above. The other four lots are dusted with the inert diluent only. All lots are stored under similar conditions until the following February at which time they are examined. The four lots that had been treated with the compound of this invention are in good condition. The four unprotected lots, to the contrary, are so badly rotted by fungi of the genus Fusarium that they cannot be planted.

EXAMPLE 86

An aqueous suspension concentrate is prepared as follows:

1 - (trichloromethylthio) - 2 - benzimidazolecarbamic acid, methyl ester _____ 30.00
Polyacrylic acid, sodium salt _____ 0.35
Low viscosity polyvinyl alcohol _____ 1.50
Water+(sodium hydroxide at a pH of 7.0 added last) _____ 68.15

The active component is ground to pass a 30 mesh screen and is then mixed with the remaining formulation ingredients and milled in a sand grinder until the particle size is below 5 microns.

Six field crates of oranges are picked from a commercial grove in Florida. Three of these crates are dipped for three minutes in a water bath containing a suspension made from the above formulation, in an amount to give 300 parts per million by weight of the active ingredient of this invention. A polyethylene glycol ester of oleic acid surface active agent is present at the rate of 150 p.p.m. of total liquid. The remaining three crates are dipped in a similar fashion in water with the surface active agent only. All crates are set aside in a citrus storage house for three weeks. At the end of this time all fruit are examined. The fruit that has been dip-treated with the compounds of this invention is still in good condition, but the fruit that is not so protected is largely rotted by the blue mold fungus (*Penicillium digitatum*).

The following compounds can be similarly formulated and when used as above, give like results.

1,3-bis(trichloromethylthio)-$\Delta^{2,N}$-2-benzimidazoline-carbamic acid, methyl ester
1-trichloromethylthio-2-benzimidazolinecarbamic acid, methyl ester
1-(o-nitrophenylthio)-2-benzimidazolecarbamic acid, isopropyl ester
1-(2,4-dinitrophenylthio)-2-benzimidazolecarbamic acid, isobutyl ester
1-(2,4-dinitrophenylthio)-2-benzimidazolecarbamic acid, isopropyl ester
1-(2,4-dinitrophenylthio)-2-benzimidazolecarbamic acid, ethyl ester
1-(trichloromethylthio)-2-benzimidazolecarbamic acid, ethyl ester
1-(methylcarbamoyl)-3-(trichloromethylthio)-$\Delta^{2,N}$-benzimidazoline-2-carbamic acid, methyl ester
1-(2,4-dinitrophenylthio)-2-benzimidazolecarbamic acid, methyl ester
1-(benzylthio)-2-benzimidazolecarbamic acid, methyl ester
1-(trifluoromethylthio)-2-benzimidazolecarbamic acid, methyl ester
1-(butylthio)-2-benzimidazolecarbamic acid, methyl ester

EXAMPLE 87

An aqueous suspension concentrate is prepared as follows:

1 - (trichloromethylthio) - 2 - benzimidazolecar-
bamic acid, isopropyl ester ------------------ 30.00
Polyacrylic acid, sodium salt ------------------ 0.35
Low viscosity polyvinyl alcohol --------------- 1.50
Water+(sodium hydroxide to a pH of 7.0 added last) --------------------------------- 68.15

The active compound is ground to pass a 30 mesh screen and is then mixed with the remaining formulation ingredients and sand ground to a particle size below 5 microns.

Green pine lumber coming from the saw in a mill is dipped for two minutes in a bath containing a suspension of the formulation prepared as described above. The amount of suspension concentrate used is such as to provide 400 parts per million of the active compound in the bath. Similar lumber is not dipped. All of the lumber is piled together in a seasoning yard. After three months the lumber is examined. The lumber that has been dip-treated was all bright and clean. The unprotected lumber was heavily covered with green mold (Penicillium spp.).

EXAMPLE 88

An aerosol is prepared from the following ingredients in the proportions given:

1-(trichloromethylthio) - 2 - benzimidazolecarbamic acid, sec-butyl ester ------------------------- 3.0
Methylene chloride ---------------------------- 22.0
Freon 11 (trichloromonofluoroethane) --------- 37.5
Freon 12 (dichlorodifluoromethane) ----------- 37.5

The active ingredient is dissolved in the methylene chloride and then loaded into the aerosol container. This is followed by cold loading of the Freons.

Alternate rose bushes growing in a greenhouse are misted lightly at weekly intervals with the aerosol described above. After two months of this program the treated plants are healthy, with dark green attractive foliage and are growing well. The untreated plants, on the other hand, have much foliage discolored and curled due to infection by the rose powdery mildew organism, *Sphaerotheca humuli*. Other foliage on the untreated plants is yellowed due to attack by the Atlantic mite (*Tetranychus atlanticus*). Due to the extensive foliage damage, the plants not treated with the compound of this invention grow more slowly than the protected plants.

The following compounds may be similarly formulated and when used as above give good results:

1 - (trichloromethylthio)-2-benzimidazolecarbamic acid, isobutyl ester
1 - (trichloromethylthio)-2-benzimidazolecarbamic acid, isopropyl ester

EXAMPLE 89

The following formulation is prepared by intimately blending the ingredients and grinding the blend in an air attrition mill until the particle size is substantially less than 5 microns and then reblending.

1-(trichloromethylthio) - 2 - benzimidazolecarbamic
  acid, methyl ester --------------------------- 50
"Rhodamin" B Extra --------------------------- 2
Sodium lignin sulfonate ------------------------ 5
"Ser-X" (serite) ------------------------------ 40
"Tergitol" 12–T–9 (dodecylphenol reacted with 9
  moles of ethylene oxide) --------------------- 3

The above formulation is applied as a dust to oats naturally infested with *Helminthosporium victoriae* at the rate of 1 oz. per bushel. The treated infested seed is planted, and germinates into a healthy stand of seedlings. Excellent control of the disease is obttined.

EXAMPLE 90

Any of the compounds named in Examples 13 to 16 can be formulated as a 0.5–2% solution in methylene chloride or chloroform.

The above solution is sprayed on oranges, which are then inoculated with *Penicillium digitatum*. Ten days later, the treated fruit is free of disease where as untreated fruit is covered with green mold.

EXAMPLE 91

A wettable powder formulation is prepared as follows:

Parts
1,3-bis(trichloromethylthio( - $\Delta^{2,N}$-2 - benzimidazo-
  linecarbamic acid, methyl ester (IIIa) -------- 70.0
Alkylaryl sodium sulfonates -------------------- 1.0
Methyl cellulose ----------------------------- 0.3

The above ingredients are blended and micropulverized to a particle size below 50 microns.

The wettable powder is added to water at the rate of 454 gms. of active ingredient per 378 liters of water. This material was tested in an early fall application of a nitrogen fertilizer on turf in Delaware. In this case, two 1000 sq. ft. plots of Marion Blue Grass was selected and fertilized by spreading "Uramite" so as to apply 2 lbs. N/1000 sq. ft. One plot was left untreated, but the other plot was sprayed with the above wettable powder formulation to apply about 0.03 lb. IIIa per 1000 sq. ft. Both plots respond to the nitrogen treatment and grow well, but the plot treated with IIIa appears to grow faster and to be greener. When the grass is cut and the clippings accumulated, it is confirmed that IIIa accelerated the growth of the turf.

EXAMPLE 92

The procedure of Example 91 is repeated, except that the aqueous suspension is prepared with 1-(2,4-dinitrophenylthio)-2-benzimidazolecarbamic acid, methyl ester in place of IIIa of that example. Similar results are obtained.

The effectiveness of the compounds of Formula III in preventing mite reproduction, controlling mite infestation, and controlling fungus diseases is clearly demonstrated by the field and laboratory tests of the following examples.

EXAMPLE 93

The following formulation is prepared by intimately blending the ingredients and grinding the blend in an air attrition mill until the particle size is substantially less than 5 microns and then reblending.

2-(methoxycarbonylamino - 1 - thiolbenzimidazole-
  carboxylic acid, methyl ester _____ 85.0
Alkyl naphthalene sulfonic acid, sodium salt _____ 1.5
Sodium-N-methyl-N-oleoyl taurate _____ 2.0
Synthetic fine silica _____ 11.5

Four similar potted bean plants (one plant per pot) are selected. The soil in two of these pots is drenched with a water suspension of the wettable powder formulation described above at a rate to provide 30 parts per million by weight in the total amount of soil in the pot. The remaining two pots are left untreated. Five days after treatment 50 adult mites (*Tetranychus telarius*) are placed on a terminal leaf on each of the test plants. Twenty-four hours later these adult mites, all still alive, are transferred to untreated bean foliage. After another twenty-four hours all of the adult mites are removed in a way which causes no damage to the eggs that have been laid during the twenty-four hour period on the untreated foliage. The number of eggs laid by each batch of 50 mites is essentially the same. A sufficient time is allowed for all viable eggs to hatch.

Counts demonstrate that none of the eggs hatch from among those laid by mites that had feed on foliage from pots with soil containing the compound of this formulation. Hatch to provide living young was complete, on the other hand, among eggs laid by mites similarly handled except that the plants providing sustenance were not in contact with the compound of this formulation. This experiment demonstrates systemic movement in plants and mite ovicide effect.

The following compounds may be similarly formulated and when used as above give similar results.

2-(methoxycarbonylamino)-1-thiolbenzimidazolecarboxylic acid, isopropyl ester
2-(ethoxycarbonylamino)-1-thionobenzimidazolecarboxylic acid, methyl ester

EXAMPLE 94

A wettable powder formulation is prepared from the following ingredients in the proportions given:

2 - (methoxycarbonylamino) - 1 - thionobenzimid-
  azolecarboxylic acid, ethyl ester _____ 30
Methoxychlor _____ 30
Sodium lauryl sulfate _____ 1
Oleic acid ester of sodium isethionate _____ 2
Non-swelling montmorillonite clay _____ 37

All the ingredients are combined and rotated in a blender until uniformly mixed. The total mix is then air-milled to produce particles essentially less than 40 microns in size.

The wettable powder prepared above is added to water in an amount such that there are 2.5 grams of each of the active ingredients per liter of water. The resulting suspension is sprayed at the rate of 10 kilograms per hectare for each of the active ingredients over a plot in a Bermuda-grass turf area in Florida. The area selected for the test is heavily infested with a plant-feeding mite, *Aceria neocynodomis*, and chinch bugs, *Blissus leucopterus isularis*. The chinch bugs are killed in the treated plot and the mite infestation soon disappears. The turf quickly returns to a healthy and attractive condition. In a similar untreated plot both the mites and the chinch bugs continue to multiply and, by their feeding, the Bermuda grass becomes discolored and the turf reflects many unsightly dead spots. Similar plots sprayed with methoxychlor only are free of damage due to chinch bugs but are injured by the high mite infestation.

The following compounds may be similarly formulated and when used as above give similar results.

2-(methoxycarbonylamino)-1-thionobenzimidazolecarboxylic acid, methyl ester
2-(methoxycarbonylamino)-1-thionobenzimidazolecarboxylic acid, butyl ester

EXAMPLE 95

A wettable powder formulation is prepared from the following ingredients in the proportions given:

2 - (methoxycarbonylamino) - 1 - thiolbenzimid-
  azolecarboxylic acid, propyl ester _____ 25
Methyl O-(methylcarbamyl)thiolacetohydroxamate __ 10
Oleic acid ester of sodium isethionate _____ 2
Sodium lauryl sulfate _____ 2
Diatomaceous silica _____ 61

All ingredients are combined and rotated in a blender until uniformly admixed. The total mix is then air-milled to produce particles most of which are less than 10 microns in particle size.

A sufficient amount of the above wettable powder is added to water such that there are 2.5 grams per liter of water of the methyl O-(methylcarbamyl)thiolacetohydroxamate. The resulting suspension is then sprayed at weekly intervals on one of a pair of similar, adjacent plots in a greenbean field in Florida at the rate of two kilograms of 2-(methoxycarbonylamino)-1-thiolbenzimidazolecarboxylic acid, propyl ester per hectare. The test area is selected as one in which there is a high infestation of the two-spotted mite, *Tetranychus bimaculatus*, and the Mexican bean beetle, *Epilachna varivestis*. The plot sprayed with the above formulation remains free of both the two-spotted mite and the Mexican bean beetle for the entire growing season and provides a good yield of greenbeans. The unsprayed plot is attacked by both of the above pests and is damaged to the extent that the yield is greatly reduced. Similar areas sprayed with methyl O-(methylcarbamyl)thiolacetohydroxamate alone are free from attack by the Mexican bean beetle but are damaged by the two-spotted mite.

In the above example methyl O-(carbamyl)thiolacetohydroxamate may be substituted for methyl O-(methylcarbamyl)thiolacetohydroxamate with essentially equivalent results.

EXAMPLE 96

A wettable powder formualtion is prepared from the following ingredients:

2 - (methoxycarbonylamino) - 1 - thionobenzimid-
  azolecarboxylic acid, propyl ester _____ 50.0
Kaolinite _____ 45.0
Sodium lignin sulfonate _____ 1.0
Dioctyl sodium sulfosuccinate _____ 2.0
Finely divided synthetic silica _____ 2.0

These ingredients are mixed, blended and micronized to a particle size below 10 microns, followed by reblending.

A uniform field planting of cantaloupe in North Carolina is inoculated with the powdery mildew fungus (*Erysiphe cichoracearum*). After 10 days this organism has become well established in the plants. At this time alternate rows are sprayed with water containing a suspension of the wettable powder prepared as described above and an added amount of a polyhydic alcohol ester surface active agent. The concentration of this chemical suspension is such as to give 227 grams of the active compound of this formulation per 378 liters of water (0.06%) and 400 p.p.m. of the extra surfactant. The spray is applied at a volume of 1410 liters per hectare. The remaining rows are left unsprayed. After another 15 days the unsprayed rows are heavily damaged by powdery mildew and some of the plants are dying. The sprayed rows, however, are healthy and growing rapidly.

The results indicate that the compound of this invention acts as a curative fungicide.

EXAMPLE 97

A wettable powder formulation is prepared as follows:

| | |
|---|---|
| 2 - (methoxycarbonylamino) - 1 - thionobenzimidazolecarboxylic acid, butyl ester | 70.0 |
| Diatomaceous earth | 28.7 |
| Alkylaryl sodium sulfonates | 1.0 |
| Methyl cellulose | 0.3 |

The above ingredients are blended and micropulverized to a particle size below 50 microns, followed by reblending.

The wettable powder is added to water at the rate of 454 grams of the active ingredient per 378 liters of water. A modified phthalic glycerol alkyd resin surface active agent ("Triton" B 1956) is added in an amount to give 400 p.p.m. in the final spray. This suspension is used to spray (to the point of run-off) alternate trees in a field planting of apples. Sprays are applied at weekly intervals from April 25 until June 6. From June 6 until the end of the season, the sprays are applied at intervals of two weeks. The remaining trees in the planting are left unsprayed.

In early September all trees are carefully examined. Trees that were sprayed with the compound of this invention are healthy and free of mite infestation and fungus damage. The fruit on the sprayed trees is unblemished and of good size. The foilage of the unsprayed trees, on the other hand, is heavily infested with the apple scab fungus (*Venturia inaequalis*) and the powdery mildew fungus (*Podosphaera leucotricha*). Also, the leaves of the unsprayed plants are bady infested with European red mites (*Panonychus ulmi*). The fruit on the unsprayed trees is spotted with scab and of small size.

The following compounds may be similarly formulated and when used as above give similar results.

2-(isopropoxycarbonylamino)-1-thionobenzimidazolecarboxylic acid, methyl ester 2-(isopropoxycarbonylamino)-1-thiolbenzimidazolecarboxylic acid, methyl ester

EXAMPLE 98

The following formulation is prepared by intimately blending the ingredients and grinding the blend in an air attrition mill until the particle size is substantially less than 5 microns and then reblending.

| | |
|---|---|
| 2 - (butoxycarbonylamino)-1-thionobenzimidazolecarboxylic acid, methyl ester | 50.0 |
| Dioctyl sodium sulfosuccinate | 1.0 |
| Low viscosity methylcellulose | 0.3 |
| Silica | 48.7 |

Acid delinted cotton seed already treated with 85 grams of tetramethylthiuram disulfide per 45.3 kilograms of seed is overtreated in a slurry treater with the formulation described above in such a way as to provide 113 grams of the active ingredient per 45.3 kilograms of seed. A similar lot of seed treated with tetramethyl thiuram disulfide only is used for purposes of comparison. The two lots of seed are planted in alternating rows in the same field. The seed treated with tetramethylthiuram disulfide only emerges to a good stand but many seedling die later due to *Rhizoctonia solani* and growth of the surviving plants is poor. Most of the seedlings that do survive exhibit soreshin lesions caused by Rhizoctonia. The seed overtreated with the compound of this invention, on the other hand, results in a stand that suffers little post-emergence damping off and grows rapidly.

EXAMPLE 99

The following formulation is prepared by intimately blending the ingredients and micropulverizing until the particles are substantially all below 20 microns.

| | |
|---|---|
| 2-(methoxycarbonylamino) - 1 - thiolbenzimidazolecarboxylic acid, butyl ester | 50 |
| Oleic acid ester of sodium isethionate | 2 |
| Sodium lauryl sulfate | 1 |
| Synthetic fine silica | 47 |

The above 50% wettable powder formulation is dispersed in water to give an active ingredient concentration of 3.6 grams per liter of water. A polyhydric alcohol ester surface active agent ("Trem" 014) is added to the spray in an amount equivalent to 300 parts per million of the final suspension. Eight uniform apple trees of the same variety are selected for testing. Four of these are sprayed to run-off, which is approximately 2850 liters per hectare at weekly intervals during the growing season with the above formulation and the other four trees are left unsprayed. By the end of the season the unsprayed trees have developed very high populations of orchard mites and are highly infected with apple scab, *Venturia inaequalis*. Due to the feeding of the mites, the foliage is russeted and drops prematurely. Also, the untreated trees have poor twig growth and small spotted fruit. The trees sprayed with the active ingredient are essentially free of mites, their eggs and apple scab. As a result of the excellent mite control, the sprayed trees have foliage of a thrifty, dark green color, and they exhibit good twig growth and fruit size.

Any of the compounds named in Examples 17 through 32 can be formulated as described in this example and when used as indicated give similar results.

EXAMPLE 100

A dust formulation is prepared from the following ingredients in the proportions listed:

| | |
|---|---|
| 2-(methoxycarbonylamino) - 1 - benzimidazoledithiocarboxylic acid, methyl ester | 5 |
| Methoxychlor | 5 |
| Sodium alkylnaphthalenesulfonate | 1 |
| Pyrophyllite clay | 89 |

The above ingredients are combined and rotated in a blender until uniformly mixed. The composition is then milled to produce particles essentially less than 50 microns in diameter. The above-prepared dust is then applied to a special planting of tea roses. The planting consists of uniform plots each with three varieties of rose. The test period extends through the summer. At the end of the test period, the roses in all unprotected plots are seriously damaged by the spider mite, *Tetranychus telarius,* the rose blackspot, *Diplocarpon rosae,* and the Japanese beetle, *Popillia japonica.* Randomly selected plots dusted at weekly intervals with the above prepared composition to the extent that thorough coverage of the plant is obtained with the formulation, remain free from damage, and produce good yields of bloom throughout the test period.

Plots treated with a dust containing methoxychlor, but without 2-(methoxycarbonylamino)-1-benzimidazoledithiocarboxylic acid, show no Japanese beetle injury. However, they are seriously damaged by mites and blackspot.

The following compounds may be similarly formulated and when used as above give like results.

2-(methoxycarbonylamino)-1-thionobenzimidazolecarboxylic acid, ethyl ester 2-(methoxycarbonylamino)-1-thionobenzimidazolecarboxylic acid, methyl ester

EXAMPLE 101

The following ingredients are converted into a dust as indicated:

| | |
|---|---|
| 2-(methoxycarbonylamino) - 1 - thionobenzimidazolecarboxylic acid, butyl ester | 20.0 |
| Pyrophyllite | 79.0 |
| Alkylnaphthalene sulfonic acid, sodium salt | 1.0 |

Equal parts of the active ingredient and the extender are milled with the surfactant and then diluted with the remaining pyrophyllite in a ribbon blender. The components are then blended until they are homogeneous.

Cotton plants in selected plots are thoroughly dusted at a rate of 10 kilograms of dust per hectare for each application on June 20 and at two-week intervals thereafter until mid-August with the above dust formulation in addition to a regular insecticidal program. Similar plots receive the insecticide application only. By late August the plots receiving the insecticide only have a high incidence of boll rot caused by *Aspergillus niger* and have high populations of spider mites Tetranychus spp., which cause the leaves of the cotton plants to turn rusty grown, twist and drop to the ground. Many bolls are completely rotted and loss of leaves results in the shedding of small bolls and prevents the lint from becoming fully developed. Cotton plants treated with the above dust formulation retain healthy foliage and produce a heavy crop of healthy full-sized bolls.

The following compounds may be similarly formulated and when used as above give like results.

2-(methoxycarbonylamino)-1-thiolbenzimidazolecarboxylic acid, methyl ester 2-(methoxycarbonylamino)-1-thiolbenzimidazolecarboxylic acid, isopropyl ester 2-(methoxycarbonylamino)-1-thionobenzimidazolecarboxylic acid, methyl ester

EXAMPLE 102

A dust concentrate is prepared as follows:

| | Percent |
|---|---|
| 2 - (ethoxycarbonylamino) - 1 - thionobenzimidazole - carboxylic acid, methyl ester | 80 |
| Synthetic fine silica | 20 |

The above ingredients are blended and milled to a particle size below 10 microns, followed by reblending.

Two experimental lots of house paint are prepared in a similar manner except that 0.5 percent by weight of the active compound of this formulation is milled with the dry ingredients, in one lot, whereas the other lot contains no fungicide. Test boards were painted with each lot. After one year of exposure in Florida, the board with the paint lacking a fungicide was badly stained by fungus growth including species of Penicillium and other genera. The board with the paint containing the compound of this invention remained bright.

EXAMPLE 103

A dilute dust is prepared as follows:

| | Percent |
|---|---|
| Dust concentrate formulation of Example 102 | 10 |
| Tobacco dust | 90 |

The above ingredients are blended to form a free flowing dust.

A uniform cherry orchard in Michigan is selected for the test. Alternate trees are dusted every 14 days at the rate of 910 grams per tree with the above fungicidal dust formulation. The remaining trees are left unprotected. On September 1 the trees are examined. The trees that had been dusted with the compound of this invention are green and healthy, with all leaves remaining on the tree. At this time the foliage of the unprotected trees is largely discolored due to attack by the leaf spot fungus (*Coccomyces hiemalis*) and the two-spotted mite (*Tetranychus telarius*). Further, much of the foliage of the unprotected trees has fallen due to the effect of the two pests.

The following compounds may be similarly formulated and when used as above give like results.

2-(methoxycarbonylamino)-1-thionobenzimidazolecarboxylic acid, propyl ester 2-(isopropoxycarbonylamino)-1-thionobenzimidazolecarboxylic acid, methyl ester 2-(methoxycarbonylamino)-1-thiolbenzimidazolecarboxylic acid, methyl ester 2-(methoxycarbonylamino)-1-thiolbenzimidazolecarboxylic acid, isopropyl ester

EXAMPLE 104

A dilute dust is prepared as follows:

| | Percent |
|---|---|
| 2 - (isopropoxycarbonylamino)-1-thiolbenzimidazolecarboxylic acid, methyl ester | 5.0 |
| Synthetic fine silica | 5.0 |
| Talc | 90.0 |

The active ingredient and the silica are first blended and micropulverized to a particle size smaller than 25 microns, and then blended with the talc.

Sugar cane seed pieces cut in November are divided into eight lots. Four of these lots are dusted in such a way as to cover all surfaces with a dust prepared as described above. The other four lots are dusted with the inert diluent only. All lots are stored under similar conditions until the following February at which time they are examined. The four lots that had been treated with the compound of this invention are in good condition. The four unprotected lots, to the contrary, are so badly rotted by fungi of the genus Fusarium that they cannot be planted.

EXAMPLE 105

An aqueous suspension concentrate is prepared as follows:

| | Percent |
|---|---|
| 2 - (methoxycarbonylamino)-1-thionobenzimidazolecarboxylic acid, butyl ester | 30.00 |
| Polyacrylic acid, sodium salt | 0.35 |
| Low viscosity polyvinyl alcohol | 1.50 |
| Water+(sodium hydroxide to a pH of 7.0 added last) | 68.15 |

The active component is ground to pass a 30 mesh screen and is then mixed with the remaining formulation ingredients and milled in a sand-grinder until the particle size is below 5 microns.

Six field crates of oranges are picked from a commercial grove in Florida. These crates of oranges are dipped for three minutes in a water bath containing a suspension made from the above formulation in an amount to give 300 parts per million by weight of the active ingredient of this invention. A polyethylene glycol ester of oleic acid surface active agent is present at the rate of 150 p.p.m. of total liquid. The remaining three crates are dipped in a similar fashion in water with the surface active agent only. All crates are set aside in a citrus storage house for three weeks.

At the end of this time all fruit are examined. The fruit that has been dip-treated with the compound of this invention is still in good condition, but the fruit that is not so protected is largely rotted by the blue mold fungus (*Penicillium digitatum*).

The following compounds can be similarly formulated and when used as above, give like results.

1-acetyl-2-benzimidazolecarbamic acid, methyl ester

2 - (methoxycarbonylamino) - 1-benzimidazolecarmbothiolic acid, S-methyl ester

N-(2-benzimidazolyl)propionamide

N-(2-benzimidazolyl)cyclopropanecarmoxamide

2 - (methoxycarbonylamino)thiol - 1 - benzimidazolecarboxylic acid, isopropyl ester 2-amino-1-(cyclopropylcarbonyl)-benzimidazole 1,3 - dipropionyl - $\Delta^{2,N}$ - 2 - benzimidazolecarbamic acid, methyl ester 1,3 - diacetyl - $\Delta^{2,N}$ - 2 - benzimidazolecarbamic acid, methyl ester

EXAMPLE 106

An aqueous suspension concentrate is prepared as follows:

| | |
|---|---|
| 2-(butoxycarbonylamino)-1-thionobenzimidazole-carboxylic acid, methyl ester | 30.00 |
| Polyacrylic acid, sodium salt | 0.35 |
| Low viscosity polyvinyl alcohol | 1.50 |
| Water+(sodium hydroxide to a pH of 7.0 added last | 68.15 |

The active component is ground to pass a 30 mesh screen and is then mixed with the remaining formulation ingredients and sand-ground to a particle size below 5 microns.

Green pine lumber coming from the saw in a mill is dipped for two minutes in a bath containing a suspension of the formulation prepared as described above. The amount of suspension concentrate used is such as to provide 400 parts per million of the active compound in the bath. Similar lumber is not dipped. All of the lumber is piled together in a seasoning yard. After three months the lumber is examined. The lumber that had been dip-treated was all bright and clean. The unprotected lumber was heavily covered with green mold (Penicillium spp.).

EXAMPLE 107

A granular formulation is prepared as follows:

| | |
|---|---|
| Granular corn cobs (15–30) mesh | 90 |
| 2-(methoxycarbonylamino)-1-thiolbenzimidazole-carboxylic acid, propyl ester | 10 |

The active compound is dissolved in warm chloroform and the chloroform solution is sprayed on the granular corn cob which is being tumbled in a mixer. Evaporation of the chloroform yields a finished granule in which the active ingredient is absorbed.

A field in California is seeded with cotton in the normal manner, except that granules prepared as described above are added to alternate rows. These granules are dropped in such a way that some fall into the furrow and some are mixed with the covering soil. The rate of granule application is such as to employ 0.45 kilogram of active chemical of this invention per 3600 linear meter of row. The remaining rows are untreated.

Six weeks after planting many of the plants in the rows without the granules are dead and others show soreshin lesions caused by Rhizoctonia solani as well as heavy populations of the Pacific mite (*Tetranychus pacificus*). In the rows that had received the granules, all plants remain alive and are healthy and free of mites. The effect on mites is clearly systemic.

The following compounds may be similarly formulated and when used as above give good results.

2 - (ethoxycarbonylamino) - 1 - thionobenzimidazole - carboxylic acid, methyl ester 2 - (methoxycarbonylamino) - 1 - thionobenzimidazole - carboxylic acid, ethyl ester

EXAMPLE 108

An aerosol is prepared from the following ingredients in the proportions given:

| | |
|---|---|
| 2-(methoxycarbonylamino)-1-thiolbenzimidazole-carboxylic acid, butyl ester | 3.0 |
| Methylene chloride | 22.0 |
| Freon 11 (trichloromonofluoromethane) | 37.5 |
| Freon 12 (dichlorodifluoromethane) | 37.5 |

The active ingredient is dissolved in the methylene chloride and then loaded into the aerosol container. This is followed by cold loading of the Freons.

Alternate rose bushes growing in a greenhouse are misted lightly at weekly intervals with the aersol described above. After two months of this program the treated plants are healthy, with dark green attractive foliage and are growing well. The untreated plants, on the other hand, have much foliage discolored and curled due to infection by the rose powdery mildew organism *Sphaerotheca humuli*. Other foliage on the untreated plants is yellowed due to attack by the Atlantic mite (*Tetranychus atlanticus*). Due to the extensive foliage damage, the plants not treated with the compound of this invention grow much more slowly than the protected plants.

The following compounds may be similarly formulated and when used as above, give good results.

2 - (methoxycarbonylamino) - 1 - thionobenzimidazole-carboxylic acid, propyl ester 2 - (isopropoxycarbonylamino) - 1-thionobenzimidazole-carboxylic acid, propyl ester 2 - (isopropoxycarbonylamino) - 1-thionobenzimidazole-carboxylic acid, ethyl ester 2 - (methoxycarbonylamino) - 1 - thiolbenzimidazolecarboxylic acid, propyl ester 2 - (methoxycarbonylamino) - 1 - thionobenzimidazole-carboxylic acid, butyl ester

EXAMPLE 109

A wettable powder formulation is prepared as follows:

| | |
|---|---|
| 2-propionamidobenzimidazole | 70.0 |
| Diatomaceous earth | 28.7 |
| Alkylaryl sodium sulfonates | 1.0 |
| Methyl cellulose | 0.3 |

The above ingredients are blended and micropulverized to a particle size below 50 microns, followed by reblending.

The wettable powder thus prepared is added to water at the rate of 454 grams of the active ingredient per 378 liters of water. A modified phthalic glycerol alkyl resin surface active agent is added in an amount to give 400 p.p.m. in the final spray. This suspension is used to spray, to the point of run-off, alternate trees in a field planting of applies. Sprays are applied at weekly intervals from April 25 until June 6. From June 6 until the end of the season, the sprays are applied at intervals of two weeks. The remaining trees in the planting are left unsprayed.

In early September all trees are carefully examined. Trees that were sprayed with the compound of this invention are healthy and free of mite infestation and fungus damage. The fruit on the sprayed trees is unblemished and of good size. The foliage of the unsprayed trees, on the other hand, is heavily infested with the apple scab fungus (*Venturia inaequalis*) and the powdery mildew fungus (*Podosphaera leucotricha*). Also the leaves of the unsprayed plants are badly infested with European red mites (*Panonychus ulmi*). The fruit on the unsprayed trees is spotted with scab and of small size.

The following compounds may be similarly formulated and when used as above give similar results.

2-cyclopropylcarboxamidobenzimidazole

EXAMPLE 110

A wettable powder formulation is prepared from the following ingredients:

| | |
|---|---|
| 1-propionyl-2-propionamidobenzimidazole | 50.0 |
| Kaolinite | 45.0 |
| Sodium lignin sulfonate | 1.0 |
| Dioctyl sodium sulfosuccinate | 2.0 |
| Synthetic fine silica | 2.0 |

These ingredients are mixed, blended and micronized to a particle size below 10 microns, followed by reblending.

A uniform field planting of cantaloupe in North Carolina is inocuated with the powdery mildew fungus (*Erysiphe cichoracearum*). After 10 days this organism has become well established in the plants. At this time alternate rows are sprayed with water containing a suspension of the wettable powder prepared as described above and an added amount of a polyhydric alcohol ester surface active agent ("Trem" 014). The concentration of this chemical suspension is such as to give 227 grams of the active compound of this invention per 378 liters of water (0.06%) and 400 p.p.m. of the surfactant. The spray is applied at a volume of 1410 liters per hectare. The remaining rows are left unsprayed.

After another 15 days the unsprayed rows are heavily damaged by powdery mildew and some of the plants are dying. The sprayed rows, however, are healthy and growing rapidly. The results indicate that the active compound of the suspension acts as a curative fungicide.

EXAMPLE 111

A dust concentrate is prepared as follows:

| | |
|---|---|
| 1 - cyclopropylcarbonyl - 2-propionamido-benzimidazole | 80 |
| Synthetic fine silica | 20 |

The above ingredients are blended and micropulverized to a particle size below 100 microns, followed by reblending.

Two experimental lots of house paint are prepared in a similar manner except that 0.5% by weight of the active compound of this invention as described above is milled with the dry ingredients in one lot, whereas none of the concentrate was added to the other lot. Test boards are painted with each lot. After one year of exposure in Florida, the board with the paint to which the concentrate was not added is badly stained by fungus growth including species of Penicillium and other genera. The board with the paint containing the compound of this invention remains bright.

EXAMPLE 112

| | |
|---|---|
| Dust concentrate formulation of Example 111 | 10 |
| Tobacco dust | 90 |

The above ingredients are blended to form a free-flowing dust.

A uniform cherry orchard in Michigan is selected for the test. Alternate trees are dusted every 14 days at the rate of 910 grams per tree with the above fungicidal dust formulation. The remaining trees are left unprotected. On September 1 the trees are examined. The trees that had been dusted with the compound of this invention are green and healthy, with all leaves remaining on the tree. At this time the foliage of the unprotected tree is largely discolored due to attack by the leaf spot fungus (*Coccomyces hiemalis*) and the two-spotted mite (*Tetranychus telarius*). Further much of the foliage of the unprotected trees has fallen due to the effect of the two pests.

EXAMPLE 113

The following formulation is prepared by intimately blending the ingredients and grinding the blend in an air attrition mill until the particle size is substantially less than 5 microns and then reblending.

| | |
|---|---|
| 1 - cyclopropylcarbonyl-2-cyclopropylcarboxamidobenzimidazole | 50.0 |
| Dioctyl sodium sulfosuccinate | 1.0 |
| Low viscosity methylcellulose | 0.3 |
| Silica | 48.7 |

Acid delinted cotton seed, already treated with 85 grams of tetramethylthiuram disulfide per 45.3 kilograms of seed, is overtreated in a slurry treater with the formulation described above, in such a way as to provide 113 grams of the active ingredient per 45.3 kilograms of seed. A similar lot of seed, treated with tetramethylthiuram disulfide only, is used for purposes of comparison. The two lots of seed are planted in alternating rows in the same field. The seed treated with tetramethylthiuram disulfide only emerges to a good stand but many seedlings die later due to *Rhizoctonia solani*, and growth of the surviving plants is poor. Most of the seedlings that do survive exhibit soreshin lesions caused by Rhizoctonia. The seeds over-treated with the above formulation, on the other hand, result in a stand that suffers little post-emergence damping off and grows rapidly.

EXAMPLE 114

The following formulation is prepared by intimately blending the following ingredients and micropulverizing them until the particles are substantially all below 20 microns.

| | |
|---|---|
| 1-propionyl-2-propionamidobenzimidazole | 50.0 |
| Oleic acid ester of sodium isethionate | 2.0 |
| Sodium lauryl sulfate | 1.0 |
| Synthetic fine silica | 47.0 |

The above 50% wettable powder formulation is dispersed in water to give an active ingredient concentration of 3.6 grams per liter of water. Eight uniform apple trees of the same variety are selected for testing. Four of these are sprayed to run-off, which is approximately 2850 liters per hectare, at weekly intervals during the growing season with the above formulation, and the other four trees are left unsprayed.

By the end of the season the unsprayed trees have developed very high populations of orchard mites and are highly infected with apple scab, *Venturia inaequalis*. Due to the feeding of the mites, the foliage is russeted and drops prematurely. Also the untreated trees have poor twig growth and small, spotted fruit. The trees sprayed with 1 - propionyl-2-propionamidobenzimidazole are essentially free of mites, their eggs and apple scab. As a result of the excellent mite control, the sprayed trees have foliage of a thrifty, dark green color, and they exhibit good twig growth and fruit size.

Any of the compounds named in Examples 17 through 32 can be formulated as described in this example and when used as indicated give similar results.

EXAMPLE 115

A wettable powder formulation is prepared from the following ingredients in the proportions given:

| | |
|---|---|
| 1-cyclopropylcarbonyl - 2 - cyclopropylcarboxamidobenzimidazole | 30.0 |
| Methoxychlor | 30.0 |
| Sodium lauryl sulfate | 1.0 |
| Oleic acid ester of sodium isethionate | 2.0 |
| Non-swelling montmorillonite clay | 37.0 |

All of the ingredients are combined and rotated in a blender until uniformly mixed. The total mix is then airmilled to produce particles essentially less than 40 microns in size.

The wettable powder prepared above is added to water in an amount such that there are 2.5 grams of each of the active ingredients per liter of water. The resulting suspension is sprayed at the rate of 10 kilograms per hectare for each of the active ingredients over a plot in a Bermuda grass turf area in Florida. The area selected for the test is heavily infested with a plant-feeding mite, *Aceria neocynodomis*, and chinch bugs, *Blissus leucopterus insularis*. The chinch bugs are killed in the treated plot and the mite infestation soon disappears. The turf quickly returns to a healthy and attractive condition.

In a similar untreated plot both the mites and the chinch bugs continue to multiply and, by their feeding, the Bermuda grass becomes discolored and the turf reflects many unsightly dead spots. Similar plots sprayed with methoxychlor only are free of damage due to chinch bugs but are injured by the high mite infestation.

The following compounds may be similarly formulated and when used as above, give like results.

2-propionamidobenzimidazole
2-cyclopropylcarboxamidobenzimidazole
1-(methylcarbonyl)-2-propionamidobenzimidazole

EXAMPLE 116

A dust formulation is prepared from the following ingredients in the proportions listed:

| | |
|---|---|
| 1-propionyl-2-prionamidobenzimidazole | 5 |
| Methoxychlor | 5 |
| Sodium alkylnaphthalenesulfate | 1 |
| Pyrophyllite clay | 89 |

The above ingredients are combined and rotated in a blender until uniformly mixed. The composition is then airmilled to produce particles essentially less than 50 microns in diameter. The above-prepared dust is then applied to a special planting of tea roses. The planting consists of uniform plots each with three varieties of rose. The test period extends from June 1 through August 31. At the end of the test period the roses in all unprotected plots are seriously damaged by the spider mite, *Tetranychus telarius*, the rose blackspot, *Ditplocarpon rosae*, and the Japanese beetle, *Popillia japonica*. Randomly selected plots dusted at weekly intervals with the above prepared composition to the extent that thorough coverage of the plant is obtained with the formulation, remain free from damage, and produce good yields of bloom throughout the test period.

Plots treated with a dust containing methoxychlor but without 1-propionyl-2-propionamidobenzimidazole show no Japanese beetle injury. However, they are seriously damaged by mites and blackspot.

The following compounds may be similarly formulated and when used as above, give like results.

1-cyclopropylcarbonyl-2-propionamidobenzimidazole

EXAMPLE 117

The following formulation is prepared by intimately blending the ingredients and grinding the blend in an air attrition mill until the particle size is substantially less than 5 microns and then reblending.

| | |
|---|---|
| 1-methylcarbonyl - 2 - benzimidazolecarbamic acid, methyl ester | 85.00 |
| Alkyl naphthalene sulfonic acid, sodium salt | 1.50 |
| Sodium N-methyl-N-oleoyl taurate | 2.00 |
| Synthetic fine silica | 11.50 |

A uniform field planting of cantaloupe in North Carolina is inoculated with the powdery mildew fungus (*Erysiphe cichoracearum*). After 10 days this organism has become well established in the plants. At this time alternate rows are sprayed with water containing a suspension of the wettable powder prepared as described above and an added amount of a polyhydric alcohol ester surface-active agent.

The concentration of this chemical suspension is such as to give 227 grams of the active compound of this invention per 378 liters of water (0.06%) and 400 p.p.m. of the surfactant. The spray is applied at a volume of 1410 liters per hectare. The remaining rows are left unsprayed. After another 15 days the unsprayed rows are heavily damaged by powdery mildew and some of the plants are dying. The sprayed rows, however, are healthy and growing rapidly. The results indicate that this compound acts as a curative fungicide.

EXAMPLE 118

A wettable powder formulation is prepared as follows:

| | |
|---|---|
| 1-butylcarbonyl - 2 - benzimidazolecarbamic acid, methyl ester | 70.0 |
| Diatomaceous earth | 28.7 |
| Alkylaryl sodium sulfonates | 1.0 |
| Methyl cellulose | 0.3 |

The above ingredients are blended and micropulverized to a particle size below 50 microns, followed by reblending.

The wettable powder thus prepared is added to water at the rate of 454 grams of the active ingredient per 378 liters of water. A modified phthalic glycerol alkyd resin surface active agent is added in an amount to give 400 p.p.m. in the final spray. This suspension is used to spray, to the point of run-off, alternate trees in a field planting of apples. Sprays are applied at weekly intervals from Apr. 25 until June 6. From June 6 until the end of the season, the sprays are applied at intervals of two weeks. The remaining trees in the planting are left unsprayed.

In early September all trees are carefully examined. Trees that were sprayed with the compound of this invention are healthy and free of mite infestation and fungus damage. The fruit on the sprayed trees is unblemished and of good size. The foliage of the unsprayed trees, on the other hand, is heavily infested with the apple scab fungus (*Venturia inaequalis*) and the powdery mildew fungus (*Podosphaera leucotricha*). Also the leaves of the unsprayed plants are badly infested with European red mites (*Panonychus ulmi*). The fruit on the unsprayed trees is spotted with scab and of small size.

The following compounds may be similarly formulated and when used as above, give like results.

1-propylcarbonyl-2-benzimidazolecarbamic acid, methyl ester 1-isopropylcarbonyl-2-benzimidazolecarbamic methyl ester

EXAMPLE 119

The following formulation is prepared by intimately blending the ingredients and grinding the blend in an air attrition mill until the particle size is substantially less than 5 microns and then reblending.

| | |
|---|---|
| 1-ethylcarbonyl - 2 - benzimidazolecarbamic acid, methyl ester | 85.0 |
| Alkylnaphthalene sulfonic acid, sodium salt | 1.5 |
| Sodium N-methyl-N-oleoyl taurate | 2.0 |
| Synthetic silica | 11.5 |

Four similar potted bean plants (1 plant per pot) are selected. The soil in two of these pots is drenched with a water suspension of the wettable powder formulation described above at a rate to provide 30 parts per million by weight in the total amount of soil in the pot. The remaining two pots are left untreated. Five days after treatment 50 adult mites (*Tetranychus telarius*) are placed on a terminal leaf on each of the test plants. Twenty-four hours later these adult mites, all still alive, are transferred to untreated bean foliage. After another twenty-four hours all of the adult mites are removed in a way which causes no damage to the eggs that have been laid during the twenty-four hour period on the untreated foliage. The number of eggs laid by each batch of 50 mites is essentially the same. A sufficient time is allowed for all viable eggs to hatch. Counts demonstrate that none of the eggs hatch from among those laid by mites that had fed on foliage from pots with soil containing the compound of this invention. Hatch to provide living young was complete, on the other hand, among eggs laid by mites similarly handled except that the plants providing sustenance were not in contact with a compound of this invention. This experiment demonstrates systemic movement in plants and mite ovicide ester

EXAMPLE 120

The following formulation is prepared by intimately blending the ingredients and grinding the blend in an air attrition mill until the particle size is substantially less than 5 microns and then reblending.

| | |
|---|---|
| 1-sec-butylcarbonyl-2 - benzimidazolecarbamic acid, methyl ester | 50.0 |
| Diocyl sodium sulfosuccinate | 1.0 |
| Low viscosity methylcellulose | 0.3 |
| Silica | 48.7 |

Acid delinted cotton seed, already treated with 85 grams of tetramethylthiuram disulfide per 45.3 kilograms of seed, is over-treated in a slurry treater with the formulation described above, in such a way as to provide 113 grams of the active ingredient per 45.3 kilograms of seed. A similar lot of seed, treated with tetramethylthiuram disulfide only, is used for purposes of comparison. The two lots of seed are planted in alternating rows in the same field. The seed treated with tetramethylthiuram disulfide only emerges to a good stand but many seedlings die later due to *Rhizoctonia solani,* and growth of the surviving plants is poor. Most of the seedlings that do survive exhibit soreshin lesions caused by Rhizoctonia. The seed over-treated with the above formulation, on the other hand, results in a stand that suffers little post-emergence damping off and grows rapidly.

EXAMPLE 121

The following formulation is prepared by intimately blending the following ingredients and micropulverizing them until the particles are substantially all below 20 microns.

| | |
|---|---|
| 1-methylcarbonyl - 2 - benzimidazolecarbamic acid, butyl ester | 50.0 |
| Oleic acid ester of sodium isethionate | 2.0 |
| Sodium lauryl sulfate | 1.0 |
| Synthetic fine silica | 47.0 |

The above 50% wettable powder formulation is dispersed in water to give an active ingredients concentration of 3.6 grams per liter of water. Eight uniform apple trees of the same variety are selected for testing. Four of these are sprayed to run-off, which is approximately 2850 liters per hectare, at weekly intervals during the growing season with the above formulation, and the other four trees are left unsprayed.

By the end of the season the unsprayed trees have developed very high populations of orchard mites and are highly infected with apple scab, *Venturia inaequalis.* Due to the feeding of the mites, the foliage is russeted and drops prematurely. Also the untreated trees have poor twig growth and small, spotted fruit. The trees sprayed with 1-methyl-carbonyl - 2 - benzimidazolecarbamic acid, butyl ester are essentially free of mites, their eggs and apple scab. As a result of the excellent mite control, the sprayed trees have foliage of a thrifty, dark green color, and they exhibit good twig growth and fruit size.

Any of the compounds named in Examples 17 to 32 may be formulated as described in this example and when used as indicated give similar results.

EXAMPLE 122

A wettable powder formulation is prepared from the following ingredients in the proportions given:

| | |
|---|---|
| 1 - methylcarbonyl - 2 - benzimidazolecarbamic acid, isopropyl ester | 25 |
| methyl O-(methylcarbamyl)thiolacetohydroxamate | 10 |
| oleic acid ester of sodium isethionate | 2 |
| sodium lauryl sulfate | 2 |
| diatomaceous silica | 61 |

All ingredients are combined and rotated in a blender until uniformly admixed. The total mix is then air-milled to produce particles most of which are less than 40 microns in particle size.

A sufficient amount of the above wettable powder is added to water such that there are 2.5 grams per liter of water of the methyl O-(methylcarbamyl)thiolacetohydroxamate. The resulting suspension is then sprayed at weekly intervals on one of a pair of similar, adjacent plots in a greenbean field in Florida at the rate of two kilograms of 1 - methylcarbonyl - 2 - benzimidazolecarbamic acid, isopropyl ester per hectare. The test area is selected as one in which there is a high infestation of the two-spotted mite, *Tetranychus bimaculatus,* and the Mexican bean beetle, *Epilachna varivestis.* The plot sprayed with the above formulation remains free of both the two-spotted mite and the Mexican bean beetle for the entire growing season and provides a good yield of greenbeans. The unsprayed plot is attacked by both of the above pests and is damaged to the extent that the yield is greatly reduced. Similar areas sprayed with methyl O-(methylcarbamyl)-thiolacetohydroxamate alone are free from attack by the Mexican bean beetle but are damaged by the two-spotted mite.

In the above example methyl O-(carbamyl)thiolacetohydroxamate may be substituted for methyl O-(methylcarbamyl)thiolacetohydroxamate with essentially equivalent results.

EXAMPLE 123

A wettable powder formulation is prepared from the following ingredients in the proportions given:

| | |
|---|---|
| 1 - ethylcarbonyl - 2 - benzimidazolecarbamic acid, isopropyl ester | 30 |
| methoxychlor | 30 |
| sodium lauryl sulfate | 1 |
| oleic acid ester of sodium isethionate | 2 |
| non-swelling montmorillonite clay | 37 |

All of the ingredients are combined and rotated in a blender until uniformly mixed. The total mix is then air-milled to produce particles essentially less than 40 microns in size.

The wettable powder prepared above is added to water in an amount such that there are 2.5 grams of each of the active ingredients per liter of water. The resulting suspension is sprayed at the rate of 10 kilograms per hectare for each of the active ingredients over a plot in a Bermudagrass turf area in Florida. The area selected for the test is heavily infested with a plant feeding mite, *Aceria neocynodomis,* and chinch bugs,, *Blissus leucopterus insularis.* The chinch bugs are killed in the treated plot and the mite infestation soon disappears. The turf quickly returns to a healthy and attractive condition.

In a similar untreated plot both the mites and the chinch bugs continue to multiply and, by their feeding, the Bermudagrass becomes discolored and the turf reflects many unsightly dead spots. Similar plots sprayed with methoxychlor only are free of damage due to chinch bugs but are injured by the high mite infestation.

The following compounds may be similarly formulated and when so used, give similar results.

1-isopropylcarbonyl-2-benzimidazolecarbamic acid, isopropyl ester
1-ethylcarbonyl-2-benzimidazolecarbamic acid, tert-butyl ester

EXAMPLE 124

A dust concentrate is prepared as follows:

| | |
|---|---|
| 1 - methylcarbonyl - 2 - benzimidazolecarbamic acid, methyl ester | 80 |
| Synthetic fine silica | 20 |

The above ingredients are blended and milled to a particle size below 10 microns, following by reblending.

Two experimental lots of house paint are prepared in a similar manner except that 0.5% by weight of the active compound of this invention formulated as described above is milled with the dry ingredients in one lot, whereas none of the concentrate was added to the other lot. Test boards were painted with each lot. After one year of exposure in Florida, the board with the paint to which the concentrate was not added was badly stained by fungus growth including species of Penicillium and other genera. The board with the paint containing the compound of this invention remained bright.

EXAMPLE 125

A dilute dust is prepared as follows:

| | |
|---|---|
| dust concentrate formulation of Example 124 | 10 |
| tobacco dust | 90 |

The above ingredients are blended to form a free flowing dust.

A uniform cherry orchard in Michigan is selected for the test. Alternate trees are dusted every 14 days at the rate of 910 grams per tree with the above fungicidal dust formulation. The remaining trees are left unprotected. On September 1 the trees are examined. The trees that had been dusted with the compound of this invention are green and healthy, with all leaves remaining on the tree. At this time the foliage of the unprotected tree is largely discolored due to attack by the leaf spot fungus (*Coccomyces hiemalis*) and the two-spotted mite (*Tetranychus telaries*). Further, much of the foliage of the unprotected trees has fallen due to the effect of the two pests.

The following compounds may be similarly formulated and when used as above give like results.

1-propylcarbonyl-2-benzimidazolecarbamic acid, methyl ester
1-isopropylcarbonyl-2-benzimidazolecarbamic acid, methyl ester

EXAMPLE 126

A dilute dust is prepared as follows:

| | |
|---|---|
| 1-ethylcarbonyl-2-benzimidazolecarbamic acid, methyl ester | 5 |
| Talc | 90 |
| Synthetic fine silica | 5 |

The active ingredient and the silica are first blended and micropulverized to a particle size smaller than 25 microns and then reblended with the talc.

Sugar cane seed pieces cut in November are divided into eight lots. Four of these lots are dusted in such a way as to cover all surfaces with a dust prepared as described above. The other four lots are dusted with the inert diluent only. All lots are stored under similar conditions until the following February at which time they are examined. The four lots that had been treated with the compound of this invention are in good condition. The four unprotected lots, to the contrary, are so badly rotted by fungi of the genus Fusarium that they cannot be planted.

EXAMPLE 127

The following ingredients are converted into a dust as indicated:

| | |
|---|---|
| 1-butylcarbonyl-2-benzimidazolecarbamic acid, methyl ester | 20 |
| Pyrophyllite | 79 |
| Alkyl naphthalene sulfonic acid, sodium salt | 1 |

Equal parts of the active ingredient and the diluent are milled with the surfactant and then diluted with the remaining pyrophyllite in a ribbon blender. The components are then blended until they are homogeneous.

Cotton plants in selected plots are thoroughly dusted at a rate of 10 kilograms of dust per hectare for each application on June 20 and at two-week intervals thereafter until mid-August with the above dust formulation in addition to a regular insecticidal program. Similar plots receive the insecticidal application only. By late August the plots receiving the insecticide only have a high incidence of boll rot caused by *Aspergillus niger* and high populations of spider mites, *Tetranychus* spp., which cause the leaves of the cotton plants to turn rusty brown, twist and drop to the ground. Many bolls are completely rotted and loss of leaves results in the shedding of small bolls and prevents the lint from becoming fully developed. Cotton plants treated with the above dust formulation retain healthy foliage and produce a heavy crop of healthy full-sized bolls.

The following compounds may be similarly formulated and when used as above give like results.

1-tert-butylcarbonyl-2-benzimidazolecarbamic acid, methyl ester
1-methylcarbonyl-2-benzimidazolecarbamic acid, butyl ester

EXAMPLE 128

A dust formulation is prepared from the following ingredients in the proportions listed.

| | |
|---|---|
| 1-methylcarbonyl-2-benzimidazolecarbamic acid, isopropyl ester | 5 |
| Methoxychlor | 5 |
| Sodium alkylnaphthalene sulfate | 1 |
| Pyrophyllite clay | 89 |

The above ingredients are combined and rotated in a blender until uniformly mixed. The composition is then air-milled to produce particles essentially less than 50 microns in diameter. The above-prepared dust is then applied to a special planting of tea roses. The planting consists of uniform plots each with three varieties of rose. The test period extends from June 1 through August 31. At the end of the test period the roses in all unprotected plots are seriously damaged by the spider mite, *Tetranychus telarius*, the rose blackspot, *Diplocarpon rosae*, and the Japanese beetle, *Popillia japonica*. Randomly selected plots dusted at weekly intervals with the above prepared composition to the extent that thorough coverage of the plant is obtained with the formulation, remain free from damage, and produce good yields of bloom throughout the test period.

Plots treated with a dust containing methoxychlor but without 1-methylcarbonyl-2-benzimidazolecarbamic acid, isopropyl ester show no Japanese beetle injury. However, they are seriously damaged by mites and blackspot.

The following compounds can be similarly formulated and when used as above give like results.

1-isopropylcarbonyl-2-benzimidazolecarbamic acid, isopropyl ester
1-ethylcarbonyl-2-benzimidazolecarbamic acid, sec-butyl ester

EXAMPLE 129

An aqueous suspension concentrate is prepared as follows:

| | |
|---|---|
| 1-ethylcarbonyl-2-benzimidazolecarbamic acid, isopropyl ester | 30.00 |
| Polyacrylic acid, sodium salt | 0.35 |
| Low viscosity polyvinyl alcohol | 1.50 |
| Water+(sodium hydroxide to a pH of 7 added last) | 68.15 |

The active component is ground to pass a 30 mesh screen and is then mixed with the remaining formulation ingredients and milled in sand grinder until the particle size is below 5 microns.

Six field crates of oranges are picked from a commercial grove in Florida. Three crates of oranges are dipped for three minutes in a water bath containing a suspension made from the above formulation, in an amount to give 300 parts per million by weight of the active ingredient of this invention. A polyethylene glycol ester of oleic acid surface active agent is present at the rate of 150 p.p.m. of total liquid. The remaining three crates are dipped in a similar fashion in water with the surface active agent only. All crates are set aside in a citrus storage house for three weeks. At the end of this time all fruit are examined. The fruit that has been dip-treated with the compound of this invention is still in good condition, but the fruit that is not so protected is largely rotted by the blue mold fungus (*Penicillium digitatum*).

EXAMPLE 130

An aqueous suspension concentrate is prepared as follows:

| | |
|---|---|
| 1-ethylcarbonyl-2-benzimidazolecarbamic acid, methyl ester | 30.00 |
| Polyacrylic acid, sodium salt | 0.35 |
| Low viscosity polyvinyl alcohol | 1.50 |
| Water+(sodium hydroxide to a pH of 7 added last) | 68.15 |

The active compound is ground to pass a 30 mesh screen and is then mixed with the remaining formulation ingredients and milled in a sand grinder until the particle size is below 50 microns.

Green pine lumber coming from the saw in a mill is dipped for two minutes in a bath containing a suspension of the formulation prepared as described above. The amount of suspension concentrate used is such as to provide 400 parts per million of the active compound in the bath. Similar lumber is not dipped. All of the lumber is piled together in a seasoning yard. After three months the lumber is examined. The lumber that has been dip-treated is all bright and clean. The unprotected lumber is heavily covered with green mold (Penicillium spp.).

EXAMPLE 131

A granular formulation is prepared as follows:

| | |
|---|---|
| Granular corn cob (15–30 mesh) | 90 |
| 1-methylcarbonyl-2-benzimidazolecarbamic acid, methyl ester | 10 |

The active compound is dissolved in warm chloroform and the chloroform solution is sprayed on the granular corn cob which is being tumbled in a mixer. Evaporation of the chloroform yields a finished granule in which the active ingredient is absorbed.

A field in California is seeded with cotton in the normal manner, except that granules prepared as set forth above are added to alternate rows. These granules are dropped in such a way that some fall into the furrow and some are mixed with the covering soil. The rate of granule application is such as to employ 0.45 kilogram of active chemical of this invention per 3600 linear meters of row. The remaining rows are untreated.

Six weeks after planting, many of the plants in the rows without the granules are dead, and others show soreshin lesions caused by *Rhizoctonia solani* as well as heavy populatiors of the Pacific mite (*Tetranychus pacificus*). In the rows that had received the granules, all plants remain alive and are healthy, and further they are free of mites. The effect on mites is clearly systemic.

The following compounds may be similarly formulated and when used as above give similar results.

1-butylcarbonyl-2-benzimidazolecarbamic acid, methyl ester 1-propylcarbonyl-2-benzimidazolecarbamic acid, methyl ester

EXAMPLE 132

An aerosol is prepared from the following ingredients in the proportions given:

| | |
|---|---|
| 1-ethylcarbonyl-2-benzimidazolecarbamic acid, isopropyl ester | 3.0 |
| Methylene chloride | 22.0 |
| Freon 11 (trichloromonofluoromethane) | 37.5 |
| Freon 12 (dichlorodifluoromethane) | 37.5 |

The active ingredient is dissolved in the methylene chloride and then loaded into the aerosol container. This is followed by cold loading of the Freons.

Alternate rose bushes growing in a green house are misted lightly at weekly intervals with the aerosol described above. After two months of this program the treated plants are healthy, with dark green attractive foliage and are growing well. The untreated plants, on the other hand, have much foliage discolored and curled due to infection by the rose powdery mildew organism, *Sphaerotheca humuli*. Other foliage on the untreated plants is yellowed due to attack by the Atlantic mite (*Tetranychus atlanticus*). Due to the extensive foliage damage, the plants not treated with the compound of this invention grow more slowly than the protected plants.

The following compounds may be similarly formulated and when used as above give good results.

1-isopropylcarbonyl-2-benzimidazolecarbamic acid, isopropyl ester 1-ethylcarbonyl-2-benzimidazolecarbamic acid, tert-butyl ester

EXAMPLE 133

The following formulation is prepared by intimately blending the ingredients and grinding the blend in an air attrition mill until the particle size is substantially less than 5 microns and then reblending.

| | |
|---|---|
| Methyl 1-(methylcarbamoyl)-3-trichloromethyl-mercapto-2-benzimidazolinecarbamate | 50 |
| "Rhodamin" B Extra | 2 |
| Polyethyleneoxide ether of dodecylphenol | 1.5 |
| Sodium lignin sulfonate | 5 |
| Silica aerogel | 1 |
| Kaolinite | 40.5 |

The above formulation is applied as a dust to oat seed naturally infested with *Ustilago kolleri* at a rate of ¼ to ½ oz. per bushel. The treated infested seed is planted, and a normal healthy plant free of the smut disease is produced, whereas the untreated seed grows and produces smutted kernels.

This formulation can also be suspended in water at the rate of 1 lb. per gallon. The resulting liquid suspension may be applied to oat seeds at the rate of ½ cup per bushel. This treatment likewise gives 98–100% control of *Ustilago kolleri*.

This formulation can be blended with 5 times its weight of kaolinite to give a 10% active dust, and applied as a drill box treatment at the rate of 3 oz. of dust per bushel. The dust and seed are well mixed, and as the coated seed is drilled into the soil, excess dust falls into the drill row. Examination of the seedling crop reveals that 98–100% of the treated seed produces oat kernels which are smut free.

The following compound may be substituted for the active ingredient in the above example, and when used as described, gives similar results.

methyl 1-(methylcarbamoyl)-2-benzimidazolecarbamate

EXAMPLE 134

The following formulation is prepared by mixing the active ingredient with an equal quantity of the diluent, blending and micropulverizing. This powder is then blended wth the remaining diluents and is ready for use.

| | |
|---|---|
| Methyl 1-(trichloromethylthio)-3-(methylcarbamoyl)-2-benzimidazoline | 10 |
| "Ser-X" (serite) | 90 |

The above formulation is applied as a dust to oat seed infested with *Ustilago kolleri* at a rate of 1¼–2½ oz. per bushel. The treated seed is planted and a normal healthy plant free from the smut disease is produced, whereas the untreated seed grows and produces smutted kernels.

The following compounds may be substituted for the active ingredient in the above example, and when formulated and used as described, give similar results.

methyl 1-(methylcarbamoyl)-2-benzimidazolecarbamate
methyl 1,3-(dimethylcarbamoyl-2-benzimidazolecarbamate

EXAMPLE 135

An aqueous suspension concentrate is prepared as follows:

| | Parts |
|---|---|
| 1-acetyl-2-benzimidazolecarbamic acid, methyl ester (I) | 30.00 |
| Polyacrylic acid, sodium salt | 0.35 |
| Low viscosity polyvinyl alcohol | 1.50 |
| Water and (sodium hydroxide to a pH of 7 added last) | 68.15 |

The active compound is ground to pass a 30-mesh screen and then mixed with the remaining formulation ingredients and mulled in a sand-grinder until the particle size is below 5 microns.

The above aqueous suspension is tested for effectiveness on a trickling filter. In this instance, the aqueous suspension is pumped into the sewage stream that feeds the rotary distributors on the trickling filter; the ratio of the two streams is such that the concentration of (I) is 10 p.p.b. in the sewage. The treatment period lasts one week. At the start of treatment, the trickling filter is effective in removing 60% of the oxygen demand from the sewage; but at the end of the treatment period, an 80% oxygen demand removal is recorded for the same throughput rate.

EXAMPLE 136

A mixture containing 0.5% of 1,3-diacetyl $\Delta^{2,N}$-benzimidazolinecarbamic acid, methyl ester (II), and ammonium sulfate (III) is prepared by dry blending 0.5 parts of (II) with 99.5 parts of (III) in a cement mixer. A uniform mixture is obtained.

The mixture is tested as a fertilizer for corn grown in Delaware where the growing season is adequate. A test plot having a nitrogen deficiency is selected and prepared by applying a broadcast application of 357 lbs./A. of 0-14-14 fertilizer. Conventional practices are used to prepare the ground and for planting the seed. The mixture is then applied at rates of 75 and 150 lbs. nitrogen/A. Similar plots are prepared and fertilized with untreated (III) and ammonium nitrate (IV) at rates of 75 and 150 lbs. nitrogen/A. The entire area is disced, harrowed and planted with corn with a single row planter.

The corn germinates and grows well on all plots. The corn in the control plots do not appear to grow as vigorously during the early season as the corn in the plot treated with (II). At the end of the season the yield from all of the plots is measured and shows that the best yield is obtained from the plot fertilized with 0.5% (II) on (III). That fertilized with (IV) gave the second best yield, while (III) produced the poorest yield.

EXAMPLE 137

The procedure is the same as Example 136 above, except that N-(2-benzimidazolyl)propionamide is used in place of (II) in the above example. Similar results are obtained.

I claim:
1. The method of preventing injury due to mites or fungi comprising applying to the locus to be protected from fungi and mites a fungicidally effective amount of a compound of the formula:

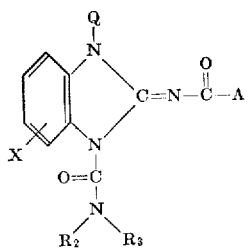

wherein

X is hydrogen, halogen, alkyl of 1 through 4 carbon atoms, nitro, or alkoxy of 1 through 4 carbon atoms;
A is $OR_1$ or $R_6$;
Q is hydrogen; methyl; methyl substituted with cyano, OR or COOR; alkylsulfonyl of 1 through 6 carbon atoms; phenylsulfonyl; phenylsulfonyl substituted with methyl, ethyl, methoxy or halogen; benzylsulfonyl; benzylsulfonyl substituted with methyl, ethyl, methoxy or halogen; alkenyl of 3 to 4 carbon atoms; propargyl; cyano;

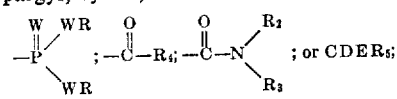

with the proviso that the total carbon content of $R_2$, $R_3$ and Q shall not exceed 18 carbon atoms;
R is methyl or ethyl;
$R_1$ is alkyl of 1 through 4 carbon atoms or allyl;
$R_2$ is hydrogen, alkyl of 1 through 6 carbon atoms, alkenyl of 3 through 6 carbon atoms or alkynyl of 3 through 6 carbon atoms;
$R_3$ is hydrogen; alkyl of 1 through 18 carbon atoms; alkyl of 1 through 18 carbon atoms substituted with halogen, alkoxy of 1 through 4 carbon atoms, or alkoxycarbonyl of 2 through 4 carbon atoms; alkenyl of 3 through 18 carbon atoms; alkenyl of 3 through 18 carbon atoms substituted with halogen, alkoxy of 1 through 4 carbon atoms, or alkoxycarbonyl of 2 through 4 carbon atoms; alkynyl of 3 through 18 carbon atoms; alkynyl of 3 through 18 carbon atoms substituted with halogen, alkoxy of 1 through 4 carbon atoms, or alkoxycarbonyl of 2 through 4 carbon atoms; cycloalkyl of 3 through 10 carbon atoms; cycloalkyl of 3 through 10 carbon atoms substituted with methyl, methoxy, or chlorine; cycloalkenyl of 4 through 8 carbon atoms; cycloalkenyl of 4 through 8 carbon atoms substituted with methyl, methoxy, or chlorine; bicycloalkyl of 7 through 10 carbon atoms; bicycloalkenyl of 7 through 10 carbon atoms; (cycloalkyl)alkyl of 4 through 9 carbon atoms; (cycloalkyl)alkyl of 4 through 9 carbon atoms substituted with methyl, methoxy, or chlorine; (cycloalkenyl)alkyl of 5 through 9 carbon atoms; aralkyl of 5 through 8 carbon atoms; aralkyl of 5 through 8 carbon atoms substituted with alkyl of 1 through 4 carbon atoms, chloroalkyl of 1 through 4 carbon atoms, fluoroalkyl of 1 through 4 carbon atoms, alkoxy of 1 through 4 carbon atoms, halogen, cyano, alkoxycarbonyl of 2 through 3 carbon atoms, alkylsulfonyl of 1 through 4 carbon atoms or nitro; phenyl; phenyl substituted with alkyl of 1 through 4 carbon atoms, chloroalkyl of 1 through 4 carbon atoms, fluoroalkyl of 1 through 4 carbon atoms, alkoxy of 1 through 4 carbon atoms, halogen, cyano, alkoxycarbonyl of 2 through 3 carbon atoms, alkylsulfonyl of 1 through 4 carbon atoms, or nitro; alkylsulfonyl of 1 through 18 carbon atoms; phenylsulfonyl; phenylsulfonyl substituted with alkyl of 1 through 4 carbon atoms, alkoxy of 1 through 4 carbon atoms, halogen, cyano, alkoxycarbonyl of 2 through 3 carbon atoms, or nitro; acyl of 1 through 18 carbon atoms; acyl of 1 through 18 carbon atoms substituted with halogen or alkoxy of 1 through 4 carbon atoms; aroyl of 6 through 10 carbon atoms; or aroyl of 6 through 10 carbon atoms substituted with alkyl of 1 through 4 carbon atoms, halogen, nitro, alkylsulfonyl of 1 through 4 carbon atoms or alkoxy of 1 through 4 carbon atoms; provided that when $R_2$ and $R_3$ are both substituents on the same nitrogen, they can be taken together to be —$(CH_2)_n$— where $n$ is 2 to 8 or —$(CH_2)_2$—O—$(CH_2)_2$—;
$R_4$ is hydrogen; alkyl of 1 through 12 carbon atoms; alkyl of 1 through 12 carbon atoms substituted with hydroxy, —$OR_1$, cyano, acetoxy, chlorine or fluorine; alkynyl of 2 through 10 carbon atoms; alkenyl of 2 through 10 carbon atoms; cycloalkyl of 3 through 8 carbon atoms; chlorine; alkoxycarbonyl of 2 through 5 carbons; or aryl of the type

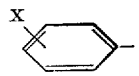

wherein X is as defined previously;
$R_5$ is alkyl of 1 through 12 carbons, alkenyl of 3 through 10 carbons, alkynyl of 3 through 10 carbons, cycloalkyl of 3 through 8 carbons, (cycloalkyl)alkyl of 7 through 10 carbons, phenyl or benzyl;

$R_6$ is hydrogen, alkyl of 1 through 3 carbons or cycloalkyl of 3 through 4 carbons; and D, E and W are oxygen or sulfur.

2. The method of claim 1 wherein the compound applied is of the formula:

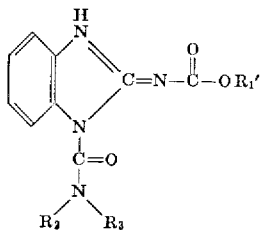

wherein $R_1'$ is methyl, ethyl, isopropyl or sec-butyl;

$R_2$ is hydrogen, alkyl of 1 through 6 carbon atoms, alkenyl of 3 through 6 carbon atoms or alkynyl of 3 through 6 carbon atoms;

$R_3$ is hydrogen; alkyl of 1 through 12 carbon atoms; alkyl of 1 through 12 carbon atoms substituted with halogen, alkoxy of 1 through 4 carbon atoms, or alkoxycarbonyl of 2 through 4 carbon atoms; alkenyl of 3 through 12 carbon atoms; alkynyl of 3 through 12 carbon atoms; cycloalkyl of 3 through 8 carbon atoms; cycloalkyl of 3 through 8 carbon atoms substituted with methyl, methoxy, or chlorine; cycloalkenyl of 4 through 8 carbon atoms; (cycloalkyl)alkyl of 4 through 9 carbon atoms; (cycloalkyl)alkyl of 4 through 9 carbon atoms substituted with methyl, methoxy, or chlorine; (cycloalkenyl)alkyl of 5 through 9 carbon atoms; aralkyl of 5 through 8 carbon atoms; aralkyl of 5 through 8 carbon atoms substituted with alkyl of 1 through 4 carbon atoms, chloroalkyl of 1 through 4 carbon atoms, fluoroalkyl of 1 through 4 carbon atoms, alkoxy of 1 through 4 carbon atoms, halogen, cyano, alkoxycarbonyl of 2 through 3 carbon atoms, alkylsulfonyl of 1 through 4 carbon atoms, or nitro; phenyl; phenyl substituted with alkyl of 1 through 4 carbon atoms, chloroalkyl of 1 through 4 carbon atoms, fluoroalkyl of 1 through 4 carbon atoms, alkoxy of 1 through 4 carbon atoms, halogen, cyano, alkoxycarbonyl of 2 through 3 carbon atoms, alkylsulfonyl of 1 through 4 carbon atoms, or nitro; alkylsulfonyl of 1 through 12 carbon atoms; phenylsulfonyl; phenylsulfonyl substituted with alkyl of 1 through 4 carbon atoms, alkoxy of 1 through 4 carbon atoms, halogen, cyano, alkoxycarbonyl of 2 through 3 carbon atoms, or nitro; acyl of 1 through 12 carbon atoms; acyl of 1 through 12 carbon atoms substituted with halogen or alkoxy of 1 through 4 carbons atoms; aroyl of 6 through 10 carbon atoms; or aroyl of 6 through 10 carbon atoms substituted with alkyl of 1 through 4 carbon atoms, halogen, nitro, alkylsulfonyl of 1 through 4 carbon atoms or alkoxy of 1 through 4 carbon atoms; provided that when $R_2$ and $R_3$ are both substituents on the same nitrogen, they can be taken together to be —$(CH_2)_n$— where $n$ is 2 to 8 or —$(CH_2)_2$—O—$(CH_2)_2$—; and provided that the total carbon content of $R_2$ and $R_3$ shall not exceed 12 carbons.

3. The method of claim 1 wherein the compound applied is of the formula:

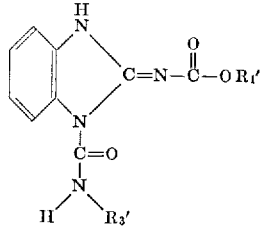

wherein $R_1'$ is methyl, ethyl, isopropyl or sec-butyl; and $R_3'$ is alkyl of 1 through 12 carbon atoms; phenyl; phenyl substituted with methyl, ethyl, methoxy, ethoxy, nitro, $CF_3$, $CH_3SO_2$ or halogen; benzyl; benzyl substituted with methyl, nitro, methoxy, or halogen; (cycloalkyl) alkyl of 7 through 8 carbon atoms; (cycloalkyl)alkyl of 7 through 8 carbon atoms substituted with methyl; cyclohexyl; or cyclohexyl substituted with methyl.

4. The method of claim 1 wherein the compound applied is of the formula:

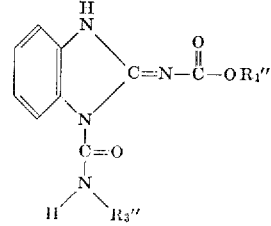

wherein $R_1''$ is methyl or ethyl and $R_3''$ is alkyl of 1 through 8 carbon atoms.

5. The method of claim 1 wherein the compound is 1-butylcarbamoyl-2-benzimidazolecarbamic acid, methyl ester.

6. The method of claim 1 wherein the compound is 1-hexylcarbamoyl-2-benzimidazolecarbamic acid, methyl ester.

7. The method of claim 1 wherein the compound is 1-octylcarbamoyl-2-benzimidazolecarbamic acid, methyl ester.

8. The method of claim 1 wherein the compound is 1-(p-methoxyphenylcarbamoyl)-2-benzimidazolecarbamic acid, methyl ester.

9. The method of preventing injury due to mites or fungi comprising applying to the locus to be protected from fungi and mites a fungicidally effective amount of a compound of the formula:

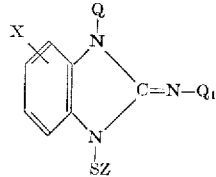

where

X is hydrogen, halogen, alkyl of 1 through 4 carbon atoms, nitro, or alkoxy or 1 through 4 carbon atoms;

$Q_1$ is hydrogen, $COOR_1$ or $COR_6$;

Z is alkyl of 1 through 6 carbon atoms; alkyl of 1 through 6 carbon atoms substituted with chlorine or fluorine; phenyl; phenyl substituted with nitro, chlorine, fluorine, alkoxy of 1 through 4 carbon atoms, methyl, halomethyl, or alkylsulfonyl of 1 through 4 carbon atoms; benzyl; or benzyl substituted with nitro, chlorine, fluorine, methyl, halomethyl, alkoxy of 1 through 4 carbon atoms, or alkylsulfonyl of 1 through 4 carbon atoms;

3,541,213

117

Q is —SZ; hydrogen, —CDER$_5$; cyano;

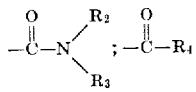

alkylsulfonyl of 1 to 6 carbon atoms;

methyl; methyl substituted with CN, —COOR, or —OR; alkenyl of 3 or 4 carbon atoms; propargyl; phenylsulfonyl; phenylsulfonyl substituted with halogen, methoxy, methyl or ethyl; benzylsulfonyl; or benzylsulfonyl substituted with halogen, methoxy, methyl or ethyl; provided that Q$_1$ cannot be hydrogen when Q is hydrogen, and further provided that the total carbon content of Q and Z cannot exceed 19 carbon atoms;

R is methyl or ethyl;

R$_1$ is alkyl of 1 through 4 carbon atoms or allyl;

R$_2$ is hydrogen, alkyl of 1 through 6 carbon atoms, alkenyl of 3 through 6 carbon atoms or alkynyl of 3 through 6 carbon atoms;

R$_3$ is hydrogen; alkyl of 1 through 18 carbon atoms; alkyl of 1 through 18 carbon atoms substituted with halogen, alkoxy of 1 through 4 carbon atoms, or alkoxycarbonyl of 2 through 4 carbon atoms; alkenyl of 3 through 18 carbon atoms; alkynyl of 3 through 18 carbon atoms; alkenyl of 3 through 18 carbon atoms substituted with halogen, alkoxy of 1 through 4 carbon atoms, or alkoxycarbonyl of 2 through 4 carbon atoms; alkynyl of 3 through 18 carbon atoms substituted with halogen, alkoxy of 1 through 4 carbon atoms, or alkoxycarbonyl of 2 through 4 carbon atoms; cycloalkyl of 3 through 10 carbon atoms; cycloalkyl of 3 through 10 carbon atoms substituted with methyl, methoxy, or chlorine; cycloalkenyl of 4 through 8 carbon atoms; cycloalkenyl of 4 through 8 carbon atoms substituted with methyl, methoxy or chlorine; bicycloalkyl of 7 through 10 carbon atoms; bicycloalkenyl of 7 through 10 carbon atoms; (cycloalkyl)alkyl of 4 through 9 carbon atoms; (cycloalkyl)alkyl of 4 through 9 carbon atoms substituted with methyl, methoxy, or chlorine; (cycloalkenyl)alkyl of 5 through 9 carbon atoms; aralkyl of 5 through 8 carbon atoms; phenyl; phenyl substituted with alkyl of 1 through 4 carbon atoms, chloroalkyl of 1 through 4 carbon atoms, fluoroalkyl of 1 through 4 carbon atoms, alkoxy of 1 through 4 carbon atoms, halogen, cyano, alkoxycarbonyl of 2 through 3 carbon atoms, alkylsulfonyl of 1 through 4 carbon atoms, or nitro; aralkyl of 5 through 8 carbon atoms substituted with alkyl of 1 through 4 carbon atoms, chloroalkyl of 1 through 4 carbon atoms, fluoroalkyl of 1 through 4 carbon atoms, alkoxy of 1 through 4 carbon atoms, halogen, cyano, alkoxycarbonyl of 2 through 3 carbon atoms, alkylsulfonyl of 1 through 4 carbon atoms, or nitro; alkylsulfonyl of 1 through 18 carbon atoms; phenylsulfonyl; phenylsulfonyl substituted with alkyl of 1 through 4 carbon atoms, alkoxy of 1 through 4 carbon atoms, halogen, cyano, alkoxycarbonyl of 2 through 3 carbon atoms, or nitro; acyl of 1 through 18 carbon atoms; acyl of 1 through 18 carbon atoms substituted with halogen or alkoxy of 1 through 4 carbon atoms; aroyl of 6 through 10 carbon atoms; or aroyl of 6 through 10 carbon atoms substituted with alkyl of 1 through 4 carbon atoms, halogen, nitro, alkylsulfonyl of 1 through 4 carbon atoms or alkoxy of 1 through 4 carbon atoms; provided that

118 when R$_2$ and R$_3$ are both substituents on the same nitrogen, they can be taken together to be —(CH$_2$)$_n$— where $n$ is 2 to 8, or —(CH$_2$)—O—(CH$_2$)$_2$—;

R$_4$ is hydrogen; alkyl of 1 through 12 carbon atoms; alkyl of 1 through 12 carbon atoms substituted with chlorine, fluorine, cyano, hydroxy, acetoxy or —OR$_1$; chlorine; cycloalkyl of 3 through 8 carbon atoms; alkenyl of 2 through 10 carbon atoms; alkynyl of 2 through 10 carbon atoms; aryl of the formula:

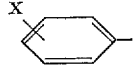

wherein X is as defined previously or alkoxycarbonyl of 2 to 5 carbon atoms;

R$_5$ is alkyl of 1 through 12 carbon atoms, alkenyl of 3 through 10 carbon atoms, alkynyl of 3 through 10 carbon atoms, (cycloalkyl)alkyl of 7 through 10 carbon atoms, phenyl or benzyl; cycloalkyl of 3 through 8 carbon atoms;

R$_6$ is hydrogen, alkyl of 1 through 3 carbon atoms or cycloalkyl of 3 through 4 carbon atoms; and D, E and W are oxygen or sulfur.

10. The method of claim 9 wherein the compound applied is of the formula:

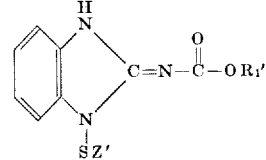

wherein

R$_1'$ is methyl, ethyl, isopropyl or sec-butyl; and

Z' is alkyl of 1 through 3 carbon atoms; alkyl of 1 through 3 carbon atoms substituted with chlorine; phenyl; phenyl substituted with methyl, nitro, or chlorine; benzyl; or benzyl substituted with methyl, nitro or chlorine.

11. The method of claim 9 wherein the compound applied is of the formula:

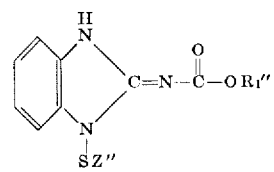

wherein

R$_1''$ is methyl, ethyl or isopropyl; and

Z'' is trichloromethyl or 2,4-dinitrophenyl.

12. The method of claim 9 wherein the compound applied is 1-(trichloromethylthio)-2-benzimidazolecarbamic acid, methyl ester.

13. The method of claim 9 wherein the compound applied is 1-(trichloromethylthio)-2-benzimidazolecarbamic acid, ethyl ester.

14. The method of claim 9 wherein the compound applied is 1-(2,4-dinitrophenylthio)-2 - benzimidazolecarbamic acid, methyl ester.

15. The method of claim 9 wherein the compound applied is 1-(2,4-dinitrophenylthio)-2 - benzimidazolecarbamic acid, ethyl ester.

16. The method of claim 9 wherein the compound applied is 1,3-di-(trichloromethylthio)-2 - benzimidazolecarbamic acid, methyl ester.

17. The method of claim 9 wherein the compound applied is 1-(trichloromethylthio)-3-methylcarbamoyl-2-benzimidazolinecarbamic acid, methyl ester.

18. The method of preventing injury due to mites or fungi comprising applying to the locus to be protected from fungi and mites a fungicidally effective amount of a compound of the formula:

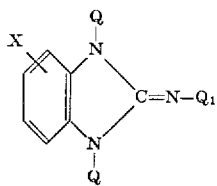

wherein
X is hydrogen, halogen, alkyl of 1 through 4 carbon atoms, nitro, or alkoxy of 1 through 4 carbons;
$Q_1$ is hydrogen, $CDER_1$, or

the other Q's are the same or different and are hydrogen; methyl; methyl substituted with —OR, —CN or COOR; alkenyl of 3 through 4 carbon atoms; propargyl;

cyano; alkylsulfonyl of 1 through 6 carbon atoms; phenylsulfonyl; benzylsulfonyl; $CDER_5$;

or trichloromethylsulfonyl; provided that when one Q and $Q_1$ are each either hydrogen or $COOR_1$, the other Q cannot be hydrogen or $COOR_2$; and further provided that the total number of carbon atoms for the two Q's cannot exceed 14 carbon atoms;
R is methyl or ethyl;
$R_1$ is alkyl of 1 through 4 carbon atoms or allyl;
$R_2$ is alkyl of 1 through 6 carbon atoms, alkenyl of 1 through 6 carbon atoms or alkynyl of 1 through 6 carbon atoms;
$R_4$ is hydrogen; alkyl of 1 through 12 carbon atoms; alkyl of 1 through 12 carbon atoms substituted with hydroxy, —$OR_1$, acetoxy, chlorine, fluorine or cyano; chlorine; alkenyl of 2 through 10 carbon atoms; alkynyl of 2 through 10 carbon atoms; cycloalkyl of 3 through 8 carbon atoms; aryl of the formula:

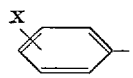

wherein X is as defined previously or alkoxycarbonyl of 2 through 5 carbon atoms;
$R_5$ is alkyl of 1 through 12 carbon atoms; alkyl of 1 through 12 carbon atoms substituted with cyano, hydroxy, OR, chlorine or bromine; alkenyl of 3 through 10 carbon atoms; alkynyl of 3 through 10 carbon atoms; cycloalkyl of 3 through 8 carbon atoms; (cycloalkyl)alkyl of 7 through 10 carbon atoms; (cycloalkyl)alkyl of 7 through 10 carbon atoms substituted with methyl, methoxy or chlorine;

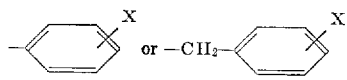

wherein X is as defined previously,
$R_6$ is hydrogen, alkyl of 1 through 3 carbon atoms, or cycloalkyl of 3 through 4 carbon atoms; and
D, E and W are oxygen or sulfur.

19. The method of claim 18 wherein the compound applied is of the formula:

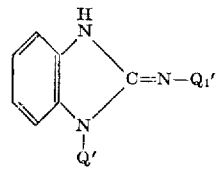

wherein
$Q_1'$ is $COOR_1'$ or

Q' is hydrogen; methyl; methyl substituted with cyano, OR or COOR; cyano; $CDER_5$;

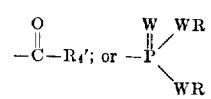

provided that when $Q_1'$ is $COOR_1'$, Q' cannot be hydrogen or $COOR_2$;
R is methyl or ethyl;
$R_1'$ is methyl, ethyl, isopropyl or sec-butyl;
$R_2$ is alkyl of 1 through 6 carbon atoms, alkenyl of 1 through 6 carbon atoms or alkynyl of 1 through 6 carbon atoms;
$R_4'$ is alkyl of 1 through 12 carbon atoms; alkyl of 1 through 12 carbon atoms substituted with hydroxy, —OR, cyano, acetoxy, chlorine or fluorine; alkynyl of 2 through 10 carbon atoms; alkenyl of 2 through 10 carbon atoms; cycloalkyl of 3 through 8 carbon atoms; chlorine; aryl of the type:

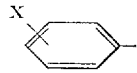

or alkoxycarbonyl of 2 to 5 carbons;
X is hydrogen, halogen, alkyl of 1 through 4 carbon atoms, nitro, or alkoxy of 1 through 4 carbon atoms;
$R_5$ is alkyl of 1 through 12 carbon atoms; alkyl of 1 through 12 carbon atoms substituted with cyano, hydroxy, OR, chlorine or bromine; alkenyl of 3 through 10 carbon atoms; alkynyl of 3 through 10 carbon atoms; cycloalkyl of 3 through 8 carbon atoms; (cycloalkyl)alkyl of 7 through 10 carbon atoms; (cycloalkyl)alkyl of 7 through 10 carbon atoms substituted with methyl, methoxy or chlorine;

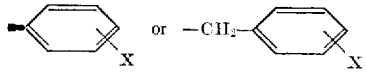

wherein X is as defined previously;
$R_6'$ is hydrogen, alkyl of 1 through 3 carbon atoms, or cycloalkyl of 3 through 4 carbon atoms; and
D, E and W are oxygen or sulfur.

20. The method of claim 18 wherein the compound applied is of the formula:

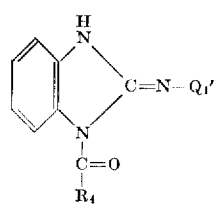

wherein
$Q_1'$ is $COOR_1'$ or

$R_1'$ is methyl, ethyl, isopropyl or sec-butyl;
$R_4$ is hydrogen; alkyl of 1 through 12 carbon atoms;

alkyl of 1 through 12 carbon atoms substituted with cyano, hydroxy, methoxy, ethoxy, acetoxy, chlorine, or fluorine; chlorine; alkenyl of 2 through 10 carbon atoms; alkynyl of 2 through 10 carbon atoms; cycloalkyl of 3 through 8 carbon atoms; alkoxy-carbonyl of 2 through 5 carbon atoms and aryl of the formula:

$$-\langle\underset{=}{\bigcirc}\rangle-X$$

wherein X is as defined previously; and
$R_6'$ is alkyl of 1 through 3 carbon atoms or cycloalkyl of 3 through 4 carbon atoms.

21. The method of claim 18 wherein the compound applied is of the formula:

[Structure: benzimidazoline with H-N, C=N-C(=O)-OR₁″, and N-C(=O)-R₄″]

wherein
$R_1''$ is methyl or ethyl; and
$R_4''$ is alkyl of 1 through 4 carbons, cycloalkyl of 3 through 4 carbons, methoxycarbonyl, or ethoxycarbonyl.

22. A mite ovicidal or fungicidal composition comprising a suitable agricultural adjuvant with a fungicidal amount of a compound of the formula:

[Structure: benzimidazoline with Q-N, C=N-C(=O)-A, and N-C(=O)-N(R₂)(R₃), with X substituent]

wherein
X is hydrogen, halogen, alkyl of 1 through 4 carbon atoms, nitro, or alkoxy of 1 through 4 carbon atoms;
A is $OR_1$ or $R_6$;
Q is hydrogen; methyl; methyl substituted with cyano, OR or COOR; alkylsulfonyl of 1 through 6 carbon atoms; phenylsulfonyl; phenylsulfonyl substituted with methyl, ethyl, methoxy or halogen; benzylsulfonyl; benzylsulfonyl substituted with methyl, ethyl, methoxy or halogen; alkenyl of 3 to 4 carbon atoms; propargyl; cyano;

$$\underset{WR}{\overset{W}{\underset{\|}{-P}}}\underset{WR}{\overset{WR}{\diagdown}}\;;\;\;-\overset{O}{\underset{\|}{C}}-R_4;\;-\overset{O}{\underset{\|}{C}}-N\underset{R_3}{\overset{R_2}{\diagdown}}\;;\;\text{or } CDER_5$$

with the proviso that the total carbon content of $R_2$, $R_3$ and Q shall not exceed 18 carbon atoms;
R is methyl or ethyl;
$R_1$ is alkyl of 1 through 4 carbon atoms or allyl;
$R_2$ is hydrogen, alkyl of 1 through 6 carbon atoms, alkenyl of 3 through 6 carbon atoms or alkynyl of 3 through 6 carbon atoms;
$R_3$ is hydrogen; alkyl of 1 through 18 carbon atoms; alkyl of 1 through 18 carbon atoms substituted with halogen, alkoxy of 1 through 4 carbon atoms, or alkoxycarbonyl of 2 through 4 carbon atoms; alkenyl of 3 through 18 carbon atoms; alkenyl of 3 through 18 carbon atoms substituted with halogen, alkoxy of 1 through 4 carbon atoms, or alkoxycarbonyl of 2 through 4 carbon atoms; alkynyl of 3 through 18 carbon atoms; alkynyl of 3 through 18 carbon atoms substituted with halogen, alkoxy of 1 through 4 carbon atoms, or alkoxycarbonyl of 2 through 4 carbon atoms; cycloalkyl of 3 through 10 carbon atoms; cycloalkyl of 3 through 10 carbon atoms substituted with methyl, methoxy, or chlorine; cycloalkenyl of 4 through 8 carbon atoms; cycloalkenyl of 4 through 8 carbon atoms substituted with methyl, methoxy, or chlorine; bicycloalkyl of 7 through 10 carbon atoms; bicycloalkenyl of 7 through 10 carbon atoms; (cycloalkyl)alkyl of 4 through 9 carbon atoms; (cycloalkyl)alkyl of 4 through 9 carbon atoms substituted with methyl, methoxy, or chlorine; (cycloalkenyl)alkyl of 5 through 9 carbon atoms; aralkyl of 5 through 8 carbon atoms; aralkyl of 5 through 8 carbon atoms substituted with alkyl of 1 through 4 carbon atoms, chloroalkyl of 1 through 4 carbon atoms, fluoroalkyl of 1 through 4 carbon atoms, alkoxy of 1 through 4 carbon atoms, halogen, cyano, alkoxycarbonyl of 2 through 3 carbon atoms, alkylsulfonyl of 1 through 4 carbon atoms, or nitro; phenyl; phenyl substituted with alkyl of 1 through 4 carbon atoms, chloroalkyl of 1 through 4 carbon atoms, fluoroalkyl of 1 through 4 carbon atoms, alkoxy of 1 through 4 carbon atoms, halogen, cyano, alkoxycarbonyl of 2 through 3 carbon atoms, alkylsulfonyl of 1 through 4 carbon atoms, or nitro; alkylsulfonyl of 1 through 18 carbon atoms; phenylsulfonyl; phenylsulfonyl substituted with alkyl of 1 through 4 carbon atoms, alkoxy of 1 through 4 carbon atoms, halogen, cyano, alkoxycarbonyl of 2 through 3 carbon atoms, or nitro; acyl of 1 through 18 carbon atoms; acyl of 1 through 18 carbon atoms substituted with halogen or alkoxy of 1 through 4 carbon atoms; aroyl of 6 through 10 carbon atoms; or aroyl of 6 through 10 carbon atoms substituted with alkyl of 1 through 4 carbon atoms, halogen, nitro, alkylsulfonyl of 1 through 4 carbon atoms or alkoxy of 1 through 4 carbon atoms; provided that when $R_2$ and $R_3$ are both substituents on the same nitrogen, they can be taken together to be —(CH₂)ₙ— where $n$ is 2 to 8 or —(CH₂)₂—O—(CH₂)₂—;
$R_4$ is hydrogen; alkyl of 1 through 12 carbon atoms; alkyl of 1 through 12 carbon atoms substituted with hydroxy, —OR₁, cyano, acetoxy, chlorine or fluorine; alkynyl of 2 through 10 carbon atoms; alkenyl of 2 through 10 carbon atoms; cycloalkyl of 3 through 8 carbon atoms; chlorine; alkoxycarbonyl of 2 through 5 carbons; or aryl of the type $$-\langle\underset{=}{\bigcirc}\rangle-X$$

wherein X is as defined previously
$R_5$ is alkyl of 1 through 12 carbons, alkenyl of 3 through 10 carbons, alkynyl of 3 through 10 carbons, cycloalkyl of 3 through 8 carbons, (cycloalkyl)alkyl of 7 through 10 carbons, phenyl or benzyl;
$R_6$ is hydrogen, alkyl of 1 through 3 carbons or cycloalkyl of 3 through 4 carbons; and
D, E and W are oxygen or sulfur.

23. The composition of claim 22 wherein the compound applied is of the formula:

[Structure: benzimidazoline with H-N, C=N-C(=O)-OR₁′, and N-C(=O)-N(R₂)(R₃)]

wherein
$R_1'$ is methyl, ethyl, isopropyl or sec-butyl;
$R_2$ is hydrogen, alkyl of 1 through 6 carbon atoms, alkenyl of 3 through 6 carbon atoms or alkynyl of 3 through 6 carbon atoms;

R₃ is hydrogen; alkyl of 1 through 12 carbon atoms; alkyl of 1 through 12 carbon atoms substituted with halogen, alkoxy of 1 through 4 carbon atoms, or alkoxycarbonyl of 2 through 4 carbon atoms; alkenyl of 3 through 12 carbon atoms; alkynyl of 3 through 12 carbon atoms; cycloalkyl of 3 through 8 carbon atoms; cycloalkyl of 3 through 8 carbon atoms substituted with methyl, methoxy, or chlorine; cycloalkenyl of 4 through 8 carbon atoms; (cycloalkyl)-alkyl of 4 through 9 carbon atoms; (cycloalkyl)-alkyl of 4 through 9 carbon atoms substituted with methyl, methoxy, or chlorine; (cycloalkenyl)alkyl of 5 through 9 carbon atoms; aralkyl of 5 through 8 carbon atoms; aralkyl of 5 through 8 carbon atoms substituted with alkyl of 1 through 4 carbon atoms, chloroalkyl of 1 through 4 carbon atoms, fluoroalkyl of 1 through 4 carbon atoms, alkoxy of 1 through 4 carbon atoms, halogen, cyano, alkoxycarbonyl of 2 through 3 carbon atoms, alkylsulfonyl of 1 through 4 carbon atoms, or nitro; phenyl; phenyl substituted with alkyl of 1 through 4 carbon atoms, chloroalkyl of 1 through 4 carbon atoms, fluoroalkyl of 1 through 4 carbon atoms, alkoxy of 1 through 4 carbon atoms, halogen, cyano, alkoxycarbonyl of 2 through 3 carbon atoms, alkylsulfonyl of 1 through 4 carbon atoms, or nitro; alkylsulfonyl of 1 through 12 carbon atoms; phenylsulfonyl; phenylsulfonyl substituted with alkyl of 1 through 4 carbon atoms, alkoxy of 1 through 4 carbon atoms, halogen, cyano, alkoxycarbonyl of 2 through 3 carbon atoms, or nitro; acyl of 1 through 12 carbon atoms; acyl of 1 through 12 carbon atoms substituted with halogen or alkoxy of 1 through 4 carbon atoms; aroyl of 6 through 10 carbon atoms; or aroyl of 6 through 10 carbon atoms substituted with alkyl of 1 through 4 carbon atoms, halogen, nitro, alkylsulfonyl of 1 through 4 carbon atoms or alkoxy of 1 through 4 carbon atoms;

provided that when R₂ and R₃ are both substituents on the same nitrogen, they can be taken together to be —(CH₂)ₙ— where $n$ is 2 to 8 or

—(CH₂)₂—O—(CH₂)₂— and provided that the total carbon content of R₂ and R₃ shall not exceed 12 carbons.

24. The composition of claim 22 wherein the compound applied is of the formula:

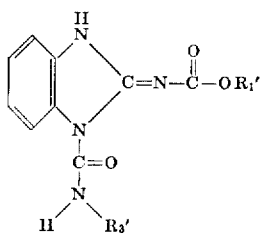

wherein

R₁' is methyl, ethyl, isopropyl or sec-butyl; and
R₃' is alkyl of 1 through 12 carbon atoms; phenyl; phenyl substituted with methyl, ethyl, methoxy, ethoxy, nitro, CF₃, CH₃SO₂ or halogen; benzyl; benzyl substituted with methyl, nitro, methoxy, or halogen; (cycloalkyl)alkyl of 7 through 8 carbon atoms; (cycloalkyl)alkyl of 7 through 8 carbon atoms substituted with methyl; cyclohexyl; or cyclohexyl substituted with methyl.

25. The composition of claim 22 wherein the compound applied is of the formula:

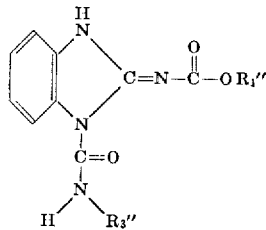

wherein

R₁'' is methyl or ethyl and
R₃'' is alkyl of 1 through 8 carbon atoms.

26. The composition of claim 22 wherein the compound applied is 1-butylcarbamoyl-2-benzimidazolecarbamic acid, methyl ester.

27. The composition of claim 22 wherein the compound applied is 1-hexylcarbamoyl-2-benzimidazolecarbamic acid, methyl ester.

28. The composition of claim 22 wherein the compound applied is 1-octylcarbamoyl-2-benzimidazolecarbamic acid, methyl ester.

29. The composition of claim 22 wherein the compound applied is 1-(p-methoxyphenylcarbamoyl)-2-benzimidazolecarbamic acid, methyl ester.

30. A mite ovicidal or fungicidal composition comprising a suitable agricultural adjuvant with a fungicidal amount of a compound of the formula:

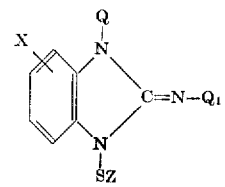

where

X is hydrogen, halogen, alkyl of 1 through 4 carbon atoms, nitro, or alkoxy of 1 through 4 carbon atoms;
Q₁ is hydrogen, COOR₁ or COR₆;
Z is alkyl of 1 through 6 carbon atoms; alkyl of 1 through 6 carbon atoms substituted with chlorine or fluorine; phenyl; phenyl substituted with nitro, chlorine, fluorine, alkoxy of 1 through 4 carbon atoms, methyl, halomethyl, or alkylsulfonyl of 1 through 4 carbon atoms; benzyl; or benzyl substituted with nitro, chlorine, fluorine, methyl, halomethyl, alkoxy of 1 through 4 carbon atoms, or alkylsulfonyl of 1 through 4 carbon atoms;
Q is —SZ; hydrogen, —CDER₅; cyano;

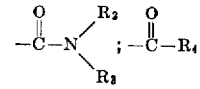

alkylsulfonyl of 1 to 6 carbon atoms;

methyl; methyl substituted with CN, —COOR, or —OR; alkenyl of 3 or 4 carbon atoms; propargyl; phenylsulfonyl; phenylsulfonyl substituted with halogen, methoxy, methyl or ethyl; benzylsulfonyl; or benzylsulfonyl substituted with halogen, methoxy, methyl or ethyl; provided that Q₁ cannot be hydrogen when Q is hydrogen, and further provided that the total carbon content of Q and Z cannot exceed 19 carbon atoms;

R is methyl or ethyl;
R₁ is alkyl of 1 through 4 carbon atoms or allyl;
R₂ is hydrogen, alkyl of 1 through 6 carbon atoms, alkenyl of 3 through 6 carbon atoms or alkynyl of 3 through 6 carbon atoms;

$R_3$ is hydrogen; alkyl of 1 through 18 carbon atoms; alkyl of 1 through 18 carbon atoms substituted with halogen, alkoxy of 1 through 4 carbon atoms, or alkoxycarbonyl of 2 through 4 carbon atoms; alkenyl of 3 through 18 carbon atoms; alkynyl of 3 through 18 carbon atoms; alkenyl of 3 through 18 carbon atoms substituted with halogen, alkoxy of 1 through 4 carbon atoms, or alkoxycarbonyl of 2 through 4 carbon atoms; alkynyl of 3 through 18 carbon atoms substituted with halogen, alkoxy of 1 through 4 carbon atoms, or alkoxycarbonyl of 2 through 4 carbon atoms; cycloalkyl of 3 through 10 carbon atoms; cycloalkyl of 3 through 10 carbon atoms substituted with methyl, methoxy, or chlorine; cycloalkenyl of 4 through 8 carbon atoms; cycloalkenyl of 4 through 8 carbon atoms substituted with methyl, methoxy or chlorine; bicycloalkyl of 7 through 10 carbon atoms; bicycloalkenyl of 7 through 10 carbon atoms; (cycloalkyl)alkyl of 4 through 9 carbon atoms; (cycloalkyl)alkyl of 4 through 9 carbon atoms substituted with methyl, methoxy, or chlorine; (cycloalkenyl)alkyl of 5 through 9 carbon atoms; aralkyl of 5 through 8 carbon atoms; phenyl; phenyl substituted with alkyl of 1 through 4 carbon atoms, chloroalkyl of 1 through 4 carbon atoms, fluoroalkyl of 1 through 4 carbon atoms, alkoxy of 1 through 4 carbon atoms, halogen, cyano, alkoxycarbonyl of 2 through 3 carbon atoms, alkylsulfonyl of 1 through 4 carbon atoms, or nitro; aralkyl of 5 through 8 carbon atoms substituted with alkyl of 1 through 4 carbon atoms, chloroalkyl of 1 through 4 carbon atoms, fluoroalkyl of 1 through 4 carbon atoms, alkoxy of 1 through 4 carbon atoms, halogen, cyano, alkoxycarbonyl of 2 through 3 carbon atoms, alkylsulfonyl of 1 through 4 carbon atoms, or nitro; alkylsulfonyl of 1 through 18 carbon atoms; phenyl sulfonyl; phenylsulfonyl substituted with alkyl of 1 through 4 carbon atoms, alkoxy of 1 through 4 carbon atoms, halogen, cyano, alkoxycarbonyl of 2 through 3 carbon atoms, or nitro; acyl of 1 through 18 carbon atoms; acyl of 1 through 18 carbon atoms substituted with halogen or alkoxy of 1 through 4 carbon atoms; aroyl of 6 through 10 carbon atoms; or aroyl of 6 through 10 carbon atoms substituted with alkyl of 1 through 4 carbon atoms, halogen, nitro, alkylsulfonyl of 1 through 4 carbon atoms or alkoxy of 1 through 4 carbon atoms; provided that when $R_2$ and $R_3$ are both substituents on the same nitrogen, they can be taken together to be $-CH_2)_n-$ where $n$ is 2 to 8, or $-(CH_2)-O-(CH_2)_2-$;

$R_4$ is hydrogen; alkyl of 1 through 12 carbon atoms; alkyl of 1 through 12 carbon atoms substituted with chlorine, fluorine, cyano, hydroxy, acetoxy or $-OR_1$; chlorine; cycloalkyl of 3 through 8 carbon atoms; alkenyl of 2 through 10 carbon atoms; alkynyl of 2 through 10 carbon atoms; aryl of the formula:

wherein X is as defined previously; or alkoxycarbonyl of 2 to 5 carbon atoms;

$R_5$ is alkyl of 1 through 12 carbon atoms, alkenyl of 3 through 10 carbon atoms, alkynyl of 3 through 10, (cycloalkyl)alkyl of 7 through 10 carbon atoms, phenyl or benzyl; cycloalkyl of 3 through 8 carbon atoms;

$R_6$ is hydrogen, alkyl of 1 through 3 carbon atoms or cycloalkyl of 3 through 4 carbon atoms; and D, E and W are oxygen or sulfur.

31. The composition of claim 30 wherein the compound applied is as of the formula:

wherein
 $R_1'$ is methyl, ethyl, isopropyl or sec-butyl; and
 $Z'$ is alkyl of 1 through 3 carbon atoms; alkyl of 1 through 3 carbon atoms substituted with chlorine; phenyl; phenyl substituted with methyl, nitro, or chlorine; benzyl; or benzyl substituted with methyl, nitro or chlorine.

32. The composition of claim 30 wherein the compound applied is as of the formula:

wherein
 $R_1''$ is methyl, ethyl or isopropyl; and
 $Z''$ is trichloromethyl or 2,4-dinitrophenyl.

33. A mite ovicidal or fungicidal composition comprising a suitable agricultural adjuvant with a fungicidal amount of a compound of the formula:

wherein
 X is hydrogen, halogen, alkyl of 1 through 4 carbon atoms, nitro, or alkoxy or 1 through 4 carbons;
 $Q_1$ is hydrogen, $CDER_1$, or $$-\overset{O}{\underset{\|}{C}}-R_4$$

The other Q's are the same or different and are hydrogen; methyl; methyl substituted with $-OR$, $-CN$ or $COOR$; alkenyl of 3 through 4 carbon atoms; propargyl;

$$-\overset{O}{\underset{\|}{C}}-R_4$$

cyano; alkylsulfonyl of 1 through 6 carbon atoms; phenylsulfonyl; benzylsulfonyl; $CDER_5$;

$$-\overset{W}{\underset{\|}{P}}\overset{WR}{\diagdown}_{WR}$$

or trichloromethylsulfonyl; provided that when one Q and $Q_1$ are each either hydrogen or $COOR_1$, the other Q cannot be hydrogen or $COOR_2$; and further provided that the total number of carbon atoms for the two Q's cannot exceed 14 carbon atoms;
 R is methyl or ethyl;
 $R_1$ is alkyl of 1 through 4 carbon atoms or allyl;
 $R_2$ is alkyl of 1 through 6 carbon atoms, alkenyl of 1 through 6 carbon atoms or alkynyl of 1 through 6 carbon atoms;
 $R_4$ is hydrogen; alkyl of 1 through 12 carbon atoms; alkyl of 1 through 12 carbon atoms substituted with hydroxy, $-OR_1$, acetoxy, chlorine, fluorine or cyano; chlorine; alkenyl of 2 through 10 carbon atoms;

alkynyl of 2 through 10 carbon atoms; cycloalkyl of 3 through 8 carbon atoms; aryl of the formula

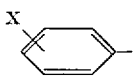

wherein X is as defined previously; or alkoxycarbonyl of 2 through 5 carbon atoms;

$R_5$ is alkyl of 1 through 12 carbon atoms; alkyl of 1 through 12 carbon atoms substituted with cyano, hydroxy, OR, chlorine or bromine; alkenyl of 3 through 10 carbon atoms; alkynyl of 3 through 10 carbon atoms; cycloalkyl of 3 through 8 carbon atoms; (cycloalkyl)alkyl of 7 through 10 carbon atoms; (cycloalkyl)alkyl of 7 through 10 carbon atoms substituted with methyl, methoxy or chlorine;

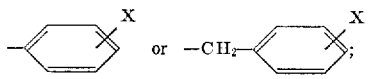

wherein X is as defined previously;

$R_6$ is hydrogen, alkyl of 1 through 3 carbon atoms, or cycloalkyl of 3 through 4 carbon atoms; and D, E and W are oxygen or sulfur.

34. The composition of claim 33 wherein the compound applied is of the formula:

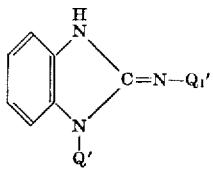

wherein $Q_1'$ is $COOR_1'$ or

Q' is hydrogen; methyl; methyl substituted with cyano, OR or COOR; cyano; $CDER_5$

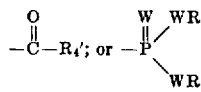

provided that when $Q_1'$ is $COOR_1'$, Q' cannot be hydrogen or $COOR_2$;

R is methyl or ethyl;

$R_1'$ is methyl, ethyl, isopropyl or sec-butyl;

$R_2$ is alkyl of 1 through 6 carbon atoms, alkenyl of 1 through 6 carbon atoms, or alkynyl of 1 through 6 carbon atoms;

$R_4'$ is alkyl of 1 through 12 carbon atoms; alkyl of 1 through 12 carbon atoms substituted with hydroxy, —OR, cyano, acetoxy, chlorine or fluorine; alkynyl of 2 through 10 carbon atoms; alkenyl of 2 through 10 carbon atoms; cycloalkyl of 3 through 8 carbon atoms; chlorine; aryl of the type:

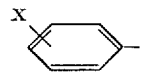

or alkoxycarbonyl of 2 to 5 carbons;

X is hydrogen, halogen, alkyl of 1 through 4 carbon atoms, nitro, or alkoxy of 1 through 4 carbon atoms;

$R_5$ is alkyl of 1 through 12 carbon atoms; alkyl of 1 through 12 carbon atoms substituted with cyano, hydroxy, OR, chlorine or bromine; alkenyl of 3 through 10 carbon atoms; alkynyl of 3 through 10 carbon atoms; cycloalkyl of 3 through 8 carbon atoms; (cycloalkyl)alkyl of 7 through 10 carbon atoms; (cycloalkyl)alkyl of 7 through 10 carbon atoms substituted with methyl, methoxy or chlorine;

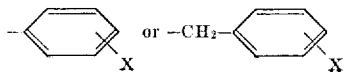

where X is as defined previously;

$R_6'$ is hydrogen, alkyl of 1 through 3 carbon atoms or cycloalkyl of 3 through 4 carbon atoms; and D, E and W are oxygen or sulfur.

35. The composition of claim 33 wherein the compound applied is of the formula:

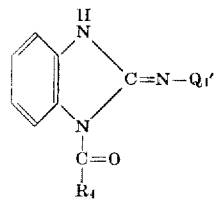

wherein $Q_1'$ is $COOR_1'$ or

$R_1'$ is methyl, ethyl, isopropyl or sec-butyl;

$R_4$ is hydrogen; alkyl of 1 through 12 carbon atoms; alkyl of 1 through 12 carbon atoms substituted with cyano, hydroxy, methoxy, ethoxy, acetoxy (chlorine, or fluorine; chlorine; alkenyl of 2 through 10 carbon atoms; alkynyl of 2 through 10 carbon atoms; cycloalkyl of 3 through 8 carbon atoms; alkoxycarbonyl of 2 through 5 carbon atoms and aryl of the formula:

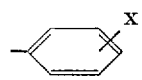

wherein X is as defined previously; and $R_6'$ is alkyl of 1 through 3 carbon atoms or cycloalkyl of 3 through 4 carbon atoms.

36. The composition of claim 33 wherein the compound applied is of the formula:

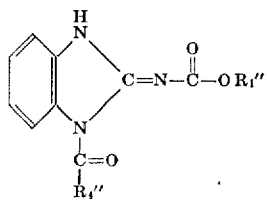

wherein $R_1''$ is methyl or ethyl; and $R_4''$ is alkyl of 1 through 4 carbons, cycloalkyl of 3 through 4 carbons, methoxycarbonyl or ethoxycarbonyl.

References Cited

UNITED STATES PATENTS

| | | | |
|---|---|---|---|
| 2,933,502 | 4/1960 | Klopping | 424—273 |
| 2,933,504 | 4/1960 | Klopping | 424—273 |
| 3,010,968 | 11/1961 | Loux | 260—481 |

FOREIGN PATENTS

| | | |
|---|---|---|
| 666,795 | 7/1965 | Belgium. |

ALBERT T. MEYERS, Primary Examiner

V. D. TURNER, Assistant Examiner

U.S. Cl. X.R.

260—309.2